US012216786B2

(12) United States Patent
Thompson

(10) Patent No.: US 12,216,786 B2
(45) Date of Patent: Feb. 4, 2025

(54) SYSTEMS AND METHODS FOR POSTURE-BASED MODELING

(71) Applicant: AS0001, Inc., Carmel, IN (US)

(72) Inventor: Jonathan J. Thompson, Carmel, IN (US)

(73) Assignee: AS0001, Inc., Carmel, IN (US)

(*) Notice: Subject to any disclaimer, the term of this patent is extended or adjusted under 35 U.S.C. 154(b) by 0 days.

(21) Appl. No.: 18/627,926

(22) Filed: Apr. 5, 2024

(65) Prior Publication Data

US 2024/0273227 A1   Aug. 15, 2024

Related U.S. Application Data

(63) Continuation-in-part of application No. 18/203,630, filed on May 30, 2023.

(60) Provisional application No. 63/457,671, filed on Apr. 6, 2023, provisional application No. 63/347,389, filed on May 31, 2022.

(51) Int. Cl.
   *G06F 21/62*      (2013.01)
   *G06Q 40/08*      (2012.01)

(52) U.S. Cl.
   CPC ......... *G06F 21/6218* (2013.01); *G06Q 40/08* (2013.01)

(58) Field of Classification Search
   CPC .......................... G06F 21/6218; G06Q 40/08
   See application file for complete search history.

(56) References Cited

U.S. PATENT DOCUMENTS

| D653,258 S | 1/2012 | Cahill et al. |
| 9,294,498 B1* | 3/2016 | Yampolskiy ............ H04L 61/25 |
| 10,102,587 B1 | 10/2018 | Potter et al. |
| 10,135,862 B1 | 11/2018 | McClintock et al. |

(Continued)

FOREIGN PATENT DOCUMENTS

| CA | 3131208 A1 | 1/2023 |
| EP | 3 179 696 A1 | 6/2017 |

(Continued)

OTHER PUBLICATIONS

International Search Report and Written Opinion for PCT/US2024/023262 dated Jul. 26, 2024, 8 pgs.

*Primary Examiner* — Jason Chiang
(74) *Attorney, Agent, or Firm* — Foley & Lardner LLP

(57) ABSTRACT

Systems, methods, and computer-readable storage media for protecting data, the data protection system can include one or more processing circuits including memory and at least one processor configured to receive, via a vendor security tool application, a cybersecurity insurance request from the entity, the cybersecurity insurance request including entity data of an entity and determine a cybersecurity posture with proof based on the entity data. The at least one processor is further configured to determine, utilizing one or more insurance parameters, at least one cybersecurity insurance plan corresponding to a cybersecurity attribute to protect the entity based on the cybersecurity posture with proof. The at least one processor is further configured to provide the at least one cybersecurity insurance plan. The at least one processor is further configured to receive an acceptance of the at least one cybersecurity insurance plan and record the acceptance in a compliance dataset.

20 Claims, 80 Drawing Sheets

(56) References Cited

U.S. PATENT DOCUMENTS

| | | |
|---|---|---|
| 10,565,534 B2 | 2/2020 | Delacourt et al. |
| 10,732,962 B1 | 8/2020 | Florescu |
| 10,785,255 B1 | 9/2020 | Otvagin et al. |
| 11,122,073 B1 * | 9/2021 | Cai .................... G06Q 10/0635 |
| 11,240,275 B1 | 2/2022 | Vashisht et al. |
| 11,244,261 B2 | 2/2022 | To et al. |
| 11,354,430 B1 | 6/2022 | Tharakan et al. |
| 11,470,106 B1 | 10/2022 | Lin et al. |
| 11,477,208 B1 | 10/2022 | Vallejo Urena et al. |
| 11,503,061 B1 | 11/2022 | Lin et al. |
| 11,750,643 B1 | 9/2023 | Imrem et al. |
| 11,757,923 B1 | 9/2023 | Vandeventer et al. |
| 11,811,818 B1 | 11/2023 | Vandeventer et al. |
| 11,816,223 B1 | 11/2023 | Vandeventer et al. |
| 11,818,120 B2 | 11/2023 | Jen et al. |
| 11,824,881 B2 | 11/2023 | Shaw et al. |
| 11,824,888 B1 | 11/2023 | Vandeventer et al. |
| 11,870,799 B1 | 1/2024 | Imrem et al. |
| 11,888,886 B1 | 1/2024 | Kudale et al. |
| 11,893,121 B1 | 2/2024 | Imrem et al. |
| 11,895,141 B1 | 2/2024 | Vandeventer et al. |
| 11,943,254 B2 | 3/2024 | Thompson |
| 12,107,869 B1 * | 10/2024 | Kannan .................... H04L 63/20 |
| 2007/0008098 A1 | 1/2007 | Wong |
| 2009/0076879 A1 | 3/2009 | Sparks et al. |
| 2012/0130874 A1 | 5/2012 | Mane et al. |
| 2013/0304616 A1 | 11/2013 | Raleigh et al. |
| 2014/0136379 A1 | 5/2014 | Smith et al. |
| 2014/0279352 A1 | 9/2014 | Schaefer et al. |
| 2015/0242619 A1 * | 8/2015 | Bender .................... H04L 63/10 726/22 |
| 2016/0019636 A1 | 1/2016 | Adapalli et al. |
| 2016/0044058 A1 * | 2/2016 | Schlauder ........... H04L 63/1433 726/25 |
| 2016/0070908 A1 | 3/2016 | Sanghvi et al. |
| 2016/0132806 A1 | 5/2016 | To et al. |
| 2016/0203319 A1 * | 7/2016 | Coen .................. G06Q 30/0185 726/25 |
| 2017/0041296 A1 | 2/2017 | Ford et al. |
| 2017/0063910 A1 | 3/2017 | Muddu et al. |
| 2017/0187742 A1 | 6/2017 | Rogers et al. |
| 2017/0214632 A1 | 7/2017 | Vedula |
| 2018/0375892 A1 * | 12/2018 | Ganor ................ G06Q 10/0635 |
| 2019/0095320 A1 | 3/2019 | Biswas et al. |
| 2019/0098037 A1 | 3/2019 | Shenoy et al. |
| 2019/0130113 A1 * | 5/2019 | Obermeier ............ G06F 21/577 |
| 2019/0182287 A1 * | 6/2019 | Hanley .................... H04L 63/20 |
| 2019/0207966 A1 | 7/2019 | Vashisht et al. |
| 2019/0319940 A1 | 10/2019 | Hamel et al. |
| 2020/0036707 A1 | 1/2020 | Callahan et al. |
| 2020/0067779 A1 | 2/2020 | Jost et al. |
| 2020/0401696 A1 | 12/2020 | Ringlein et al. |
| 2020/0402179 A1 | 12/2020 | Teresi |
| 2020/0412751 A1 | 12/2020 | Thayer et al. |
| 2021/0029156 A1 * | 1/2021 | Sharifi Mehr ........ H04L 67/303 |
| 2021/0075821 A1 | 3/2021 | Chenette et al. |
| 2021/0084057 A1 * | 3/2021 | Chhabra ............ H04L 63/1416 |
| 2021/0136121 A1 | 5/2021 | Crabtree et al. |
| 2021/0211452 A1 | 7/2021 | Patel et al. |
| 2021/0234885 A1 * | 7/2021 | Campbell ............... H04L 63/20 |
| 2021/0287299 A1 | 9/2021 | Tofte et al. |
| 2021/0314293 A1 | 10/2021 | Soundararajan et al. |
| 2021/0367963 A1 * | 11/2021 | Murray ............... H04L 63/0414 |
| 2021/0367964 A1 | 11/2021 | Jones et al. |
| 2022/0027828 A1 | 1/2022 | Avala et al. |
| 2022/0060499 A1 * | 2/2022 | Huda .................. H04L 63/1416 |
| 2022/0094596 A1 * | 3/2022 | Jagannathan ........... H04L 63/20 |
| 2022/0164440 A1 | 5/2022 | Murphy et al. |
| 2022/0329630 A1 | 10/2022 | Li |
| 2022/0377099 A1 | 11/2022 | Berger et al. |
| 2023/0259632 A1 * | 8/2023 | Marciano ............. G06F 21/577 726/25 |
| 2023/0269625 A1 | 8/2023 | Raleigh et al. |
| 2023/0308474 A1 * | 9/2023 | Thompson ......... H04L 63/1441 |
| 2023/0370452 A1 * | 11/2023 | Mannengal ............. H04L 63/20 |
| 2023/0379346 A1 | 11/2023 | Goldstein et al. |
| 2023/0403154 A1 | 12/2023 | Kaizer et al. |
| 2024/0013198 A1 | 1/2024 | Terborg et al. |
| 2024/0064176 A1 | 2/2024 | Raleigh et al. |
| 2024/0086918 A1 | 3/2024 | Gisolfi et al. |
| 2024/0121259 A1 | 4/2024 | Imrem et al. |
| 2024/0129318 A1 | 4/2024 | Vandeventer et al. |
| 2024/0184659 A1 | 6/2024 | Vandeventer et al. |
| 2024/0185191 A1 | 6/2024 | Bernardi |

FOREIGN PATENT DOCUMENTS

| | | |
|---|---|---|
| WO | WO-2008/147400 A1 | 12/2008 |
| WO | WO-2019/051166 A1 | 3/2019 |
| WO | WO-2021/105626 A1 | 6/2021 |

* cited by examiner

Welcome, Maplecraft!
Quick Start Guide

Get Started

- Internal Team
- Critical Assets
- Insurer & Panel Providers
- Response Plan
- Resilience Testing

Internal Team
Let's work on getting your internal team together.

Copy and send this invite link:
https://www.rspndr.app/invite?=876g786txi7h676bbljko Or type an email and press return to invite them:
e.g. first.last@domain.com

| | | |
|---|---|---|
| emai.address@gmail.com | Joined | ⊗ |
| emai.address@gmail.com | Joined | ⊗ |
| emai.address@gmail.com | Joined | ⊗ |
| emai.address@gmail.com | Pending | ⊗ |
| emai.address@gmail.com | Pending | ⊗ |
| emai.address@gmail.com | Pending | ⊗ |

+ Add Task     Continue

Incident Readiness Progress
1 of 5 steps complete

What to expect during an incident.

FIG. 7A

① How will Responder help me?

Responder helps you methodically structure your security team to bring everyone together in one place. In the event of a cyber security event, all appropriate parties will be notified immediately to ensure timely response and remediation.

YOUR INCIDENT RESPONSE TEAM:

| CYBER INSURER | BREACH COACH | IRTEAM |
|---|---|---|
| NONE SELECTED | NONE SELECTED | NONE SELECTED |

② How will your incident response vendors help?

Incident response vendors help you during a cyber security attack by providing you with a team of experts who help you to assess the situation, contain the damage, and recover from the attack. They also help you to develop a plan to prevent future attacks.

There is no one-size-fits-all incident response vendor, as the best cyber security vendor for a given organization will depend on that organization's specific needs and requirements. However, some tips for choosing a cyber security vendor include:

1. Define your organization's specific needs and requirements.
2. Research various cyber security vendors to see which ones offer solutions that meet your needs.
3. Request proposals from vendors that look promising, and compare their offerings.
4. Make sure to also consider factors such as cost, customer support, and reputation.
5. Once you've narrowed down your options, choose the vendor that you feel is the best fit for your organization.

③ Tasks and analysis to learn more about the attack.

+ Add Task

FIG. 7B

③ Tasks and analysis to learn more about the attack.

Incident response is the process of identifying, containing, eradicating, and recovering from a security incident. The goal of incident response is to minimize the damage caused by a security incident and to restore normal operations as quickly as possible.

The first step in incident response is to identify the incident. This can be done by monitoring system activity and looking for signs of unusual activity. Once the incident has been identified, it must be contained. This means isolating the affected systems and preventing the spread of the Incident. The next step is to eradicate the cause of the incident. This can be done by removing malware, patching vulnerabilities, or taking other corrective action. Finally, the incident must be recovered from. This means restoring data, rebuilding systems, and taking other steps to return to normal operations.

④ Live monitoring for you and your key stakeholders so everyone is in sync.

There are a few key ways to keep stakeholders up-to-date during a cyber security attack:

1. Communicate early and often: As soon as you become aware of a potential cyber security attack, it's important to start communicating with key stakeholders. This includes letting them know what's happening, what you're doing to mitigate the attack, and what steps they can take to protect themselves.
2. Use multiple channels: Don't rely on just one communication channel (e.g., email) to reach your stakeholders. Use multiple channels (e.g., phone, text, social media) to ensure that your message gets through.
3. Be clear and concise: When communicating during a crisis, it's important to be clear and concise. Avoid using jargon or technical terms that your stakeholders may not understand.
4. Keep it updated: As the situation changes, make sure to keep your stakeholders updated with the latest information. This includes any new steps you're taking to mitigate the attack, as well as any

Welcome, Maplecraft!
Quick Start Guide

Get Started

- Internal Team
- Critical Assets
- Insurer & Panel Providers
- Response Plan
- Resilience Testing

Response Plan

Feugiat suscipit ac laoreet lectus eu venenatis. Eget scelerisque sed neque aenean morbi ultrices augue. Enim nibh metus pretium semper commodo mattis non.

Do you have a response plan?

| Yes | No | Use Included Plan |

Purchase a Response Plan

Browse response plans from our cyber security vendor marketplace.

◆ BEST FIT
VENDOR NAME
NAME OF OFFERING $XXX.XX
VIEW DETAILS

◆ BEST FIT — 714
VENDOR NAME
NAME OF OFFERING $XXX.XX
VIEW DETAILS

Browse 24 more plans...

— 712
Incident Readiness Progress
3 of 5 steps complete

Go Back | Continue

+ Add Task

FIG. 7I

③ Store test results, issues identified, root causes, and learnings

Consectetur aliquam ipsum dolor, felis sed molestie euismod quam. Orci dolor aenean tempus fringilla amet, justo massa. Massa sit elit elementum convallis mauris hac tincidunt. Quam fermentum posuere vitae sed sed erat vitae magna elit. Mi lacus tortor sapien sed nisl dis sem magna auctor. Duis fringilla mi at posuere.

WE FOUND 8 TOTAL ISSUES:

☐ CONTROLS MISSING FROM ASSETS
LOREM IPSUM DOLOR SIT AMET, CONSECTETUR ADIPISCING ELIT. ELIT SED FERMENTUM, VIVAMUS...

⚡ RDP OPEN TO INTERNET
LOREM IPSUM DOLOR SIT AMET, CONSECTETUR ADIPISCING ELIT. ARCU BIBENDUM IN MAS A. GR...

VIEW ALL...

④ REVIEW FINDINGS AND REMEDIATE ISSUES IN A TIMELY MANNER

THIRD PARTY PEN TESTING

① ENGAGE REGULAR, RECURRING PEN TESTING

② CONDUCT TESTING

③ STORE TEST RESULTS AND REVIEW ISSUES WITH MANAGEMENT

④ TRACK HIGH-PRIORITY ISSUES AND RESOLVE

+ Add Task

Incident Readiness Progress
5 of 5 steps complete

FIG. 7L

The first step in incident response is to identify the incident. This can be done by monitoring system activity and looking for signs of unusual activity. Once the incident has been identified, it must be contained. This means isolating the affected systems and preventing the spread of the incident. The next step is to eradicate the cause of the incident. This can be done by removing malware, patching vulnerabilities, or taking other corrective action. Finally, the incident must be recovered from. This means restoring data, rebuilding systems, and taking other steps to return to normal operations.

④ Live monitoring for you and your key stakeholders so everyone is in sync.

There are a few key ways to keep stakeholders up-to-date during a cyber security attack:

1. Communicate early and often: As soon as you become aware of a potential cyber security attack, it's important to start communicating with key stakeholders. This Includes letting them know what's happening, what you're doing to mitigate the attack, and what steps they can take to protect themselves.
2. Use multiple channels: Don't rely on just one communication channel (e.g., email) to reach your stakeholders. Use multiple channels (e.g., phone, text, social media) to ensure that your message gets through.
3. Be clear and concise: When communicating during a crisis, it's important to be clear and concise. Avoid using jargon or technical terms that your stakeholders may not understand.
4. Keep it updated: As the situation changes, make sure to keep your stakeholders updated with the latest information. This includes any new steps you're taking to mitigate the attack, as well as any new risks that they should be aware of.

Maplecraft
◉ Indianapolis, IN

Existing Capabilities

| Capability | Provider | Offering | Linked in Horizon | API Key |
|---|---|---|---|---|
| Cyber Insurer | ⊙ Resilience | <Name of Product> | 🔗 | 1e0bc770-8602-4c... |
| Breach Coach | ⓝ Mullen-Coughlin ˅ | <Name of Product> ⊕<br><Name of Product> ⊕<br>+ Add another... | 🔗 | 1e0bc770-8602-4c... |
| Network Security | ⓔ Vendor Name | <Name of Product> | 🔗 | ⊕ |
| Endpoint Security | -- | -- | -- | -- |
| MSSP | ⓔ Vendor Name | <Name of Product> | 🔗 | ⊕ |
| Security Operations | ⓔ Vendor Name | <Name of Product> | 🔗 | ⊕ |
| Messaging Security | -- | -- | -- | 1e0bc770-8602-4c... |
| Risk Management | -- | -- | -- | 1e0bc770-8602-4c... |
| Transaction Security | -- | -- | -- | 1e0bc770-8602-4c... |
| SEIM | ⓔ Vendor Name | <Name of Product> | 🔗 | ⊕ |
| MFA | ⓔ Vendor Name | <Name of Product> | 🔗 | ⊕ |
| Wer Security | ⓔ Vendor Name | <Name of Product> | 🔗 | ⊕ |
| Application Security | ⓔ Vendor Name | <Name of Product> | 🔗 | ⊕ |
| Data Security | -- | -- | -- | 1e0bc770-8602-4c... |
| Incident Response | ⓚ Kroll | <Name of Product> | 🔗 | ⊕ |
| Access Management | ⓔ Vendor Name | <Name of Product> | 🔗 | ⊕ |
| Fraud Protection | -- | -- | -- | 1e0bc770-8602-4c... |
| Cloud Security | -- | -- | -- | 1e0bc770-8602-4c... |

FIG. 9B

Additional Capabilities (Enhanced Protection)
These components are not required to fulfill your stated security objective, but will offer additional protections.

| User Testing [+ Add] | Pen Testing [+ Add] | Threat Response [+ Add] |
|---|---|---|
| The objective of this category is to ultrices sit nisl, ultrices turpis. | The objective to ultrices sit | The objective of this category is to ultrices sit nisl, ultrices turpis. |
| MSRP Range $5K-$10K — 904 | MSRP Range $5K-$10K | MSRP Range $5K-$10K |

Phase I
Phase II
Phase II
+ Add phase...

| WAF [+ Add] | Secure Coll | Rights Mgmt [+ Add] |
|---|---|---|
| The objective of this category is to ultrices sit nisl, ultrices turpis. | The objective of this category is to ultrices sit nisl, ultrices turpis. | The objective of this category is to ultrices sit nisl, ultrices turpis. |
| MSRP Range $5K-$10K | MSRP Range $5K-$10K | MSRP Range $5K-$10K |

Security Stack Designer
Spectrum by Alpine Security

Company Profile

What can you tell us about your organization?
- Employees: 50-100 Employees
- Industry: Health Care
- HQ Location: CA-California
- Annual Revenue: $50M-$100M
- Cybersecurity Team: 2-5 Members Last updated Monday at 3:47 PM - View Activity

Data
- Employee
- PII
- Medical
- Critical Infra.
- Security
- Sensitive

Location

Hardware
- Desktops — Laptops
- Mobiles — Servers
- File Servers — Databases

Compute Services

---

[Designer] [Composer] Expand Header    [Share] [Save Design]

Security Program Objective: Obtain Cyber Liability Insurance
Target Coverage: Up to $500K   Target Retention: $25K   Target Premium: $3K - $5K/mo

My Data — What kind of data does your organization store?
- Employee — Financial
- IP — PII

— 906

Dian added PII Monday at 3:47 PM - View Activity

My Threats — What threats are you most concerned about?
- Ransomware — Phishing

— 908

James added Phishing at Thursday 3:47 PM - View Activity

My Locations — What hardware do you have at your organization?
- Desktops — Laptops
- AWS — Salesforce Cloud
- Google Cloud — G Suite

— 910

Meghan approved this on Tuesday at 3:47 PM - View Activity

Capabilities — What are your existing cybersecurity capabilities?
- Sec Ops — Web Security
- Access Mgmt — App Security
- SEIM — MDR

— 912

Shanae added Access Management today at 3:47 PM - View Activity

Your Security Posture
Coverage: ▨ Your Organization ▨ Similar Peer ▨ Required

---

Estimated Cost
[Annual] [Monthly]
Security stack starts at:
$18,500/yr

[Continue to Vendor Selection]

Approved by 8 of 11 Reviewers

Capabilities Chat

Penatibus a odio et a. Sollicitudin vitae faucibus feugiat et id. Dignissim nec est sit lobortis. Viverra a pretium sodales.

Sarah Beatle
Et sit at vitae fringilla.

Placerat eu interdum eget donec in feugiat elit enim mattis morbi.

Daniel Pincher (Broker)
Hendrerit nunc.
Quis sapien.

Start typing....

Policy Name [QUALIFIED]
Berkshire Hathaway

| Coverage Up to $500K | Retention $25,000 | Premium $3K-5K/mo |

You need these:

Endpoint Protection (EPP)
Cras tortor aliquet id ac. Arcu, tellus a tristique gravida tincidunt metus, vulputate enim.

Public Key Infrastructure
Pretium elit fringilla eget et, lorem habitant mollis. Sociis suscript ultricies donec dignissm enim, pellentesque amet, eros.

Asset Management
Nullam diam in integer aliquam sed blandit. Sit sit viverra nulla vitae, nibn.

You already have these capabilities:

Forensics
<Existing Vendor Name>

User Testing
<Existing Vendor Name>

CIS
<Existing Vendor Name>

Policy Details

Intercept XDR
Link to Legal Document

Rapid Response
Link to Legal Document

[ Model This Policy ] — 944

Vendor Dashboard

| Total Active Clients | New Clients This Month | Total Bookings This Month | Next Availability | Click to add... | Click to add... | Copy Vendor URL |
|---|---|---|---|---|---|---|
| 14 | 6 | 18 | 10:00 AM EST | | | |

Market Bids & Bookings — 1102
Below are incoming bids for incident response, and bookings you've accepted.

Target Price for Incident Response ˅ in North America ˅ for DNA Type ˅

$25K  $30K  $35K  $40K  $45K  $50K  $55K  $60K  $65K  $70K  $75K

Total Market Opportunity
$1,588,021  up 30.4%

Average Bid
$49,980  up 2.8%
Compared to your auto-accept threshold of $62,000

Incoming Market Bids
1104 {
- Incident #198615
- Incident #197632
- Incident #185622
- Incident #109785
- Incident #197131
}

$128,000 01/01/2021 at 10:00:00 AM EST
$52,000 01/01/2021 at 10:00:00 AM EST
$29,000 01/01/2021 at 10:00:00 AM EST — 1105
$81,000 01/01/2021 at 10:00:00 AM EST
$94,000 01/01/2021 at 10:00:00 AM EST

Your Recent Bookings
- Incident #189652
- Incident #164329
- Incident #136790
- Incident #159862
- Incident #100187

$110,000 01/01/2021 at 10:00:00 AM EST
$73,000 01/01/2021 at 10:00:00 AM EST
$78,000 01/01/2021 at 10:00:00 AM EST
$77,000 01/01/2021 at 10:00:00 AM EST
$90,000 01/01/2021 at 10:00:00 AM EST

My Bids & Bookings
Below are incoming bids for incident response, and bookings you've accepted.

Configure Price Target ◯ Auto-Accept Incidents ⓘ

FIG. 11A

< Go Back

Data Compromise - #8174365
Maplecraft

[Download] [Share]

Incident Description

Quam sed consectetur volutpat massa, nisi turpis. Dui sodales ipsum sagittis euismod. Bibendum senectus lobortis donec nunc nulla tellus. Mollis at proin eget tellus malesuada mattis ut elit. Faucibus commodo dolor etiam gravida eleifend dolor. Vulputate adipiscing morbi pulvinar.

- Non, mattis velit nec enim vel viverra aliquet
- Ultrices orci quam morbi ut gravida est
- Porttitor senectus pellentesque turpis pretium interdum in tincidunt ut

IR Team

Organization Team
- Alejandro Sanders, CTO
- Corey Kim, Security Engineer
- Hunter Hill, Database Engineer
- Marnie Porter, CSO
- Wayne Little, Security Engineer
- Timothy Cain, Database Engineer

Incident Response Team
- Annette Black, Team Lead
- Kathryn Murphy, Senior Security Analyst
- Betty Cooper, Senior Security Analyst
- Ralph Edwards, Security Analyst Sidebar:
- Incident Description
- Incident Details
- Origination Details
- Cost Breakdown
- Ransom
- Adversary Intel
- Organization Firmographics
- IR Team
- IR Team Performance
- Score
- Attacker TTPs
- Environment Details
- Performance Summary

You received an IR estimate.

Nullam tristique egestas nisl at purus. Quisque ultrices et auge vulputate eu mattis congue. Rhoncus pharetra ullamcorper lacus.

Estimate Summary

| Service(s) | Quantity | Price |
|---|---|---|
| Intercept XDR | 10 hours | $5,000.00 |

Et nisl pretium, elit, tortor vitae aliquet proin.
Sit nae vulputate accumsan, enim.

| | | |
|---|---|---|
| Rapid Response | 10 hours | $3,500.00 |

Velit, tincidunt platea sem lorem volutpat et praesent. Erat aenean sagitis et sil digniss.

| | |
|---|---|
| Estimated Tax | $595.00 |
| Subtotal | $9,095,00 |

The vendor has specified that payment will be due in full 30 days after the completion of the services stated in this proposal.

| Decline Proposal | Accept Proposal |
|---|---|

This email was sent to address@gmail.com. If you'd rather not receive this

FIG. 16D

Recommended Capabilities
[Name of vendor] is recommending you purchase the following capabilities. Click "Buy Now" to begin purchase process.

Incident Response
Crowdstrike • Falcon Insight EDR       $XX,XXX   Add to Plan —1808

MSSP
Alert Logic • MDS for AWS       $XX,XXX   Add to Plan —1810

Adaptation Rules 18

Adaptation rules are automated actions for protecting your assets and enviroment.       Browse Library  [+ New Rule]

| Asset Managment<br>Automated Asset Setup | EDR<br>Proactive Threat Protection | MTR<br>Remediation Prioritization |
|---|---|---|
| if New Assets [Apply Core Capabilities] | if New Global Threat  where DNA Match | if Active Incident  where DNA Match |
| ⊙ Immediately | ⊙ block IP Range  ⊙ alert SOC Manager | ⊙ create task "Remediate"  ⊙ Immediately |
|  | [Create task "Threat Hunt"]  [+ 2 more...] | ⊙ set priority High |
|  | ⊙ Immediately |  |
| Last run  Runs  API Status | Last run  Runs  API Status | Last run  Runs  API Status |
| 12 days ago  1,449 times  Active ⊘ | 9:12 AM  23 times  Active ⊘ | 12 days ago  187 times  Active ⊘ |

1812 ⟶ (pointing to Asset Managment)

Threats Affecting You

- Added manually by Wes Johnson
  Researchers Warn of Linux Kernel 'Dirty Pipe' Arbitrary File Overwrite Vulnerability
  ↑3 ↓1
  [Tag][Tag][Tag] +
  14 peers are acting on this    [Actions ⌄]

- Added via Linkedin
  Attackers Can Crash Appliances by Sendi...
  ↑1 ↓
  [Tag][Tag][Tag] +
  14 peers are acting on this Menu:
- Not Relevant
- Send to Designer
- Modify Configuration
- Request Input
- Conduct Threat Hunt "Action" Button

Select MSSP
Compose the best-fit MSSP for your needs. Recommendations are based on the qualities of the organization and what we know about your needs.

| HQ Location Any ⌄ | AWS Native Yes ⌄ | On-Prem/Cloud Any⌄ | Incident Response Yes ⌄ | Sort Best Fit ⌄ |
|---|---|---|---|---|
| ⑤ Sophos MTR From $2,000 | ⓘ | ⩓ Accenture From $2,000 | ⓘ | ⓔ eSentire From $2,000 |
| ⌵ Select Vendor — 2004 | | ☐ Select Vendor | | ⌵ Select Vendor |
| ⚒ Alert Logic From $2,000 | ⓘ | ⒶArctic Wolf From $2,000 | ⓘ | ⓔ eSentire** From $2,000 |
| ☐ Select Vendor | | ☐ Select Vendor | | ☐ Select Vendor |

Go Back     Cancel [ Next ]

FIG. 20A

Compose IR Team
Compose the best-fit incident response team for this incident. Recommendations based on the qualities of the organization and incident are provided below.

Select an vendor:
Ante aliquam purus in quis sollicitudin neque. Mec ut est arenea nulla lacus malesuada.

Availability Immediate ⌄  Panel Preferred Any ⌄  Price Any ⌄  Efficacy Any ⌄  Sort Best Fit ⌄

| Best Fit | Available Now! | | Available Now! | | Available Now! |

2006
⑤ Sophos MTR
From $2,000

*Tincidunt accumsan id sem aenean mus vestibukum sollicitudin aliquam.*

☑ Select Vendor    2008

| Off-Panel | Available in 30m | ⓘ   2014 | Off-Panel | Available in 75 min | ⓘ |

Vendor Name
From $2,000

*Tincidunt accumsan id sem aenean mus vestibukum sollicitudin aliquam.*

☐ Select Vendor

Vendor Name
From $2,000

*Tincidunt accumsan id sem aenean mus vestibukum sollicitudin aliquam.*

☐ Select Vendor

Vendor Name
From $2,000

*Tincidunt accumsan id sem aenean mus vestibukum sollicitudin aliquam.*

☑ Select Vendor

Vendor Name
From $2,000

*Tincidunt accumsan id sem aenean mus vestibukum sollicitudin aliquam.*

☐ Select Vendor

Go Back                                   Cancel  Invite Vendors  2010

FIG. 20B

SYSTEMS AND METHODS FOR POSTURE-BASED MODELING

CROSS-REFERENCE TO RELATED PATENT APPLICATIONS

The present application is a continuation-in-part of U.S. Non-Provisional patent application Ser. No. 18/203,630, filed May 30, 2023, which claims the benefit of and priority to (1) U.S. Provisional Application No. 63/347,389, filed May 31, 2022, and (2) U.S. Provisional Application No. 63/457,671, filed Apr. 6, 2023, each of which are incorporated herein by reference in their entireties and for all purposes.

BACKGROUND

The present disclosure relates generally to computer security architecture and software for information security and cybersecurity. In a computer networked environment, entities such as people or companies have vulnerability that can result in security incidents. Some entities may desire to implement protections and some entities may desire to offer protections.

SUMMARY

Some arrangements relate to a data protection system for protecting data, the data protection system including one or more processing circuits including memory and at least one processor configured to receive, via a vendor security tool application, a cybersecurity protection request from the entity, the cybersecurity protection request including entity data of an entity. The at least one processor further configured to determine a cybersecurity posture with proof based on the entity data, the proof including one or more digital signatures and authenticated cybersecurity data. The at least one processor further configured to determine, utilizing one or more protection parameters, at least one cybersecurity protection plan corresponding to a cybersecurity attribute to protect the entity based on the cybersecurity posture with the proof. The at least one processor further configured to provide, to a graphical user interface (GUI) of the vendor security tool application of an entity computing system of the entity, the at least one cybersecurity protection plan including at least one selectable element. The at least one processor further configured to in response to an action on the at least one selectable element, receive, from the GUI of the vendor security tool application, an acceptance of the at least one cybersecurity protection plan. The at least one processor further configured to embed the proof into the acceptance and record the acceptance including the cybersecurity attribute and the accepted cybersecurity protection plan in a protection dataset.

In some arrangements, the at least one processor further configured to receive or collect environmental data from computing and networking structures of the entity and record the environmental data in the protection dataset.

In some arrangements, determining the at least one cybersecurity protection plan includes executing a Zero-Knowledge Proof (ZKP) model to determine the entity's cybersecurity posture against the one or more protection parameters, wherein the ZKP model maintains anonymity of all or a portion of data used in determining the at least one cybersecurity protection plan, and wherein the anonymity of the entity is maintained until acceptance.

In some arrangements, (1) determining at least one cybersecurity protection plan; (2) providing the at least one cybersecurity protection plan, (3) receiving the acceptance, and (4) recording the acceptance corresponds to quoting, binding, and issuing (QBI) of the cybersecurity protection plan, wherein determining the at least one cybersecurity protection plan further includes quoting the cybersecurity protection plan based on matching the cybersecurity posture of the entity to the cybersecurity attribute, wherein providing the at least one cybersecurity protection plan, receiving the acceptance, and recording the acceptance corresponds to binding and issuing the at least one cybersecurity protection plan based on (1) transmitting a first API call to create a protection binder and (2) transmitting a second API call to issue the at least one cybersecurity protection plan and wherein the first API call includes a first data payload including an entity identification, cybersecurity protection plan information, and a temporary protection agreement identifier, and wherein the second API call includes a finalized protection policy document, a permanent policy identifier, and confirmation of policy activation covering the entity under the at least one cybersecurity protection plan.

In some arrangements, the at least one processor further configured to automatically renew the cybersecurity protection plan of the entity based on the modeled cybersecurity posture and resilience.

In some arrangements, the at least one processor further configured to dynamically update the at least one cybersecurity protection plan based at least on an update in a cybersecurity landscape or a change in one or more entities' protection preferences.

In some arrangements, the at least one processor further configured to receive, from a broker computing system, a bundle request from a broker, the bundle request including a set of cybersecurity parameters, determine a plurality of prospective entities satisfying the set of cybersecurity parameters, bundle the plurality of prospective entities and corresponding cybersecurity postures into a data package, transmit, to a plurality of entity computing systems, the data package including information of the plurality of prospective entities and corresponding cybersecurity postures, the data package includes a customized arrangement corresponding to an endorsement or a pricing coverage, receive, from one or more broker computing systems, one or more bid requests for the bundled data package, and exchange the bundled data package for an amount based on one of the one or more bid requests, wherein the exchange includes assigning the plurality of prospective entities of the bundled data package to an entity.

In some arrangements, the set of cybersecurity parameters include proof criteria, the proof criteria including cybersecurity measures and technologies (SMT) of the plurality of entities, and wherein determining the at least one cybersecurity protection plan corresponding to the cybersecurity attribute further includes using the proof to ensure compliance with required cybersecurity measures and technologies, and using one or more tokens to align the entity with the cybersecurity attributes, and wherein the tokens correspond to a verified and authenticated state of the entities' cybersecurity posture and resilience.

In some arrangements, the cybersecurity protection plan provided is based on the determined security posture of the entity, wherein the cybersecurity protection plan corresponds to one or more coverage options aligning with the entity's protection preference.

Some arrangements relate to a method of protecting data, the method including receiving, by one or more processing circuits via a vendor security tool application, a cybersecurity protection request from the entity, the cybersecurity protection request including entity data of an entity. The method further including determining, by the one or more processing circuits a cybersecurity posture with proof based on the entity data, the proof including one or more digital signatures and authenticated cybersecurity data. The method further including determining, by the one or more processing circuits utilizing one or more protection parameters, at least one cybersecurity protection plan corresponding to a cybersecurity attribute to protect the entity based on the cybersecurity posture with the proof. The method further including providing, by the one or more processing circuits to a graphical user interface (GUI) of the vendor security tool application of an entity computing system of the entity, the at least one cybersecurity protection plan including at least one selectable element. The method further including in response to an action on the at least one selectable element, receiving, by the one or more processing circuits from the GUI of the vendor security tool application, an acceptance of the at least one cybersecurity protection plan. The method further including embedding, by the one or more processing circuits the proof into the acceptance and recording the acceptance including the cybersecurity attribute and the accepted cybersecurity protection plan in a protection dataset.

In some arrangements, the method further including receiving or collecting, by the one or more processing circuits, environmental data from computing and networking structures of the entity and recording, by the one or more processing circuits, the environmental data in the protection dataset.

In some arrangements, determining the at least one cybersecurity protection plan includes executing a Zero-Knowledge Proof (ZKP) model to determine the entity's cybersecurity posture against the one or more protection parameters, wherein the ZKP model maintains anonymity of all or a portion of data used in determining the at least one cybersecurity protection plan, and wherein the anonymity of the entity is maintained until acceptance.

In some arrangements, (1) determining at least one cybersecurity protection plan; (2) providing the at least one cybersecurity protection plan, (3) receiving the acceptance, and (4) recording the acceptance corresponds to quoting, binding, and issuing (QBI) of the cybersecurity protection plan, wherein determining the at least one cybersecurity protection plan further includes quoting the cybersecurity protection plan based on matching the cybersecurity posture of the entity to the cybersecurity attribute, wherein providing the at least one cybersecurity protection plan, receiving the acceptance, and recording the acceptance corresponds to binding and issuing the at least one cybersecurity protection plan based on (1) transmitting a first API call to create a protection binder and (2) transmitting a second API call to issue the at least one cybersecurity protection plan, wherein the first API call includes a first data payload including an entity identification, cybersecurity protection plan information, and a temporary protection agreement identifier, and wherein the second API call includes a finalized protection policy document, a permanent policy identifier, and confirmation of policy activation covering the entity under the at least one cybersecurity protection plan.

In some arrangements, the method further including automatically renewing, by the one or more processing circuits the cybersecurity protection plan of the entity based on the modeled cybersecurity posture and resilience.

In some arrangements, the method further including dynamically updating, by the one or more processing circuits, the at least one cybersecurity protection plan based at least on an update in a cybersecurity landscape or a change in one or more entities' protection preferences.

In some arrangements, the method further including receiving, by the one or more processing circuits from a provider computing system, a bundle request from a protection provider, the bundle request including a set of cybersecurity parameters, determining, by the one or more processing circuits, a plurality of entities protected by the protection provider satisfying the set of cybersecurity parameters, identifying, by the one or more processing circuits, a plurality of protection plans of the plurality of entities, bundling, by the one or more processing circuits, the plurality of protection plans into a data package, transmitting, by the one or more processing circuits to a broker computing system, the data package including information of the plurality of protection plans, receiving, by the one or more processing circuits from one or more broker computing systems, one or more bid requests for the bundled data package, and exchanging, by the one or more processing circuits, the bundled data package for an amount based on one of the one or more bid requests, wherein the exchange includes assigning the plurality of protection plans of the bundled data package to a broker.

In some arrangements, the set of cybersecurity parameters include proof criteria, the proof criteria including cybersecurity measures and technologies (SMT) of the plurality of entities, and wherein determining the at least one cybersecurity protection plan corresponding to the cybersecurity attribute further includes using the proof to ensure compliance with required cybersecurity measures and technologies, and using one or more tokens to align the entity with the cybersecurity attributes, and wherein the tokens corresponds to verified and authenticated state of the entities' cybersecurity posture and resilience.

In some arrangements, the cybersecurity protection plan provided is based on the determined security posture of the entity, wherein the cybersecurity protection plan corresponds to one or more coverage options aligning with the entity's protection preference.

Some arrangements relate to a non-transitory computer readable medium (CRM) including one or more instructions stored thereon and executable by one or more processors to receive, via a vendor security tool application, a cybersecurity protection request from the entity, the cybersecurity protection request including entity data of an entity, determine a cybersecurity posture with proof based on the entity data, the proof including one or more digital signatures and authenticated cybersecurity data, determine, utilizing one or more protection parameters, at least one cybersecurity protection plan corresponding to a cybersecurity attribute to protect the entity based on the cybersecurity posture with the proof, provide, to a graphical user interface (GUI) of the vendor security tool application of an entity computing system of the entity, the at least one cybersecurity protection plan including at least one selectable element, in response to an action on the at least one selectable element, receive, from the GUI of the vendor security tool application, an acceptance of the at least one cybersecurity protection plan, and embed the proof into the acceptance and record the acceptance including the cybersecurity attribute and the accepted cybersecurity protection plan in a protection dataset.

In some arrangements, determining the at least one cybersecurity protection plan includes executing a Zero-Knowledge Proof (ZKP) model to determine the entity's cybersecurity posture against the one or more protection parameters, wherein the ZKP model maintains anonymity of all or a portion of data used in determining the at least one cybersecurity protection plan, and wherein the anonymity of the entity is maintained until acceptance.

BRIEF DESCRIPTION OF THE DRAWINGS

FIGS. 8A-8E depict example graphical user interfaces, according to some arrangements.

FIGS. 9A-9H depict example graphical user interfaces, according to some arrangements.

FIGS. 10A-10E depict example graphical user interfaces, according to some arrangements.

FIGS. 11A-11D depict example graphical user interfaces, according to some arrangements.

Figure 13B:
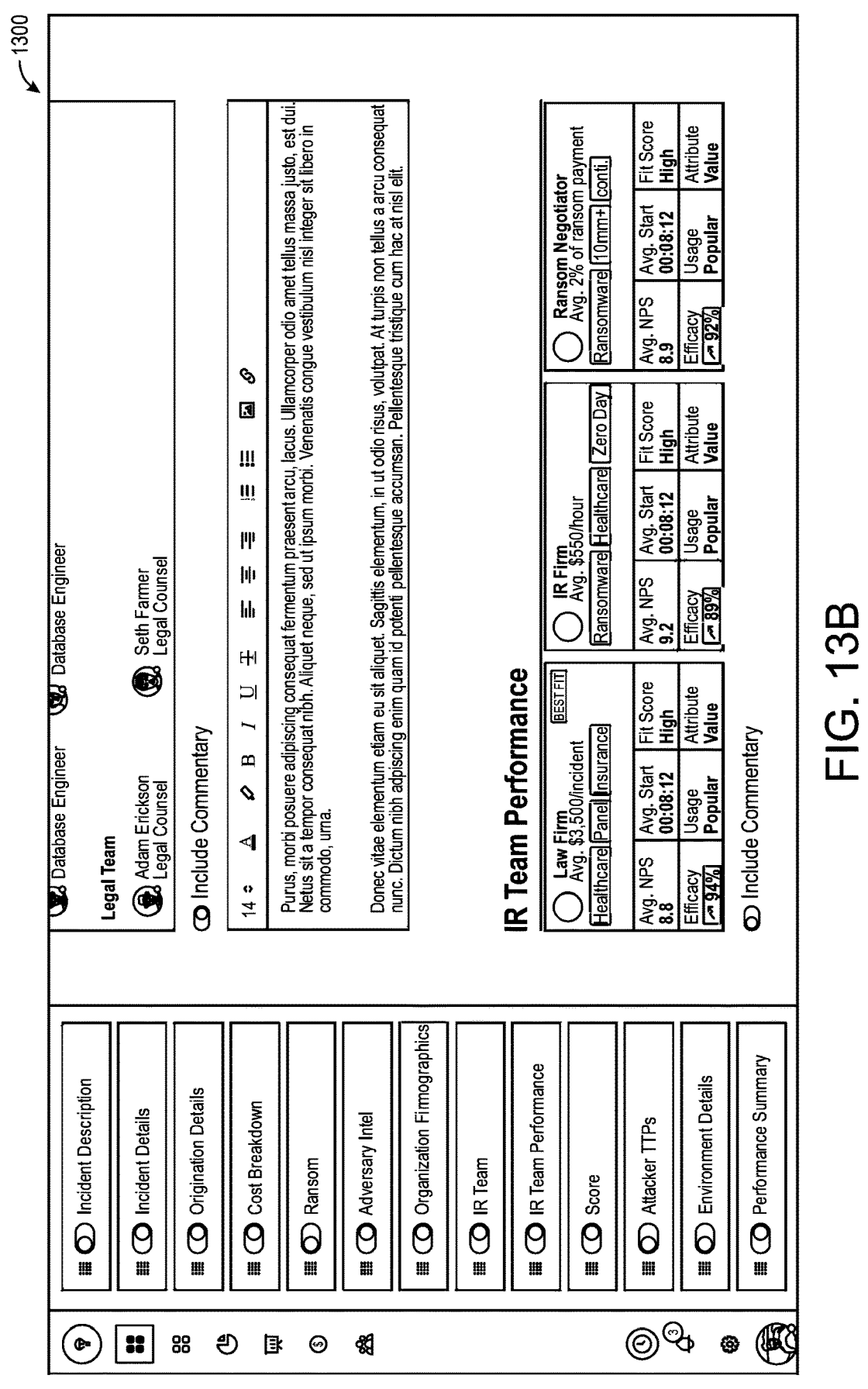

FIGS. 13A-13E depict example graphical user interfaces, according to some arrangements.

FIGS. 15A-15G depict example graphical user interfaces, according to some arrangements.

FIGS. 16A-16D depict example graphical user interfaces, according to some arrangements.

FIGS. 18A-18C depict example graphical user interfaces, according to some arrangements.

FIG. 19 depicts an example graphical user interface, according to some arrangements.

FIGS. 20A-20B depict example graphical user interfaces, according to some arrangements.

Figure 1A:
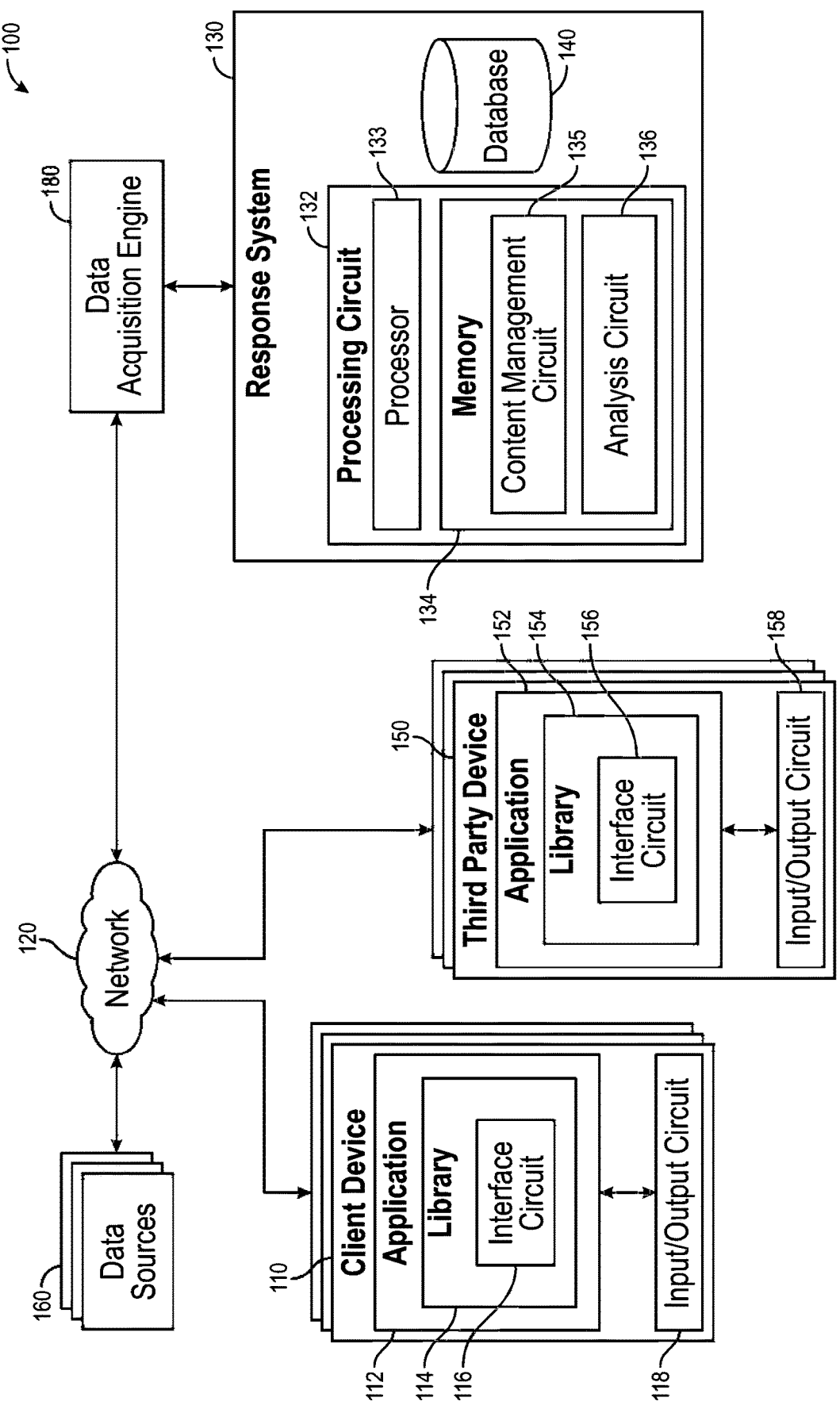
FIG. 1A depicts a block diagram of an implementation of a system for managing and configuring incident responses, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the FIGURES, systems and methods relate generally to implementing a cybersecurity framework. In some arrangements, the system represents an embodiment of a security architecture that employs modeling to protect data and align security postures.

Many existing cybersecurity systems and architectures face several challenges that limit their effectiveness in managing and responding to cyber threats. One of these problems is a lack of integrated incident response capabilities. In particular, many existing systems operate in silos, with separate tools for threat detection, response, and recovery. This lack of integration can lead to delays in response times, miscommunication between teams, and a lack of overall visibility into the security posture of an organization. Another problem is the lack of streamlined processes for engaging with third-party vendors for incident response services. Organizations often have to navigate through complex procurement processes during a cyber incident, losing crucial time that could be used to mitigate the incident. Additionally, organizations often struggle to accurately assess their readiness to respond to incidents. They lack clear visibility into their own capabilities and limitations, and often don't have an effective way to communicate this information to potential response providers. Yet another problem with existing cybersecurity systems and architectures is the inability to dynamically adapt to changes in the security landscape. Many existing systems employ static defenses that are unable to adjust to new threats as they arise. This leads to vulnerabilities as attackers continually evolve their strategies and methods. Moreover, static systems also fail to account for changes in the organization's own infrastructure and operations, such as the adoption of new technologies or changes in business processes, which can introduce new potential points of attack. This inability to dynamically adapt hampers the organization's ability to maintain a robust security posture, leaving them exposed to a constantly evolving threat landscape.

Accordingly, the ability to prevent cyber threats, such as hacking activities, data breaches, and cyberattacks, provides entities and users (e.g., provider, institution, individual, and company) improved cybersecurity by creating a customized cybersecurity framework tailored to their specific needs. This framework not only helps entities understand their current cybersecurity vulnerabilities but also connects them with appropriate vendors offering targeted protection plans. The customized framework enhances the protection of sensitive data, such as medical records and financial information, proprietary business data, and also helps safeguard the reputation of the entity. In addition to improving protection, the tailored cybersecurity framework also has the potential to reduce financial costs associated with data breaches, such as falling stock prices, costs of forensic investigations, and legal fees. The detailed design and execution of cybersecurity models for detecting and addressing vulnerabilities enable dynamic monitoring of various relationships, such as network, hardware, device, and financial relationships, between entities and vendors. The unique approach of providing a customized cybersecurity framework allows for significant improvements in cybersecurity by improving network security, infrastructure security, technology security, and data security. With vendors actively monitoring entities, immediate response to potential threats can be facilitated, thus further enhancing the overall security posture of the entity. This approach not only mitigates existing vulnerabilities but also anticipates potential threats, offering an adaptive and proactive solution to cybersecurity.

Furthermore, by utilizing a customized cybersecurity framework for entities and users, it is possible to understand existing vulnerabilities, link them to specific assets, and provide targeted protection strategies, offering the technical benefit of generating personalized remediation recommendations and avoiding and preventing successful hacking activities, cyberattacks, data breaches, and other detrimental cyber-incidents. As described herein, the systems and methods of the present disclosure may facilitate the connection of entities to suitable vendors, offering security plans tailored to their specific vulnerabilities and needs. An additional benefit from the implementation of a customized cybersecurity framework is the ability to streamline the process of identifying and addressing vulnerabilities. This optimization of resources not only enables rapid risk reduction but also allows for the ongoing monitoring of the entity's cybersecurity status by the vendor, ensuring continuous protection and immediate response to potential threats. The implementation of such a framework not only allows entities to understand and address their current vulnerabilities but also empowers them to make informed decisions about their cybersecurity strategy. This includes selecting from a range of vendor plans and services, activating these plans as needed, and having the peace of mind that their cybersecurity is being actively monitored and managed by professionals.

Additionally, the present disclosure provides a technical enhancement of dynamic cybersecurity architecture comprehension. For instance, an entity's cybersecurity vulnerabilities can be automatically understood and mapped within the process of implementing a customized cybersecurity framework, eliminating the need for maintaining separate inventories of network weaknesses, infrastructure vulnerabilities, operating systems susceptibilities, etc. In some embodiments, the implementation of this customized cybersecurity framework includes identifying potential security gaps associated with a particular entity or device identifier, such as a domain identifier (e.g., a top-level domain (TLD) identifier, a subdomain identifier, or a URL string pointing to a particular directory), an IP address, a subnet, etc. As a result, rather than separately assessing each subclass of vulnerabilities, a computing system can utilize a unified view into a computing environment of a particular target entity (e.g., via the readiness system of the security architecture) and centrally manage the understanding of different types of vulnerabilities and associated potential security threats. For instance, by initiating a comprehensive vulnerability assessment in a single operation. These vulnerability identification operations, described further herein, may include computer-executed operations to discern the entity's cybersecurity status and potential threats, determine vulnerabilities based on this status and subsequently connect the entity to suitable vendors offering appropriate cybersecurity plans.

Referring to FIG. 1 generally, system 100 is an implementation of a security architecture utilizing modeling to provide an incident response management platform that includes multiple components, such as client device 110, response system 130, third-party devices 150, and data sources 160. These components can be interconnected through a network 120 that supports secure communication protocols such as TLS, SSL, and HTTPS. In some implementations, the response system 130 can generate and provide an application for incident response readiness that guides users through the steps to prepare for and manage incidents effectively. The application can integrate with various technologies and vendors to purchase services to resolve issues, and provides integration points for incident response workflow management. For example, users can access a marketplace within the application to purchase products, insurance, and services, and can determine their organization's capabilities, limitations, and threat focus. In some implementations, the response system 130 also presents the organization's readiness to incident response providers and automatically routes them to pre-associated panel vendors or organization-selected vendors at the point of need, contracting and activating the incident room immediately.

In some implementations, the response system 130 can integrate readiness, including insurer data, into various third-party systems via APIs. In some implementations, the response system 130 can map an incident response (IR) plan from a static document or documents to the task enablers in Responder that bring them to life, showing where the tasks required by partners such as IR firms, insurers, and breach counsel are covered by the IR plan and IR playbook. The response system 130 can decompose the response plan into associated actionable tasks and activities by the organization, incident response providers, and other stakeholders, and provides different users and partners with a unified view of tasks, activities, and progress/status tracking.

In some implementations, the response system 130 stores data regarding key milestones in an authoritative data source such as blockchain (e.g., database 140), ensuring that results are traceable and linkable. For example, issues can be identified, tasks can be created, work can be routed to vendors, and proof of resolution can be recorded. In some implementations, the response system 130 can also supports real-time status tracking of policy-aligned tasks to status updates provided for incident response. In some implementations, instant intake is achieved by a remote embeddable widget on a website, which starts an incident response process that begins with a proposal stage and continues through workflows to achieve response readiness based on pre-defined logic and automation. For example, services can be purchased or extended within the application, and in the event of an inbound incident, the application facilitates routing to a claim manager.

In some implementations, the response system 130 can provide an application for incident response readiness that guides users through the steps to ensure they are prepared for any potential incidents. The application can be designed to integrate with technology and vendors to purchase services that are required to resolve any issues. For example, the user can access the application through a variety of devices, including client device 110. In particular, the application can offer integration points for incident response workflow management, enabling users to streamline their incident response process. The organization incident readiness feature of the response system 130 offers several features, including the integration of readiness, including insurer data, into various third-party systems, such as via an API. By integrating with third-party systems, the response system 130 can ensure that users have access to the most up-to-date information regarding their organization's readiness for potential incidents. In addition, the response system 130 can offer incident response plan mapping from a static plan document to the task enablers in Responder, which brings the tasks required by partners such as IR firms, insurers, and breach counsel to be measurable and identified.

Still referring to FIG. 1 generally, the response system 130 can offer a marketplace for purchasing products, insurance, and services that may be required in the event of an incident. The marketplace includes various vendors that offer different products and services, enabling users to choose the best fit for their organization based on their capabilities, limitations, and threat focus. The application also determines organization readiness levels with proof of date, time stamps, and artifacts (e.g., on the blockchain), which can be used to identify any gaps in the organization's incident response plan. In some implementations, the response system 130 can automate the routing of incidents to pre-associated, panel vendors or organization-selected vendors at the point of need and immediately contracts and activates the incident room (e.g., when a cyber incident occurred or potentially occurred). Accordingly, the system 100 can ensure that the organization can respond to an incident as quickly and efficiently as possible. Additionally, the response system 130 can decompose the response plan into associated actionable tasks and activities by the organization, incident response providers, and others. This allows users to better understand their organization's response plan and identify areas for improvement.

In general, the application (e.g., graphical user interface provided by content management circuit 135) provides different users/partners with a unified view of tasks, activities, and progress/status tracking. For example, the status tracking can be tied back to incident readiness and managing the incident through resolution. Users can collaborate via the tool instead of via phone calls and emails, which ensures that everyone is working from the same information and avoids any miscommunication. The application can also offers real-time (or near real-time) status tracking of policy aligned tasks to status updates provided for incident response, enabling users to quickly and easily see how their incident response plan is progressing. In some implementations, data regarding key milestones is stored in an authoritative data source such as blockchain (e.g., database 140 (private ledger) or data sources 160 (public ledger)), ensuring that results can be traceable and linkable. Thus, this can enable users to identify areas for improvement in their incident response plan and make changes as necessary. In some implementations, the response system 130 offers an instant intake feature that can be integrated into a remote embeddable widget on a website. For example, the widget can start an incident response process that starts with a proposal stage and continues through workflows to achieve response readiness based on pre-defined logic and automation. This ensures that incidents are quickly identified and resolved, and that the organization is prepared for any potential incidents.

Still referring to FIG. 1A generally, the response system 130 of system 100 includes a data acquisition engine 180 and analysis circuit 136 that democratizes posture threats, incidents, and claim data. In particular, all stakeholders in the incident response process can have access to relevant data to make informed decisions. The analysis circuit 136 can use the democratized data in underwriting, claims, and the resilience process to enhance the overall response to an incident. With the data acquisition engine 180, the response system 130 can collect and process data from various sources, such as third-party devices 150 and data sources 160, to provide a comprehensive view of the organization's security posture. In some implementations, the response system 130 also implement incident response protocols and features via analysis circuit 136 that provide a centralized location for managing and configuring incident responses. For example, an application can walk users through the steps of incident response readiness and integrates with technology and vendors to purchase services to resolve issues. The response system 130 can automate the routing of incident response tasks to pre-associated, panel vendors, or organization-selected vendors at the point of need and immediately contracts and activates the incident room. By decomposing the response plan into associated actionable tasks and activities by the organization, incident response providers, and other stakeholders, the response system 130 ensures that all parties are working together to manage the incident through resolution.

In some implementations, the response system 130 includes a vendor-provider marketplace that allows organizations to purchase products, insurance, and services that enhance their incident response capabilities. For example, the marketplace can be integrated into the response system 130, allowing users to easily access relevant products and services during an incident. Additionally, the response system 130 can determine the organization's capabilities, limitations, and threat focus to present readiness to incident response providers. In some implementations, the response system 130 can include collection, recall, and proof of state features that provide that data regarding key milestones is stored in an authoritative data source such as the blockchain. This includes capabilities pre-incident, what happened after the incident occurred, what was the root cause, and recording. For example, results are traceable and linkable, and issues are identified, tasks are created, work is routed to vendors, and proof of resolution is recorded. In some implementations, the response system 130 can include a drag and drop file tokenization feature that allows users to securely tokenize and store sensitive files. In particular, this feature is useful when organizations desire to share sensitive information with third parties or with internal stakeholders. The system ensures that the information is secure and that only authorized parties can access it. Thus, this feature is designed to streamline the incident response process and enable better collaboration between all stakeholders.

Referring now to FIG. 1A in more detail, a block diagram depicting an implementation of a system 100 for managing and configuring incident responses. System 100 includes client device 110, response system 130, third party devices 150, and data sources 160. In various implementations, components of system 100 communicate over network 120. Network 120 may include computer networks such as the Internet, local, wide, metro or other area networks, intranets, satellite networks, other computer networks such as voice or data mobile phone communication networks, combinations thereof, or any other type of electronic communications network. Network 120 may include or constitute a display network. In various implementations, network 120 facilitates secure communication between components of system 100. As a non-limiting example, network 120 may implement transport layer security (TLS), secure sockets layer (SSL), hypertext transfer protocol secure (HTTPS), and/or any other secure communication protocol.

In general, the client device(s) 110 and third party device(s) 150 can execute a software application (such as application 112 or application 150, e.g., a web browser, an installed application, or other application) to retrieve content from other computing systems and devices over network 120. Such an application may be configured to retrieve an interfaces and dashboards from the response system 130. In one implementation, the client device 110 and third party device 150 may execute a web browser application, which provides the interface (e.g., from content management circuit 135) on a viewport of the client device 110 or third party device 150. The web browser application that provides the interface may operate by receiving input of a uniform resource locator (URL), such as a web address, from an input device (such as input/output circuit 118 or 158, e.g., a pointing device, a keyboard, a touch screen, or another form of input device). In response, one or more processors of the client device 110 or third party device 150 executing the instructions from the web browser application may request data from another device connected to the network 120 referred to by the URL address (e.g., the response system 130). The other device may then provide webpage data and/or other data to the client device 110 or third party device 150, which causes the interface (or dashboard) to be presented by the viewport of the client device 110 or third party device 150. Accordingly, the browser window presents the interface to facilitate user interaction with the interface. In some embodiments, the interface (or dashboard) can be presented via an application stored on the client device 110 and third party device 150.

The network 120 can enable communication between various nodes, such as the response system 130, third party device 150, client device 110, and data sources 160. In some arrangements, data flows through the network 120 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 130 layered over an OSI layer-3 network protocol such as Internet Protocol (IP), e.g., IPv4 or IPv6. The network 130 is composed of various network devices (nodes) communicatively linked to form one or more data communication paths between participating devices. Each networked device includes at least one network interface for receiving and/or transmitting data, typically as one or more data packets. An illustrative network 120 is the Internet; however, other networks may be used. The network 130 may be an autonomous system (AS), i.e., a network that is operated under a consistent unified routing policy (or at least appears to from outside the AS network) and is generally managed by a single administrative entity (e.g., a system operator, administrator, or administrative group).

Client device 110 (sometimes referred to herein as a "mobile device") may be a mobile computing device, smartphone, tablet, smart watch, smart sensor, or any other device configured to facilitate receiving, displaying, and interacting with content (e.g., web pages, mobile applications, etc.). Client device 110 may include an application 112 to receive and display content and to receive user interaction with the content. For example, application 112 may be a web browser. Additionally, or alternatively, application 112 may be a mobile application. Client device 110 may also include an input/output circuit 118 for communicating data over network 120 (e.g., receive and transmit to response system 130).

In various implementations, application 112 interacts with a content publisher to receive online content, network content, and/or application content. For example, application 112 may receive and present various dashboards and information resources from distributed by the content publisher (e.g., content management circuit 135). Dashboards and/or information resources may include web-based content such as a web page or other online documents. The dashboards information resources may include instructions (e.g., scripts, executable code, etc.) that when interpreted by application 112 cause application 112 to display a graphical user interface such as an interactable web page and/or an interactive mobile application to a user (e.g., dashboards of FIGS. 2-49). In various implementations, application 112 can include one or more application interfaces for presenting an application (e.g., mobile application, web-based application, virtual reality/augmented reality application, smart TV application and so on).

Application 112 is shown to include library 114 having an interface circuit 116. The library 114 may include a collection of software development tools contained in a package (e.g., software development kit (SDK), application programming interface (API), integrated development environment (IDE), debugger, etc.). For example, library 114 may include an application programming interface (API). In another example, library 114 may include a debugger. In yet another example, the library 114 may be an SDK that includes an API, a debugger, and IDE, and so on. In some implementations, library 114 includes one or more libraries having functions that interface with a particular system software (e.g., iOS, Android, Linux, etc.). Library 114 may facilitate embedding functionality in application 112. For example, a user may use library 114 to automatically transmit event logs whenever an event occurs on application 112. As a further example, library 114 may include a function configured to collect and report device analytics and a user may insert the function into the instructions of application 112 to cause the function to be called during specific actions of application 112 (e.g., during testing as described in detail below). In some implementations, interface circuit 116 functionalities are provided by library 114.

In various implementations, interface circuit 116 of system 100 can provide one or more interfaces to users, which can be accessed through an application interface presented in the viewport of client device 110. These interfaces can take the form of dashboards and other graphical user interfaces, offering a variety of functionality to the user. For example, a user can view incident responses, remediate claims, communicate with team members, purchase or extend products and services, and more. The interfaces provided by interface circuit 116 can be customizable and dynamic, allowing users to configure and adjust them to suit their specific needs. They can also be designed to present real-time data associated with current incident responses, potential incidents or threats, and other important information, allowing users to make informed decisions and take proactive steps to manage risk.

For example, interface circuit 116 can generate dashboards that provide real-time data and insights. These dashboards can be customized to suit the needs of individual users or groups, providing a comprehensive view of incident responses, potential threats, and the status of remediation efforts. For example, a dashboard might show the status of incident responses across different regions, or highlight areas where additional resources are needed. In another example, the interface circuit 116 can generate a landscape of all currently connected devices to the entity, such as a company or institution. This can include information on the types of devices, their locations, and other important details that can help inform incident response efforts. With this information, users can better understand the scope of potential threats, identify vulnerable areas, and take steps to improve security and resilience.

In another example implementation, the application 112 executed by the client device 110 can cause a web browser to the display the interfaces (e.g., dashboards) on the client device 110. For example, the user may connect (e.g., via the network 120) to a website structured to host the interfaces. In various implementations, interface can include infrastructure such as, but not limited to, host devices (e.g., computing device) and a collection of files defining the interface and stored on the host devices (e.g., in database 140). The web browser operates by receiving input of a uniform resource locator (URL) into a field from an input device (e.g., a pointing device, a keyboard, a touchscreen, mobile phone, or another form of input device). In response, the interface circuit 116 executing the interface in the web browser may request data such as from content (e.g., vendor information, settings, current incident response, other dashboards, etc.) from database 140. The web browser may include other functionalities, such as navigational controls (e.g., backward and forward buttons, home buttons). In some implementations, the debugging interface can include both a client-side interface and a server-side interface. For example, a client-side interface can be written in one or more general purpose programming and can be executed by client device 110. The server-side interface can be written, for example, in one or more general purpose programming languages and can be executed by the response system 130. Additional details associated with the interface are described in detail with reference to example FIGS. 7-21.

Interface circuit 116 may detect events within application 112. In various implementations, interface circuit 116 may be configured to trigger other functionality based on detecting specific events (e.g., transactions, in-app purchases, performing a test of a vendor, scrolling through an incident response plan, sending a contract to a vendor, spending a certain amount of time interacting with an application, etc.). For example, interface circuit 116 may trigger a pop-up window (overlayed on an interface) upon selecting an actionable object (e.g., button, drop-down, input field, etc.) within a dashboard. In various implementations, library 114 includes a function that is embedded in application 112 to trigger interface circuit 116. For example, a user may include a function of library 114 in a transaction confirmation functionality of application 112 that causes interface circuit 116 to detect a confirmed transaction (e.g., purchase cybersecurity protection plans, partnering). It should be understood that events may include any action important to a user within an application and are not limited to the examples expressly contemplated herein. In various implementations, interface circuit 116 is configured to differentiate between different types of events. For example, interface circuit 116 may trigger a first set of actions based on a first type of detected event (e.g., selecting actionable objects within the static response plan) and may trigger a second set of actions based on a second type of detected event (e.g., running a test). In various implementations, interface circuit 116 is configured to collect event logs associated with the detected event and/or events and transmit the collected event logs to content management circuit 135.

In various implementations, the interface circuit 116 can collect events logs based on a designated session. In one example, the designated session may be active from when application 112 is opened/selected to when application 112 is closed/exited. In another example, the designated session may be active based on a user requesting a session to start and a session to end. Each session, the interface circuit 116 can collect event logs while the session is active. Once completed, the event logs may be provided to any system described herein. During the session, the event logs may trace each event in the session such that the events are organized in ascending and/or descending order. In some implementations, the events may be organized utilizing various other techniques (e.g., by event type, by timestamp, by malfunctions, etc.).

In various implementations, the interface circuit 116 of the client device 110 (or third party device 150) may start collecting event logs when application 112 is opened (e.g., selected by the user via an input/output device 118 of the client device 110), thus starting a session. In some implementations, once the application is closed by the user the interface circuit 116 may stop collecting event logs, thus ending the session. In various implementations, the user may force clear event logs or force reset application 112 such that the current session may reset, thus ending a particular session and starting a new session. Additional details regarding the interface circuit 116 functionalities, and the dashboards and interfaces presented within a viewport of client device 110 are described in additional details with reference to FIGS. 7-21.

The input/output circuit 118 is structured to send and receive communications over network 120 (e.g., with response system 130 and/or third-party device 150). The input/output circuit 118 is structured to exchange data (e.g., bundled event logs, content event logs, interactions), communications, instructions, etc. with an input/output component of the response system 130. In one implementation, the input/output circuit 118 includes communication circuitry for facilitating the exchange of data, values, messages, and the like between the input/output circuit 118 and the response system 130. In yet another implementation, the input/output circuit 118 includes machine-readable media for facilitating the exchange of information between the input/output device and the response system 130. In yet another embodiment, the input/output circuit 118 includes any combination of hardware components, communication circuitry, and machine-readable media.

In some embodiments, the input/output circuit 118 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output circuit 118 may provide an interface for the user to interact with various applications (e.g., application 114) stored on the client device 110. For example, the input/output circuit 118 includes a keyboard, a keypad, a mouse, joystick, a touch screen, a microphone, a haptic sensor, a car sensor, an IoT sensor, a biometric sensor, an accelerometer sensor, a virtual reality headset, smart glasses, smart headsets, and the like. As another example, input/output circuit 118, may include, but is not limited to, a television monitor, a computer monitor, a printer, a facsimile, a speaker, and so on. As used herein, virtual reality, augmented reality, and mixed reality may each be used interchangeably yet refer to any kind of extended reality, including virtual reality, augmented reality, and mixed reality.

In some implementations, input/output circuit 118 of the client device 110 can receive user input from a user (e.g., via sensors, or any other input/output devices/ports described herein). A user input can be a plurality of inputs, including by not limited to, a gesture (e.g., a flick of client device 110, a shake of client device 110, a user-defined custom gesture (e.g., utilizing an API), biological data (e.g., stress level, heart rate, hand geometry, facial geometry, psyche, and so on) and/or behavioral data (e.g., haptic feedback, gesture, speech pattern, movement pattern (e.g., hand, food, arm, facial, iris, and so on), or combination thereof, etc. In some embodiments, one or more user inputs can be utilized to perform various actions on client device 110.

For example, a user can use a gesture, such as a flick or a shake, to quickly invoke an incident response through the response system 130 from their client device 110. With the use of biological and behavioral data, a user could trigger an incident response, access the vendor marketplace, or recall proof of state using custom-defined gestures via an API with input/output circuit 118. The drag and drop file tokenization feature can also be activated by a gesture, allowing a user to seamlessly tokenize files and secure them on the blockchain with a simple motion or touch on their client device 110.

Input/output circuit 118 may exchange and transmit data information, via network 120, to all the devices described herein. In various implementations, input/output circuit 118 transmits data via network 120. Input/output circuit 118 may confirm the transmission of data. For example, input/output circuit 118 may transmit requests and/or information to response system 130 based on selecting one or more actionable items within the interfaces and dashboards described herein. In another example, input/output circuit 118 may transmit requests and/or information to third party devices 150 operated one or more vendors. In various implementations, input/output circuit 118 can transmit data periodically. For example, input/output circuit 118 may transmit data at a predefined time. As another example, input/output circuit 118 may transmit data on an interval (e.g., every ten minutes, every ten hours, etc.).

The third party device 150 includes application 152, library 154, interface circuit 156, and input/output circuit 158. The application 152, library 154, interface circuit 156, and input/output circuit 158 may function substantially similar to and include the same or similar components as the components of client device 110, such as application 112, library 114, interface circuit 116, and input/output circuit 118, described above. As such, it should be understood that the description of the client device 110, such as application 112, library 114, interface circuit 116, and input/output circuit 118 of the client device 110 provided above may be similarly applied to the application 152, library 154, interface circuit 156, and input/output circuit 158 of the third party device 150. However, instead of a user of a company or institution operations the third party device 150, a vendor or providers (e.g., goods or services) operates the third party device 150.

The response system 130 may include a logic device, which can be a computing device equipped with a processing circuit that runs instructions stored in a memory device to perform various operations. The processing circuit can be made up of various components such as a microprocessor, an ASIC, or an FPGA, and the memory device can be any type of storage or transmission device capable of providing program instructions. The instructions may include code from various programming languages commonly used in the industry, such as high-level programming languages, web development languages, and systems programming languages. The response system 130 may also include one or more databases for storing data and an interface, such as a content management circuit 135, that receives and provides data to other systems and devices on the network 120.

The response system 130 can be run or otherwise be executed on one or more processors of a computing device, such as those described below in FIG. 2. In broad overview, the response system 130 can include a processing circuit 132, a processor 133, memory 134, a content management circuit 135, an analysis circuit 136, a database 140, a front and 142. The interface and dashboards generated by content management circuit 135 can be provided to the client devices 110 and third party devices 150. Generally, the interfaces and dashboards can be rendered at the client devices 110 and/or third party devices 150. The content management circuit 135 can include a plurality of interfaces and properties, such as those described below in FIGS. 7-21. The interfaces and dashboards can execute at the response system 130, the client device 110, the third party devices 150, or a combination of the three to provide the interfaces and dashboards. In some implementations, the interfaces and dashboards generated and formatted by content management circuit 135 can be provided within a web browser. In another implementation, the content management circuit 135 executes to provide the interfaces and dashboards at the client devices 110 and third party devices 150 without utilizing the web browser.

The response system 130 may be a server, distributed processing cluster, cloud processing system, or any other computing device. Response system 130 may include or execute at least one computer program or at least one script. In some implementations, response system 130 includes combinations of software and hardware, such as one or more processors configured to execute one or more scripts. Response system 130 is shown to include database 140 and processing circuit 132. Database 140 may store received data. For example, the database 140 can include data structures for storing information such as, but not limited to, the front end information, interfaces, dashboards, incident information, claim information, user information, vendor information, contract information, invoices, a blockchain ledger, etc. The database 140 can be part of the response system 130, or a separate component that the response system 130, the client device 110, or the third party device 150 can access via the network 120. The database 140 can also be distributed throughout system 100. For example, the database 140 can include multiple databases associated with the response system 130, the client device 110, or the third party device 150, or all three. Database 140 may include one or more storage mediums. The storage mediums may include but are not limited to magnetic storage, optical storage, flash storage, and/or RAM. Response system 130 may implement or facilitate various APIs to perform database functions (i.e., managing data stored in database 140). The APIs can be but are not limited to SQL, ODBC, JDBC, NOSQL and/or any other data storage and manipulation API.

Processing circuit 132 includes processor 133 and memory 134. Memory 134 may have instructions stored thereon that, when executed by processor 133, cause processing circuit 132 to perform the various operations described herein. The operations described herein may be implemented using software, hardware, or a combination thereof. Processor 133 may include a microprocessor, ASIC, FPGA, etc., or combinations thereof. In many implementations, processor 133 may be a multi-core processor or an array of processors. Memory 134 may include, but is not limited to, electronic, optical, magnetic, or any other storage devices capable of providing processor 133 with program instructions. Memory 134 may include a floppy disk, CD-ROM, DVD, magnetic disk, memory chip, ROM, RAM, EEPROM, EPROM, flash memory, optical media, or any other suitable memory from which processor 133 can read instructions. The instructions may include code from any suitable computer programming language.

The data sources 160 can provide data to the response system 130. In some arrangements, the data sources 160 can be structured to collect data from other devices on network 120 (e.g., user devices 110 and/or third-party devices 150) and relay the collected data to the response system 130. In one example, a user and/or entity may have a server and database (e.g., proxy, enterprise resource planning (ERP) system) that stores network information associated with the user and/or entity. In this example, the response system 130 may request data associated with specific data stored in the data source (e.g., data sources 160) of the user or entity. For example, in some arrangements, the data sources 160 can host or otherwise support a search or discovery engine for Internet-connected devices. The search or discovery engine may provide data, via the data acquisition engine 180, to the response system 130. In some arrangements, the data sources 160 can be scanned to provide additional data. The additional data can include newsfeed data (e.g., articles, breaking news, and television content), social media data (e.g., Facebook, Twitter, Snapchat, and TikTok), geolocation data of users on the Internet (e.g., GPS, triangulation, and IP addresses), governmental databases, generative artificial intelligence (GAI) data, and/or any other intelligence data associated with the specific entity of interest.

The system 100 can include a data acquisition engine 180. In various arrangements, the response system 130 can be communicatively and operatively coupled to the data acquisition engine 180. The data acquisition engine 180 can include one or more processing circuits configured to execute various instructions. In various arrangements, the data acquisition engine 180 can be configured to facilitate communication (e.g., via network 120) between the response system 130 and systems described herein. The facilitation of communication can be implemented as an application programming interface (API) (e.g., REST API, Web API, customized API), batch files, and/or queries. In various arrangements, the data acquisition engine 180 can also be configured to control access to resources of the response system 130 and database 140.

The API can be used by the data acquisition engine 180 and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of a SQL data set, a protocol buffer message stream, an instantiated class implemented in a suitable object-oriented programming language (e.g., Java, Ruby, C#), an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC)). As such, EDI messages may be implemented in any of the above or using another suitable technology.

In some arrangements, data is exchanged by components of the data acquisition engine 180 using web services. Where data is exchanged using an API configured to exchange web service messages, some or all components of the computing environment may include or may be associated with (e.g., as a client computing device) one or more web service node(s). The web service may be identifiable using a unique network address, such as an IP address, and/or a URL. Some or all components of the computing environment may include circuits structured to access and exchange data using one or more remote procedure call protocols, such as Java remote method invocation (RMI), Windows distributed component object model (DCOM). The web service node(s) may include a web service library including callable code functions. The callable code functions may be structured according to a predefined format, which may include a service name (interface name), an operation name (e.g., read, write, initialize a class), operation input parameters and data type, operation return values and data type, service message format, etc. In some arrangements, the callable code functions may include an API structured to access on-demand and/or receive a data feed from a search or discovery engine for Internet-connected devices. Further examples of callable code functions are provided further herein as embodied in various components of the data acquisition engine 180.

The data sources 160 can provide data to the response system 130 based on the data acquisition engine 180 scanning the Internet (e.g., various data sources and/or data feeds) for data associated with a specific user or entity (e.g., vendor, insurer). That is, the data acquisition engine 180 can hold (e.g., in non-transitory memory, in cache memory, and/or in database 140) the executables for performing the scanning activities on the data sources 160. Further, the response system 130 can initiate the scanning operations. For example, the response system 130 can initiate the scanning operations by retrieving domain identifiers or other user/entity identifiers from a computer-implemented DBMS or queue. In another example, a user can affirmatively request a particular resource (e.g., domain or another entity identifier) to be scanned, which triggers the operations. In various arrangements, the data sources 160 can facilitate the communication of data between the client devices 140 and third party devices 150, such that the data sources 160 receive data (e.g., over network 120) from the client devices 140 and third-party devices 150 before sending the data other systems described herein (e.g., response system 130). In other arrangements and as described herein, the client devices 140 and third-party devices 150, and the data sources 160 can send data directly, over the network 120, to any system described herein and the data sources 160 may provide information not provided by any of the client devices 140 and third party devices 150.

As used herein, the terms "scan" and "scanning" refer to and encompass various data collection operations, which may include directly executing and/or causing to be executed any of the following operations: query(ies), search(es), web crawl(s), interface engine operations structured to enable the data acquisition engine 180 to enable an appropriate system interface to continuously or periodically receive inbound data, document search(es), dataset search(es), retrieval from internal systems of previously received data, etc. These operations can be executed on-demand and/or on a scheduled basis. In some embodiments, these operations include receiving data (e.g., device connectivity data, IP traffic data) in response to requesting the data (e.g., data "pull" operations). In some embodiments, these operations include receiving data without previously requesting the data (e.g., data "push" operations). In some embodiments, the data "push" operations are supported by the interface engine operations.

One of skill will appreciate that data received as a result of performing or causing scanning operations to be performed may include data that has various properties indicative of device properties, hardware, firmware, software, configuration information, and/or IP traffic data. For example, in an arrangement, a device connectivity data set can be received. In some embodiments, device connectivity data can include data obtained from a search or discovery engine for Internet-connected devices which can include a third-party product (e.g., Shodan), a proprietary product, or a combination thereof. Device connectivity data can include structured or unstructured data.

Various properties (sometimes referred to as "attributes") (e.g., records, delimited values, values that follow particular pre-determined character-based labels) can be parsed from the device connectivity data. The properties can include device-related data and/or IP traffic data. Device-related data can encompass data related to software, firmware, and/or hardware technology deployed to, included in, or coupled to a particular device. Device-related data can include IP address(es), software information, operating system information, component designation (e.g., router, web server), version information, port number(s), timestamp data, host name, etc. IP traffic data can include items included in packets, as described elsewhere herein. Further, IP traffic data included in the device connectivity data can include various supplemental information (e.g., in some arrangements, metadata associated with packets), such as host name, organization, Internet Service Provider information, country, city, communication protocol information, and Autonomous System Number (ASN) or similar identifier for a group of devices using a particular defined external routing policy. In some embodiments, device connectivity data can be determined at least in part based on banner data exposed by the respective source vendor or insurer. For example, device connectivity data can include metadata about software running on a particular device of a source entity.

In various arrangements, vendors and users can utilize Internet-wide scanning tools (e.g., port scanning, network scanning, vulnerability scanning, Internet Control Message Protocol (ICMP) scanning, TCP scanning, UDP scanning, semi-structured and unstructured parsing of publicly available data sources) for collecting data (e.g., states and performance of companies, corporations, users). Further, in addition to this data, other data collected and fused with the data obtained via scanning may be newsfeed data (e.g., articles, breaking news, television), social media data (e.g., Facebook, Twitter, Snapchat, TikTok), geolocation data of users on the Internet (e.g., GPS, triangulation, IP addresses), governmental databases, and any other data associated with the specific user or entity (e.g., vendor or insurer), their capabilities, configurations, cyber insurance policy, coverage, attestations, questionnaires and overall state of aforementioned attributes.

In some arrangements, scanning occurs in real-time such that the data acquisition engine 180 continuously scans the data sources 160 for data associated with a specific vendor or user (e.g., real-time states of specific vendors or users, real-time threats, real-time performance). In various arrangements, scanning may occur in periodic increments such that the data acquisition engine 180 can scan the Internet for data associated with the specific vendor or user periodically (e.g., every minute, every hour, every day, every week, and any other increment of time.) In some embodiments, data acquisition engine 180 may receive feeds from be various data aggregating systems that collect data associated with specific vendors or users. For example, the response system 130 can receive specific vendor or user data from the data sources 160, via the network 120 and data acquisition engine 180. The information collected by the data acquisition engine 180 may be stored in database 140. In some arrangements, an entity (e.g., company, vendor, insurer, any service or goods provider, etc.) may submit data to response system 130 and provide information about their products or services, pricing, capabilities, statuses, etc., which may be stored in database 140.

Memory 134 may include analysis circuit 136. The analysis system 136 can be configured to perform data fusion operations, including operations to generate and/or aggregate various data structures stored in database 140, which may have been acquired as a result of scanning operations or via another EDI process. For example, the analysis circuit 136 can be configured to aggregate entity data stored in the database 140. The entity data may be a data structure associated with a specific entity and include various data from a plurality of data channels. In some embodiments, the analysis circuit 136 can be configured to aggregate line-of-business data stored in the database 140. The line-of-business data may be a data structure associated with a plurality of line-of-business of an entity and indicate various data from a plurality of data channels based on line-of-business (e.g., information technology (IT), legal, marketing and sales, operations, finance and accounting).

The analysis circuit 136 can also be configured to receive a plurality of user and entity data. In some arrangements, the analysis circuit 136 can be configured to receive data regarding the network 120 as a whole (e.g., stored in database 140) instead of data specific to particular users or entities. The received data that the analysis circuit 136 receives can be data that response system 130 aggregates and/or data that the response system 130 receives from the data sources 160 and/or any other system described herein. As previously described, the response system 130 can be configured to receive information regarding various entities and users on the network 120 (e.g., via device connectivity data). Further, the response system 130 can be configured to receive and/or collect information regarding interactions that a particular user or entity has on the network 120 (e.g., via IP traffic data). Further, the response system 130 can be configured to receive and/or collect additional information. Accordingly, the received or collected information may be stored as data in database 140. In various arrangements, the database 140 can include user and entity profiles.

The response system 130 can be configured to electronically transmit information and/or notifications relating to various metrics, dashboards (e.g., graphical user interfaces) and/or models it determines, analyzes, fuses, generates, or fits to user data, entity data, and/or other data. This may allow a user of a particular one of the client devices 110 and third party devices 150 to review the various metrics, dashboards, or models which the response system 130 determines. Further, the response system 130 can use the various metrics to identify remediation actions for users and entities. The analysis circuit 136 implements data fusion operations of the response system 130. In various arrangements, the analysis circuit 136 can be configured to receive a plurality of data (e.g., user and entity data) from a plurality of data sources (e.g., database 140, client devices 140, third party devices 150, data sources 160) via one or more data channels (e.g., over network 120). Each data channel may include a network connection (e.g., wired, wireless, cloud) between the data sources and the response system 130.

In some arrangements, the analysis circuit 136 can also be configured to collect a plurality of data from a particular data source or from a plurality of data sources based on electronically transmitting requests to the data sources via the plurality of data channels, managed and routed to a particular data channel by the data acquisition engine 180. A request submitted via the data acquisition engine 180 may include a request for scanning publicly available information exposed by a user or entity. In some embodiments, the request submitted via the data acquisition engine 180 may include information regarding access-controlled data being requested from the user or entity. In such cases, the request can include trust verification information sufficient to be authenticated by the target entity (e.g., multi-factor authentication (MFA) information, account login information, request identification number, a pin, certificate information, a private key of a public/private key pair). This information should be sufficient to allow the target entity to verify that a request is valid.

In various arrangements, the analysis circuit 136 can be configured to initiate a scan, via the data acquisition engine 180, for a plurality of data from a plurality of data sources based on analyzing device connectivity data, vendor information, scheduling information (e.g., team members), network properties (e.g., status, nodes, element-level (sub-document level), group-level, network-level, size, density, connectedness, clustering, attributes) and/or network information (e.g., IP traffic, domain traffic, sub-domain traffic, connected devices, software, infrastructure, bandwidth) of a target computer network environment and/or environments of the entity or associated with the entity. The operations to fuse various properties of data returned via the scan can include a number of different actions, which can parse device connectivity data, packet segmentation, predictive analytics, cross-referencing to data regarding known vulnerabilities, and/or searching data regarding application security history. These operations can be performed to identify costs of vendors, services offered, hosts, ports, and services in a target computer network environment. The target computer network environment can be identified by a unique identifier, such as a domain identifier (e.g., a top-level domain (TLD) identifier, a subdomain identifier, a URL string pointing to a particular directory), an IP address, a subnet, etc. Further, the target computer network environment can be defined with more granularity to encompass a particular component (e.g., an entity identified by an IP address, software/applications/operating systems/exposed API functions associated with a particular port number, IP address, subnet, domain identifier). In some arrangements, one or more particular target computer network environments can be linked to an entity profile (e.g., in the database 140). In one example, scanning can include parsing out packet and/or device connectivity data properties that may indicate available UDP and TCP network services running on the target computer network environment. In another example, scanning can include parsing out packet and/or device connectivity data that indicates the operating systems (OS) in use on the target computer network environment.

In various arrangements, vendor information can be determined based accessing a vendor device (e.g., 150) or website of the vendor to collect vendor information (e.g., via an API call). In various arrangements, vulnerabilities and incidents can be determined based on any software feature, hardware feature, network feature, or combination of these, which could make an entity vulnerable to cyber threats, incidents, such as hacking activities, data breaches, and cyberattacks. In turn, cyber-threats (sometimes referred to herein as "cyber-indents" or "incidents") increase the probability of cyber-incidents. Accordingly, a vulnerability or incident can be a weakness that could be exploited to gain unauthorized access to or perform unauthorized actions in a computer network environment (e.g., system 100). For example, obsolete computing devices and/or obsolete software may present vulnerabilities and/or threats in a computer network environment. In another example, certain network frameworks may present vulnerabilities and/or threats in a computer network environment. In yet another example, business practices of an entity may present vulnerabilities and/or threats in a computer network environment. In yet another example, published content on the Internet may present vulnerabilities in a computer network environment. In yet another example, third-party computing devices and/or software may present vulnerabilities and/or threats in a computer network environment. Accordingly, as shown, all devices (e.g., servers, computers, any infrastructure), all data (e.g., network information, vendor data, network traffic, user data, certificate data, public and/or private content), all practices (e.g., business practices, security protocols), all software (e.g., frameworks, protocols), and any relationship an entity has with another entity can present vulnerabilities and/or threats in a computer network environment that could lead to one or more cyber-incidents.

In broad view, the analysis circuit 136 can also be configured to receive company and vendor information regarding the company/vendor. In some implementations, the analysis circuit 136 can receive a registration request and register user accounts (e.g., accounts). For example, a user of library 114 may register their user account with a client device such that the client device 110 can execute the library 114 and perform various actions. Registering a client device 110 or user (or vendor) can include, but not limited to, providing various identifying information (e.g., device name, geolocation, identifier, etc.), platform designations (e.g., iOS, Android, WebOS, BlackBerry OS, etc.), user actions (e.g., activation gesture, haptic, biometric, etc.), authentication information (e.g., username, password, two-step criteria, security questions, address information, etc.). Once the analysis circuit 136 approves a registration request, the information associated with the request may be stored in database 140. Additionally, a notification may be transmitted to the client device 110 indicating the user, vendor, or client device 110 (or third party device 150) is registered and can utilize the dashboards to perform actions associated with one or more applications.

In various implementations, analysis circuit 136 performs statistical operations on received data to produce statistical measurements describing the received data. For example, analysis circuit 136 may determine capabilities of individuals, objectives, cost estimates, etc. In various implementations, the statistical operations can be calculated based on performing various statistical operations and analysis. In some implementations, received data and previously collected data stored in database 140 can be used to train a machine-learning model. That is, predictions regarding vulnerabilities and incidents could be based on artificial intelligence or a machine-learning model. For example, a first machine-learning model may be trained to identify particular incidents and output a prediction. In this example, a second machine-learning model may be trained to identify remediation actions based on incident. In various implementations, machine learning algorithms can include, but are not limited to, a neural network, convolutional neural network, recurrent neural network, linear regression model, and sparse vector machine). The various computing systems/devices described herein can input various data (e.g., event logs, debugging information and so on) into the machine learning model, and receive an output from the model indicating a particular action to perform. In some implementations, analysis circuit 136 can be configured to perform source testing on one or more networks. Source testing on one or more networks can include performing various test plans. During the source testing, various malfunctions and exceptions can be identified. Additionally, the network can be identified such that the testing occurs on a designated network (e.g., or multiple designated content networks).

Memory 134 also includes content management circuit 135. The content management circuit 135 may be configured to generate content for displaying to users and vendors. The content can be selected from among various resources (e.g., webpages, applications). The content management circuit 135 is also structured to provide content (e.g., via a graphical user interface (GUI)) to the user devices 140 and/or third party devices 150), over the network 120, for display within the resources. For example, in various arrangements, a claim dashboard or incident response dashboard may be integrated in a mobile application or computing application or provided via an Internet browser. The content from which the content management circuit 135 selects may be provided by the response system 130 via the network 120 to one or more user devices 110 and/or third party devices 150. In such implementations, the content management circuit 135 may determine content to be generated and published in one or more content interfaces of resources (e.g., webpages, applications).

The content management circuit 135 can be configured to interact with a database management system or data storage vault, where clients can obtain or store information. Clients can use queries in a formal query language, inter-process communication architecture, natural language or semantic queries to obtain data from the DBMS. In some implementations, one or more clients obtain data from the DBMS using queries in a custom query language such as a Visualization API Query Language. In some implementations, the content management circuit 135 can be configured to provide one or more customized dashboards (e.g., stored in database 140) to one or more computing devices (e.g., user devices 140, third party devices 150) for presentation. That is, the provided customized dashboards (also referred to herein as "customized interface") can execute and/or be displayed at the computing devices described herein. In some arrangements, the customized dashboards can be provided within a web browser or installed application. In some arrangements, the customized dashboards can include PDF files. In some arrangements, the customized dashboards can be provided via email. According to various arrangements, the customized dashboards can be provided on-demand or as part of push notifications.

In various arrangements, the content management circuit 135 executes operations to provide the customized dashboards to the user devices 140 and third party devices 150, without utilizing the web browser. In various arrangements, the customized dashboards can be provided within an application (e.g., mobile application, desktop application). The dashboard from which the content management circuit 135 generates may be provided to one or more users or entities, via the network 120. In some arrangements, the content management circuit 135 may select dashboards and/or interfaces associated with the user or entity to be displayed on the user devices 140 or third party devices 150. Additional details regarding the dashboards and the content presented are described in detail with reference to FIGS. 7-21.

In an example arrangement, an application executed by the user devices 140 and/or third party devices 150 can cause the web browser to display on a monitor or screen of the computing devices. For example, the user may connect (e.g., via the network 120) to a website structured to host the customized dashboards. In various arrangements, hosting the customized dashboard can include infrastructure such as host devices (e.g., computing device) and a collection of files defining the customized dashboard and stored on the host devices (e.g., in a database). The web browser operates by receiving input of a uniform resource locator (URL) into a field from an input device (e.g., a pointing device, a keyboard, a touchscreen, mobile phone, or another form of input device). In response, the content management circuit 135 executing the web browser may request data such as from the database 140. The web browser may include other functionalities, such as navigational controls (e.g., backward and forward buttons, home buttons, other navigational buttons or items). The content management circuit 135 may execute operations of the database 140 (or provide data from the database 140 to the user devices 140, and/or third-party devices 150 for execution) to provide the customized dashboards at the user devices 140 and/or third-party devices 150.

In some arrangements, the content management circuit 135 can include both a client-side application and a server-side application. For example, a content management circuit 135 can be written in one or more general purpose programming languages and can be executed by user devices 140 and/or third-party devices 150. The server-side content management circuit 135 can be written, for example, in one or more general purpose programming, or a concurrent programming language, and can be executed by the response system 130. The content management circuit 135 can be configured to generate a plurality of customized dashboards and their properties, such as those described in detail below relative to example FIGS. 7-21. The content management circuit 135 can generate customized user-interactive dashboards for one or more users and entities, such as the client device 110 and third party devices 150, based on data received, collected, and/or aggregated from the analysis circuit 136, any other computing device described herein, and/or any database described herein (e.g., 140).

The generated dashboards can include various data (e.g., data stored in database 140 and/or data sources 160) associated with one or more entities including scheduling information, profile information, cybersecurity risk and/or vulnerabilities cybersecurity vulnerabilities (e.g., malware, unpatched security vulnerabilities, expired certificates, hidden backdoor programs, super-user and/or admin account privileges, remote access policies, other policies and procedures, type and/or lack of encryption, type and/or lack of network segmentation, common injection and parameter manipulation, automated running of scripts, unknown security bugs in software or programming interfaces, social engineering, and IoT devices), insurer and vendor information (e.g., policies, contracts, products, services, underwriting, limitations), incident information, cyberattack information (e.g., phishing attacks, malware attacks, web attacks, and artificial intelligence (AI)-powered attacks), remediation items, remediation actions/executables, security reports, data analytics, graphs, charts, historical data, historical trends, vulnerabilities, summaries, help information, domain information, and/or subdomain information. As used herein, a "cyber-incident" may be any incident where a party (e.g., user, individual, institution, company) gains unauthorized access to perform unauthorized actions in a computer network environment. The database 140 can also include data structures for storing information such as system definitions for customized dashboards generated by content management circuit 135, animated or other content items, actionable objects, graphical user interface data, and/or additional information.

The analysis circuit 136 can be configured to determine organization incident readiness. Readiness is the process an organization follows to prepare for a cyber incident before it happens. This includes entering information that may be needed at the initiation of an incident by incident response teams and breach counsel. Readiness levels are calculated by binary completion of the n tasks that are included in that organization's readiness activities. An organization with 10 readiness steps and 5 completed shows as 50%. In some implementations, determining organization incident readiness can include integrating readiness (e.g., insurer data and other vendor data) into third party devices 150. For example, the insurer data of a company's insurer can be recorded and stored at a third party device 150. In various implementations, determining organization incident readiness can include the analysis circuit determining organization capabilities, limitations, cyber threats, and specific focus associated with cyber threats. Additionally, organization incident readiness can be provided to incident response providers (e.g., security providers, firmware providers, software providers, infostructure providers). The analysis circuit 136 can also be configured to automatically route incidents and claims to vendors associated with a company or user (e.g., client device 110) and in turn contracting and activating an incident response. In some implementations, a response plan can be submitted by a company and the analysis circuit 136 can decompose and analyze the response plan to determine actionable tasks and activities to complete (e.g., by the company or after contracting with a vendor).

In various implementations, the determined organization incident readiness can be stored (e.g., by the analysis circuit 136) as a block in a blockchain (or on a ledger) that can metadata identifying the readiness including, but not limited to, a time stamp, proof of date, and artifacts. In various implementations, the data regarding key milestones (e.g., capabilities pre-incident, what happened after the incident occurred, root cause, recoding) can be stored on a blockchain (e.g., such that it is immutable). In particular, key milestones can be traceable and linkable within a blockchain (or ledger) such that issues can be identified, actionable tasks can be tracked, work is routed to vendors (e.g., 150), and proof of resolution is recorded. In some implementations, database 140 can include a plurality of ledgers or blockchains and the database 140 can be a node of a plurality of nodes on a ledger or blockchain. It should be understood that the various data and information described herein can be implemented on a blockchain. For example, the blockchain can be used to provide for irrefutable proof in a data set of the data, locations, capabilities, configurations, that were in place prior to an incident. In another example, the block can be used to link the incident occurrence with what worked (e.g., effective in preventing an incident) and what did not work (e.g., vulnerability that led to the incident). For example, the irrefutable permanent ledgers (or blockchain) may be used by users at points in the process where they wish to record proofs on chain. This may include configurations, capabilities, assets, policies, threats, actors, claims, incident reports, cyber threat intelligence artifacts, and any other state-based attribute that needs to be recorded and may be shared with others to irrefutably prove that the state of that attribute was "x" at time "t". Combinations of attributes for different data, assets, configurations, capabilities, are collected and rolled up to show if any elements have changed through the use of Merkel Trees, allowing a check of the top-most hash of the combination of downstream values facilitating a single checkpoint to determine if any other elements and configurations, combinations of parameters is the same or if they have changed.

In various implementations, the analysis circuit 136 can intake potential or current incidents based on an embedded widget on remote web sites or within remote web applications. This allows an incident response provider or vendor (sometimes referred to herein as "IR providers" or IR vendors") the ability to seamlessly intake incident response requests for assistance from their web site or one of their sales channel partner sites and have it load directly into the incident intake process within responder. In turn, an embedded widget could be communicably coupled to the analysis circuit 136 (e.g., via network 120) to allow the analysis circuit to start an incident response process (e.g., at proposal stage) and continue through a workflow to achieve response readiness based on pre-defined logic or rules. This rule mechanism can allow for the user to specify specific attributes, collection of attributes, order, and routing method for connecting inbound requests to those who are best-fit to execute on the requests. For example, when an inbound instance of an incident response can be routed to a claim manager based on pre-defined logic or rules, such as to route inbound cases to the IR provider that is active currently, or to the provider who specializes in ransomware extortion cases where the ransom exceeds 10 million, or to round-robin inbound cases among a set of panel IR providers, etc.

In some implementations, the analysis circuit 136 can facilities invoice processing within an incident response process across different insurers. Furthermore, throughout an incident response conditions can be modified, added, or removed to route tasks (or work) to different vendors or partners (e.g., 150). In some implementations, the analysis circuit 136 can also be configured to collect incident submission data, normalize the data (e.g., based on historical data or trends), and automatically submit insurance claims based on the normalized data. Moreover, the analysis circuit 136 can connect the underlying root cause to the capability failure or procedural issue and have that data submitted with the insurance claim. For example, the analysis circuit 136 can connect underlying root cause back to the insurers underwriting questions. In various implementations, the analysis circuit 136 can integrate organization incident readiness into all related parties to a company. As such, the analysis circuit 136 can integrate incident response activation and collaborative across business, teams, insurers, etc. Further, the analysis circuit 136 can be configured to link the root cause of an incident to the capability failure or procedural issue and then link back the insurers underwriting questions.

The content management circuit 135 can also be configured to enable a user (e.g., of a company) to purchase and extended services via the generated dashboards. In some implementations, the content management circuit 135 allows the user (e.g., via a step through process) to integrate into technology and vendors to resolve issues (e.g., incidents) and/or prevent incidents in the future. For example, the dashboards can provide users integration points for incident response workflow management. As such, the content management circuit 135 can generate dashboards (and/ or interfaces) on an application (e.g., 112 or 152) for purchasing products, insurances, and services. In particular, the generated dashboards can provide users of the application with a unified (or universal) view of tasks, activities, and progress/status tracking of incidents, claims, etc. The dashboards can also tie back to incident readiness and managing the incidents through resolution. The content management circuit 135 can also generate the dashboards to include collaboration tools (e.g., video calls, calendar, chats), and the dashboards can include real-time status tracking of policies, incidents, claims, insurers such that policy aligned tasks and status updated can be provide for incident responses and claims.

Figure 1B:
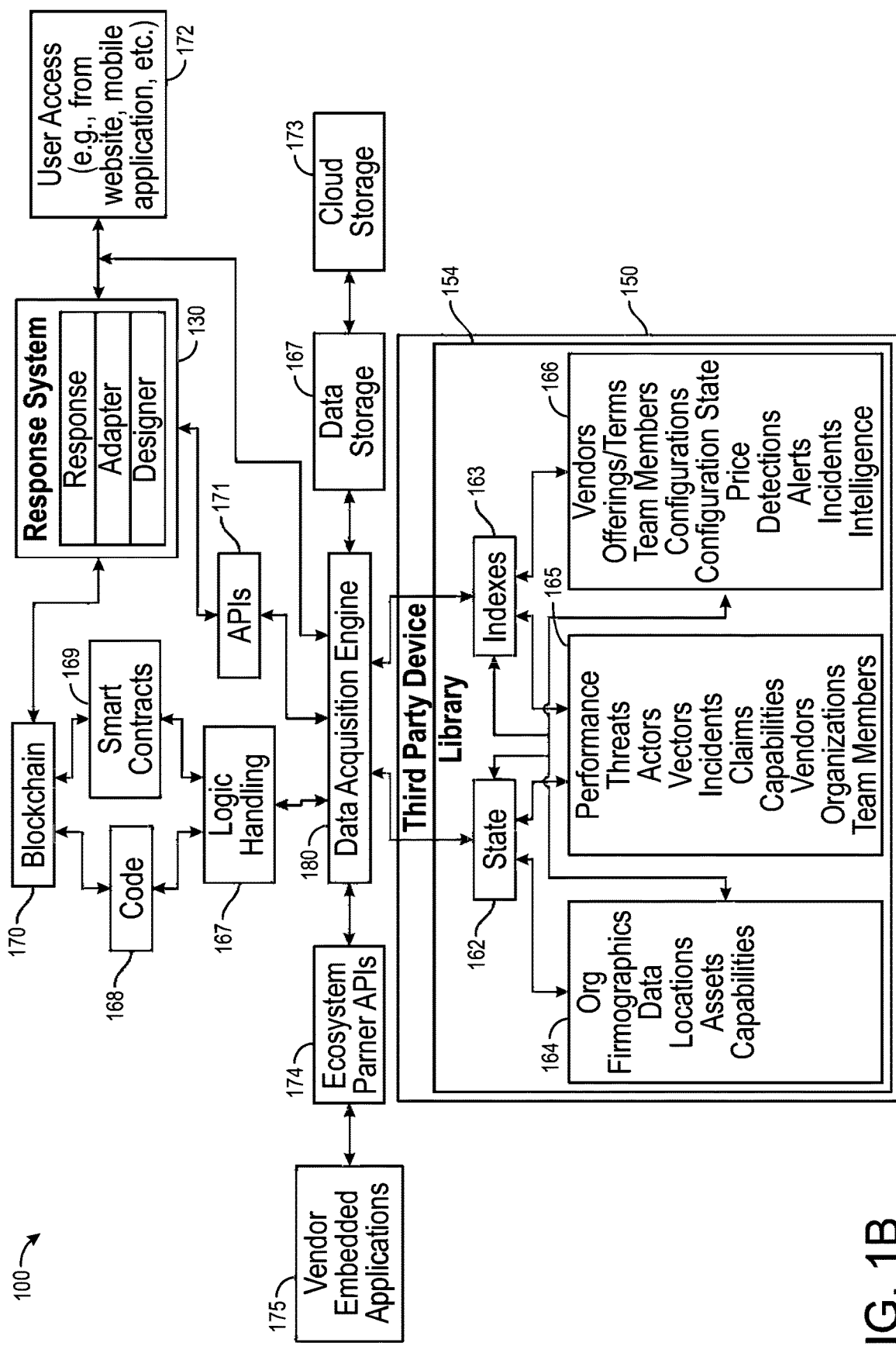
FIG. 1B depicts a block diagram of a more detailed architecture of certain systems or devices of FIG. 1A, according to some arrangements.

Referring now to FIG. 1B, a block diagram depicting a more detailed architecture of certain systems or devices of system 100. System 100 includes the data acquisition engine 180 and response system 130 described in detail with reference to FIG. 1A. However, it should be understood that the response system 130 also encompasses the capability to generate content and dashboards tailored for each aspect of the response process, including the response, adapter, and designer components. These content and dashboards are generated by the content management circuit 135 and can be seen in various figures ranging from FIGS. 7-21.

To illustrate further, the response system 130 enables the presentation of diverse information related to an organization's security and threats through the adapter dashboard and architecture. This facilitates a comprehensive understanding of the security landscape and helps inform decision-making processes. Additionally, the dashboard functionality can be customized by the vendor and/or organization using the designer dashboard and architecture. This empowers them to tailor the visual representation of data, making it more intuitive and aligned with their specific requirements. Furthermore, the responder dashboard and architecture provided by the response system 130 enable the vendor and/or organization to effectively prepare for, track, and update incidents and readiness. This comprehensive dashboard encompasses the entire incident response lifecycle, from the initial incident detection and response through to the final incident closure and claim submission. By leveraging the responder dashboard and architecture, the vendor and/or organization can ensure smooth incident management, streamline processes, and facilitate efficient collaboration among stakeholders.

In the depicted architecture, both organizations and vendors operating the third party devices 150 or client devices 110 have the ability to store states 162 and indexes 163 within the library 154 (or library 114). In some implementations, these states 162 and indexes 163 can be determined based on data derived from various datasets, including the organization dataset 164, performance dataset 165, and vendor dataset 166.

In some implementations, the organization dataset 164 encompasses a wide range of information such as firmographics, data related to locations, assets, and capabilities of the third-party or client organization. This dataset provides a comprehensive understanding of the organization's profile and resources. In some implementations, the performance dataset 165 includes diverse sets of data, including threat data, actor data, vector data, incident data, claim data, capability data, vendor data, organization data, and team member data. These performance-related datasets capture information for assessing the organization's security posture, incident history, and overall operational performance. They enable effective monitoring, analysis, and decision-making in incident response activities. In some implementations, the vendor dataset 166 contains information related to offerings (cybersecurity protection plans), terms, team member data, configuration data, configuration state data, pricing details, detection data, alert data, incident data, and intelligence data. This dataset enables organizations to gain insights into the capabilities and services provided by vendors, facilitating informed decision-making when selecting and collaborating with specific vendors.

In general, the states 162 and indexes 163, derived from the datasets, are utilized as input by the data acquisition engine 180 (or analysis circuit 136) to output a security posture. In some implementations, the data acquisition engine 180 is configured to scan and perform data collection based on accessing vendor embedded applications 175, via ecosystem partner APIs 174. This enables seamless integration with vendor systems, allowing for efficient retrieval and synchronization of relevant data. In the depicted architecture, the states 162 and indexes 163 improve the efficient operations of the response system 130. These states 162 and indexes 163 can stored within the library 154 (or library 114) and are determined based on data from various datasets, including the organization dataset 164, performance dataset 165, and vendor dataset 166.

In some implementations, the states 162 represent the current condition or status of the organization or vendor operating the third-party 150 or client devices 110. They encapsulate information such as system configurations, security policies, incident response readiness, and other relevant parameters. By maintaining these states, the response system 130 can quickly access and reference the most up-to-date information about the organization's or vendor's environment. Additionally, in some implementations, the indexes 163 serve as pointers or references to specific data or resources within the library 154 (or library 114). They streamline the retrieval and access of critical information, ensuring efficient data processing and analysis. These indexes are designed to optimize search operations and enable rapid access to relevant datasets, contributing to the overall responsiveness and effectiveness of the response system 130.

Accordingly, to ensure the accuracy and currency of the states 162 and indexes 163, the data acquisition engine 180 can be configured to scan and collect data by interacting with the vendor embedded applications 175. The communication can occur through ecosystem partner APIs 174, establishing a connection between the response system 130 and the embedded applications 175 used by vendors. Through this communication, the data acquisition engine 180 can retrieve real-time (or near real-time) information from the vendor's systems, including offerings, configurations, alerts, incidents, and other relevant data. In some implementations, the engine 180 can utilize the retrieved data to update and synchronize the states 162 and indexes 163, providing that the response system 130 has the latest and accurate information to support incident response activities.

Expand further on states 162 and indexes 163, the data acquisition engine 180 can maintain the security posture of the organization. That is, the data acquisition engine 180 can actively check a vendor's API for any changes in the configuration "State," the data acquisition engine 180 that the security posture remains up to date and aligned with the evolving environment. By recording these configuration updates to the corresponding index, the data acquisition engine 180 and response system 130 establishes a view of the organization's security landscape. This approach goes beyond static assessments and provides a dynamic and real-time perspective on the organization's security posture. By linking the configuration data with real incident data and other relevant metadata, the response system 130 enhances the accuracy and actionability of the match, enabling quick and effective response to potential threats. In various arrangements, this continuous monitoring and adaptation of the security posture over time is provided and/or presented in a posture stream (as shown with reference to FIG. 18A), which captures and analyzes the evolving information. As new data points are gathered and recorded in the posture stream, the response system 130 can execute proactive incident response activities.

As used herein, a "security posture" refers to the current state and overall cybersecurity profile of an organization or vendor. It is determined based on various factors and information collected from entity data, including system configurations, security policies, incident response readiness, and other relevant parameters. In some arrangements, the data acquisition engine 180 (or analysis circuit 136) scans and collects data from vendor embedded applications through ecosystem partner APIs, ensuring the accuracy and currency of the states and indexes used to represent the security posture. In various arrangements, the analysis circuit 136 utilizes a distributed ledger to tokenize and broadcast the security posture, ensuring transparency and immutability. The analysis circuit 136 can also be configured to model the security posture and multiple security objectives to generate a set of cybersecurity attributes specific to the entity.

Furthermore, the data acquisition engine 180 is shown to gather data from blockchain 170 (e.g., ledgers storing various immutable information about entities, vendors, and corporations) via code 168 and smart contracts 169 that are executed by logic handling 167 (e.g., of the data acquisition engine 180). In some implementations, data acquisition engine 180 can communicate with response system 130 directly (e.g., via a wired or hard-wired connection) or via APIs 171. To enable user access and interaction with the dashboards and content generated by the response system 130, user access 172 is provided. Users, including organizations, vendors, and entities, can access the dashboards and content through dedicated applications such as application 112 or application 152. These applications can be accessed through user devices, such as client device 110, or through third-party devices 150.

Additionally, user access 172 to the dashboards and content can be provided to users (e.g., organizations, vendors, entities) via an application (e.g., 112 or 152) a user device (e.g., 110) and/or third party device 150. Additional, fewer, or different systems and devices can be used. It is important to note that the depicted system and devices are not exhaustive, and additional, fewer, or different systems and devices may be employed depending on specific implementation requirements. The architecture can be tailored to suit the unique needs of organizations, vendors, and entities, allowing for flexibility and customization in the deployment of the response system 130.

In addition to gathering data from the blockchain 170, the response system 130 can establish a communication channel with the blockchain 170. This communication enables the response system 130 to interact with the blockchain 170 in a secure and decentralized manner. By directly accessing the blockchain 170, the response system 130 can leverage its inherent properties of immutability, transparency, and distributed consensus to enhance the integrity and reliability of incident-related data and information. Accordingly, the response system 130 can use blockchain 170 to record and verify incident details, maintain an auditable trail of actions and transactions, and ensure the integrity of information throughout the incident response process.

It will be recognized that some or all of the figures are schematic representations for purposes of illustration. The figures are provided for the purpose of illustrating one or more embodiments with the explicit understanding that they will not be used to limit the scope or the meaning of the claims.

Figure 2:
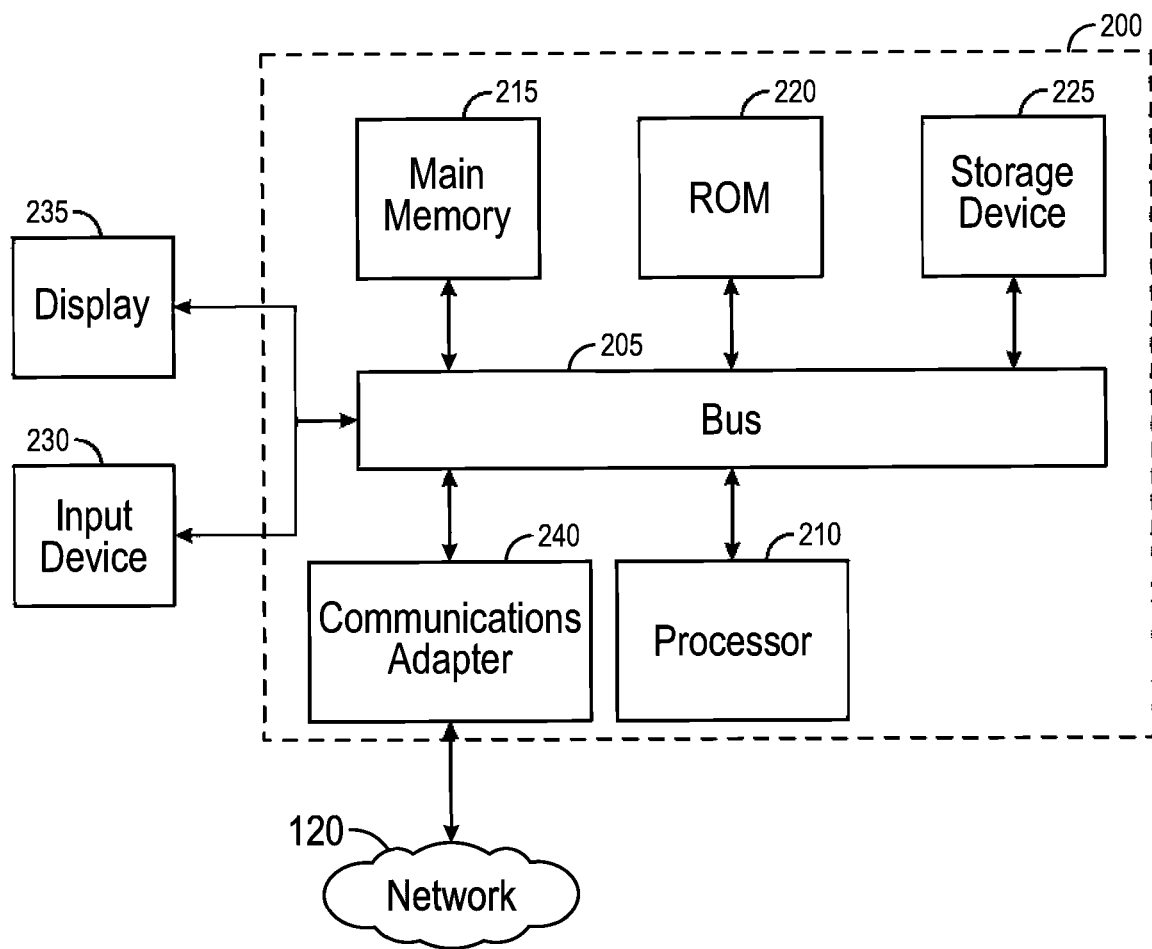
FIG. 2 depicts a computer system, according to some arrangements.

Referring now to FIG. 2, a depiction of a computer system 200 is shown. The computer system 200 that can be used, for example, to implement a system 100, incident response system 130, client devices 110, third party devices 150, data sources 160, and/or various other example systems described in the present disclosure. The computing system 200 includes a bus 205 or other communication component for communicating information and a processor 210 coupled to the bus 205 for processing information. The computing system 200 also includes main memory 215, such as a random-access memory (RAM) or other dynamic storage device, coupled to the bus 205 for storing information, and instructions to be executed by the processor 210. Main memory 215 can also be used for storing position information, temporary variables, or other intermediate information during execution of instructions by the processor 210. The computing system 200 may further include a read only memory (ROM) 220 or other static storage device coupled to the bus 205 for storing static information and instructions for the processor 210. A storage device 225, such as a solid-state device, magnetic disk or optical disk, is coupled to the bus 205 for persistently storing information and instructions.

The computing system 200 may be coupled via the bus 205 to a display 235, such as a liquid crystal display, or active matrix display, for displaying information to a user. An input device 230, such as a keyboard including alphanumeric and other keys, may be coupled to the bus 205 for communicating information, and command selections to the processor 210. In another arrangement, the input device 230 has a touch screen display 235. The input device 230 can include any type of biometric sensor, a cursor control, such as a mouse, a trackball, or cursor direction keys, for communicating direction information and command selections to the processor 210 and for controlling cursor movement on the display 235.

In some arrangements, the computing system 200 may include a communications adapter 240, such as a networking adapter. Communications adapter 240 may be coupled to bus 205 and may be configured to enable communications with a computing or communications network 120 and/or other computing systems. In various illustrative arrangements, any type of networking configuration may be achieved using communications adapter 240, such as wired (e.g., via Ethernet), wireless (e.g., via Wi-Fi, Bluetooth), satellite (e.g., via GPS) pre-configured, ad-hoc, LAN, WAN.

According to various arrangements, the processes that effectuate illustrative arrangements that are described herein can be achieved by the computing system 200 in response to the processor 210 executing an arrangement of instructions contained in main memory 215. Such instructions can be read into main memory 215 from another computer-readable medium, such as the storage device 225. Execution of the arrangement of instructions contained in main memory 215 causes the computing system 200 to perform the illustrative processes described herein. One or more processors in a multi-processing arrangement may also be employed to execute the instructions contained in main memory 215. In alternative arrangements, hard-wired circuitry may be used in place of or in combination with software instructions to implement illustrative arrangements. Thus, arrangements are not limited to any specific combination of hardware circuitry and software.

Figure 3:
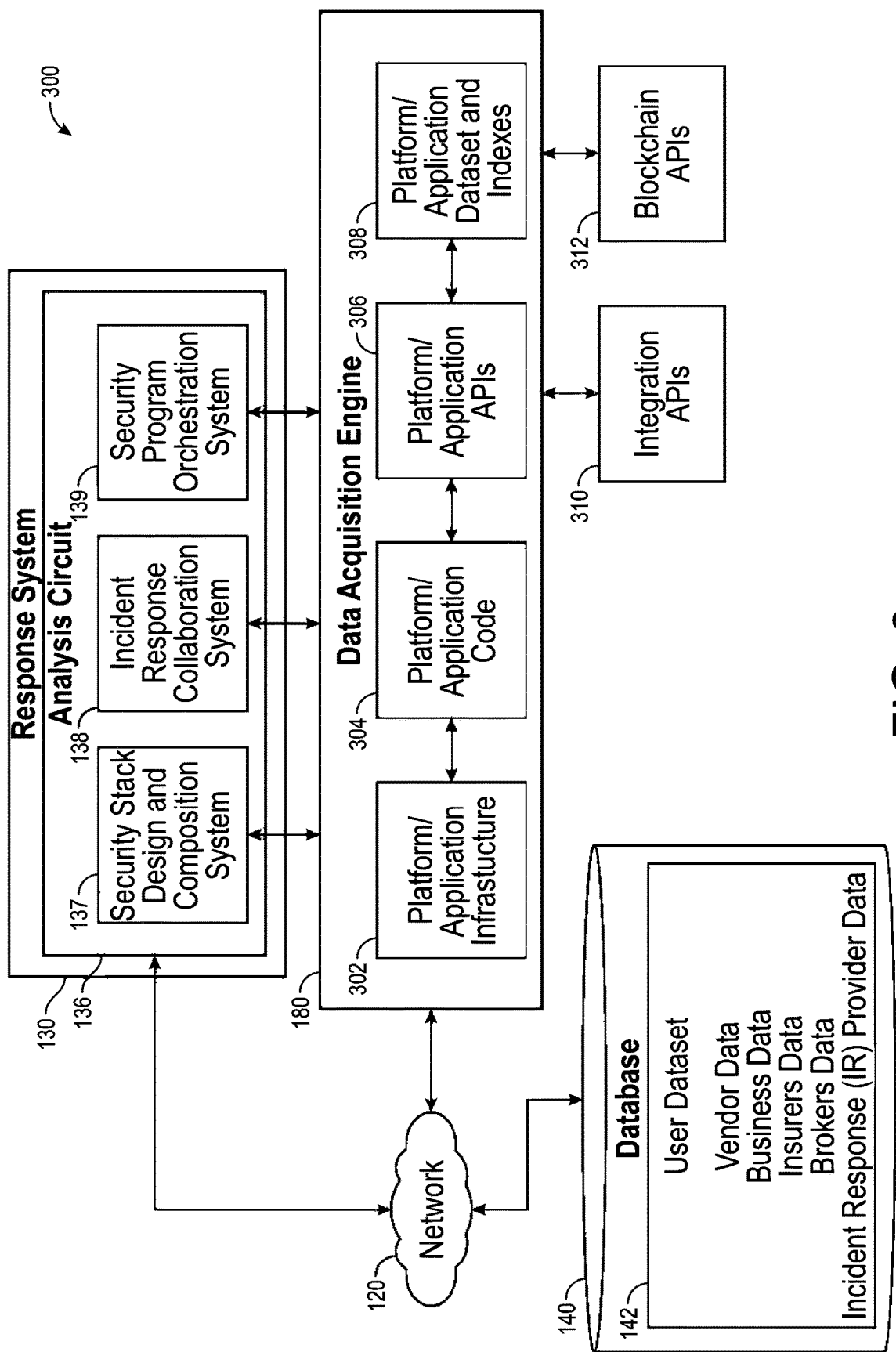
FIG. 3 depicts an architecture that facilitates data acquisition and analysis, according to some arrangements.

Referring now to FIG. 3, the data acquisition engine 180 and analysis circuit 136 of the response system 130, as depicted in FIG. 1, depict an architecture that facilitates efficient data acquisition and analysis. In some implementations, a user dataset 142, containing diverse data associated with different entities and users, can be securely stored in the database 140. The systems and devices illustrated in FIG. 3 communicate and exchange information over the network 120, which enables seamless integration and collaboration among the components.

The data acquisition engine 180 encompasses various components designed to support the execution of applications 112 and 152. These components include, but are not limited to, the platform application infrastructure 302, platform application code 304, platform application APIs 306, and platform application datasets and indexes 308. Together, these elements form the support of the data acquisition engine 180, providing the structures and resources to ensure the efficient functioning of the applications. Additionally, integration APIs 310 and blockchain APIs 312 are integrated into the data acquisition engine 180, enabling seamless execution of API requests, data retrieval from blockchains, access to data sources 160, and integration with various vendors and third parties for streamlined data exchange. These integration APIs 310 facilitate the secure and reliable flow of information, ensuring the responsiveness and effectiveness of the data acquisition process.

The analysis circuit 136 is shown to include, but is not limited to, a security stack designer and composition (SSDC) system 137, an incident response collaboration (IRC) system 138, and a security program orchestration (SPO) system 139. For example, the SSDC system 137 walk users through identifying what data and computations are most important, where the data resides, what vendor product, service, and procedural capabilities are in place to prevent/detect/respond to cyber-attacks, and based on these visualized gaps, determine what to prioritize.

The analysis circuit 136 includes several components that improve the capabilities of the response system 130. One of these components is the security stack designer and composition (SSDC) system 137, which is configured to guide users through the process of identifying and addressing potential vulnerabilities and gaps in their security infrastructure. In some implementations, the SSDC system 137 provides users with a systematic approach to evaluate the significance of their data and computational processes, determining their criticality in the context of cybersecurity. By utilizing the SSDC system 137, users can gain insights into the specific locations where their data is stored and processed, allowing for a comprehensive understanding of potential security risks. In general, the SSDC system 137 employs various techniques to identify specific locations where data is stored and processed within an organization's infrastructure. In particular, by leveraging data mapping and inventory techniques that enable the SSDC system 137 to identify data repositories, databases, file systems, and other storage systems where data is stored. For example, the SSDC system 137 can analyze network traffic and data flows within an organization's network to identify sources and destinations of data. By monitoring network communication and analyzing data packets, the SSDC system 137 can trace the path of data transmission and determine the endpoints where data is stored or processed.

Additionally, the SSDC system 137 can utilize data discovery and scanning mechanisms (e.g., using data acquisition engine 180) to identify data repositories within an organization's infrastructure. This may involve scanning file systems, databases, cloud storage, and other data repositories to identify the locations where sensitive or critical data resides. In some implementations, the SSDC system 137 can integrate with data classification tools or metadata repositories (e.g., data sources 160) to gather information about the nature and sensitivity of the data. By understanding the characteristics and classification of data, the SSDC system 137 can identify the specific locations where sensitive data is stored or processed. By combining these techniques, the SSDC system 137 can provide organizations with a comprehensive view of the locations where data is stored and processed. It enables organizations to understand the data flow across their infrastructure and gain insights into the potential security risks associated with specific data storage and processing environments.

For example, an organization that utilizes both on-premises servers and cloud storage for data storage. The SSDC system 137 can perform an analysis of the organization's network and infrastructure, monitoring data flows between different systems. It would identify the on-premises servers, databases, and file systems where certain data is stored. Additionally, it would detect the cloud storage providers and specific cloud repositories where data is stored. By mapping out these locations, the SSDC system 137 provides the organization with a clear understanding of the data storage landscape and enables them to apply appropriate security measures to protect the data in each location.

In some implementations, the SSDC system 137 facilitates an assessment of the existing vendor products, services, and procedural capabilities that are currently in place to prevent, detect, and respond to cyber-attacks. This evaluation enables users to identify any gaps or areas of improvement in their security stack. Through visualizations and analysis, the SSDC system 137 helps users prioritize their security measures based on identified gaps and vulnerabilities. By highlighting areas that require attention, the SSDC system 137 empowers organizations to allocate their resources effectively and take proactive steps to enhance their overall security posture. Moreover, the SSDC system 137 is designed to be dynamic and adaptable, accommodating the ever-evolving threat landscape and the changing needs of organizations. It provides a user-friendly interface that simplifies the complex task of security stack design and composition, making it accessible to users with varying levels of technical expertise.

In some implementations, the IRC system 138 can be configured to collect, aggregate, and generate data and data structure that can be presented via application 112 and 152 and can be configured to determine level of importance related to matter pre-incidents, pre-associate to internal incident team members, cyber insurers, breach counsel, incident response firms, and security vendors to reduce the time it takes to activate and triage live incidents in the future. By leveraging the capabilities of the IRC system 138, organizations can efficiently manage incidents, reduce response times, and ensure collaboration among various stakeholders.

In some implementations, the IRC system 138 can collect and aggregate relevant data. This can include gathering information from various sources such as incident reports, security logs, system alerts, and user-generated data. The IRC system 138 employs data collection mechanisms to capture and centralize this information, ensuring that incident responders have a comprehensive and consolidated view of the incident landscape. The term "incident landscape" refers to the overall environment and context in which incidents occur within an organization's systems and networks. It encompasses the various factors, elements, and conditions that shape the occurrence and impact of security incidents. The incident landscape includes aspects such as the organization's infrastructure, network architecture, data assets, applications, user activities, potential vulnerabilities, and threat landscape. Understanding the incident landscape is important for incident responders as it allows them to gain insights into the organization's unique security challenges, identify potential attack vectors, assess risks, and develop effective incident response strategies. By comprehensively mapping and analyzing the incident landscape using the IRC system 138, organizations can proactively strengthen their defenses, detect and respond to incidents promptly, and minimize the impact of security breaches.

In some implementations, the IRC system 138 can generate data structures that facilitate the organization and presentation of incident-related information. These data structures enable the categorization, classification, and correlation of incident data, making it easier for incident responders to analyze and make informed decisions. The IRC system 138 can employ various techniques such as data modeling, schema design, and indexing to create efficient and structured data representations. By leveraging the data and data structures generated by the IRC system 138, organizations can determine the level of importance related to pre-incident matters. This involves assessing the potential impact and severity of different incident scenarios, identifying critical assets and systems, and evaluating the potential risks and vulnerabilities. This information helps organizations prioritize their incident response efforts, allocating appropriate resources and attention to high-priority incidents.

In some implementations, the IRC system 138 also enables pre-association of internal incident team members, cyber insurers, breach counsel, incident response firms, and security vendors. By establishing these pre-associations, organizations can expedite the activation and triaging of live incidents in the future. The IRC system 138 can maintain a database of trusted contacts and partners, allowing incident responders to quickly engage the necessary expertise and support when responding to incidents. This reduces response times and enhances the overall efficiency of technology and incident handling. Moreover, the IRC system 138 facilitates seamless collaboration among various stakeholders involved in incident response. It provides a unified platform where team members can share information, communicate, and coordinate their efforts. The IRC system 138 may include features such as real-time messaging, task assignment, document sharing, and incident status tracking, enabling effective collaboration and ensuring that all stakeholders are aligned and working towards a common goal.

The security program orchestration (SPO) system 139 can be configured to manage and adapt an organization's security program to address changes in the security posture and cyber threats. In some implementations, it operates by receiving inputs that indicate the changing state of the security posture, which can come from various sources such as technical indicators or human-assisted inputs through APIs or social media sharing. These inputs provide valuable information about emerging threats, vulnerabilities, or changes in the organization's security landscape. Once the SPO system 139 receives these inputs, it analyzes and evaluates the information to determine the necessary adjustments and changes required in the security program. This involves identifying specific areas or aspects of the security program that need to be modified, such as updating security policies, configurations, access controls, or implementing additional security measures.

The orchestration aspect of the SPO system 139 coordinates and manages the implementation of these changes across the organization's various vendor tools and configurations. It ensures that the necessary modifications are applied consistently and effectively across different security systems and technologies, minimizing any potential gaps or inconsistencies that could compromise the organization's overall security posture. Furthermore, the SPO system 139 can be configured to automate and streamline the process of implementing security program changes, reducing the manual effort and potential errors associated with manual intervention. It can leverage automation capabilities to efficiently propagate the required changes to the appropriate security tools, configurations, and policies, ensuring that the organization's security program remains up-to-date and aligned with the evolving threat landscape.

Referring to the interplay of the analysis circuit 136 generally, the SSDC system 137 designs and composes the security stack. It guides users through the process of identifying critical data, determining its storage locations, and understanding the necessary vendor products, services, and procedural capabilities to protect against, detect, and respond to cyber-attacks. By visualizing the existing gaps and vulnerabilities, the SSDC system 137 helps organizations prioritize their security efforts and make informed decisions to strengthen their security posture. The IRC system 138 focuses on collaboration and information sharing during incident response. It collects, aggregates, and generates data to be presented via applications 112 and 152. This system facilitates the efficient and effective communication among internal incident team members, cyber insurers, breach counsel, incident response firms, and security vendors. By pre-associating relevant parties and establishing clear lines of communication, the IRC system 138 reduces the time it takes to activate and triage live incidents in the future, leading to improved incident response capabilities. The SPO system 139, on the other hand, plays a crucial role in managing the organization's security program. It receives inputs indicating changes in the security posture or emerging cyber threats, whether through technical indicators or human-assisted inputs. Leveraging these inputs, the SPO system 139 determines the adjustments required in the security program and orchestrates the implementation of those changes across the organization's various vendor tools and configurations. This ensures that the security program remains up-to-date and aligned with the evolving threat landscape, enhancing the organization's overall security resilience.

Accordingly, together, these three systems create a powerful synergy within the organization's security ecosystem. The SSDC system 137 helps design a robust security infrastructure, the IRC system 138 enables efficient collaboration and information sharing during incident response, and the SPO system 139 ensures the agility and adaptability of the organization's security program. By working in tandem, these systems contribute to a proactive and comprehensive approach to improve security, empowering organizations to mitigate risks, respond effectively to incidents, and continuously improve their security posture in a rapidly evolving threat landscape.

Figure 4A:
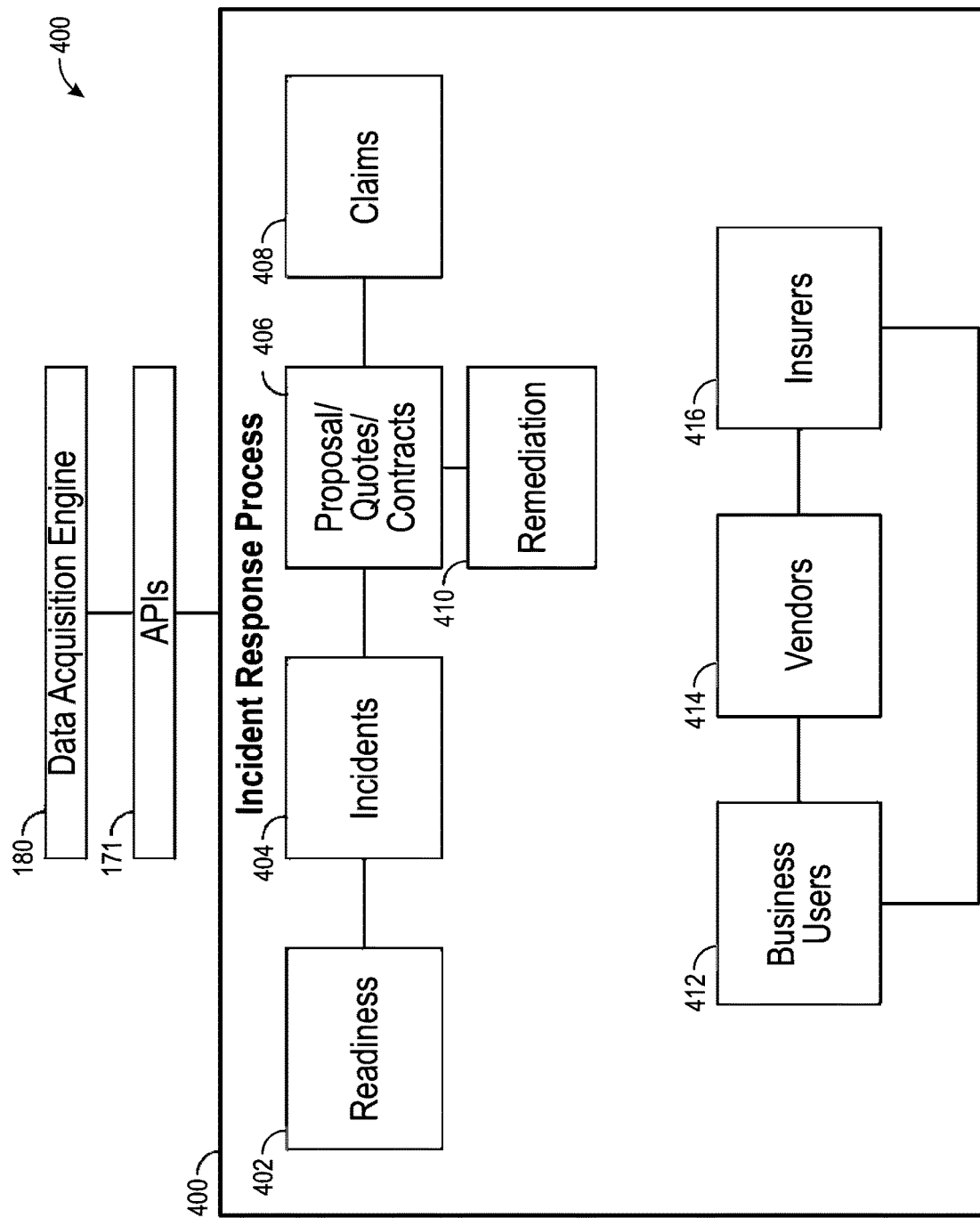
FIGS. 4A-B depicts a flowchart for a method for incident response preparedness and readiness, according to some arrangements.
Figure 4B:
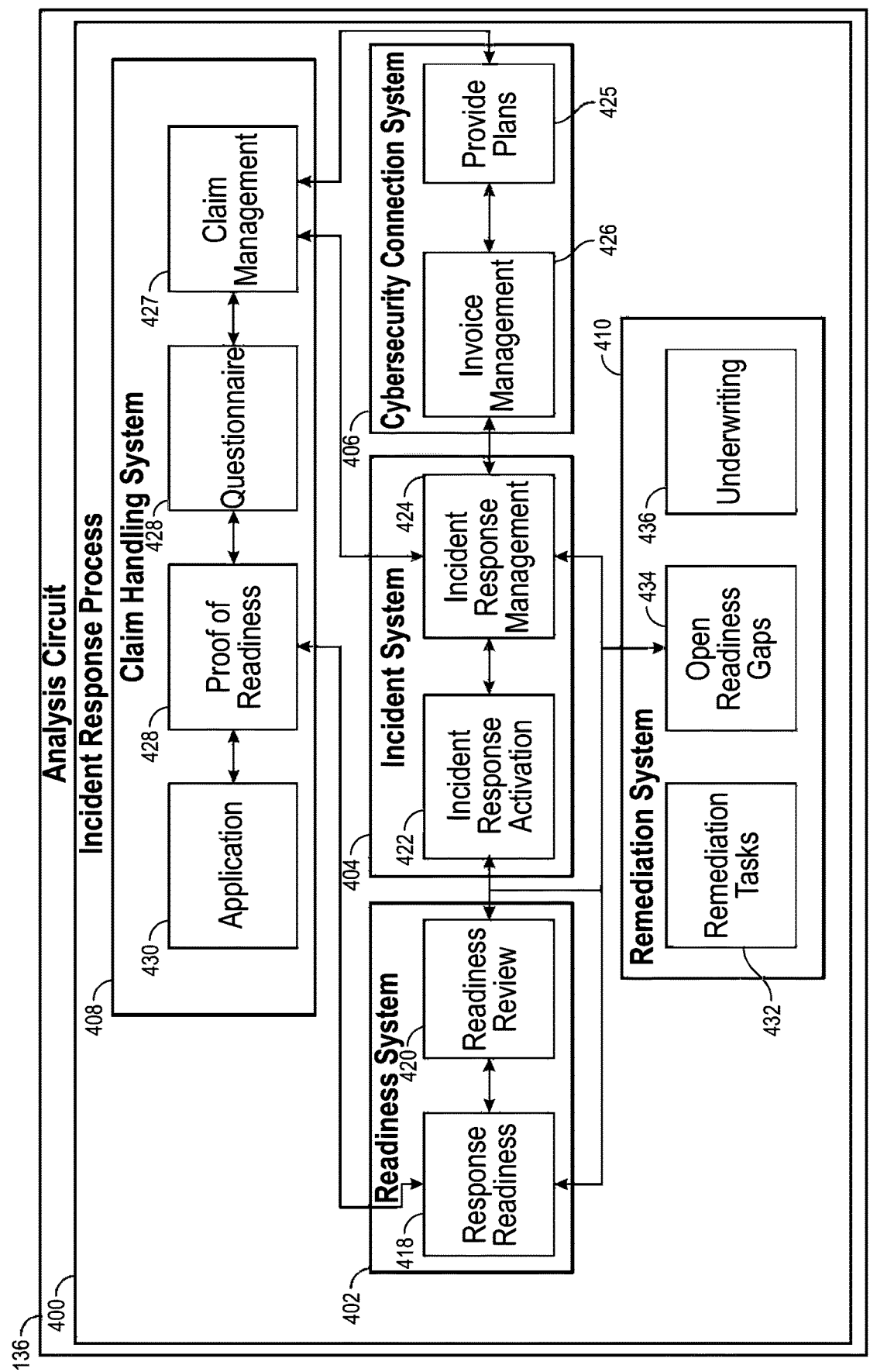

Referring now to FIGS. 4A-4B, a method 400 for incident response preparedness and readiness through the final incident closure and claim submission. Response system 130 (e.g., in particular analysis circuit 136) or third party device 150 can be configured to perform method 400. Further, any computing device or system described herein can be configured to perform method 400. Additionally, all the functions and features described in method 400 can be performed on an application (described in greater detail with reference to FIGS. 7-21). The data acquisition engine 180 can communicate using APIs with the response system 130.

In broad overview of the incident response process (i.e., method 400), the analysis circuit 136 can implement method 400. The analysis circuit can include various computing systems such as readiness system 402, incident system 404, cybersecurity connection system 406, claim handling system 408, and remediation system 410 can each be systems configured to implement steps within an incident response process. In particular, FIG. 4B shows exemplary activities or tasks performed in each of the steps shown in FIG. 4A. Throughout the steps and activities data and data structures can be utilized (e.g., aggregate, collected, or generated) including data of business users 412, vendors 414, and insurers 416. APIs 171 and API request and returns can be sent and received by the one or more processing circuits to perform method 400. Additionally, fewer, or different operations may be performed depending on the particular arrangement. In some arrangements, some or all operations of method 400 may be performed by one or more processors executing on one or more computing devices, systems, or servers. In various arrangements, each operation may be re-ordered, added, removed, or repeated.

Referring to method 400 in more detail, the analysis circuit 136 can execute a readiness step by readiness system 402, where a readiness analysis is executed. In some implementations, during the readiness step by readiness system 402, the analysis circuit 136 can perform response readiness 418 and readiness review 420. During the response readiness 418, the analysis circuit 136 evaluates the organization's level of preparedness to effectively respond to incidents. It assesses various factors such as the availability of incident response teams, the adequacy of incident response plans and procedures, the integration of incident response tools and technologies, and the establishment of communication channels and protocols. This evaluation helps identify any gaps or deficiencies in the organization's response capabilities, enabling appropriate measures to be taken to address them.

Simultaneously (or in a logical order), the readiness review 420 conducted by the analysis circuit 136 involves a thorough examination of the organization's overall readiness for incident response. It encompasses a comprehensive review of the organization's incident response framework, including its policies, procedures, documentation, and training programs. The analysis circuit 136 examines whether the organization's incident response framework aligns with industry best practices, regulatory requirements, and internal objectives. It also assesses the organization's ability to effectively coordinate and collaborate with external stakeholders, such as incident response providers, cyber insurers, breach counsel, and other relevant parties.

In some arrangements, the readiness system 402 is configured to access the entity data of an organization and utilize this information to determine the organization's security posture. The readiness system 402 can take into account various parameters such as the entity's cybersecurity policies, system configurations, incident response readiness, and others. It can then model the security posture along with a plurality of security objectives of the organization to generate a set of cybersecurity attributes.

The analysis circuit 136 can also execute an incident step by incident system 404, where an incident analysis is executed. In some implementations, during the incident step by incident system 404, the analysis circuit 136 can perform incident response activation 422 and incident response management 424. During the incident response activation 422, the analysis circuit 136 triggers the actions to initiate the incident response process. It activates the predefined incident response plans, procedures, and resources to ensure a swift and coordinated response. This includes notifying the incident response team, engaging relevant stakeholders and vendors, and initiating communication channels to exchange critical information.

In some arrangements, the incident system is configured to maintain the relationship between the entity and third-party cybersecurity providers. That is, it is configured to model a plurality of cybersecurity protection plans between the entity and a third-party. In particular, it provides a framework for integrating third-party cybersecurity solutions into the entity's systems, ensuring that these solutions align with the entity's security objectives and can effectively address its cybersecurity needs.

Simultaneously (or in a logical order), the analysis circuit 136 executes incident response management 424, which involves the ongoing coordination, monitoring, and control of the incident response activities. For example, it ensures that the incident response team follows the established procedures, communicates effectively, and collaborates seamlessly to address the incident. The analysis circuit 136 provides real-time insights and updates on the incident's status, facilitates information sharing between team members, and tracks the progress of incident containment, eradication, and recovery efforts. By effectively managing the incident response, the analysis circuit 136 helps minimize the impact of the incident and accelerates the return to normal operations. By performing the incident response activation 422, it initiates a rapid and coordinated response, while the incident response management 424 ensures effective coordination and control throughout the incident response process. This incident analysis and response approach facilitated by the analysis circuit 136 allows organizations to mitigate the impact of incidents, minimize downtime, and protect their critical assets and operations.

The analysis circuit 136 can also execute a proposal/quote/contract step by cybersecurity connection system 406, where a proposal/quote/contract generation is executed. In some implementations, during the proposal/quote/contract step by cybersecurity connection system 406, the analysis circuit 136 can perform invoice management 426. During the proposal/quote/contract step by cybersecurity connection system 406, the analysis circuit 136 leverages its capabilities to generate comprehensive and accurate proposals, quotes, and contracts. It takes into account the specific requirements, parameters, and preferences of the involved parties, ensuring that the proposed terms align with their respective needs. The analysis circuit 136 utilizes relevant data, such as pricing information, service level agreements (SLAs), and contractual obligations, to generate customized proposals and quotes. In some implementations, within the proposal/quote/contract step by cybersecurity connection system 406, the analysis circuit 136 incorporates invoice management 426 functionality. This feature enables the efficient handling and tracking of invoices related to the proposed services or products. The analysis circuit 136 ensures that accurate and timely invoices are generated, shared, and managed throughout the invoicing process. It may include features such as invoice creation, validation, tracking, and payment processing, streamlining the financial aspect of the proposal/quote/contract lifecycle.

In some arrangements, the cybersecurity connection system 406 can be configured to determine and provide (i.e., connect) a cybersecurity protection plan, utilizing one or more protection parameters. The plans can correspond to a new cybersecurity attribute that has been identified as necessary to protect the organization. The cybersecurity connection system 406 makes this protection plan available to the entity, which can then choose to activate it based on its specific needs and acceptance of the plan's terms.

The analysis circuit 136 can also execute a claims step by claim handling system 408, where claims are generated and tracked. In some implementations, during the claims step by claim handling system 408, the analysis circuit 136 can perform proof of readiness 429, provide an application 430 (e.g., application 112 and 152), generate and provide questionnaires 428, and perform claim management 427. In some implementations, proof of readiness 429 involves gathering and presenting evidence to substantiate the readiness of the organization in handling incidents and responding effectively. The analysis circuit 136 collects relevant data, such as incident response plans, documentation, training records, and compliance certifications, to demonstrate the organization's preparedness. Additionally, the analysis circuit 136 provides an application 430, such as application 112 and 152, to facilitate the claims process. This application serves as a centralized platform where users can access and submit their claims. It streamlines the entire claims workflow, enabling efficient communication, documentation, and tracking of the claims from initiation to resolution.

In some arrangements, the claim handling system 408 is configured to monitor the environmental data of the entity while modeling at least one of the plurality of cybersecurity protection plans. That is, the claim handling system 408 monitors for any anomalies or signs of potential cybersecurity incidents in the entity's environment. When it detects a new cybersecurity incident associated with the entity from the environmental data, it generates a report, enabling the entity or vendor to promptly respond to the incident and prevent further damage.

In some implementations, as part of the claims step by claim handling system 408, the analysis circuit 136 also generates and provides questionnaires 428. These questionnaires are designed to gather specific information related to the incident or the claim being submitted. They serve as a structured means to collect relevant details and documentation that are necessary for claim evaluation and processing. Moreover, the analysis circuit 136 encompasses claim management 427 functionalities during the claims step by claim handling system 408. This includes activities such as claim validation, documentation management, claim status tracking, and communication with involved parties. The analysis circuit 136 ensures that claims are effectively managed, providing transparency and visibility into the progress and status of each claim.

The analysis circuit 136 can also execute a remediation step by remediation system 410, where remediations are executed. In some implementations, during the remediation step by remediation system 410, the analysis circuit 136 can perform remediation tasks 432, open readiness issues and gaps 434, and execute underwriting 436 (e.g., of organizations to determine what type of vendor plans, products, or services they may qualify for). The execution of remediation tasks 432 includes implementing specific actions or measures to mitigate vulnerabilities, resolve security gaps, and address any identified weaknesses in the organization's security infrastructure. The analysis circuit 136 can provide guidance and instructions to stakeholders, outlining the necessary steps to remediate the identified issues effectively.

In some arrangements, the remediation system 410 is configured to execute one or more remediation actions to mitigate a vulnerability or security gap. It bases its actions on the security posture of the entity. If a vulnerability is detected or a security gap is identified, the remediation system 410 executes to address the issue, employing a range of remediation actions such as patching software, modifying system configurations, or enhancing security policies.

Additionally, the analysis circuit 136 facilitates the process of opening readiness issues and gaps 434. It identifies areas where the organization may have shortcomings or deficiencies in its preparedness for potential incidents or security threats. By highlighting these gaps, the analysis circuit 136 helps organizations prioritize and allocate resources to address the identified issues and enhance their overall readiness posture. Moreover, the analysis circuit 136 can execute underwriting 436, which involves evaluating organizations to determine the type of vendor plans, products, or services they may qualify for. Through a comprehensive assessment, the analysis circuit 136 analyzes various factors, such as the organization's security measures, incident response capabilities, risk management practices, and compliance with industry standards. Based on the evaluation, the analysis circuit 136 provides insights and recommendations on suitable vendor offerings that align with the organization's specific requirements and level of readiness.

In some arrangements, the readiness system 402 is configured to continuously update the security posture of the entity. It does this by monitoring dynamic changes in the entity data, which can involve alterations in system configurations, updates to security policies, new cyber threats, and shifts in the cyber risk landscape. This continuous updating of the security posture ensures that the organization's security status always reflects the most current conditions. It enables the analysis circuit 136 to react to emerging threats or vulnerabilities, providing real-time protection for the entity's data and systems.

In some arrangements, the readiness system 402 can also be configured to tokenize and broadcast the security posture to a distributed ledger. This process involves converting the security posture into a format suitable for recording on a blockchain (e.g., a type of distributed ledger). It then broadcasts this tokenized data across the network of computers that maintain the ledger. Additionally, the readiness system 402 provides a public address of the tokenized updated security posture on the distributed ledger. This public address can be accessed by a plurality of third-parties for verification. This transparent and immutable record-keeping enhances trust among stakeholders and provides a verifiable proof of the entity's security posture.

In some arrangements, the readiness system 402 is further configured to generate a security roadmap. This roadmap includes a plurality of phases associated with the modeling of the set of cybersecurity attributes. Each cybersecurity attribute of the set is assigned a phase associated with the security roadmap of the entity. For example, the roadmap serves as a strategic plan that outlines the steps the entity needs to (or should) take to enhance its security posture. It provides a clear pathway to achieving the entity's security objectives, ensuring that efforts are well-coordinated and resources are optimally utilized. By assigning each cybersecurity attribute to a phase of the roadmap, the readiness system 402 ensures that each aspect of the entity's security is appropriately addressed.

In some arrangements, the cybersecurity connection system 406 can create and set in motion a cybersecurity protection obligation, in provide plans 425, between the entity and the third-party upon receiving an activation of the cybersecurity protection plan. The cybersecurity protection obligation can be a binding agreement or contract that outlines the responsibilities and roles of the entity and the third-party in securing the entity's systems and data. This protection obligation is characterized by several protection attributes, which may involve various elements such as the scope of protection, the duration of the contract, the specific cybersecurity services to be provided, the response time in the event of a security incident, and the terms of service termination or renewal. Moreover, the cybersecurity connection system 406 can identify multiple cybersecurity protection plans (e.g., at provide plans 425) associated with various third-parties. These could include a wide array of cybersecurity service providers, each offering distinct protection plans. For instance, a first cybersecurity protection plan could be offered by a first third-party, while a second cybersecurity protection plan could be offered by a different third-party. Each of these protection plans can be associated with the new cybersecurity attribute identified during the modeling process, indicating that they are specifically designed to address this aspect of the entity's cybersecurity needs.

In some arrangements, each cybersecurity protection plan, in turn, is associated with one of several availability states. These states provide an immediate understanding of the plan's status regarding its accessibility for the entity. The "available now" state means that the plan is currently accessible for implementation. The "available pending" state signifies that the plan will become accessible in the future, perhaps subject to certain conditions or the passing of a certain period. Conversely, an "unavailable" state denotes that the plan is not currently accessible, possibly due to it being phased out, fully subscribed, or not being offered in the entity's region. Additional or fewer states can be added. This system of availability states allows the entity to quickly determine which plans are viable options for enhancing their cybersecurity posture.

In some arrangements, the incident system 404 can establish a data (e.g., continuous, in real-time, periodically) monitoring channel between the entity and the third-party. This communication stream allows for real-time (or near real-time) detection and response to any potential cybersecurity incidents. To achieve this, a first communication connection is established using a first application programming interface (API) between the entity's computing system (e.g., 110) or one or more entity assets (e.g., 110) and the incident system 404. This connection allows the incident system 404 to continuously monitor the entity's systems and data for any signs of a cybersecurity incident. Simultaneously, a second communication connection is established using a second API between a third-party computing system (e.g., 150) and the incident system 404. This connection enables the third-party, often a cybersecurity service provider, to also monitor the entity's systems and data, providing an additional layer of protection and vigilance.

Moreover, the claim handling system 408 can be configured to quickly respond to any detected cybersecurity incidents. Upon detection of a new cybersecurity incident, the claim handling system 408 generates alerts and provides a real-time dashboard for the entity and vendor. This dashboard provides an overview of the entity's cybersecurity posture, details of the detected incident, recommended response actions, and updates on the response process. This real-time information allows the entity to rapidly understand and react to the cybersecurity incident, minimizing potential damage and downtime.

In some arrangements, the remediation system 410 can use predictive analytics to identify potential security gaps before they can be exploited. It analyses patterns in the entity's data and behaviors, as well as trends and threats in the broader cybersecurity landscape, to predict where vulnerabilities might arise. Upon identifying a potential security gap, the remediation system 410 proactively executes one or more remediation actions. These actions could involve updating security policies, patching software vulnerabilities, reconfiguring system settings, providing cybersecurity training to employees, or implementing additional cybersecurity measures.

Figure 5:
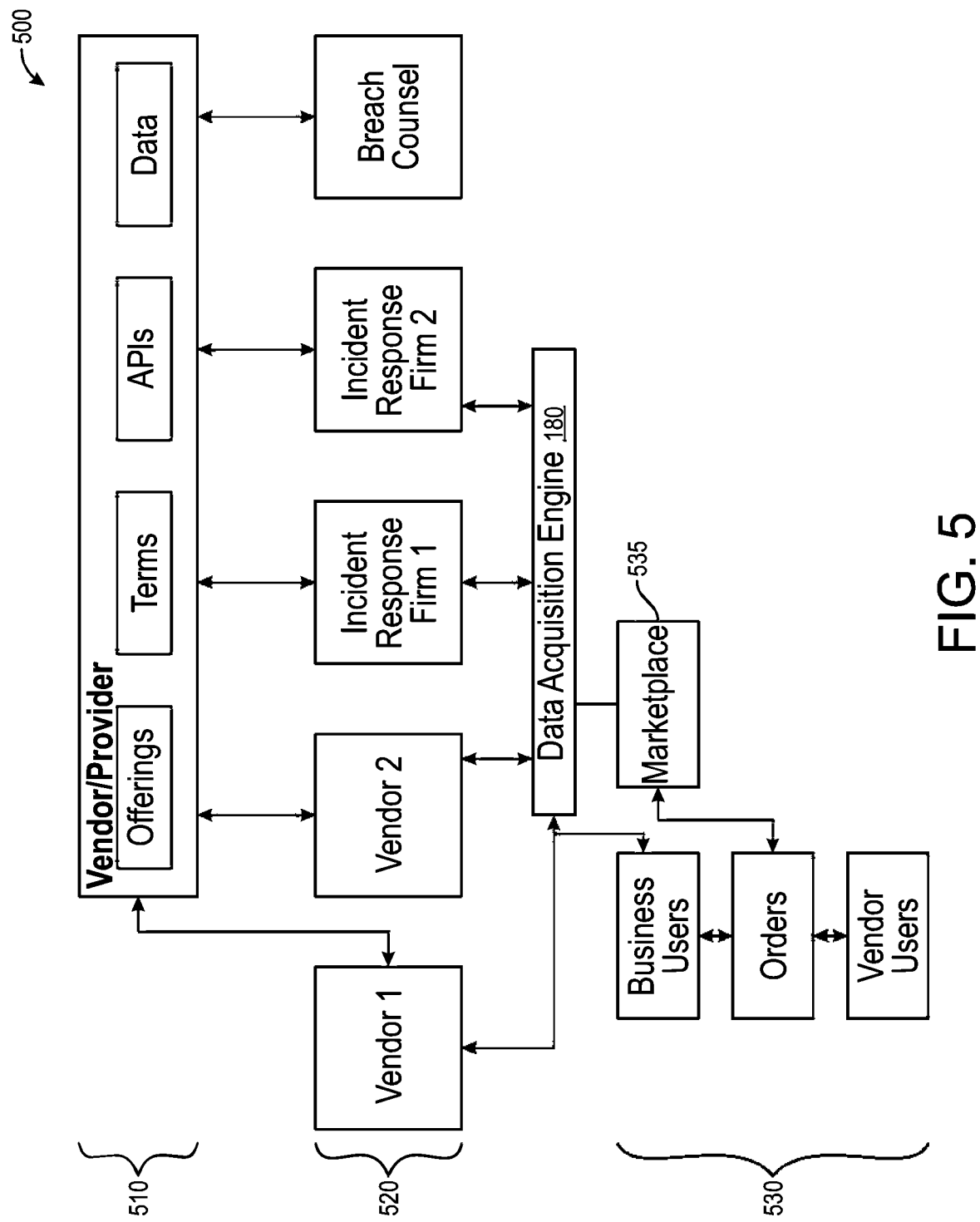
FIG. 5 depicts an example vendor-provider marketplace, according to some arrangements.

Referring now to FIG. 5, a vendor-provider marketplace 500, according to some arrangements. The vendor-provider marketplace 500 depicts generally the interactions between vendors 510 and users 530 (e.g., directly or through partners 420) as well as vendors 510 to partners 520. For example, each vendor 520 can include, but is not limited to, offerings, terms, APIs, and data that can be provided and/or exchanged with to the response system 130 via the data acquisition engine 180 and other vendors, incident response firms, and breach counsel (e.g., law firm) (collectively referred to as "partners 520"). In some implementations, those partners 520 can communicate with the data acquisition engine 180 of FIG. 1A to generate dashboards of an application (e.g., 112, 152) and store data in database 140 for future use.

Expanding on the vendor-provider marketplace 500 depicted in FIG. 5, this marketplace serves as a central hub for interactions between vendors 510, users 530, and partners 520, facilitating the exchange of offerings, terms, APIs, and data. Each vendor 510 within the marketplace encompasses a range of products, services, and resources that can be made available to users 530 directly or through the engagement of partners 520. These partners 520, which include incident response firms, breach counsel (such as law firms), and other relevant entities, play a crucial role in providing expertise and additional support to enhance incident response capabilities (i.e., a type of cybersecurity attribute). Through seamless communication with the data acquisition engine 180, the partners 520 can actively engage in generating comprehensive dashboards within the application interfaces (e.g., 112, 152). These dashboards offer real-time insights and analytics, enabling users 530 to visualize and assess their incident response readiness, track ongoing incidents, and access relevant data stored in the database 140 for future reference. The data acquisition engine 180 serves as a communication bridge, allowing partners 520 to contribute information and leverage the functionalities of the response system 130. It should be understood that the vendors 510, partners 520, and users 530 depicted in the vendor-provider marketplace 500 can all be executed by computer systems, exemplified by the computing system 200 shown in FIG. 2. These computer systems enable seamless collaboration, data exchange, and transactional activities within the marketplace, ensuring a dynamic and efficient ecosystem for incident response management.

In certain implementations, the vendor-user interaction within the marketplace 535 extends beyond mere browsing and exploration. Vendors 510 and users 530 have the capability to place orders directly through the marketplace 535, initiating a streamlined process facilitated by the data acquisition engine. This integration of ordering functionality enhances the efficiency and convenience of the marketplace, enabling seamless transactions between vendors and users. Notably, the marketplace 535 serves as a platform for programmatic connectivity, enabling new partners to establish collaborative relationships efficiently. The marketplace incorporates contracting workflows and partnering processes, which are seamlessly facilitated through the application interface. Once a partnership is ratified, the partners can immediately engage in business activities within the platform, leveraging the full range of services and offerings available. This includes the ability to submit proposals, engage in reselling, establish technical connectivity for provisioning and licensing, establish API connections for data sharing, utilization, and presentation on the platform, and leverage pre-defined programmable logic for user, vendor, and partner interactions.

In some implementations, the marketplace 535 introduces dynamic and automated workflows that enable efficient routing of inbound orders to the appropriate partner based on predefined criteria. This programmable logic ensures that orders are seamlessly directed to the designated partner for processing and fulfillment. Furthermore, programmatic activation of contracts and seamless order fulfillment processes are executed, ensuring a smooth and rapid delivery of the purchased offering, whether it is a product or service. The marketplace ecosystem facilitates the seamless integration of vendors, partners, and users, streamlining the entire order management process and enabling timely and efficient delivery of products and services.

Distinguishing itself from other vendor marketplaces, this embedded marketplace 535 is seamlessly integrated within the applications and APIs (171) spanning the entire system architecture. This unique integration enables vendor offerings to be presented to users precisely when they need them, seamlessly integrating within the user flow during various stages of cybersecurity incident response planning, testing, and execution. Moreover, the marketplace becomes an integral part of the design and composition processes for constructing a robust cybersecurity stack, as well as during security program orchestration and adaptation to ensure the ongoing effectiveness of the cybersecurity program. By embedding the marketplace within the applications and APIs, users 530 have immediate access to a comprehensive array of vendor offerings precisely at the point of need. Whether users are developing their incident response plans, conducting tests, executing response strategies, or adapting their security programs, the marketplace seamlessly integrates within their workflow, providing timely and relevant vendor options to enhance their cybersecurity capabilities (i.e., cybersecurity attributes). This unique approach eliminates the need for users to navigate separate platforms or search for vendors independently, streamlining the entire process and promoting efficiency in decision-making and procurement.

Additionally, this embedded marketplace fosters a holistic approach to cybersecurity management, facilitating collaboration between users 530 and vendors 510 throughout the entire ecosystem. By offering vendor options during incident response planning, testing, and execution, users can make informed decisions and select the most suitable solutions to mitigate risks effectively. Similarly, during the design and composition of their cybersecurity stack, users 530 can access a diverse range of vendor offerings directly within the application interface, enabling them to build a comprehensive and tailored security infrastructure. Additionally, during security program orchestration and adaptation, the marketplace 535 provides users with valuable insights and options to enhance the effectiveness and resilience of their security programs, ensuring continuous protection against evolving threats.

It should be understood that the embedded marketplace's architecture allows for flexibility and scalability, accommodating additional systems, devices, data structures, and data sources as required. The marketplace can adapt to the evolving needs of users and vendors, expanding its offerings and functionalities to meet the dynamic nature of the cybersecurity landscape. This adaptability ensures that the marketplace remains a valuable resource for users, providing access to the latest innovations and vendor solutions while facilitating seamless collaboration and partnership within the cybersecurity ecosystem.

Figure 6:
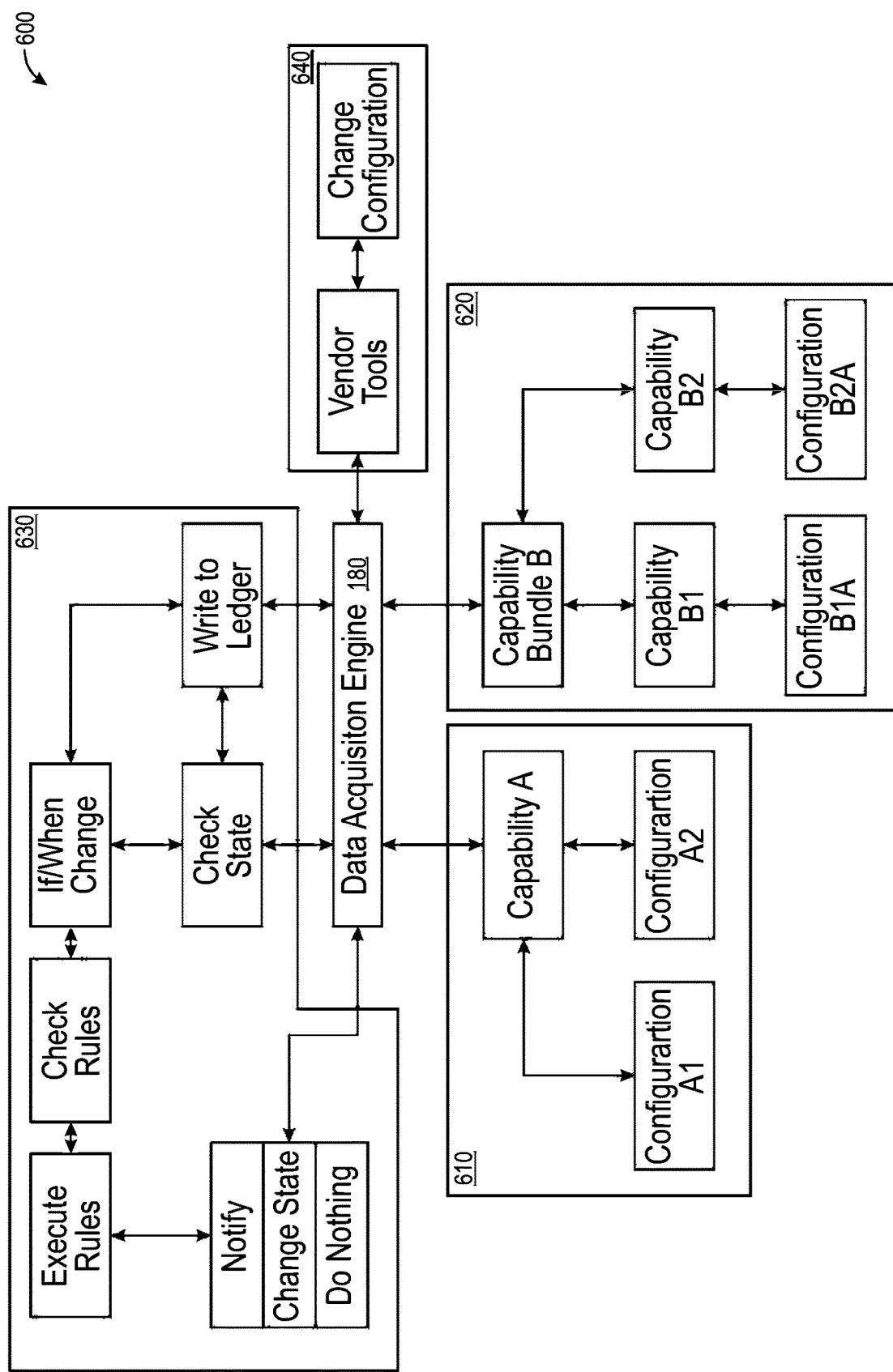
FIG. 6 depicts a flowchart for a method for capturing the state of capabilities, according to some arrangements.

Referring now to FIG. 6, a method 600 for capturing the state of capabilities (sometimes referred to herein as "cybersecurity attributes") (e.g., vendor technologies or configurations) in place and in use by users, retrieving state, and sharing of state at points in time as well as over a time period. Response system 130 (e.g., in particular analysis circuit 136 or data acquisition engine 180) or third party device 150 can be configured to perform method 600. Further, any computing device or system described herein can be configured to perform method 600. Additionally, all the functions and features described in method 600 can be performed on an application (described in greater detail with reference to FIGS. 7-21).

In broad overview of method 600, capabilities 610 and 620 associated with a corporation of business can be received (e.g., capability A with configuration A1 and configuration A2, and capability bundle B with capability B1 and B2, where capability B1 has a configuration B1A and capability B2 has a configuration B2A). The capabilities 610 and 620 can be checked (e.g., check state) and the capabilities can be written to a ledger (e.g., database and/or blockchain 170) in steps 630. Once the capabilities 610 and 620 are received, a thorough check is conducted to verify their state and ensure their accuracy and validity. This check entails examining the current status and parameters of each capability, evaluating factors such as readiness, compatibility, and compliance with established standards or requirements. By performing this comprehensive assessment, any discrepancies or issues pertaining to the capabilities can be identified and addressed.

In some implementations, following the verification process, the next step involves recording the capabilities into a ledger. This ledger serves as a secure and reliable storage medium, which can take the form of a database or a blockchain 170. The capabilities, along with their associated configurations, are meticulously documented and stored within the ledger, ensuring the integrity and traceability of the information. This enables easy access to the capabilities' details, their respective configurations, and any historical changes or updates that may occur over time. By writing the capabilities to the ledger, organizations gain a centralized and auditable repository that securely maintains a record of their capabilities. Additionally, the ledger ensures transparency and accountability by providing an immutable and tamper-proof audit trail of the capabilities and their configurations.

In turn in steps 630, a process can occur if a state has changed including, but not limited to, checking rules, execute rules, and notifying, changing state, and/or do nothing. If a change occurred (i.e., trigger condition, e.g., capability A changed, the data acquisition engine 180 may determine to change it back (or role it back), capability B changed and in turn then vendor technology is configured to change Y associated with the business or corporation) then the one more processing circuits can programmatically connect to vendor technology to change a configuration (e.g., utilizing API calls). In some implementations, at steps 640, the data acquisition engine 180 can communicate with vendor tools to change particular configurations.

Upon detecting a change in state, the data acquisition engine 180 evaluates the trigger condition, such as the alteration of capability A or capability B. Based on this evaluation, a decision is made regarding the appropriate course of action. For example, if capability A experiences a change, the data acquisition engine 180 may determine that a rollback is necessary to revert the capability back to its previous state. Similarly, if capability B undergoes a change, the vendor technology associated with the business or corporation can be configured to adjust Y accordingly, aligning it with the modified capability. To effectuate these changes, the processing circuits within the data acquisition engine 180 (or within response system 130) establish programmatic connections with the vendor technology responsible for managing the configurations (e.g., at step 640). Moving forward to step 640, the data acquisition engine 180 actively engages in communication with the vendor tools to implement the desired changes. Through this interaction, the data acquisition engine 180 can efficiently orchestrate the configuration changes required to align the capabilities with the desired state.

With reference to FIG. 6, the one or more processing circuits can utilize the various data structures (e.g., assets, locations, capabilities, threats) to collect, attribute, and adapt to determine if a trigger condition occurred (e.g., historical data of the corporation or business can be used to determine if a trigger condition occurred) In turn, the one or more processing circuits can execute one or more functions such as make an API request (e.g., to vendor, insurer, or business), store information in a database, and/or update a blockchain ledger (e.g., at step 630). Additionally, fewer, or different operations may be performed depending on the particular arrangement. In some arrangements, some or all operations of method 600 may be performed by one or more processors executing on one or more computing devices, systems, or servers.

In some implementations, in order to identify the occurrence of a trigger condition, historical data of the corporation or business is often utilized. This historical data provides valuable insights into the past behavior and patterns of the organization, allowing the processing circuits to make informed decisions regarding trigger condition identification. Upon determining that a trigger condition has indeed occurred, the one or more processing circuits initiate a series of functions and operations to address the situation. These functions may include making API requests to relevant entities such as vendors, insurers, or other businesses. Through these API requests, the processing circuits can retrieve crucial information or initiate specific actions necessary to respond to the trigger condition effectively. Additionally, in certain implementations, the processing circuits can update a blockchain ledger, providing a secure and immutable record of the trigger condition and any associated changes made as a result.

In various arrangements, each operation may be re-ordered, added, removed, or repeated. This system will be used to deliver state of a business security configuration to enable insurance underwriting, whereby the facts of the state of the business user computing environment are known, and provable. This provides the underwriting insurer the ability to collect irrefutable proof-of-state of the business environment as part of their pre-underwriting and risk selection process and can be then used to enable programmatic binding as part of their application process. The system can be further utilized to enable programmatically and dynamically adaptable insurance products that change the coverage level based on the factual changes in state of the computing environment at the insured through the policy period. This allows the insurer to ensure that the insured has followed the underwriting criteria throughout the term of the policy. Cyber insurance renewals can be programmatically generated and automatically bound based on the binary data provided by the system during renewal as the insurer knows what the compliance history has been for the insured as well as the facts of the current state of the vendor capabilities and configurations in the insureds computing environment.

In various arrangements, the underwriting process begins by collecting data from the insured's security tools and configurations. This data can then be analyzed and matched against the specific underwriting requirements defined by the insurer. The collected data acts as irrefutable proof of the insured's security posture, providing the insurer with a holistic understanding of the risk associated with the insured's business environment. In some arrangements, once the data has been collected and matched to underwriting requirements, the processing circuits can wrap this information with the necessary context and metadata through a broker. The broker acts as an intermediary, consolidating and structuring the data in a standardized format that can be seamlessly transmitted to the insurer's quoting API. This integration improves the underwriting application process, enabling the insurer to access the factual data of the insured's security configuration and computing environment. With this data in hand, the insurer can programmatically assess the risk and make informed decisions regarding coverage and policy terms. This automated and dynamic approach empowers insurers to offer adaptable insurance products that can be adjusted based on the factual changes in the insured's computing environment throughout the policy period, ensuring ongoing compliance with underwriting criteria and tailored coverage for the insured. Additionally, the system facilitates the automatic generation and binding of cyber insurance renewals based on the binary data provided during the renewal process. By utilizing the compliance history and the up-to-date facts of the insured's computing environment, the insurer can renew the policy while maintaining a comprehensive understanding of the insured's risk profile and ensuring continuous coverage.

Generally, FIGS. 7A-7O, 8A-8E, 9A-9H, 12, 14A-14B, 17, 18A-18C, 19, and 20A-20B depict the organization or entity dashboards and the interactive items and actionable items the organization can interact with (e.g., using client device 110). Referring now to FIGS. 7A-7O, which generally relate to an onboarding process for a response system 130 (referred to herein as "Responder") that facilitates incident response. Specifically, FIGS. 7A-7O provides a quick start guide for organizations to onboard into Responder. As shown in FIGS. 7A-7O, the quick start guide includes a series of steps that guide organizations through the process of getting ready to use Responder for incident response. Upon interaction with a client device 110 (e.g., of a customer), Responder's response system 130 initiates an onboarding process. The onboarding process begins with a guided wizard that assists the organization in setting up key components of the system, such as inviting team members and identifying critical assets. The guide also provides general guidance on the different features of Responder.

As the organization progresses through the steps in the quick start guide, Responder provides helpful tutorial videos to guide the user through each of the different features. Additionally, as the organization fills out the initial steps in the guide, Responder becomes more tailored to the organization's specific needs. Specifically, Responder will provide details on how the organization's specific vendors will help during an incident, rather than just general information on incident response vendors. The first step in the onboarding process is inviting the organization's internal team and copying and sending them an invite link. From there, the guide assists the organization in identifying key assets and understanding how Responder and its vendors will assist during an incident. By providing a comprehensive onboarding process, Responder streamlines incident response and facilitates effective communication and collaboration among all stakeholders.

Referring now to FIG. 7A, the interface 700 presents (e.g., on client device 110) a step in the onboarding process for Responder, which can include inviting the organization's internal team and its members to join the platform. The response system 130 streamlines this process by allowing the user to copy and send an invite link to team members via email. Alternatively, users can type in the emails manually and send the invitations that way. In some implementations, once the invitations are sent, the user can proceed to the next step of the onboarding process. This step can include involves identifying critical assets, such as systems and applications, that should be protected and monitored during any incident (e.g., cyber incident). Responder's onboarding guide provides detailed guidance on how to identify these assets and incorporate them into the platform provided by response system 130 for effective incident response. In addition to facilitating the invitation and asset identification process, Responder's onboarding guide can provide an overview of the platform's various features and functionalities. This includes tutorials on how to use Responder's response system 130, how to communicate with internal and external stakeholders, and how to utilize Responder's vendor network for additional support during incidents.

Figure 7D:
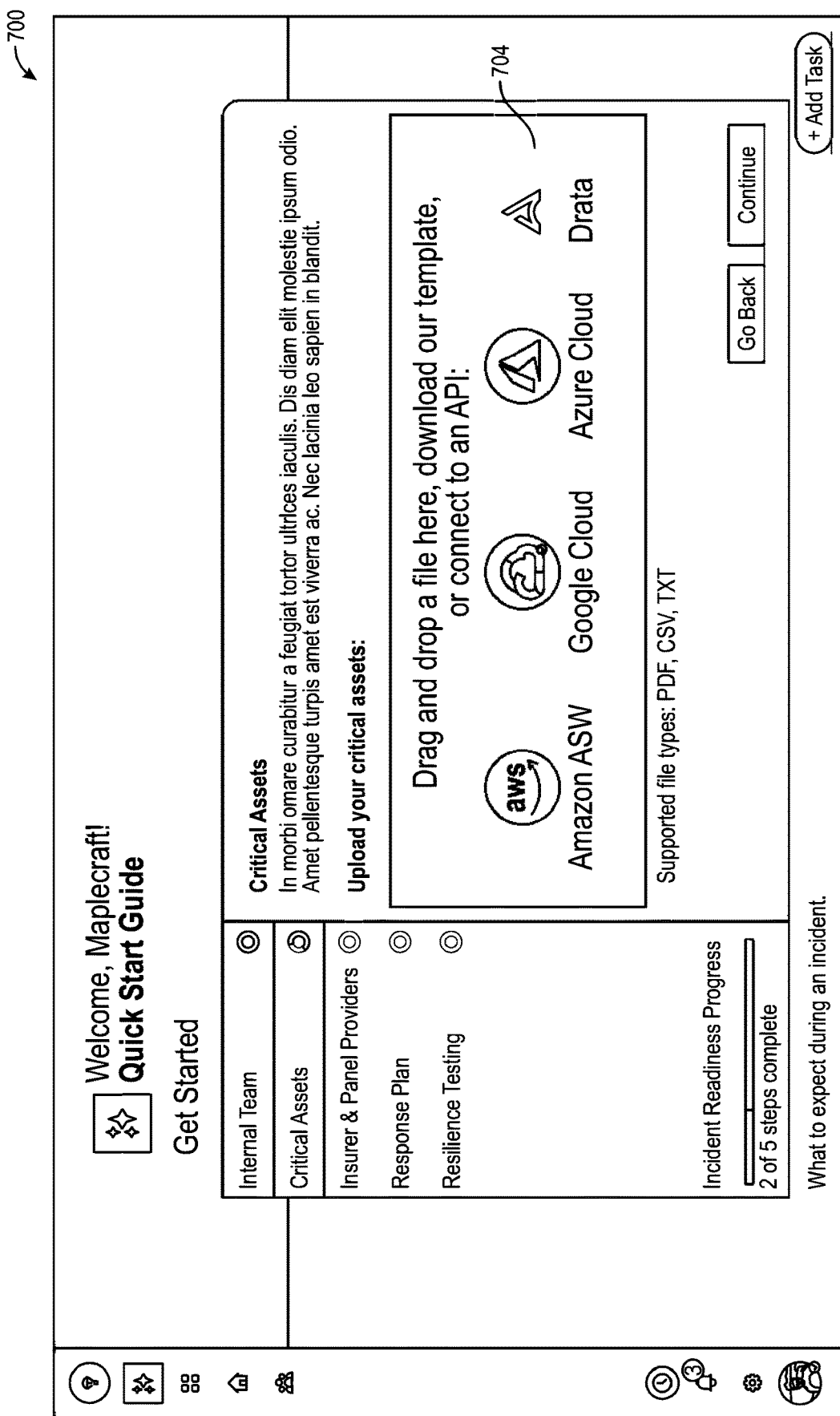
FIGS. 7A-7O depict example graphical user interfaces, according to some arrangements.

Referring now to FIGS. 7B, 7C, and 7D, Responder's onboarding process continues with the identification of critical assets that should be protected and monitored during an incident. Interface 700 presents an interactive view that allows the user to drag and drop critical assets into actionable items 702 and 704. These actionable items allow the user to upload critical assets from any file rile or connect to a cloud providers such as Amazon, AWS, Google Cloud, or Azure to pull in assets that have already been managed elsewhere. This intuitive interface 700 improves asset identification for users, ensuring that Responder's response system 130 can effectively monitor and protect them during an incident. Thus, responder's onboarding guide provides detailed guidance on how to identify and manage critical assets, ensuring that users have a clear understanding of the platform's capabilities and functionalities. In addition to uploading critical assets, Responder's onboarding guide provides guidance on how to configure alerts and notifications for these assets. This ensures that the appropriate stakeholders are notified by the response system 130 in real-time (or near real-time) if an incident occurs, allowing for rapid response and effective incident management.

Some arrangements relate to modeling data, the Responder can be configured to accept data from a user device via an application programming interface (API), tokenize and extract content of the data into a plurality of tokens, generate a unique identifier for each of the plurality of tokens, store a mapping between the unique identifier and each of the plurality of tokens, populate, from each of the plurality of tokens, a plurality of fields of a data object based on the extracted content of the data stored in each of the plurality of tokens, and verify accuracy of the populated plurality of fields.

In general, the response system 130 can be configured to automate the process of filling out questionnaires and applications by allowing users to upload files containing relevant information. In some arrangements, the following method can be implemented to tokenize and index data using the response system 130. The method can include (1) accepting files, where the response system 130 can allow a user to drag and drop files (e.g., docx, csv, xls, ppt, pdf, etc.) into the application or upload files via an API. The method can further include (2) indexing all the content and chuck the data, (3) creating a unique index, and (4) bashing up against a model. Additionally, the method can further include, from the files, (5) allowing the user to answer the questions for underwriting purposes. The method can further include (e.g., within the questioner) (6) determining or receiving data locations, (7) identifying if the evidence that is mapped, (8) determining if the location of the storage matters, (9) identifying the readiness application side.

In some arrangements, indexing and chunking data can include indexing all content and breaking it down into smaller, more manageable chunks. This process allows the response system 130 to efficiently parse and analyze the data, ultimately extracting the relevant information necessary for completing the questionnaire or application. In some arrangements, a unique index can be created for each chunk of data, which serves as a reference point for the system. In some arrangements, the chunked and indexed data can be compared against a pre-existing model, which could be a knowledge base or a machine learning model.

Expand on tokenizing and indexing, tokenizing the data can provide several improvements, such as facilitating easier data analysis by breaking data into smaller units simplifies the process of searching, sorting, and comparing information within the uploaded files. Additionally, tokenizing can enhance data processing efficiency by using smaller data units it allow the system to handle and process data faster and more efficiently. Furthermore, tokenizing can improve data extraction accuracy by identifying and extracting relevant information to recognize patterns, relationships, or similarities among the tokens. With regards to indexing, the process can include (1) assigning a unique identifier to each token (e.g., where each token is assigned a unique identifier, enabling the system to differentiate between tokens and ensuring accurate data retrieval), (2) creating an index data structure (e.g., the system constructs an index data structure that stores the mapping between the unique identifiers and their respective token positions within the files), and (3) updating the index as necessary (e.g., as new data is added, modified, or removed from the uploaded files, the index is updated accordingly to maintain its accuracy and usefulness).

For example, the automation can be performed on a questioner that allows the user to answer questions for underwriting purposes. Some questions can include: Does the Applicant conduct security vulnerability assessments to identify and remediate critical security vulnerabilities on the internal network and Applicant's public website(s) on the Internet; Does the Applicant install and update an anti-malware (also known as endpoint protection, DR) solution on all systems commonly affected by malicious software? If yes, explain how you know. If no, explain why not; Does the Applicant use any software or hardware that has been officially retired (i.e., considered "end-of-life") by the manufacturer (e.g., Windows XP); Does the Applicant update (e.g., patch, upgrade) commercial software for known security vulnerabilities per the manufacturer's advice; Does the Applicant update open source software (e.g., Java, Linux, PHP, Python, OpenSSL) that is not commercially supported for known security vulnerabilities; Does the Applicant have processes established that ensure the proper addition, deletion, and modification of user accounts and associated access rights.

In some arrangements, the response system 130 can process the uploaded files and tokenizes the text and data contained within, converting them into identifiable units of information. In some arrangements, the response system 130 can index the tokenized information, enabling efficient searching, retrieval, and extraction of relevant data. In some arrangements, the response system 130 can map the indexed information to corresponding fields in the questionnaires or applications, based on pre-defined rules and logic. In some arrangements, the response system 130 can automatically prefill out the questionnaires or applications with the extracted and mapped information, thereby reducing the user's time and effort. In some arrangements, the user can review the prefilled information and make any necessary adjustments before submitting the completed questionnaire or application.

The response system 130 can include a user interface, a file processing module (or circuit or system), a tokenization and indexing engine (or circuit or system), a mapping module or system, and a form prefilling module or system. The user interface can allow users to drag and drop or upload files, while the response system 130 can process the uploaded files and sends them to the tokenization and indexing engine. The response system 130 can tokenize and index the information, which can then be mapped to the appropriate fields in the questionnaires or applications by the response system 130. In some arrangements, the response system 130 can fill out the forms with the extracted information, allowing users to review and submit the completed forms. Advantages of the present disclosure include time and effort savings for users, a reduction in errors due to manual data entry, and an increased likelihood of consistent and accurate information across multiple forms. In some respects, the discloser has been described with respect to a limited number of embodiments, it will be appreciated that many variations, modifications, and other applications of the disclosure may be made within the scope of the appended claims.

Accordingly, the response system 130 offers a user-friendly and efficient feature that allows users to drag and drop files, such as docx, csv, xls, ppt, pdf, and other formats, into the application or upload them via an API. This feature improves the process of providing information for insurance questionnaires or applications, and cybersecurity questionnaires. The system automates the extraction and utilization of the relevant information within the files, reducing manual effort, time consumption, and the potential for errors. In some arrangements, the response system 130 incorporates a seamless and intuitive user interface that allows users to drag and drop files of various formats into the system. This interface also provides users with the option to upload files using an API, making it easy to integrate the system into their existing workflow. The system is designed to accommodate a wide range of file formats, ensuring that users can provide information from multiple sources and formats without the need for time-consuming conversions.

In some arrangements, once the files are uploaded or provided, the response system 130 processes them by tokenizing and indexing their content. The tokenization process breaks down the content into smaller units, making it easier to analyze and extract relevant information. The indexing process assigns unique identifiers to each token and maps them to their positions within the files, allowing for efficient data retrieval during the subsequent steps. After tokenization and indexing, the system compares the processed data against a pre-existing model, such as a knowledge base or a machine learning model, to identify pertinent information. This comparison enables the system to extract valuable insights and verify the accuracy of the information. With the relevant data extracted, the system proceeds to pre-fill the fields in the insurance questionnaires or applications, and cybersecurity questionnaires.

Figure 7E:
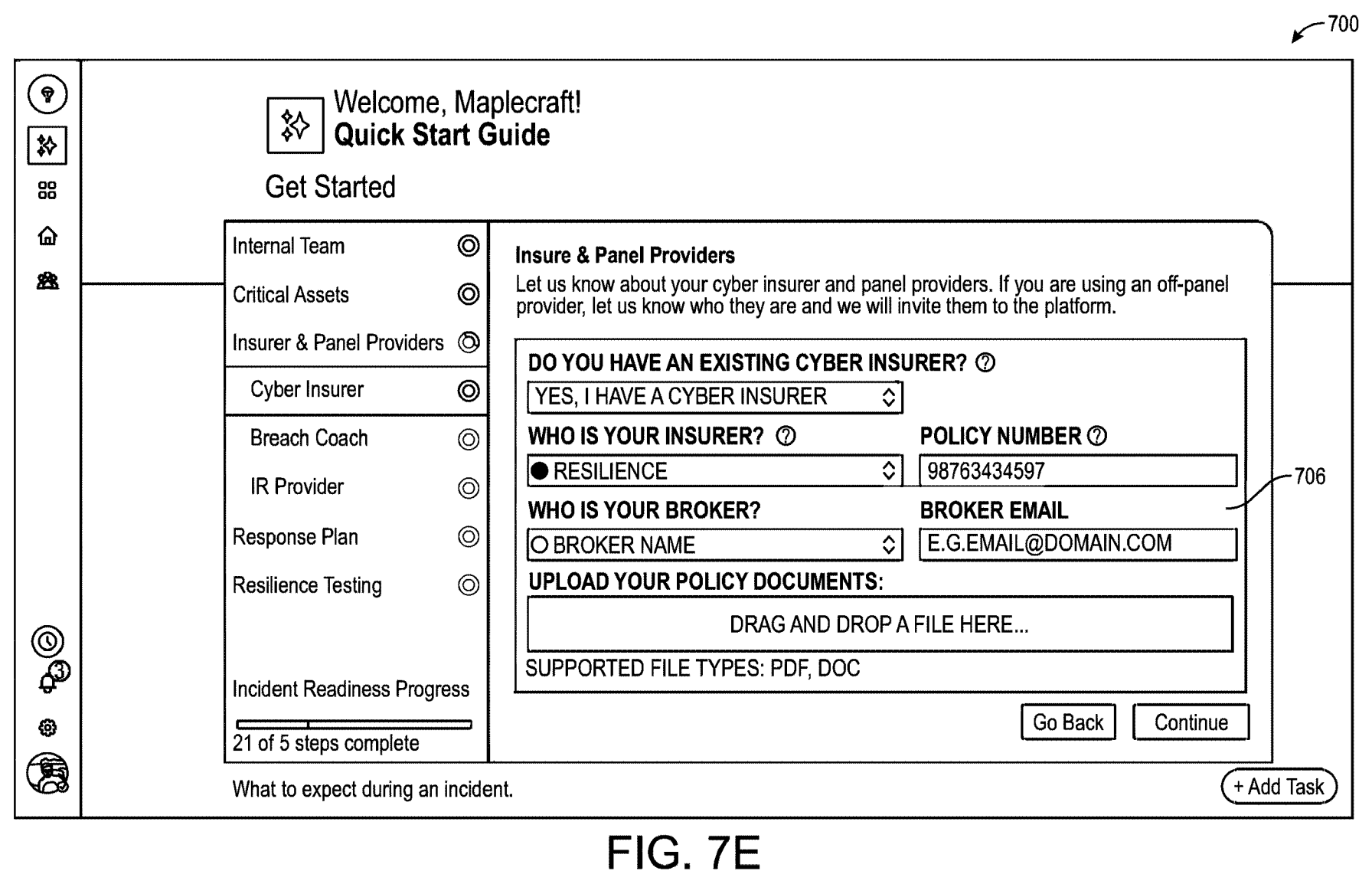
Figure 7F:
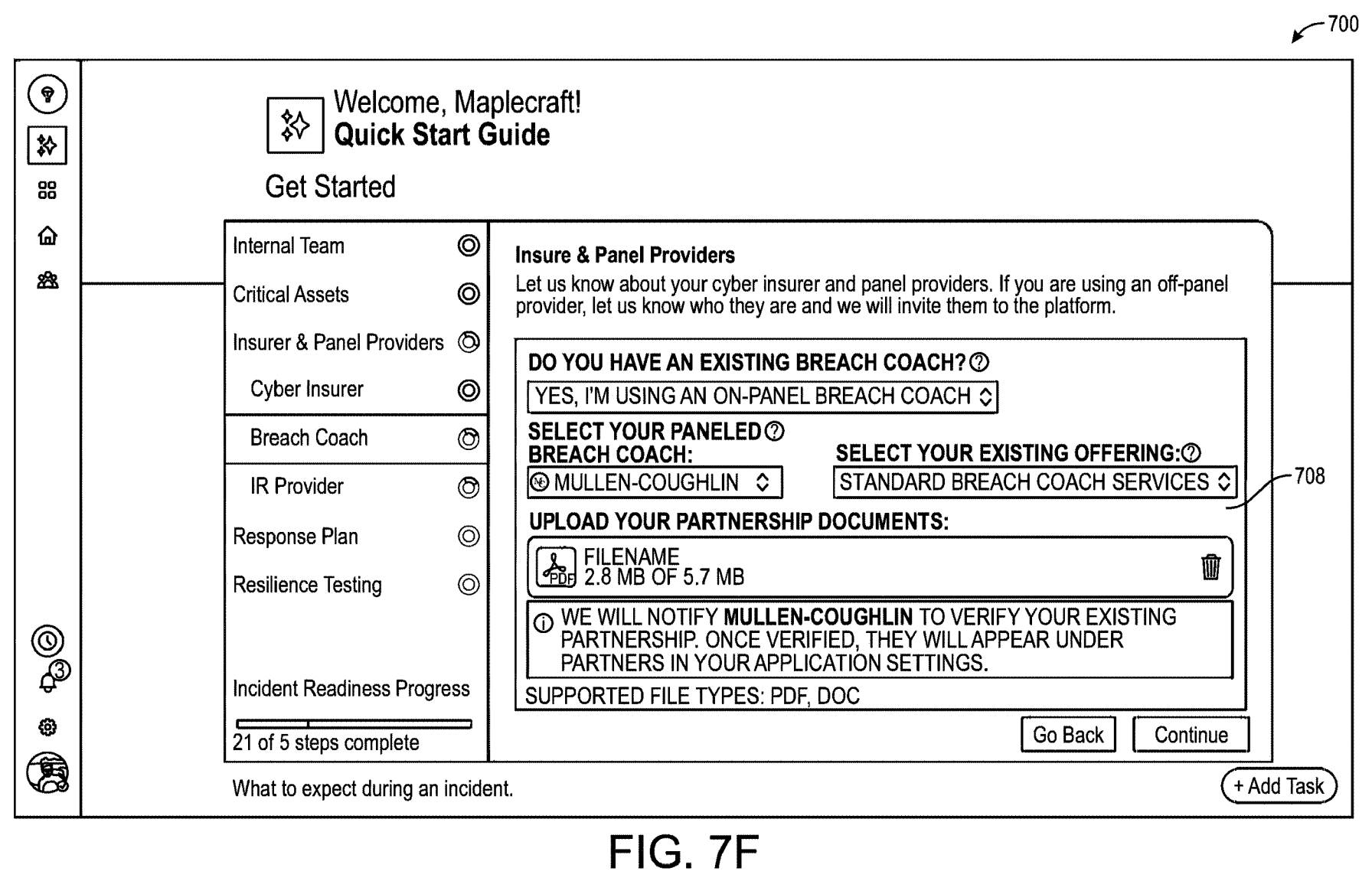
Figure 7G:
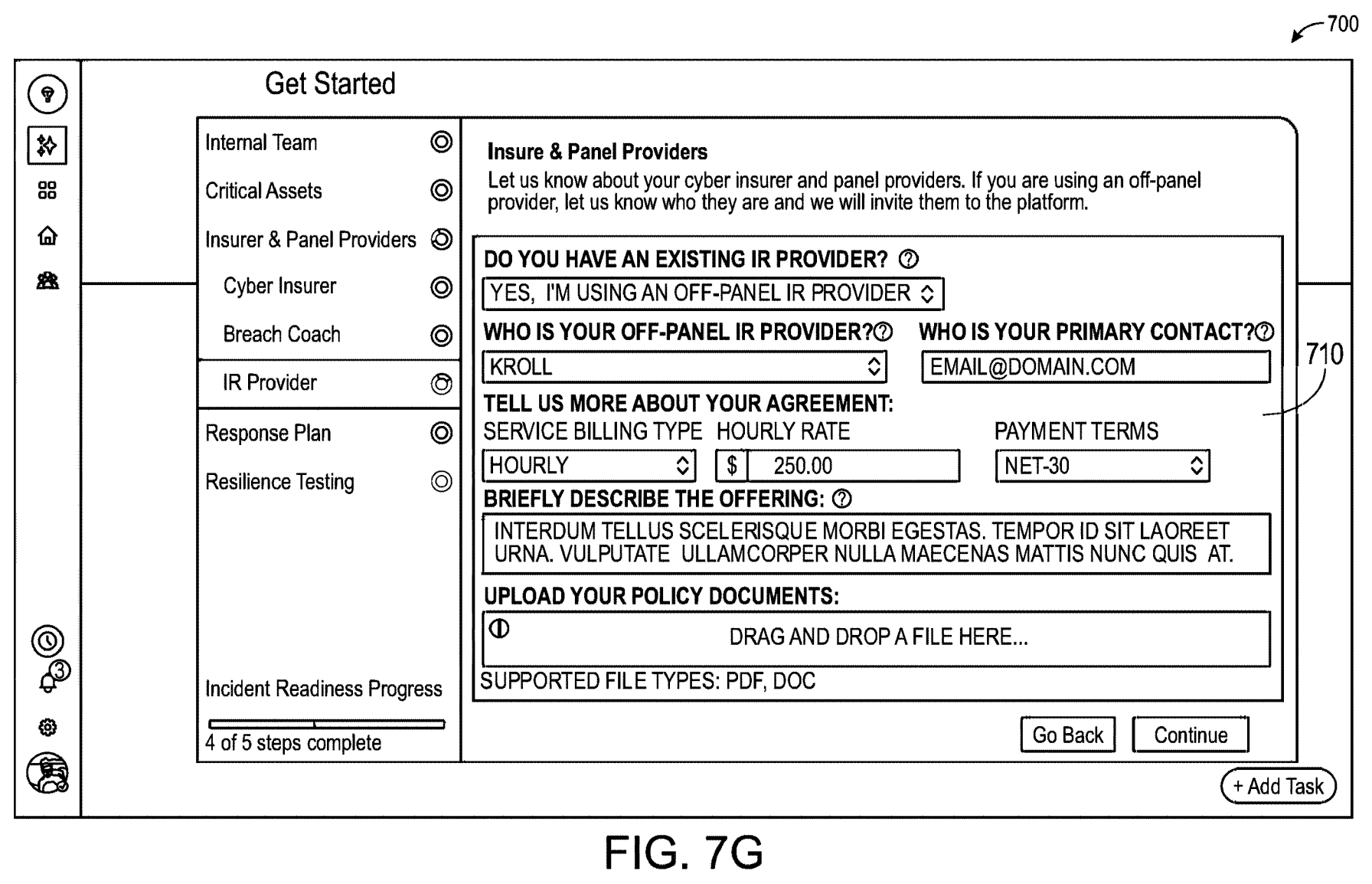

Referring now to FIGS. 7E, 7F, and 7G, Responder's onboarding process continues with the configuration of insurers and panel providers. Interface 700 presents interactive items and content 706 for configuring cyber insurance, interactive items and content 708 for configuring breach coaches, and interactive items and content 710 for configuring incident response providers. In some implementations, the panel provider configuration process takes the user through steps to help them identify their current cyber insurer, breach coach, and incident response provider. For example, in the first step, the user is asked if they have an existing cyber insurer. If the answer is yes, the user can provide details such as the policy number, broker, email, and existing policy documents. Once completed, the user can proceed to the next step. In the second step, the user is asked if they have an existing breach coach. If the answer is yes, the user can select from a list of offerings that the breach coach has already uploaded into the system. The user can also upload partnership documents and verify the partnership with the breach coach. Once completed, the user can proceed to the final step.

In some implementations, in the final step, the user is asked if they have an existing incident response provider. If the answer is yes, the user can either choose from a vendor who is already in the system or create a new vendor on the fly. If the vendor is off panel, the user can provide more information about the off panel agreement, including pricing, payment terms, and a brief description of the offering. The user can also upload partnership documents and request a code from the vendor to verify the partnership. Once the code is received and verified, the user can confirm the information and sign up the vendor to join the incident. Accordingly, this streamlined configuration process ensures that insurers and panel providers are properly integrated into Responder's response system 130, allowing for effective collaboration and communication during an incident. Responder's onboarding guide provides detailed guidance on how to configure insurers and panel providers, ensuring that users have a clear understanding of the platform's capabilities and functionalities.

Figure 7H:
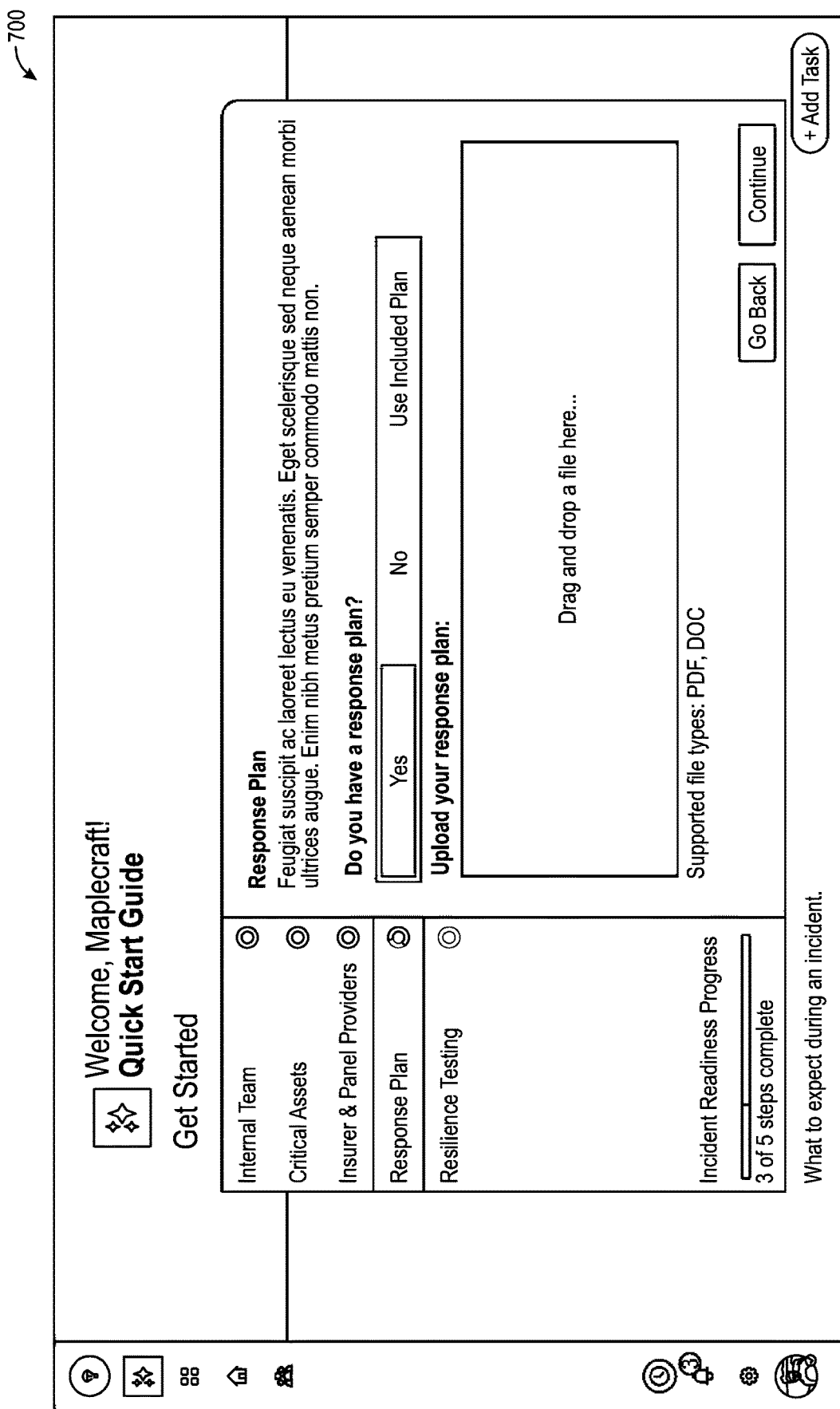
Figure 7J:
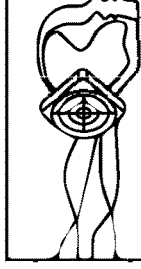

Referring now FIGS. 7H, 7I, and 7J, Responder's onboarding process continues with the response planning phase. Interface 700 presents a response plan selection page where the organization is asked if they already have a response plan in place. If the answer is yes, the user can upload it directly to Responder. If the answer is no, the user can choose to purchase a response plan that is best suited to their organization based on their DNA. Responder's onboarding guide provides users with a range of response plans to choose from, including response plan 712, response plan 714, and response plan 716.

In some implementations, if the user wants more information about a particular plan, they can click on "view details" to see additional files and assets related to that plan. The response plans are designed to provide organizations with a comprehensive framework for responding to incidents effectively. In particular, these plans can be tailored to the specific needs of the organization, based on their size, industry, and other factors. This ensures that the organization is well-prepared to handle incidents when they occur, reducing the risk of costly downtime, reputational damage, and potential delayed incident responses causing increased exposure. In addition to providing response plans, Responder's onboarding guide also provides guidance on how to develop a customized response plan based on the organization's unique needs. This includes guidance on identifying key stakeholders, defining roles and responsibilities, and establishing communication protocols.

Figure 7K:
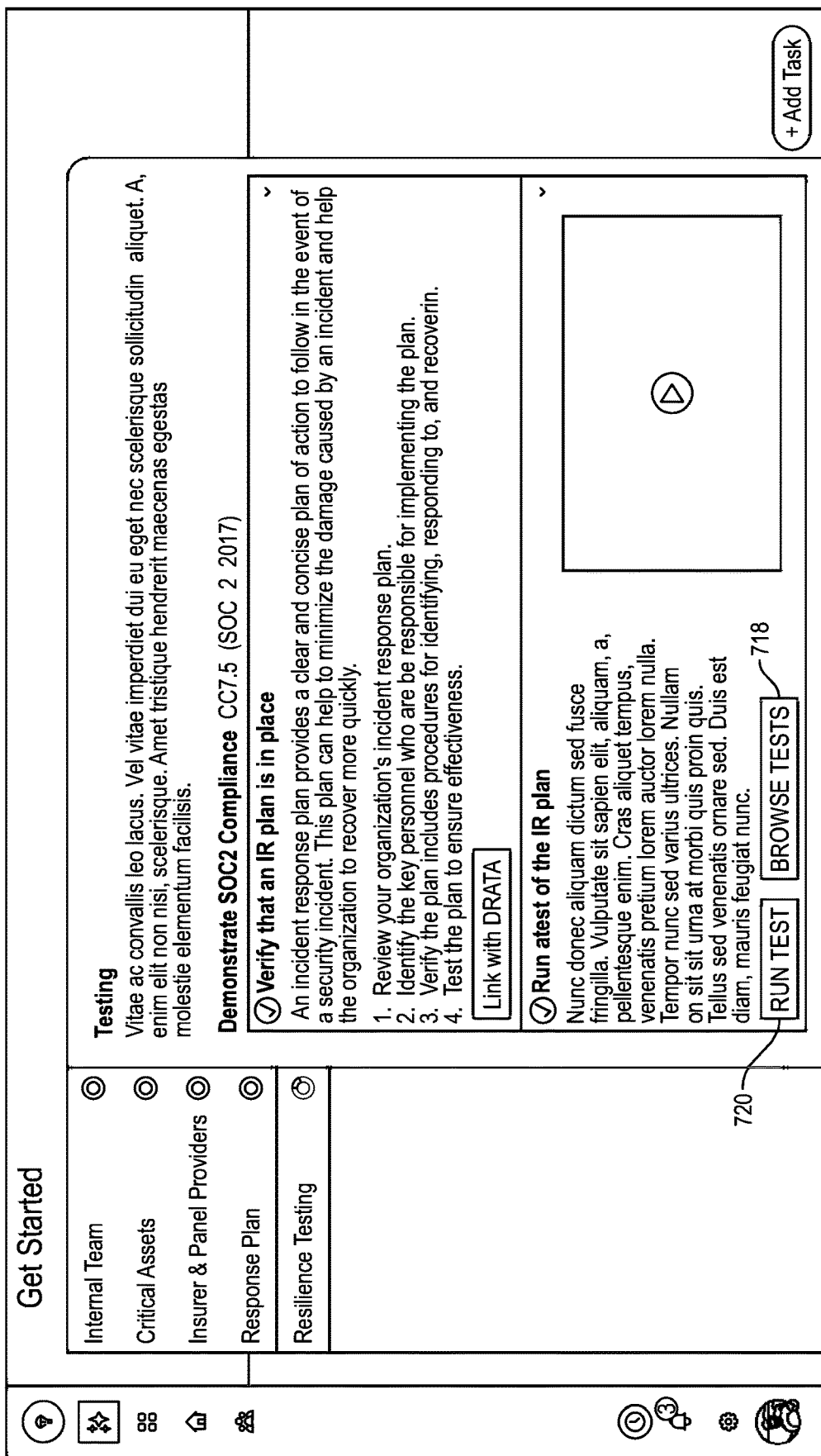

Referring now to FIGS. 7K and 7L, Responder's onboarding process continues with the resilience testing phase. Once the user has added their panel providers and selected a response plan, they can move on to verify that the plan is in place and conduct resilience testing using response system 130. In some implementations, running tests to evaluate the efficacy of an incident response plan is a component of the onboarding process for an incident response platform. Interface 700 presents interactive items 718 and 720 that allow the user to select from a range of potential tests and run a test of their incident response plan. In some implementations, this feature is designed to streamline the testing process and ensure that the incident response plan is effective and resilient in the face of real-world incidents.

For example, to further enhance the testing process, Responder offers the option to link with third-party tools such as COMPANY X. This integration enables users to conduct more comprehensive and accurate tests of their incident response plan. Third-party tools provide an added layer of expertise and testing capabilities that can help organizations identify gaps and weaknesses in their incident response plan, which can then be addressed promptly. When running tests through the Responder platform, the analysis circuit 136 of response system 130 can execute the tests and provide detailed analysis of the results. The analysis circuit 136 can identify areas of strength and weakness within the incident response plan, enabling users to fine-tune and optimize their plan accordingly. This level of analysis provides improvement to security architecture by ensuring that the incident response plan is effective, reducing the risk of costly downtime and reputational damage in the event of an incident. Once the test is completed, the user can store the results and review the findings using interactive items 722 and 724. Any issues that are identified can be remediated promptly to ensure that the incident response plan is as effective as possible. In some implementations, Responder offers a set of recommendations for addressing identified weaknesses in the incident response plan, providing the user with clear guidance on how to optimize their plan for maximum effectiveness.

For example, the analysis circuit 136 can simulate a phishing email and send it to employees within the organization. The analysis circuit 136 can track how many employees click on the link in the email, and provide detailed analysis of which employees are most susceptible to phishing attacks. This test can be used to identify areas where additional employee training is needed to improve the organization's overall security posture. In another example, the analysis circuit 136 can simulate a malware attack and track how quickly the organization and its providers are able to detect and respond to the threat. The analysis circuit 136 can also identify which systems were affected by the malware and provide recommendations for how to remediate the issue. This test can help the organization to ensure that its malware detection and response processes are working effectively. In yet another example, the analysis circuit 136 can perform a network segmentation test to ensure that critical systems are properly isolated from less critical systems. The analysis circuit 136 can identify any areas where the network may be vulnerable to attack, and provide recommendations for how to improve network segmentation to better protect critical assets. In yet another example, the analysis circuit 136 can simulate an incident response scenario and track how well the organization and its providers are able to respond to the threat. The analysis circuit 136 can identify areas where the incident response plan may need to be updated or improved, and provide recommendations for how to optimize the plan for maximum effectiveness.

Figure 7M:
Figure 7N:

Referring now to FIGS. 7M, 7N, and 7O, Responder's onboarding process continues with the "what to expect during an incident" updates. Once the user has identified their panel providers and incident response team, Responder provides detailed information on how each vendor will help during an incident. Interface 700 presents interactive items 702, which allow the user to see how each vendor will assist during an incident. In some implementations, this information is provided by the vendor when they sign up and create different offerings. For example, if a vendor created an offering for managed incident response, they would have provided information on how they will assist during an incident. This information is displayed in Responder's interface 700, along with product documentation that the user can access online.

In general, Responder is an incident response platform that provides organizations with a set of tools and resources to help them prepare for and respond to security incidents. The platform consists of both a backend and frontend component that work together to provide a seamless user experience. The backend components of Responder processes and stores data, executes instructions, and manages the various components of a computing system. It can be executed either by the response system 130 or by a user device such as a client device 110 or a third-party device 150. The backend is designed to be scalable and flexible, allowing it to adapt to the needs of organizations of all sizes. The frontend components of Responder presents data and content to the user in a clear and intuitive manner. It includes graphical user interface (GUI) code that can be displayed or presented on a user device. The GUI is interactive and customizable, allowing users to easily navigate and interact with the various features of the Responder platform. The frontend includes actionable and interactive content from interface 700, as well as additional content that is relevant to the user's specific incident response needs. As shown, the frontend and backend components of Responder work together to provide users with an intuitive incident response platform. The backend processes and stores data, executes instructions, and manages the various components of the system, while the frontend presents this data to the user in an actionable format. Additional details regarding the backend and frontend features of Responder are described herein.

Figure 8A:
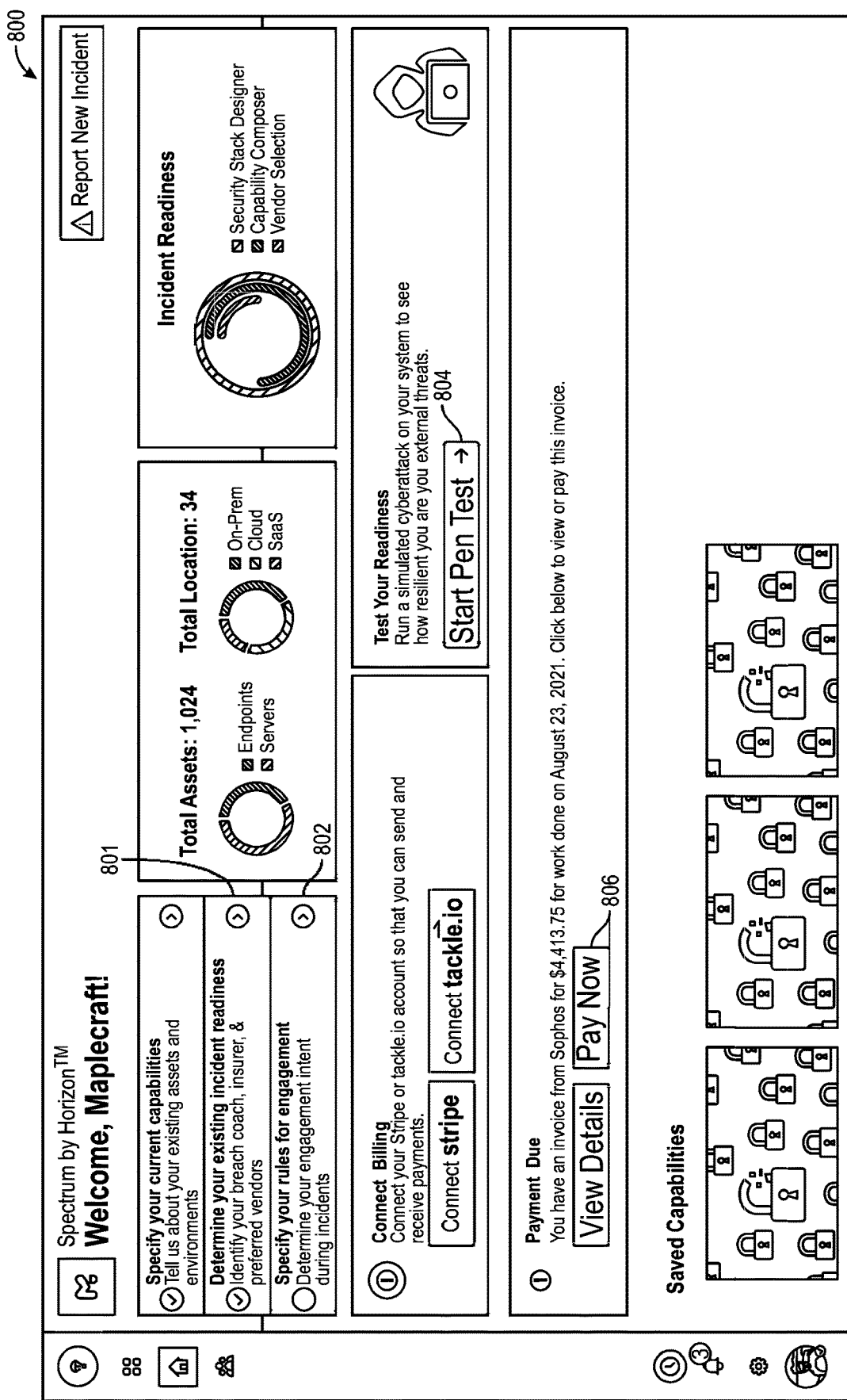
Figure 8B:
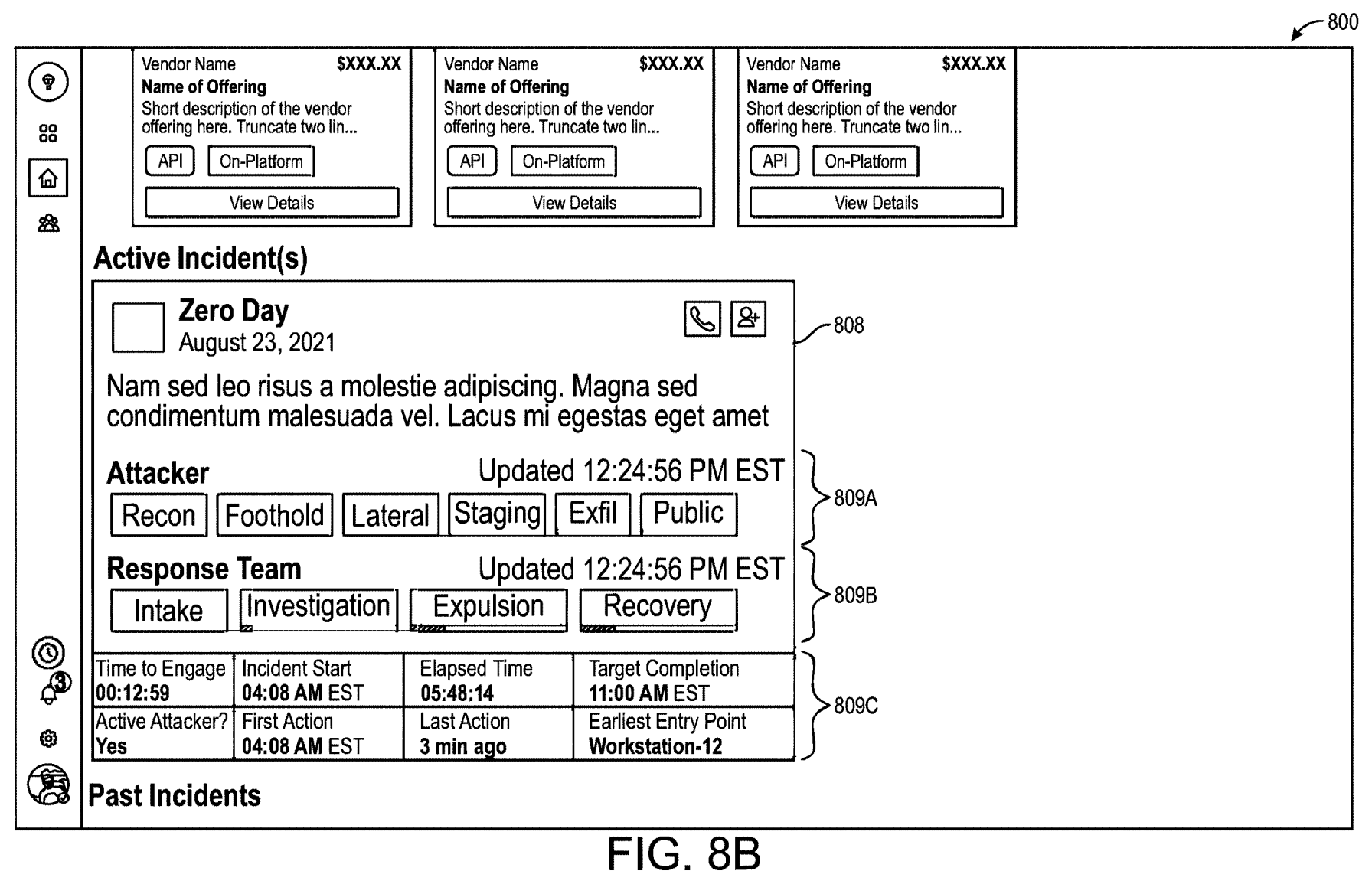
Figure 8C:
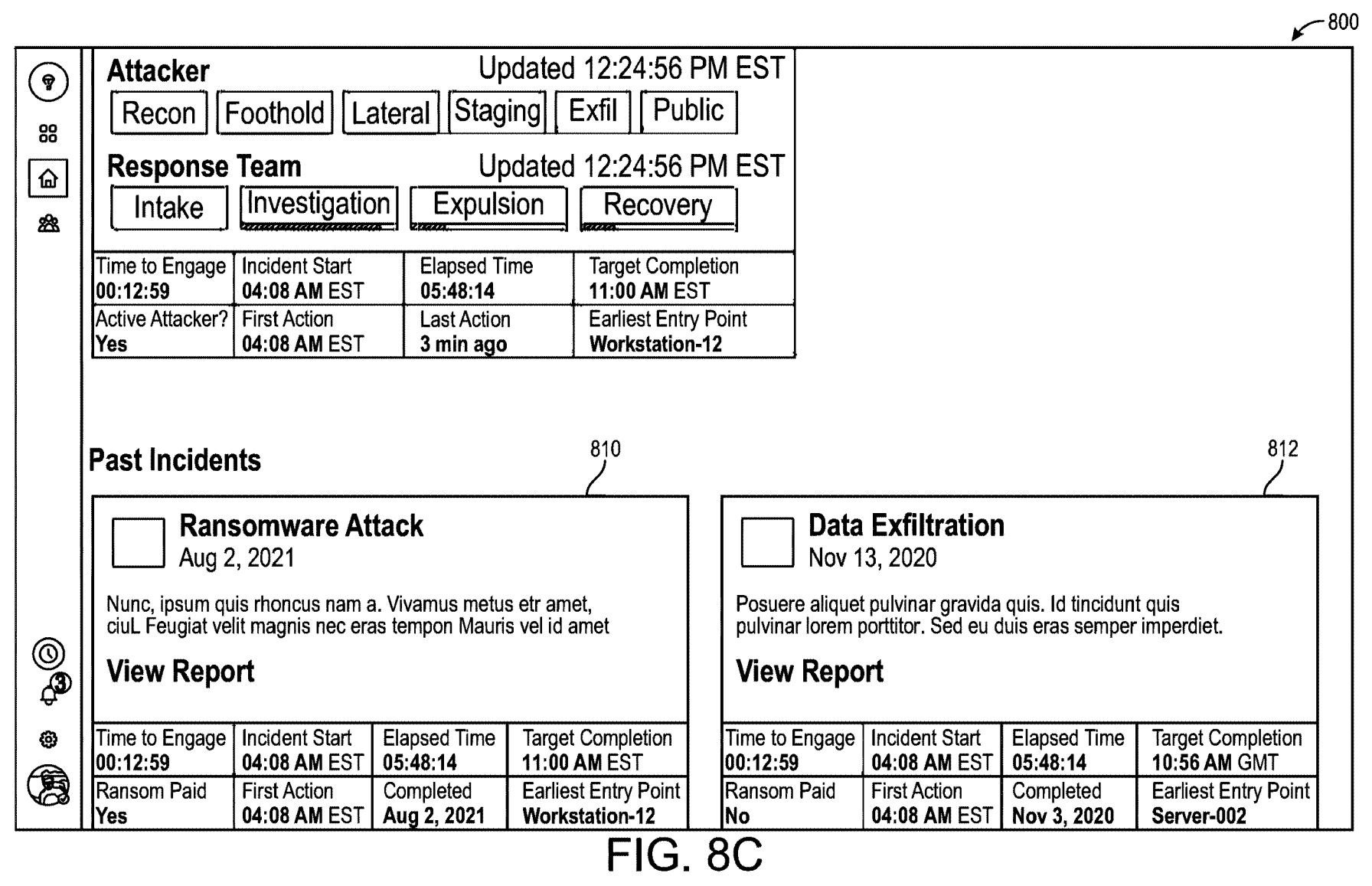
Figure 8D:
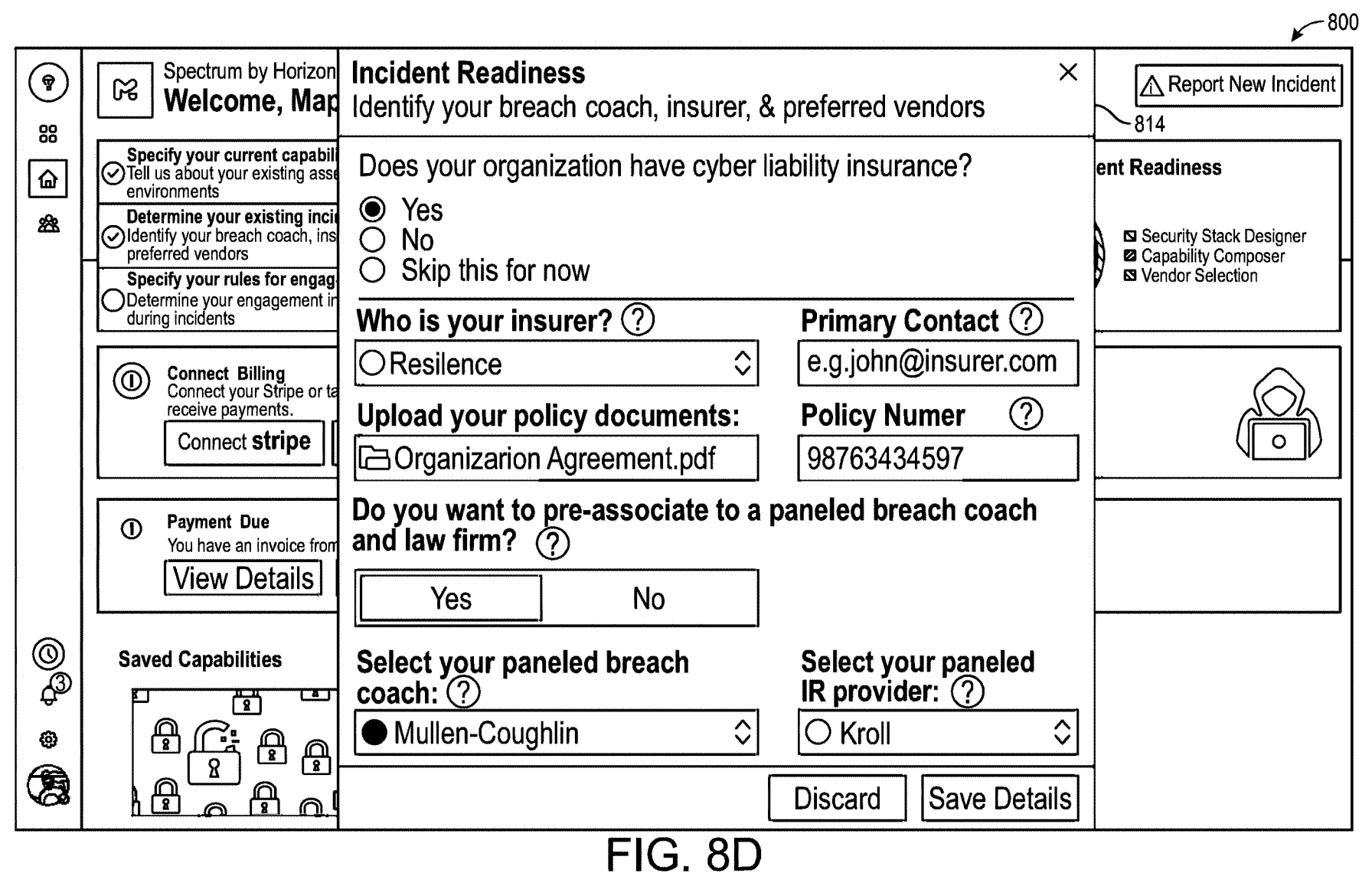
Figure 8E:
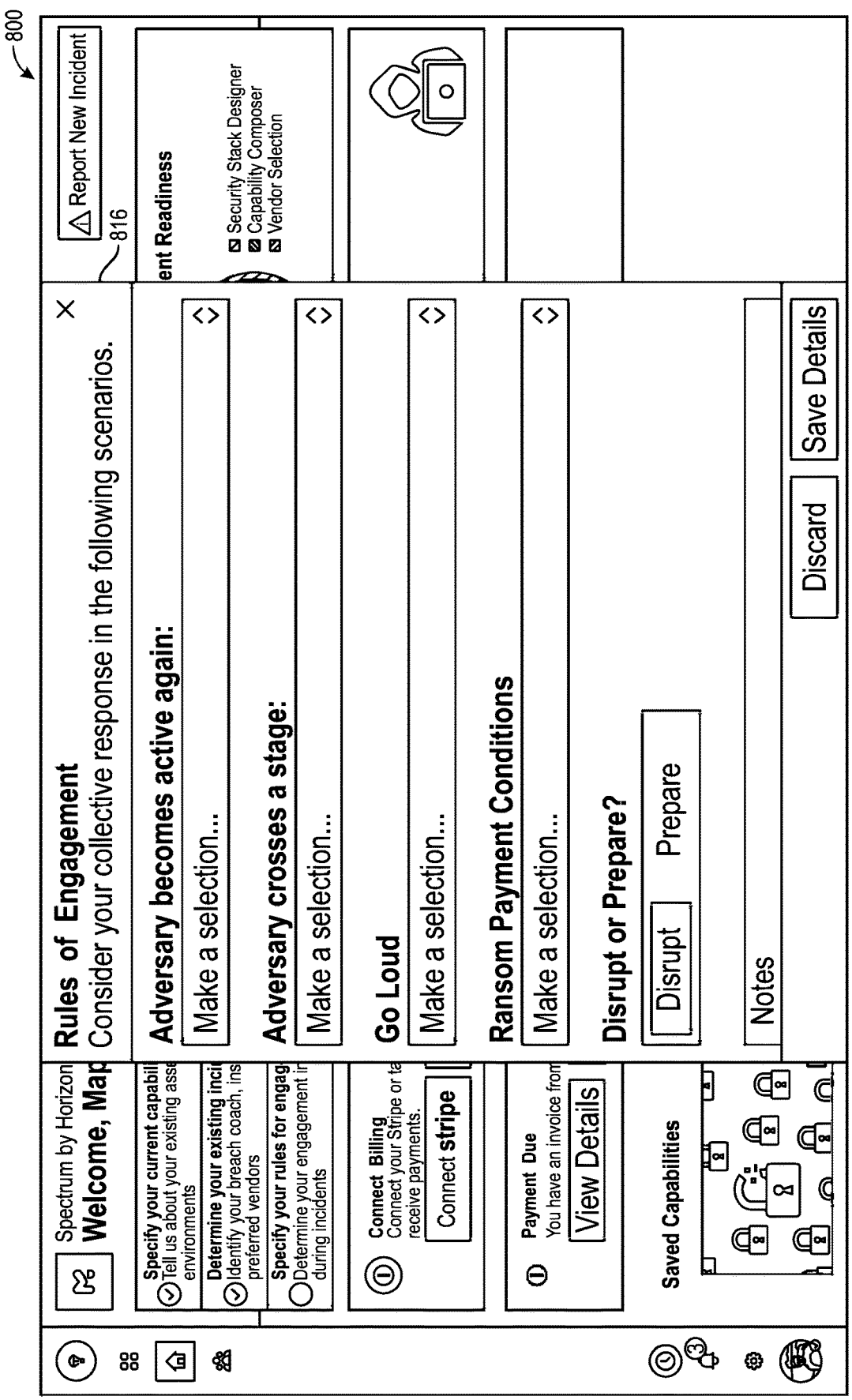

Generally, FIGS. 8A, 8B, and 8C provide an in-depth look at the home dashboard 800, while FIGS. 8D and 8E present additional interactive items that enhance its functionality. The home dashboard 800 serves as a centralized hub where organizations can manage various aspects of their operations and optimize their incident readiness In FIGS. 8A, 8B, and 8C, interactive items 801 and 802 empower organizations to specify their current capabilities, assess their existing incident readiness, and establish specific rules of engagement. These features enable organizations to define their preparedness and align their incident response strategies with their unique requirements. The home dashboard 800 also offers convenient billing and payment management capabilities. As depicted by the payment icon 806, organizations can seamlessly connect their billing information and make invoice payments directly from the dashboard. This streamlined process eliminates the need for manual invoicing and enhances the overall financial management experience. In some implementations, the home dashboard 800 allows organizations to report new incidents or conduct readiness tests with ease. By selecting the designated test item 804, organizations can initiate simulations or check the effectiveness of their preparedness measures. This functionality enables proactive testing and validation of incident response protocols, ensuring organizations remain well-prepared in the face of potential threats.

FIGS. 8D and 8E showcase additional interactive items within the home dashboard 800. These items further enrich the user experience and provide organizations with greater control and visibility over their incident response processes. The specific functionalities depicted in these figures may vary but can include features such as incident tracking, incident analytics, incident categorization, response timeline management, incident reporting, and more.

In some implementations, the home dashboard 800 presents a view of incidents (e.g., 808, 810, and 812), both active and past, allowing organizations to interact with each incident and gain valuable insights into their status. For instance, active incident 808 provides detailed information about the attack and the current progress of the attacker 809A. This includes insights into various stages of the attack, such as reconnaissance, foothold establishment, lateral movement, staging, exfiltration, and public exposure. The dashboard also highlights the response team's progress 809B in addressing the incident, including key stages such as intake, investigation, expulsion, and recovery.

In some implementations, the home dashboard 800 presents various metrics 809C related to the incident, providing a holistic view of its timeline and impact. These metrics may include the time it took to engage with the attacker, the start time of the incident, the elapsed time since the incident began, the target completion time to resolve the incident, the current status of the attack, the timing of the first and last actions, and the earliest identified entry point, such as a specific computer or system. To facilitate real-time monitoring and progress tracking, the response team's progress 809B is represented using visual indicators within the home dashboard 800. Each step of the incident response process can be displayed as a box, and when a step is completed, the box is highlighted in green or filled in. Additionally, for each action box, a percentage or progress bar may be displayed, providing a visual representation of the response team's advancement at a glance. This dynamic and intuitive visual display enables organizations to assess the ongoing response efforts and understand the real-time progress made in mitigating the incident.

The interactive nature of the home dashboard 800 allows organizations to actively engage with each incident displayed. By interacting with incidents 808, 810, and 812, organizations can delve deeper into incident details, access relevant documentation, collaborate with the response team, provide updates, track actions taken, and review the overall incident management process. This interactive functionality fosters effective communication and coordination, ensuring that organizations can actively participate in the incident response and stay informed about the progress made at all times.

In FIG. 8D, upon selecting interactive item 801, a pop-up 814 can be presented that includes information about the organization such as, cyber liability insurance, insurer, policy documents, policy number, pre-associated breach or panel coaches, panel incident response providers, etc. In some implementations, this information can be manual entered by a user. In some implementations, this information can be gathered or scanned from various data sources.

In FIG. 8E, upon selecting interactive item 802, a pop-up 816 can be presented that includes rules for engagement for a collective response to an incident. For example, the rules may include provisions for responding if the adversary becomes active again after being dormant, if the adversary progresses through a specific stage in the attack lifecycle, if certain thresholds are crossed indicating the need for immediate action, or if specific conditions related to ransom payments, disruption or preparation efforts are met. These rules serve as a framework for the organization's response strategy, helping to ensure a coordinated and effective response to security incidents.

Figure 9A:
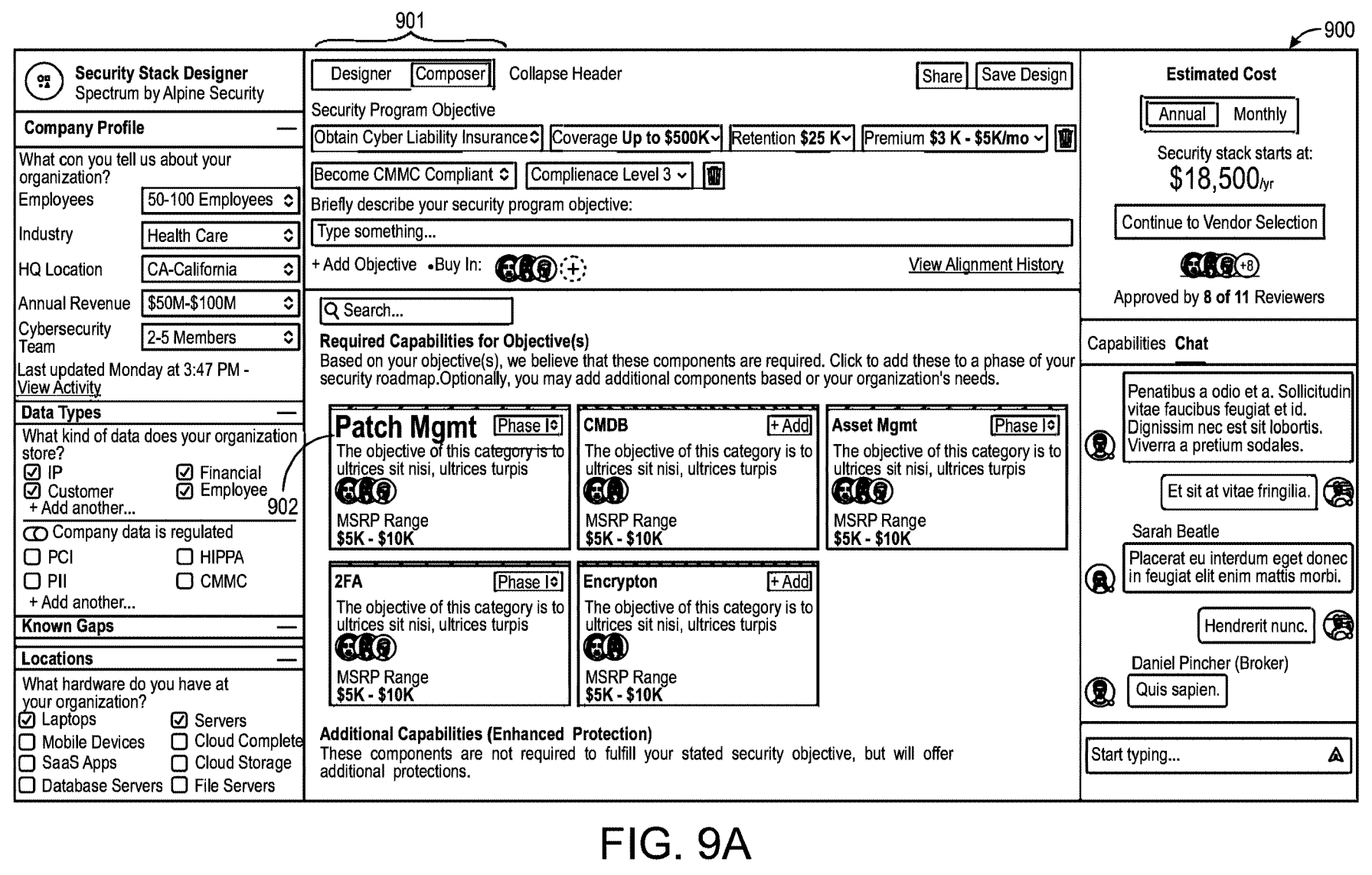
Figure 9E:
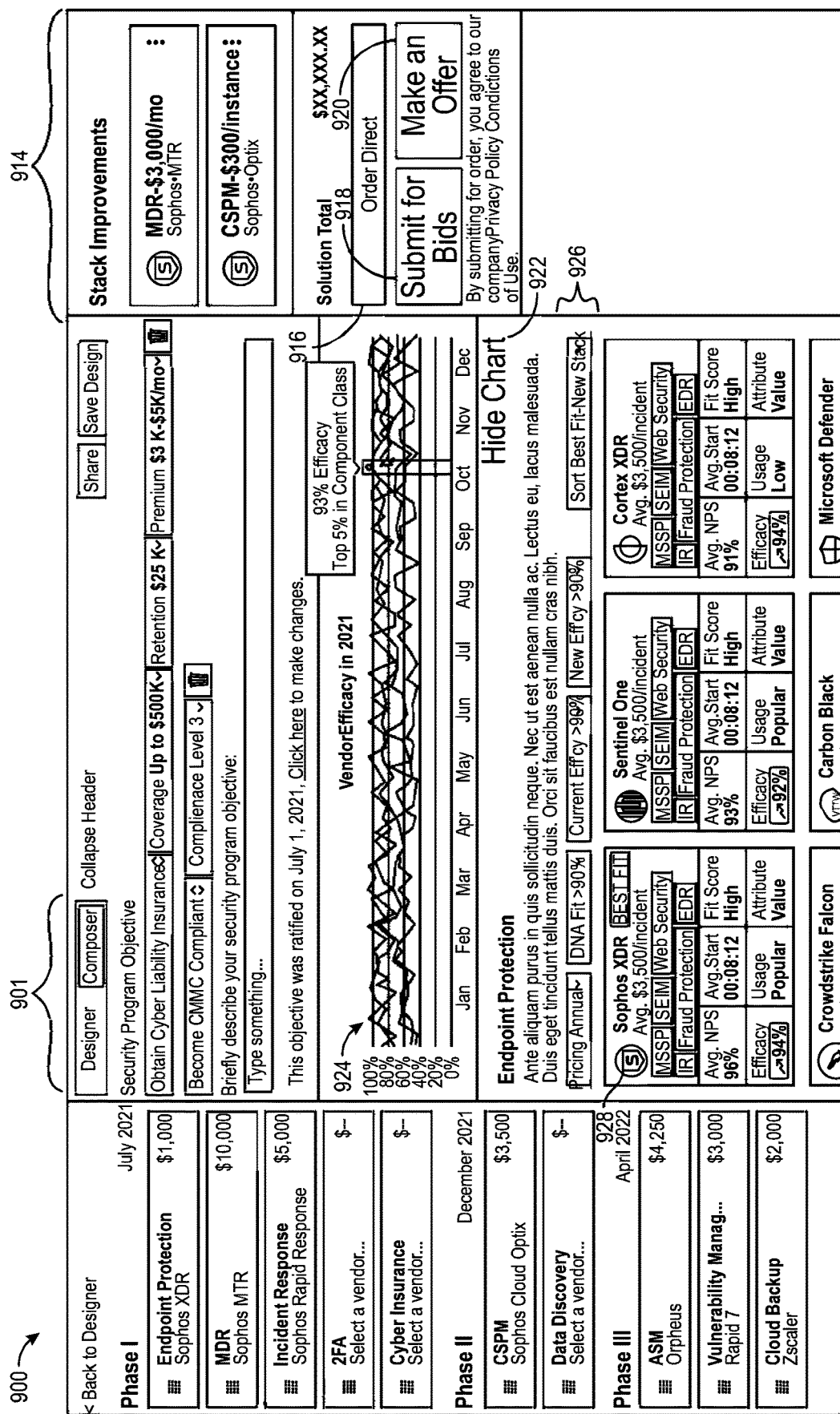

Referring now to FIGS. 9A-9H, an organization dashboard 900 including a composer interface and a designer interface that can switched between using selective element (or item) 901. In FIG. 9A, the organization dashboard 900 features interactive tiles that provide suggested, required, or additional capabilities aligned with the organization's objectives. For instance, the patch management tile 902 allows organizations to set up and manage this crucial capability with a selected vendor. These tiles serve as actionable prompts, guiding organizations to address specific areas of focus.

In some implementations, certain objectives may trigger the organization to enter into a vendor selection process. As depicted in FIG. 9A, when it comes to establishing a security stack, the organization is presented with estimated costs per year or month. By selecting the appropriate selectable item, the organization can proceed with the vendor selection process, ensuring alignment between their needs and the chosen vendor's offerings. The organization dashboard 900 goes beyond providing mere suggestions and capabilities. It encompasses a composer interface and a designer interface, allowing organizations to fine-tune their objectives and tailor their strategies accordingly. The selectable element 901 facilitates navigation between these interfaces, enabling organizations to switch between the composer and designer perspectives.

Within the composer interface, organizations can gain the ability to define, refine, and orchestrate their objectives. They can set specific targets, establish key performance indicators, and align their capabilities accordingly. This interface provides a view of the organization's goals and progress, allowing them to track their journey towards achieving desired outcomes. On the other hand, the designer interface offers organizations a creative and intuitive space to design and shape their capabilities. They can explore different configurations, experiment with various options, and customize their solutions based on their unique requirements. This interface empowers organizations to craft tailored approaches that align with their specific needs and preferences.

In FIG. 9B, the organization dashboard 900 expands to display a comprehensive list of existing capabilities. In FIG. 9C, the organization dashboard 900 introduces additional capabilities that can bolster the organization's protection. For example, the user testing tile 904 allows organizations to select a vendor specifically for user testing, enhancing their overall security measures. Furthermore, organizations have the flexibility to assign these capabilities to different phases of implementation, such as phase 1, phase 2, or phase 3, depending on their strategic priorities and roadmap.

With regards to the designer view of the organization dashboard 900 in FIG. 9D, organizations gain access to valuable information and indicators that help evaluate their security posture. The my data section 906 presents an indicator, represented by bullets (or other indicators), that denotes the level of exposure or threat resistance. For example, more filled-in bullets indicate a higher level of safety, providing organizations with a visual representation of their data security. Similarly, the my threats section 908 highlights the specific threats that the organization is currently facing, enabling them to prioritize mitigation efforts accordingly. The my locations section 910 showcases the various hardware and infrastructure components within the organization's environment, such as desktops, AWS, Google Cloud, G Suite, laptops, and more. Additionally, the capabilities section 912 outlines the specific security capabilities implemented by the organization, such as security operations (sec ops), web security, application security, access management, and others.

Returning to the composer view of the organization dashboard 900 in FIG. 9E, organizations gain insights into different phases of their security implementation. The vendor efficacy metrics 924 provide a means to evaluate the performance and effectiveness of vendors associated with each capability. The dashboard also offers a range of endpoint protections 922, such as antivirus software, firewalls, or intrusion detection systems. These endpoint protection options can be sorted and filtered using the available filters 926, ensuring that organizations can identify and select the most suitable solutions for their specific needs. In some implementations, the organization dashboard 900 introduces the "improvements" section 914, which allows organizations to identify areas where enhancements are required. They can order improvements by prioritizing them through the selectable button 916. For example, organizations have the option to submit these improvement requirements for bidding by potential vendors using the submit for bids button 918 or even make an offer directly through the make an offer button 920, providing a streamlined process for acquiring necessary security enhancements.

Figure 9F:
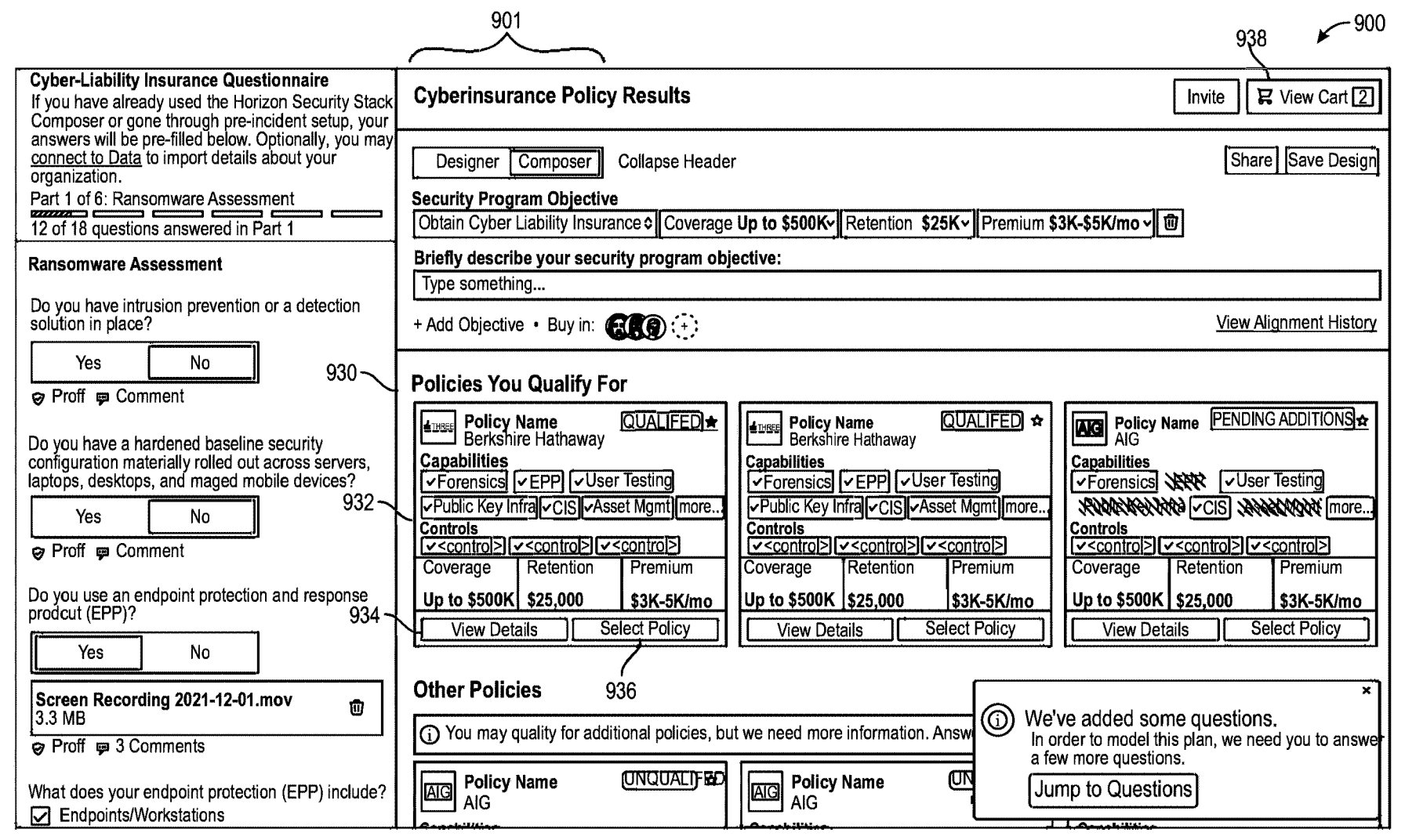

In FIG. 9F, the organization dashboard 900 can be configured to present policies 930 that the organization qualifies for, following the selection of, for example, "continue to vendor selection" button in FIG. 9A. These policies represent various security measures and guidelines that organizations can adopt to enhance their overall cybersecurity posture. The organization dashboard 900 allows users to browse through the available policies, select specific ones 926, and view detailed information 934 about each policy 932. By selecting a policy, users can add it to their cart 938, indicating their intention to adopt and implement that particular policy.

Figure 9G:
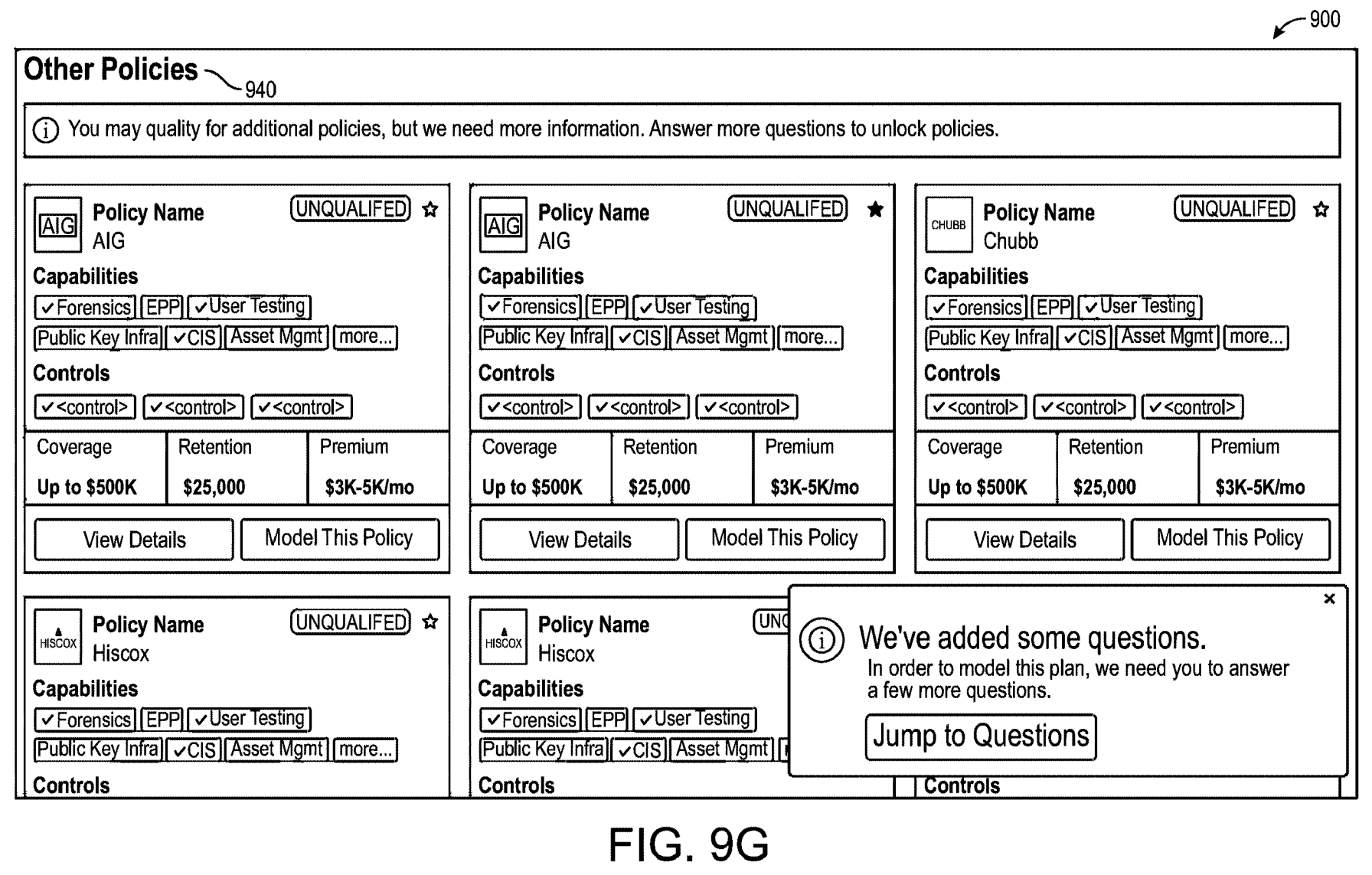

In FIG. 9G, the organization dashboard 900 provides insights into additional policies 940 that the organization may not qualify for but can still access and review. Although these policies may not currently align with the organization's qualifications, it allows them to stay informed about the evolving landscape of security policies and standards. Users can explore the details of these policies and gain knowledge about emerging security practices, even if they are not immediately applicable to their organization's specific requirements.

In FIG. 9H, upon selecting the view details option 934 for a specific policy 932, the organization dashboard 900 can present an overview of the policy. This includes detailed information about the policy itself, such as the extent of coverage, retention period, and associated premium costs. Additionally, the organization dashboard 900 indicates the specific security needs addressed by the policy, such as endpoint protection, public key infrastructure, asset management, and more. In some implementations, the organization dashboard 900 provides access to policy documents, ensuring that organizations have a clear understanding of the policy's terms, conditions, and obligations. In some implementations, the organization dashboard 900 offers the capability to model the selected policy. Upon selecting the policy modeling element 944, users can explore different scenarios and configurations to understand the potential impact and implications of adopting the policy. This modeling feature allows organizations to assess how the policy aligns with their existing security infrastructure, operational processes, and overall business objectives.

Generally, FIGS. 10A-10E, 11A-11D, 13A-13E, 15A-15G, 16A-16D, and 21A-21B depict the vendor dashboards and the interactive items and actionable items the vendor can interact with (e.g., using third-party device 150). Referring now to FIGS. 10A-10E, the incident room dashboard 1000 provide a centralized space where the entire team, including the IR vendor, insurer, breach coach, and law firm, can actively monitor the live progress of the active incident (e.g., show with reference to FIG. 16B, where the incident room dashboard 1000 is presented in response to a selection of active incident 1604). In some implementations, the incident status 1002 can offer real-time updates on the current state of the incident. This allows stakeholders to have a clear understanding of the ongoing attack progress through the in-progress element 1004, which indicates the stage the attacker is in, as well as the response team's progress.

In some implementations, the incident room dashboard 1000 also provides high-level metrics 1006, enabling a quick overview of the organization's environment within the primary workspace. Additionally, the dashboard can highlight any active tasks 1008 that are currently being worked on by the team. By clicking on a specific task, such as task 1020 in FIG. 10C, users can access more detailed information, monitor the task's activity, add comments, upload attachments, and even start or stop task timers 1022. In some implementations, the incident room dashboard 1000 serves as an information hub that provides essential details and functionalities for vendors in managing and responding to incidents. For example, the incident room dashboard 1000 can provide alerts 1012, which are automatically generated by the response system 130. These alerts can range from notifications about new meetings initiated on Zoom to changes in phase or submitted change orders related to the incident.

In some implementations, the incident room dashboard 1000 also facilitates team member engagement by providing an activity feed 1014 that highlights individual contributions and actions. This feed captures activities such as system backup status updates or the upload of new files, enabling vendors to track the progress and involvement of team members. In some implementations, the incident room dashboard 1000 offers a range of incident-level actions that vendors can undertake. They can participate in video calls, access the intake details 1016 associated with the incident's initiation, invite new team members, and view pertinent information about the incident itself. This includes information about the duration of the incident, its origin, and any outstanding or existing agreements with the client or end organization. In cases where the allocated hours for the incident have been exhausted, vendors can initiate a new change order by simply clicking on the "new change order" option, assembling the necessary details, and submitting the request. This request would then be sent to the organization for further approval, allowing the incident response to proceed smoothly. Additionally, the dashboard provides insights into the response team, offering visibility into the team's members and their respective roles.

Figure 10A:
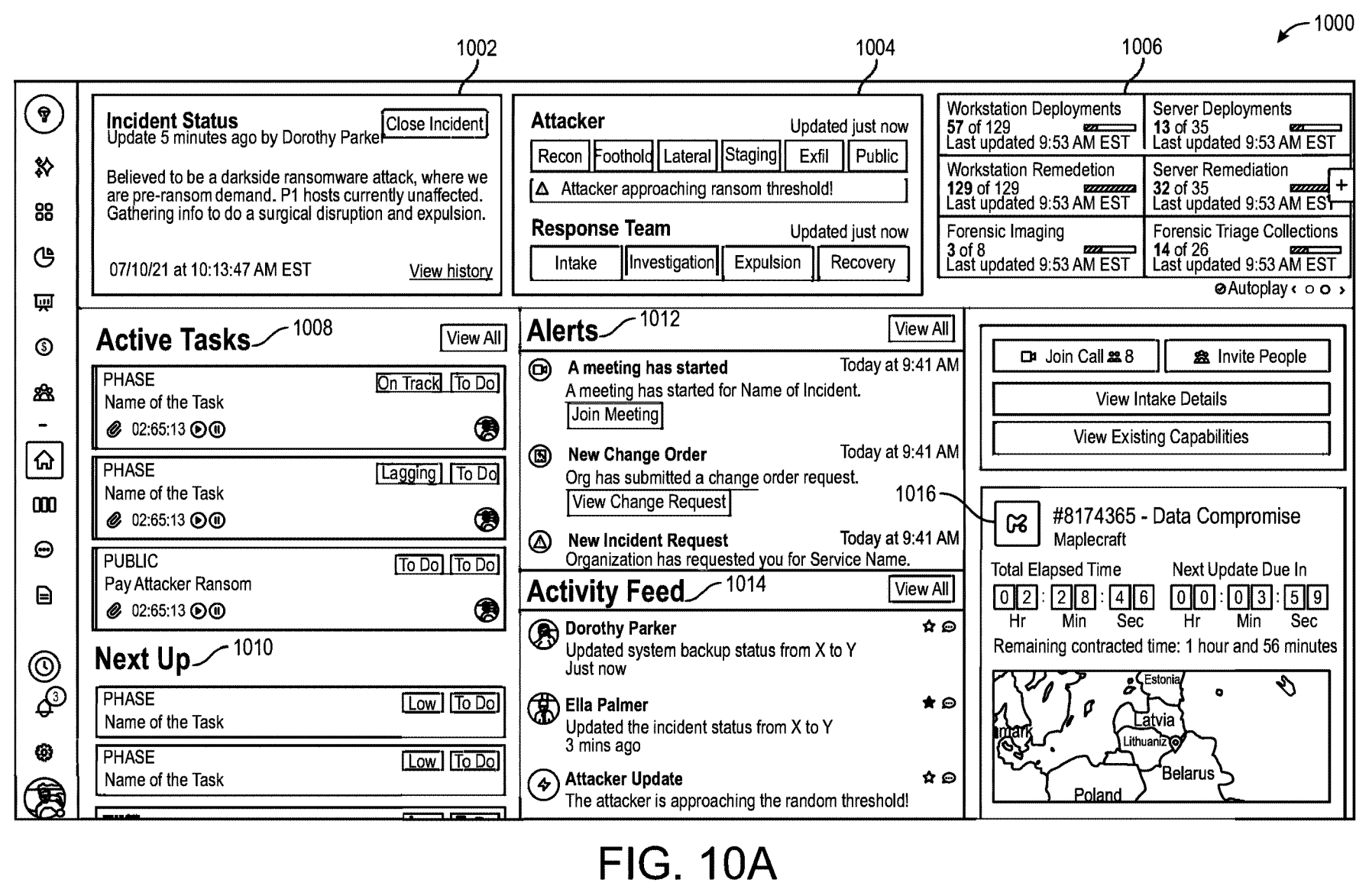
Figure 10B:
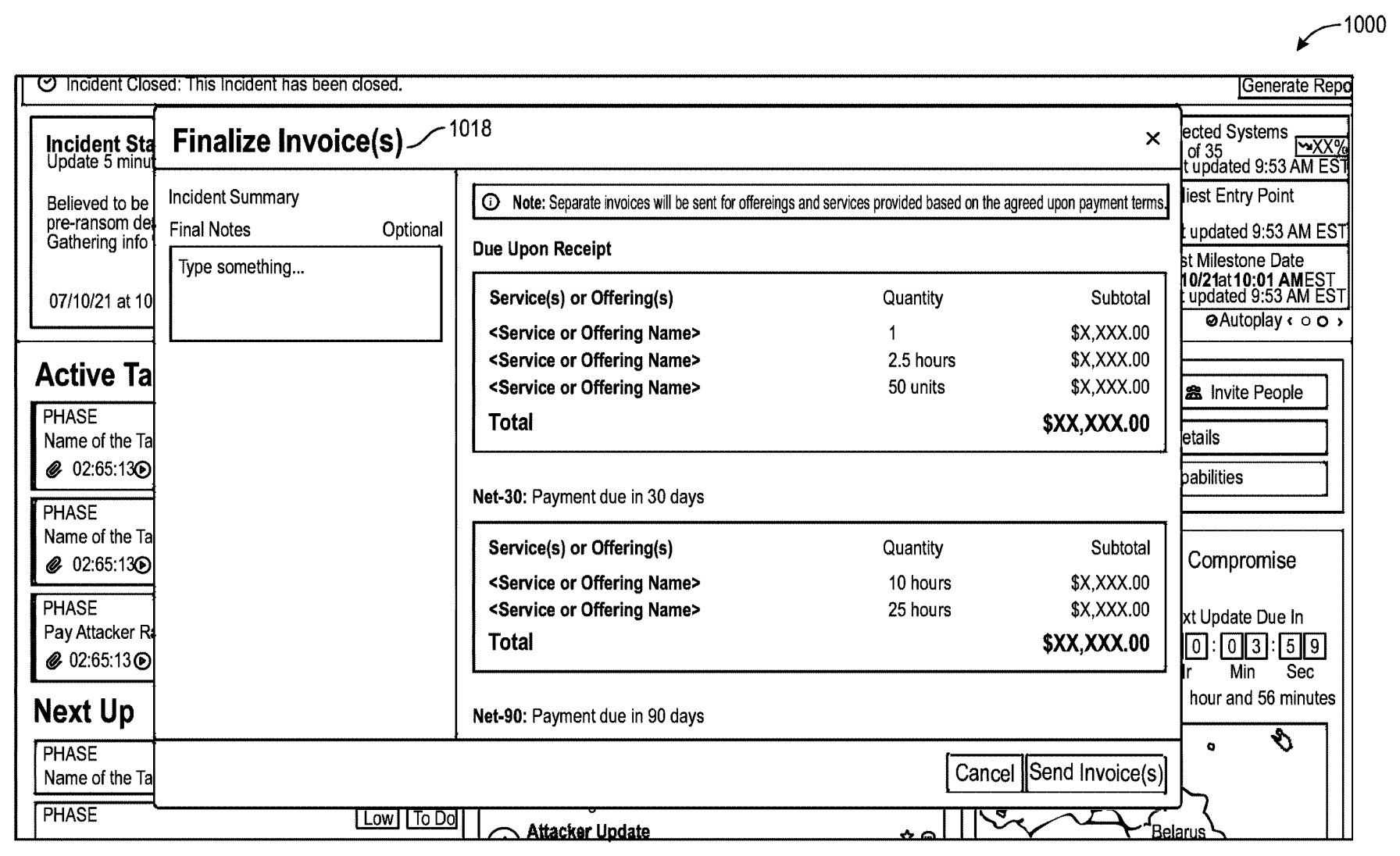

In some implementations, the incident room dashboard 1000 provides vendors with a range of capabilities to efficiently manage and close incidents. In FIG. 10B, vendors can select the "close incident" option within the incident status 1002, which triggers the generation of a final invoice 1018. This ensures that all services provided during the incident are accurately documented and invoiced. Once an incident is closed, vendors can utilize the incident room dashboard to generate a comprehensive post-incident report, as illustrated in FIGS. 13A-13E. This report consolidates valuable insights, analyses, and findings from the incident, enabling vendors to document and communicate the incident's details and outcomes effectively.

Figure 10C:
Figure 10D:
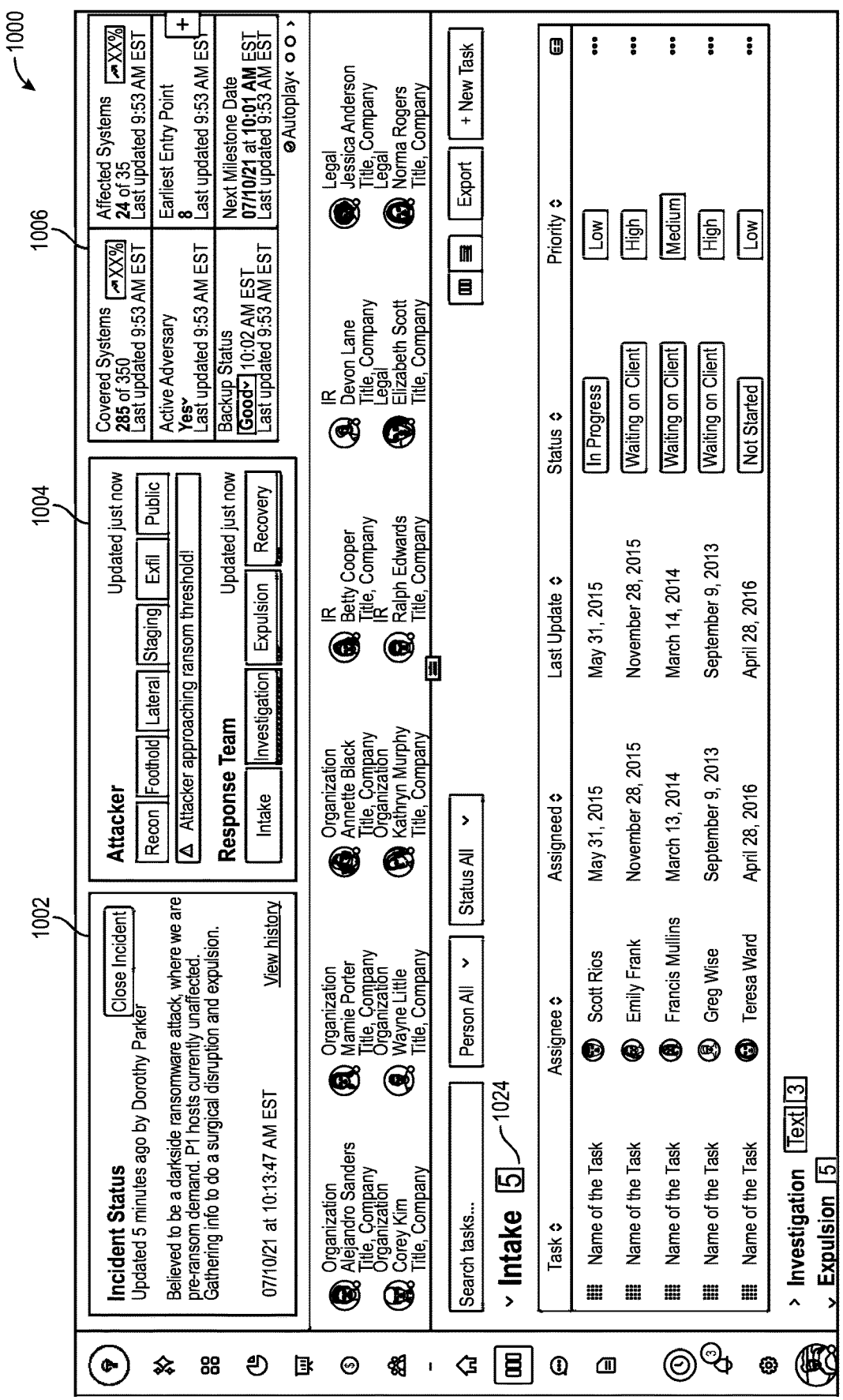
Figure 10E:
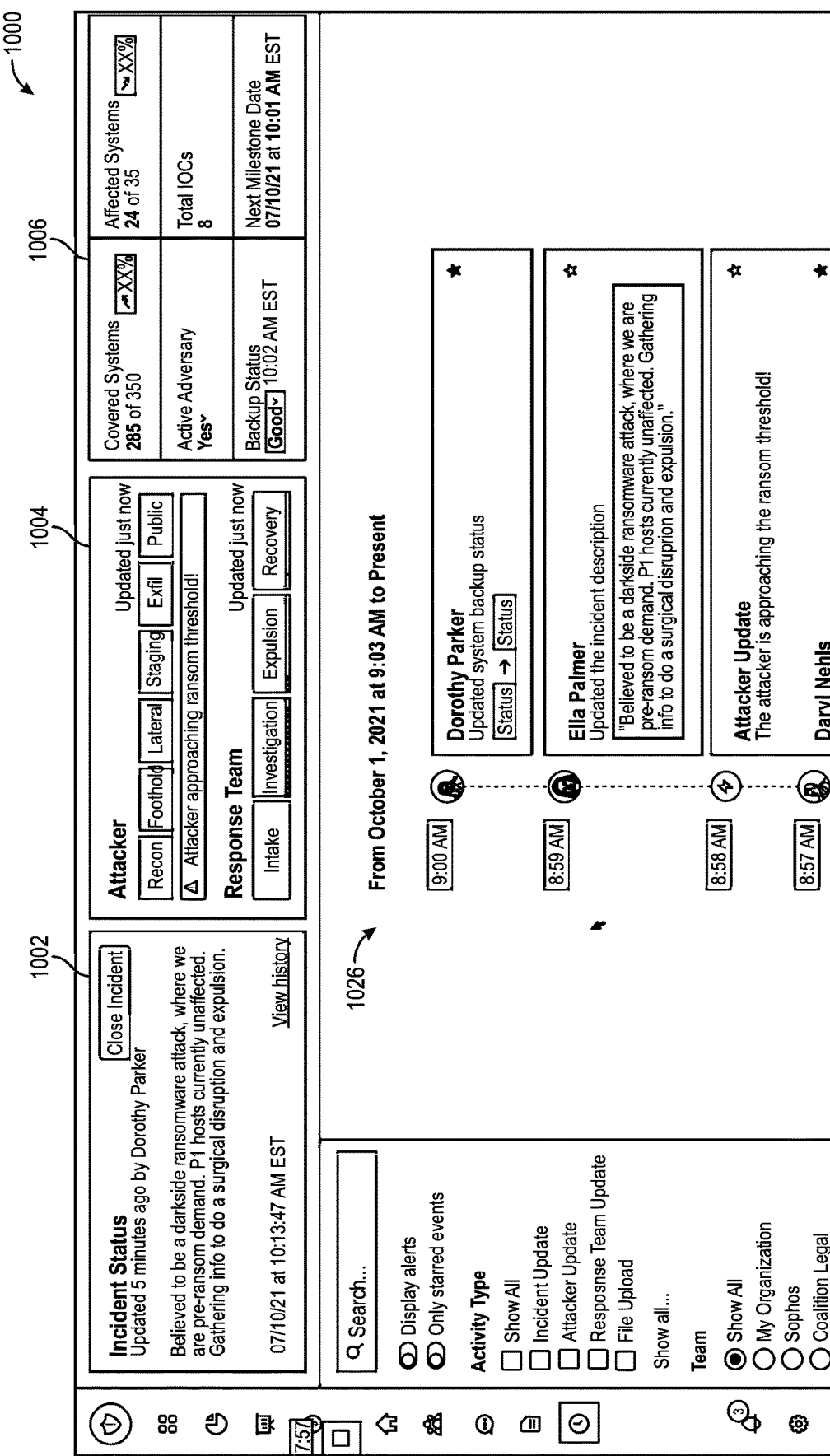

In FIG. 10D, the incident room dashboard 1000 presents additional features to enhance productivity and collaboration within the incident response team. Vendors can access the task management section, where they can view and distribute tasks 1024 among team members. These tasks can be organized based on phases or displayed in a Kanban-style view, offering flexibility in task management. Furthermore, the incident room dashboard 1000 can host a dedicated communication channel specific to the incident. This channel allows team members to create groups and engage in real-time communication, facilitating efficient and focused collaboration. In some implementations, all assets related to the incident can be aggregated and stored within the incident room dashboard's file storage. This centralized repository ensures that all relevant documents, reports, and data pertaining to the incident are easily accessible, enabling vendors to retrieve and share information efficiently. In FIG. 10E, the incident room dashboard 1000 features an activity trail 1026, which serves as a central audit trail for the incident. This trail records all actions and activities performed throughout the incident's lifecycle, providing a detailed chronological account of events.

Figure 11B:
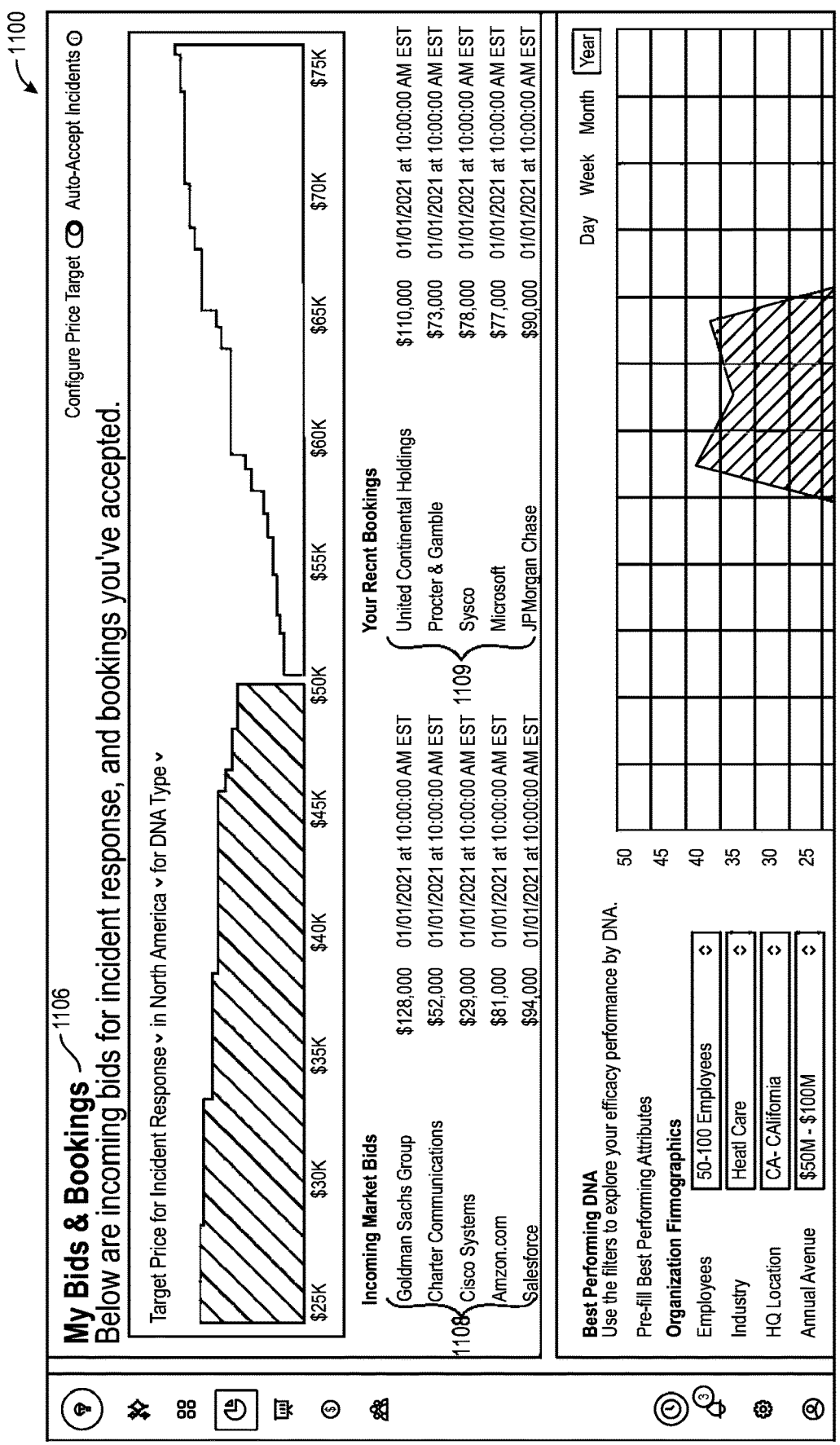

In FIGS. 11A-11D, the vendor metric dashboard 1110 is shown, presenting various market bid and booking metrics. The dashboard includes components such as general market bid and booking metrics 1102, displaying key statistics related to market bids and bookings. Additionally, market incoming market bids 1104 highlights the influx of bids from the market, while recent market bookings 1105 provides insights into the latest bookings made. FIG. 11A provides a visual representation of these features. Within the vendor metric dashboard, vendors can also access their specific bids and bookings through the vendor specific bids and bookings 1106 section, known as "my bids." This allows vendors to track their own performance and activity. Furthermore, vendors can monitor incident-specific bids through the vendor specific incident bids 1108 section, enabling them to stay informed about relevant incidents in which they have expressed interest. Recent bookings made by the vendor are displayed in the vendor specific recent bookings 1109 section, as shown in FIG. 11B.

Figure 11C:
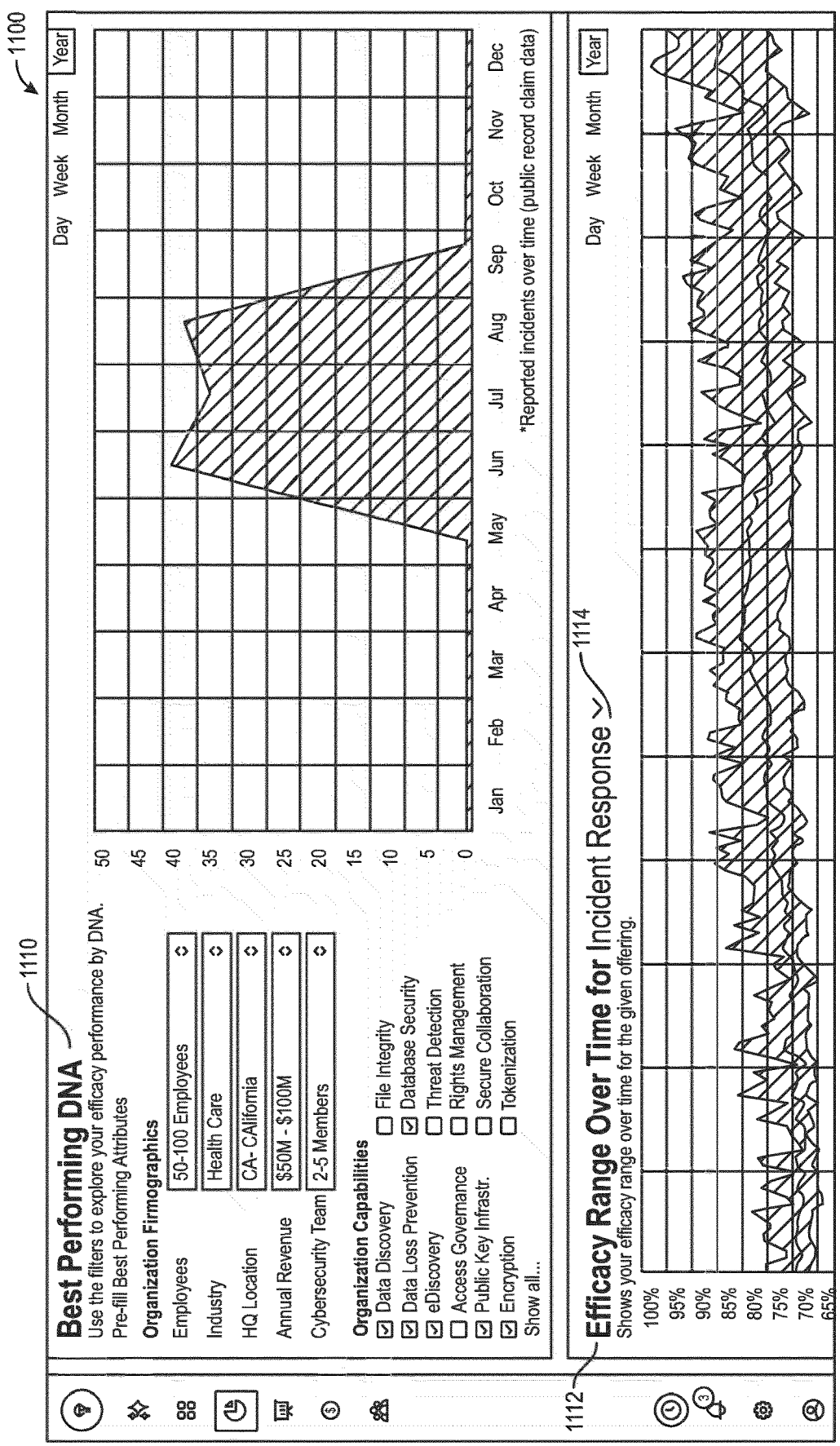
Figure 11D:
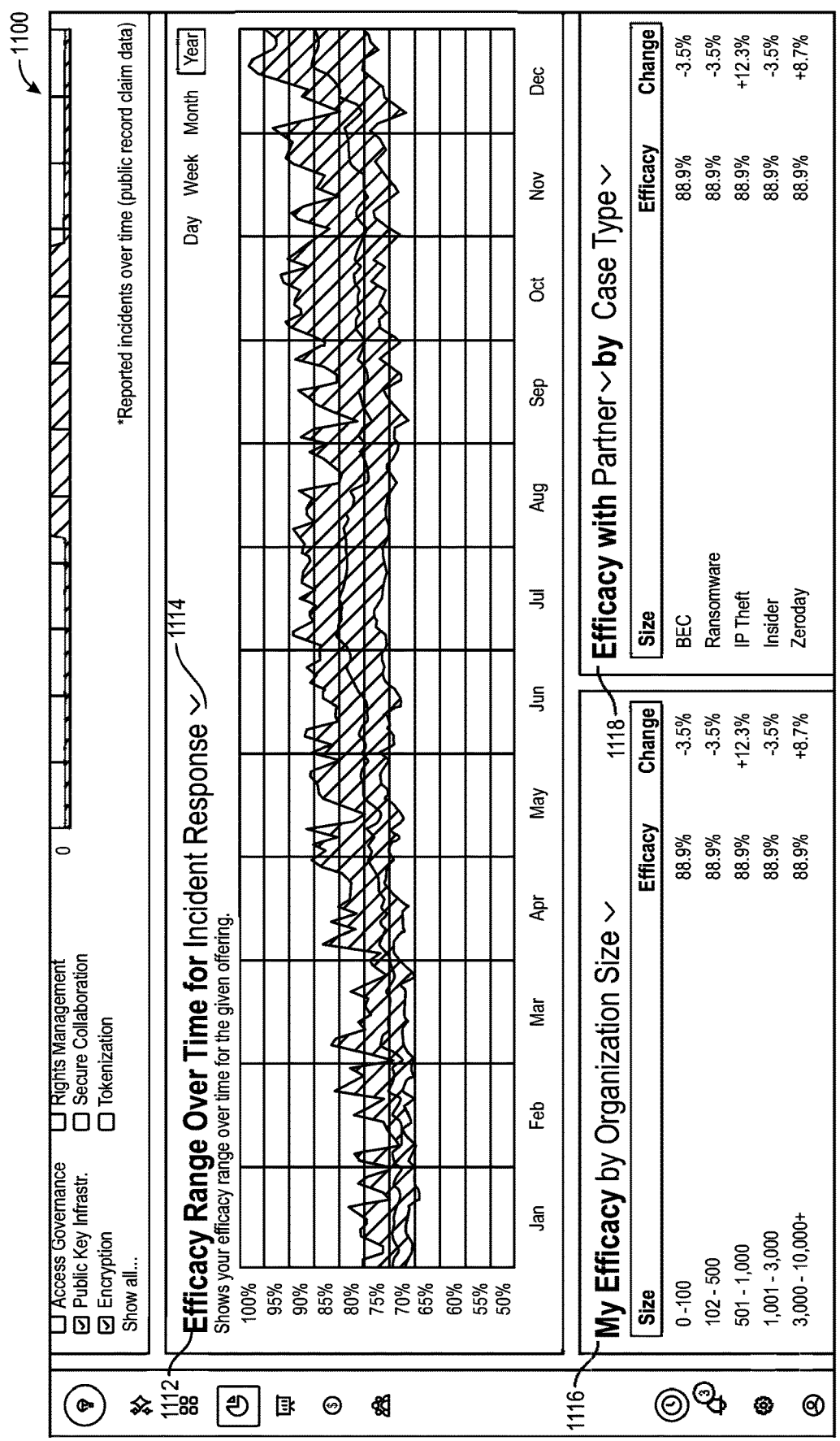

Efficacy metrics are also highlighted in FIG. 11C. The dashboard presents best performing DNA metrics 1110, showcasing the metrics that indicate the vendor's optimal performance. Efficacy metrics 1112 can be adjusted using the drop-down menu 1114, providing a flexible and customizable view of the vendor's effectiveness in different areas. These metrics allow vendors to evaluate and optimize their performance based on specific criteria. In FIG. 11D, the efficacy metric 1116 for the vendor is displayed, offering a clear representation of the vendor's performance. Additionally, the partner efficacy metric 1118 provides insights into the effectiveness of collaborative partnerships with other entities. Accordingly, the interactive items and actionable items available within these dashboards empower vendors to make informed decisions and take appropriate actions based on the provided data. By leveraging these comprehensive vendor dashboards, vendors can track their market presence, evaluate their efficiency and efficacy metrics, monitor their bids and bookings, and assess their performance in relation to partners. This level of visibility and control enables vendors to make strategic decisions and optimize their operations within the context of the marketplace.

Figure 12:
FIG. 12 depicts an example graphical user interface, according to some arrangements.
Figure 13C:
Figure 13D:
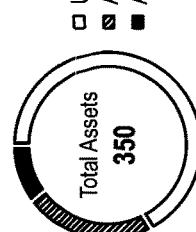
Figure 13E:
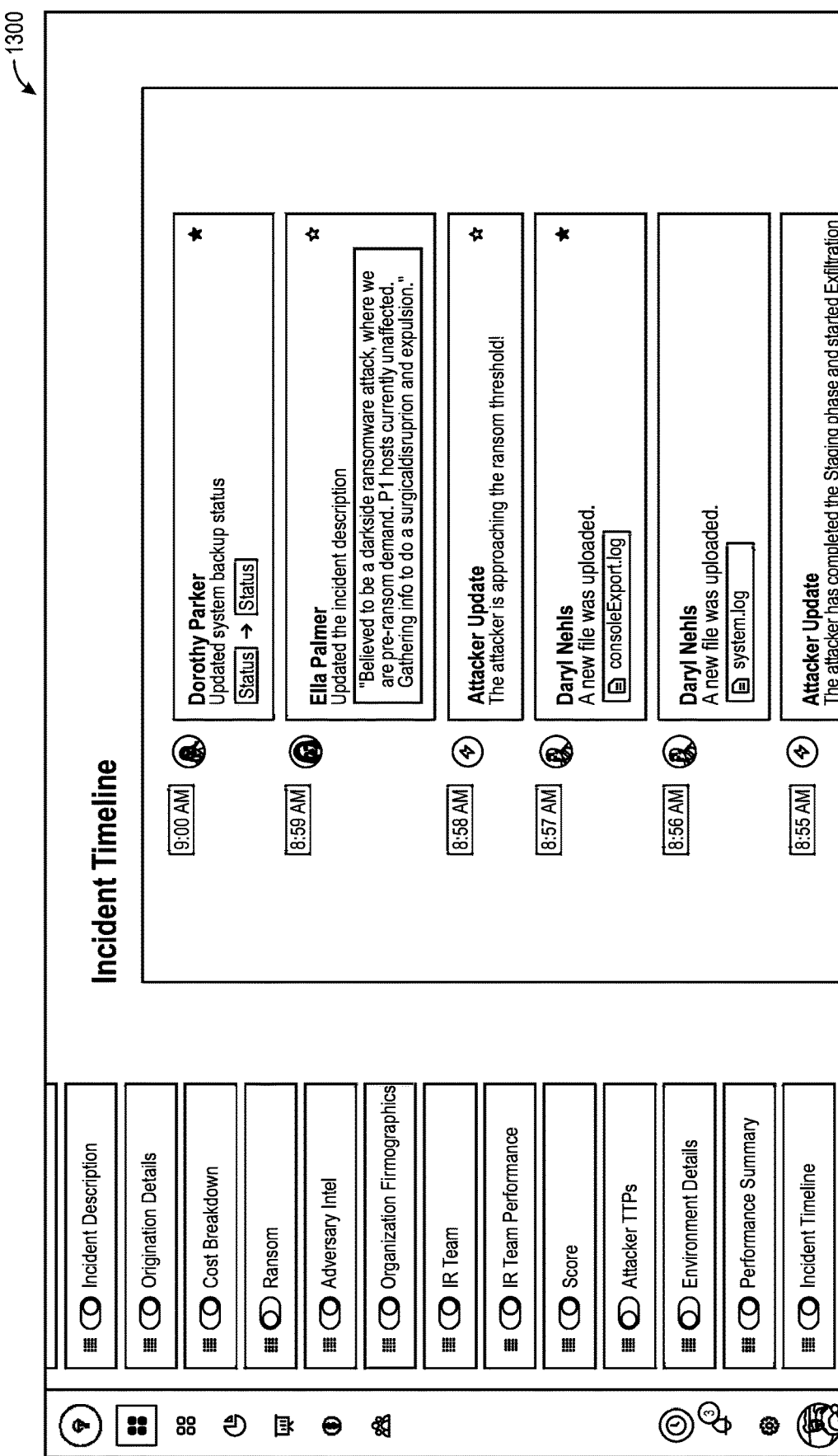

Referring now to FIG. 12, the service agreement interface 1200 can be provided to an organization (e.g., in response to an identified incident at an organization). In general, a contract proposal can include a plurality of content and actionable objects (or items) within the service agreement interface 1200. As shown, an estimate associated with a service agreement can be presented that included actionable objects (e.g., can be selected) that can decline or accept a proposal (e.g., from a vendor, or from an organization). In some implementations, the service agreement interface 1200 offers the organization two options: decline or accept the offer for services. This interface presents the organization with the relevant details and terms of the service agreement, ensuring transparency and clarity. Through a user-friendly interface, the organization can thoroughly review the proposal and make an informed choice. As shown, the service agreement interface 1200 allows the organization to decline 1202 or accept 1204 the offer for services by one or more vendors.

Referring now to FIGS. 13A-13E, a post-incident report dashboard 1300 can be presented as a tool that allows vendors to generate detailed reports summarizing the key aspects of an incident. In FIGS. 13A-13E, the post-incident report dashboard 1300 showcases the ability of vendors to provide an overview of the incident, ensuring that all involved parties gain a comprehensive understanding of the event's occurrence and its management. Additionally, as shown, the vendor can enable or disable various features using the on/off interactable button switches (e.g., incident description, incident details, cost breakdown, etc.). In some implementations, the post-incident report dashboard 1300 includes various sections that offer insights into different aspects of the incident. For example, vendors can provide IR team performance statistics and metrics, allowing stakeholders to assess the effectiveness and efficiency of the incident response efforts.

In some implementations, the report also encompasses details about the incident, such as its origin and contextual information. This information helps provide a clear understanding of the incident's background and circumstances. Furthermore, the post-incident report dashboard 1300 can present a breakdown of the costs associated with the incident, enabling stakeholders to gain insights into the financial implications of the event. In particular, to provide a comprehensive view of the incident, the post-incident report dashboard 1300 incorporates environment details that outline the specific systems or networks affected. Another component of the post-incident report dashboard 1300 can be the task summaries and working time by each team member. This feature allows vendors to outline the specific tasks performed by individual team members during the incident response process. In some implementations, the incident timeline is provided in the post-incident report dashboard 1300. It can provide a chronological sequence of events, capturing the key milestones and actions taken throughout the incident's lifecycle.

Figure 14A:
FIGS. 14A-14B depict example graphical user interfaces, according to some arrangements.
Figure 14B:

Referring now to FIGS. 14A-14B, an invoice 1400 is shown, a generated and provided invoice that allows an entity, after receiving services from a vendor, to pay the invoice by selecting selectable button 1402. The invoice 1400 details the services rendered by the vendor, including the nature of the cybersecurity incident addressed, the duration of service provision, and the corresponding costs. Upon clicking the selectable button 1402, the entity is redirected to a secure payment portal where they can choose from various payment options, facilitating a secure transaction.

Figure 15A:
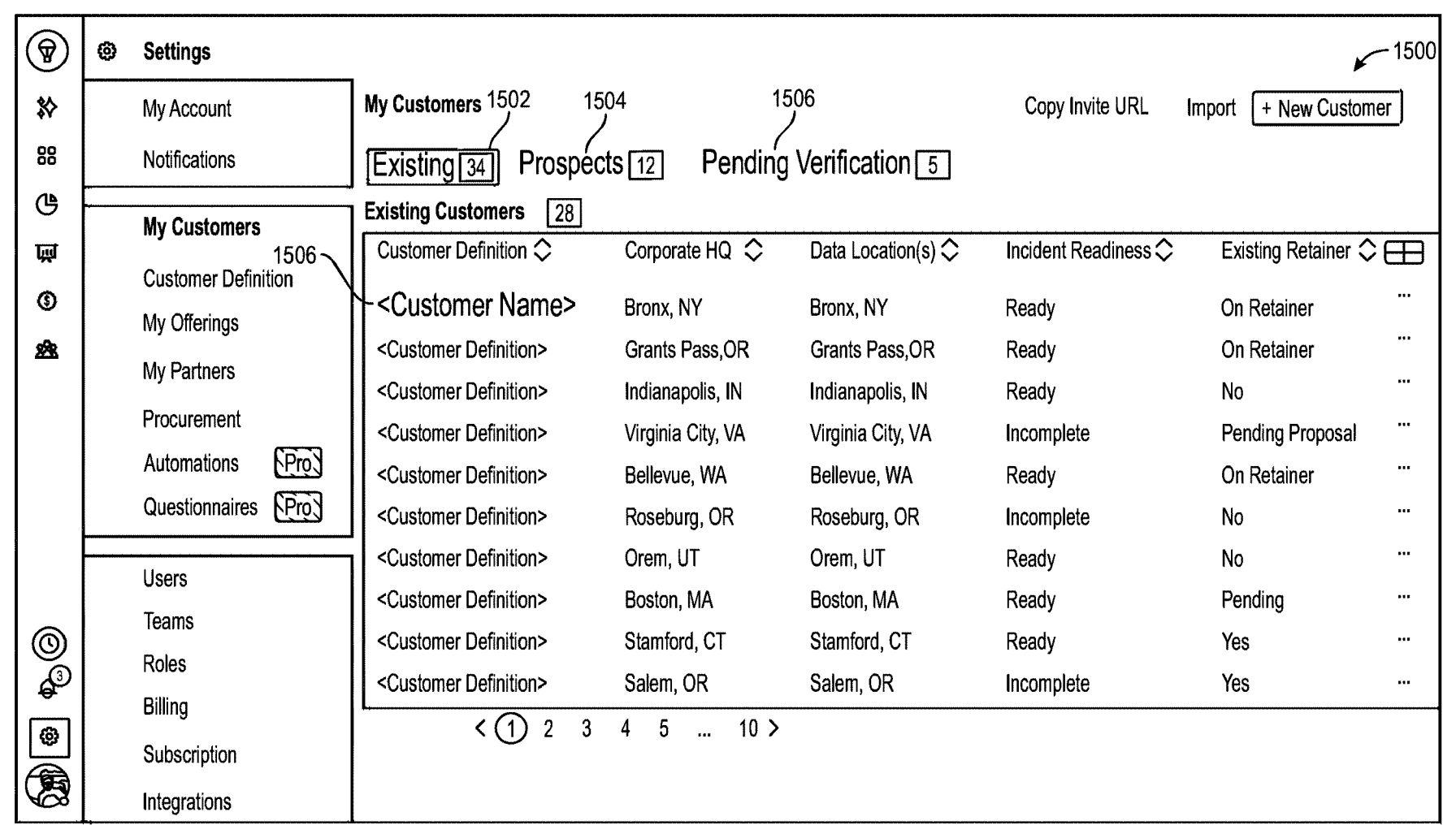
Figure 15B:
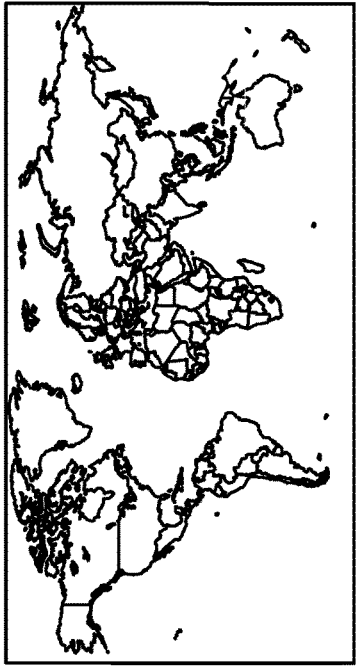

Referring now to FIGS. 15A-15G, the vendor setup dashboard 1500 is shown, allowing a vendor to customize, review, and update their offerings (sometimes referred to herein as "cybersecurity protection plans"), customers and firmographics, partners, procurement (e.g., purchase options, resellers), automations, roles, and team members. In FIG. 15A, interactive items 1502, 1504, and 1506 provide vendors with easy access to critical customer-related information. By selecting these items, vendors can view existing customers, prospective customers, and pending verifications, respectively. The accompanying list 1508 offers a clear overview of customers, aiding vendors in maintaining a comprehensive record. Additionally, some features can be considered "Pro" features that are enabled in response to a payment or accumulation of activity (e.g., after continuously using the dashboards for 3 months). In some arrangements, the "Pro" features can be enabled if the vendor enrolls in an advertisement tier such that advertisement may be presented on the dashboards.

Figure 15C:
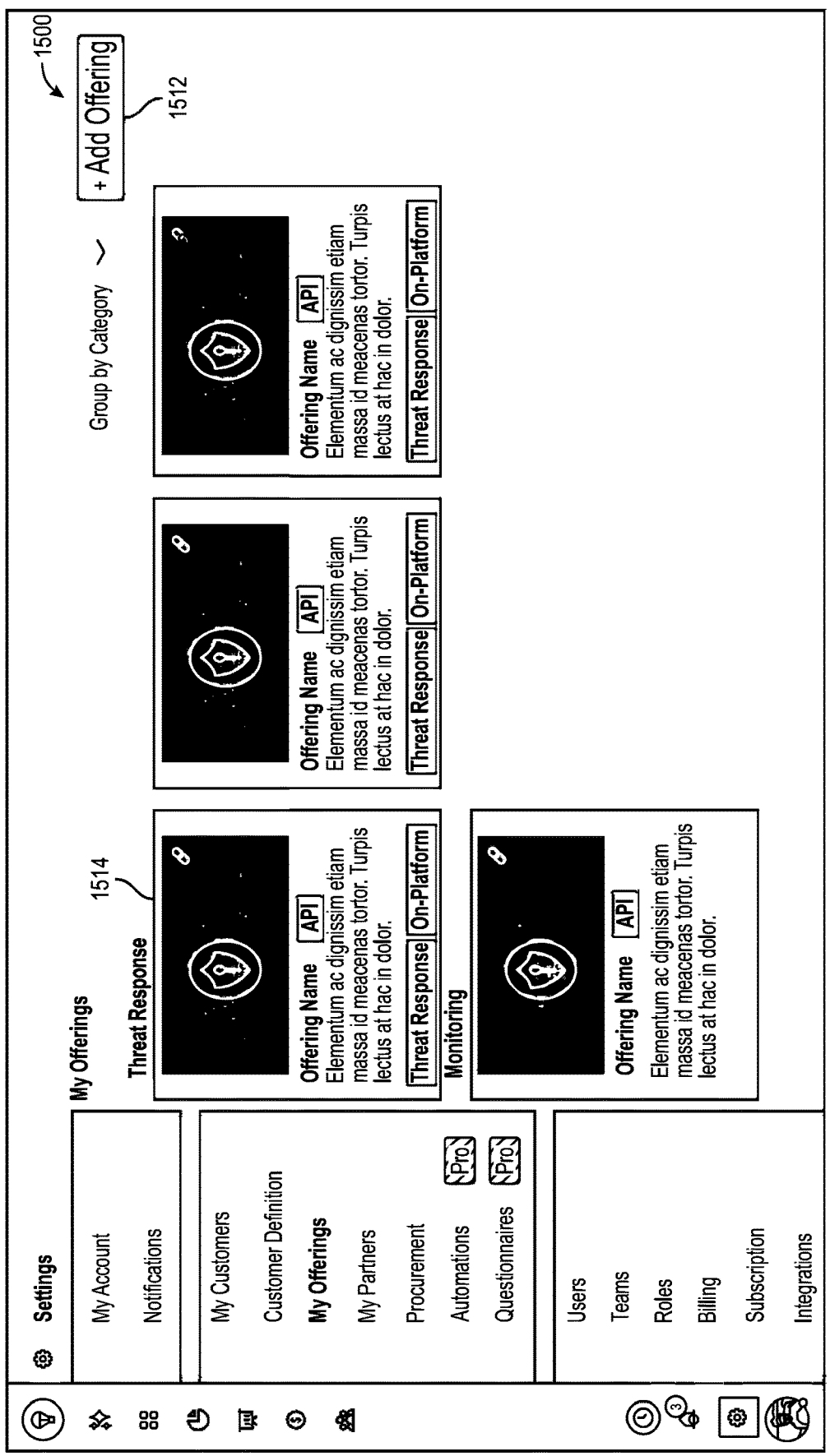

FIG. 15B enables vendors to define their target customer base and estimate potential opportunities. Through interactive sliders, vendors can customize the criteria for evaluating opportunities, such as location, organization size, and type. This flexible feature empowers vendors to narrow or broaden their focus, aligning their offerings with specific market segments. Turning to FIG. 15C, vendors can review and manage their offerings. For example, the interface provides a detailed overview of existing offerings, while the interactive item 1512 allows vendors to easily add new offerings. This streamlined process ensures that vendors can continually update and refine their product or service portfolio.

Figure 15D:
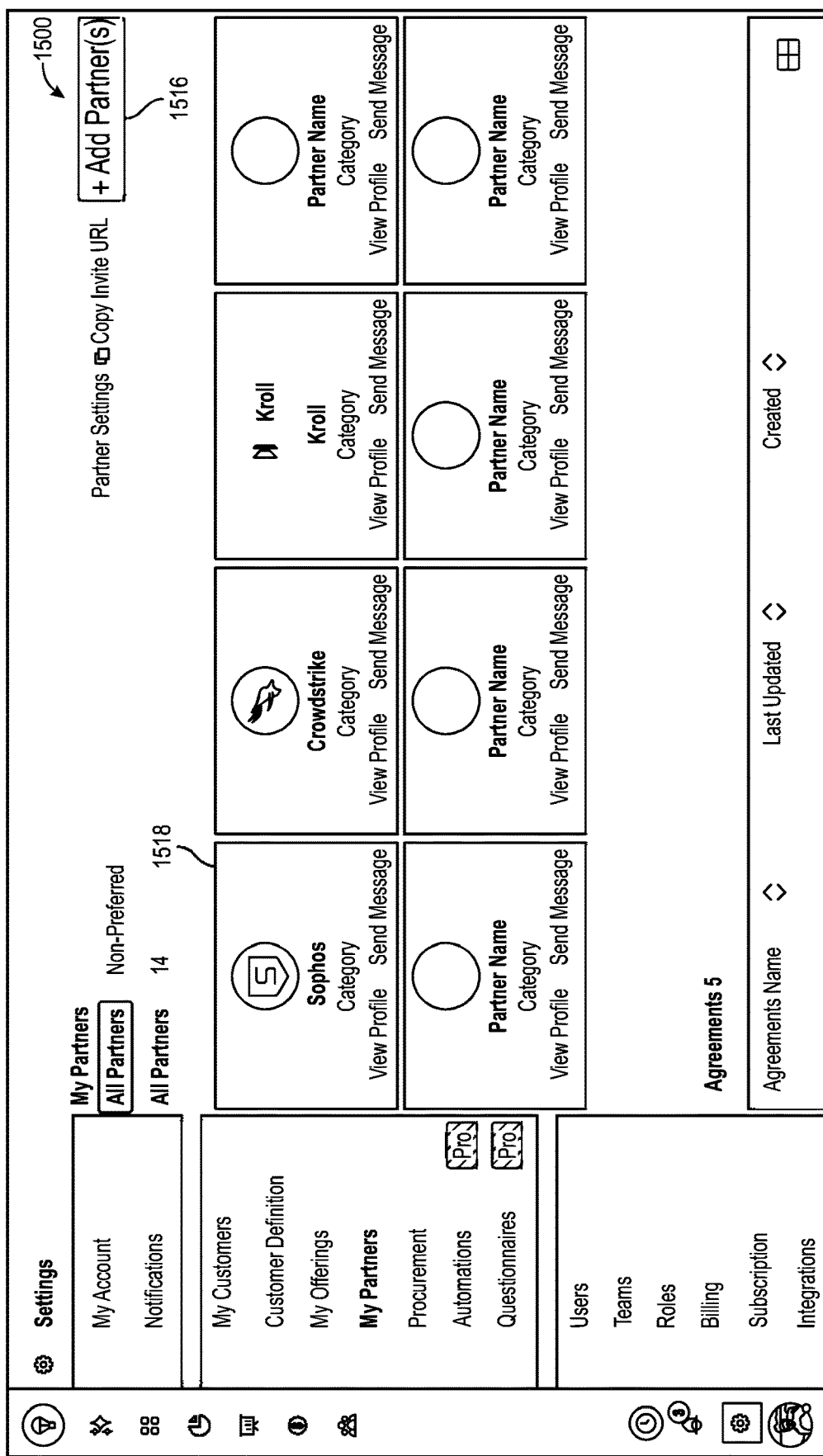
Figure 15E:
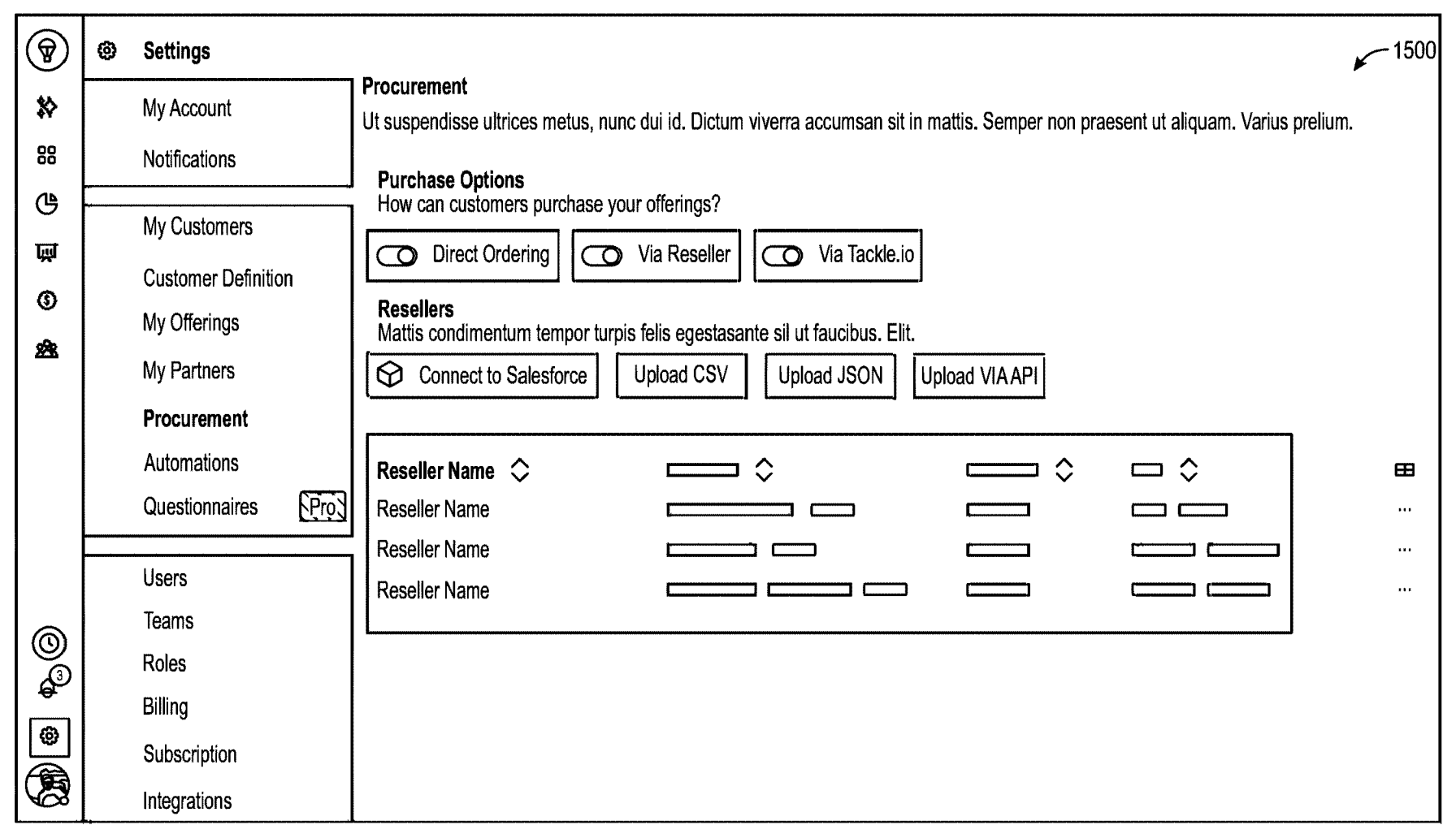

In FIG. 15D, vendors have the ability to establish partnerships with other entities. By selecting the interactive item 1516, vendors can initiate the partner setup process and review their existing partners in the accompanying interface 1518. This facilitates collaboration and expands the reach of vendors' offerings. FIG. 15E introduces the configuration of procurement options and resellers. For example, vendors can easily set up purchase options and specify resellers, ensuring a smooth and efficient procurement process within their ecosystem.

Figure 15F:
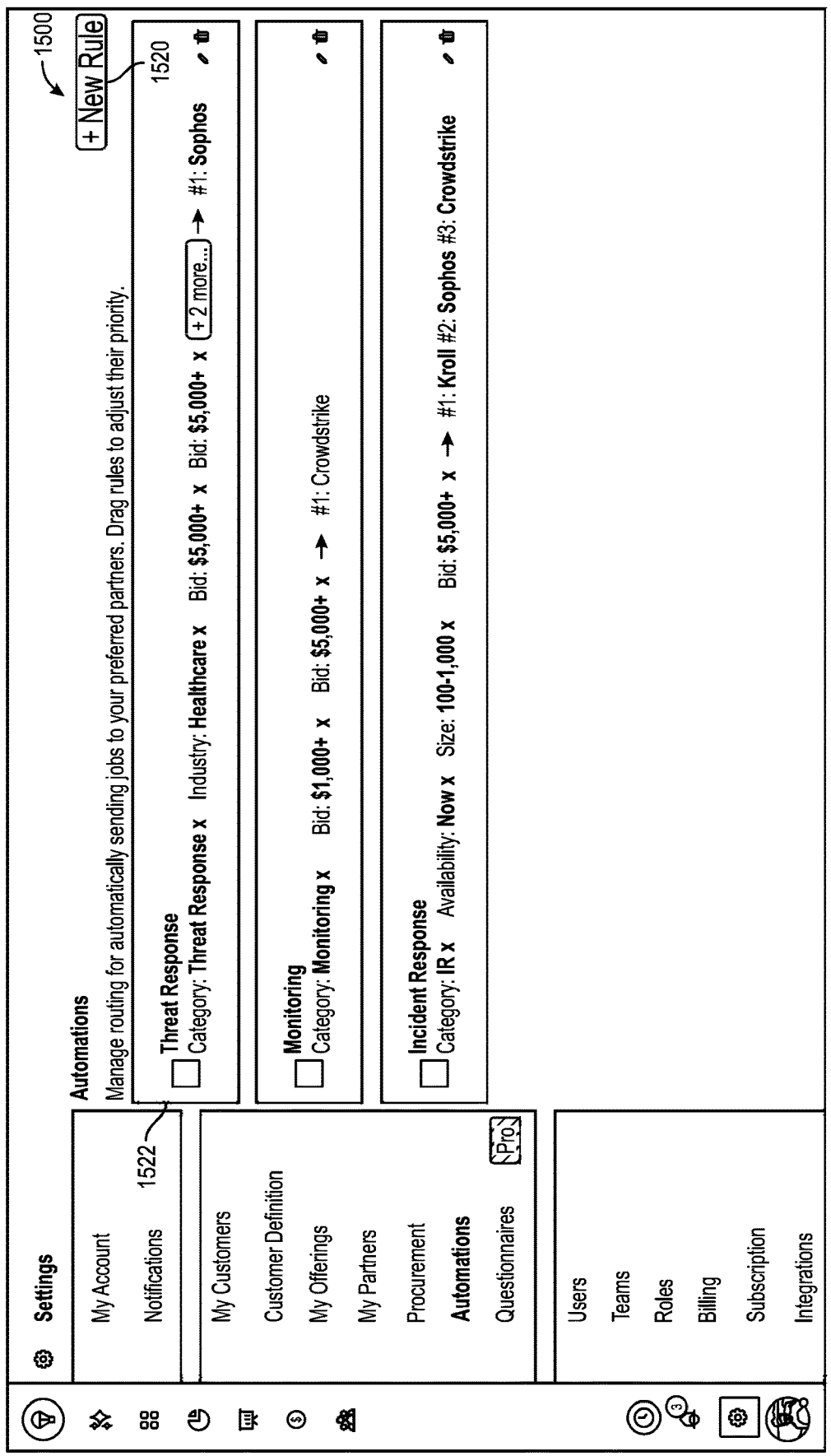
Figure 15G:
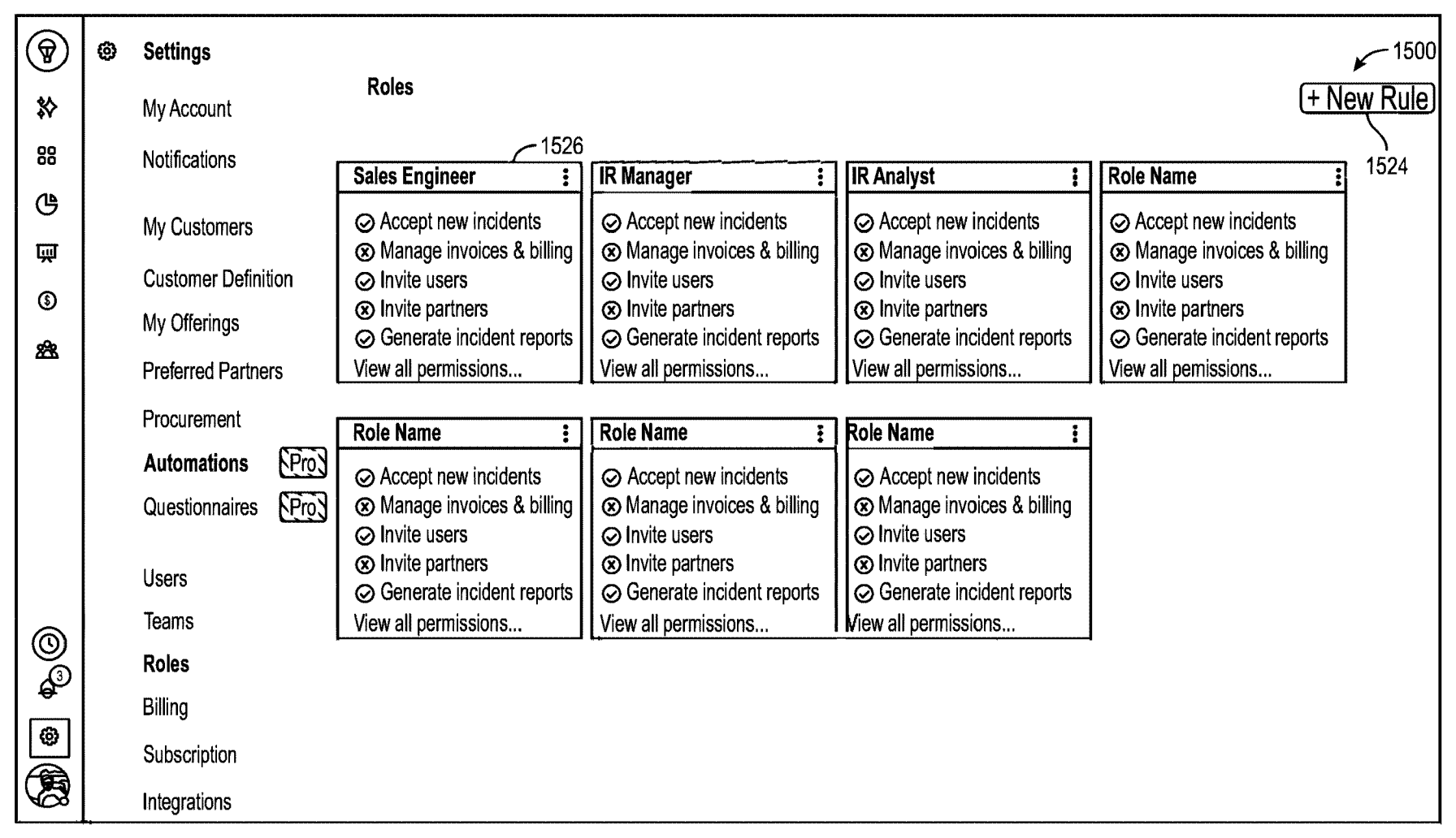

FIG. 15F empowers vendors to configure automations to streamline their operations. By utilizing the interactive button 1520, vendors can add various rules that govern different aspects of their business. For example, these rules can include threat response rules, monitoring rules, and incident response rules, among others. This automation capability enhances efficiency and enables vendors to respond promptly to potential incidents. FIG. 15G allow vendors to create new rules 1524 and assign specific roles 1526 to individuals within their organization. For example, roles, such as sales engineer, can be defined with granular permissions, allowing individuals to accept new incidents, invite users, generate incident reports, and perform other designated tasks. This fine-grained role assignment ensures proper division of responsibilities and access privileges.

Figure 16A:
Figure 16B:
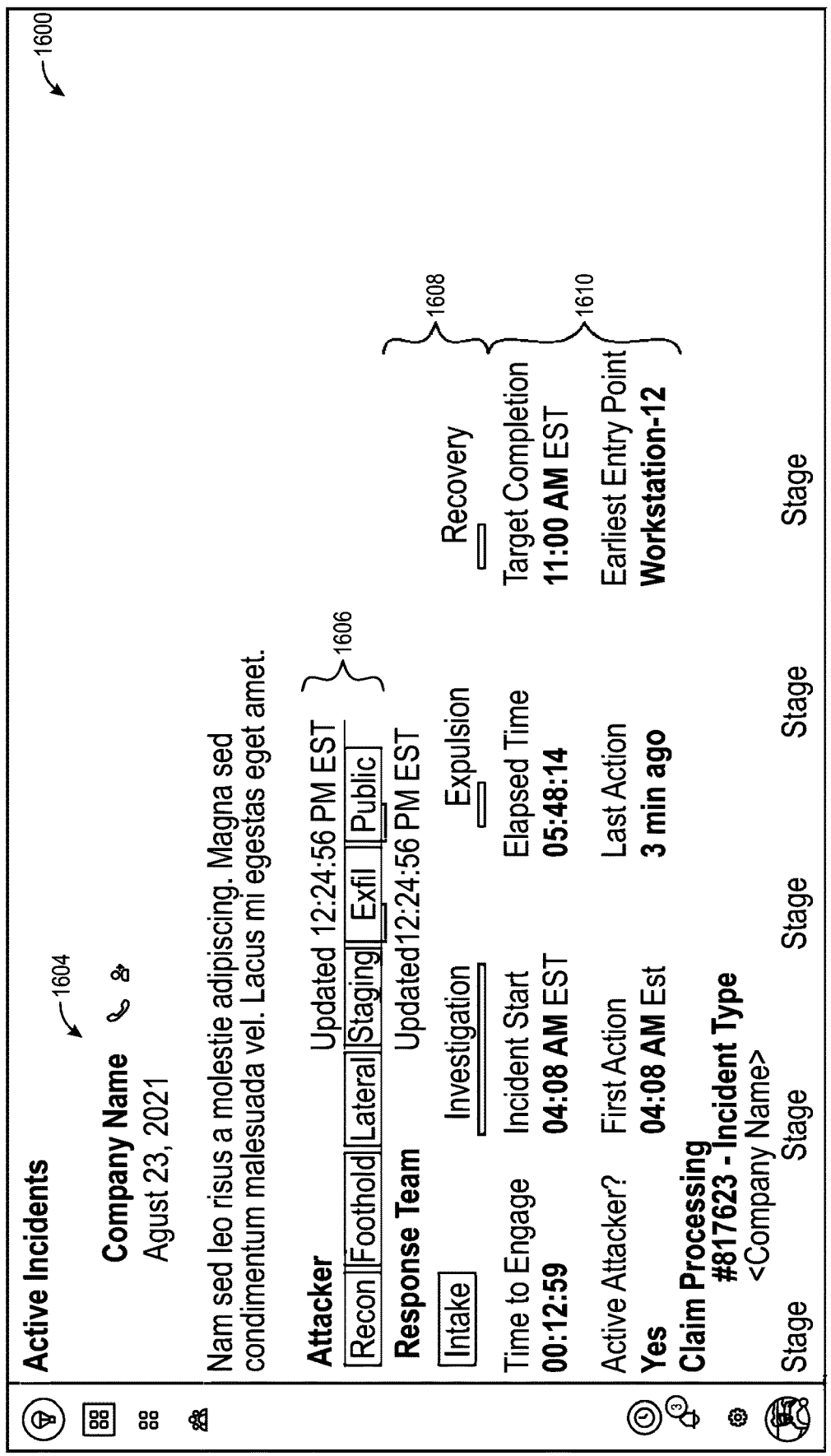

Referring now to FIGS. 16A-16D, the vendor incident dashboard 1600 is shown, presenting various incidents, including inbound incidents 1602 and 1606 and active incidents 1604, shown in FIGS. 16A and 16B. Inbound incidents can automatically allow the vendor to send a contract using send contract interactive item 1608, add a team using team interactive item 1610, or allow the vendor to view details of the incident using details interactive item 161, shown in FIG. 16C2. The contract can be sent to an organization that is depicted n FIG. 16D that allows the organization to accept or decline.

Figure 16C:
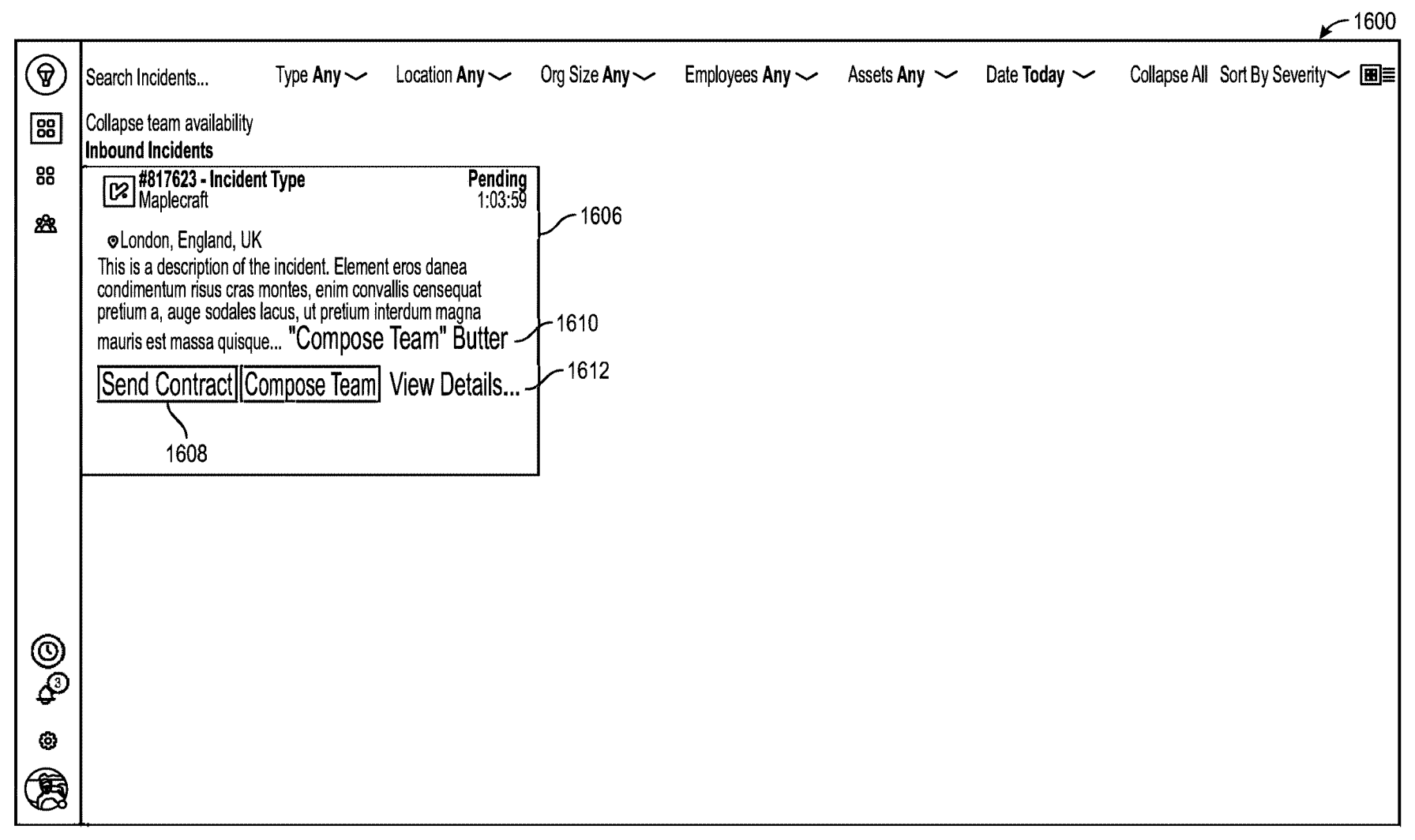

In some implementations, inbound incidents are prominently displayed on the vendor incident dashboard, as depicted in FIGS. 16A and 16B. The dashboard provides an overview of these incidents, enabling vendors to quickly assess their nature and severity. Interactive items are incorporated into the interface to streamline the incident response process. For instance, the send contract interactive item 1608 allows vendors to promptly send a contract to the organization associated with the incident. By selecting this option, the vendor initiates the contractual process, providing the necessary legal framework for collaboration. Furthermore, the team interactive item 1610 facilitates seamless team management within the vendor incident dashboard. Vendors can easily add team members to the incident response team by utilizing this interactive item. This feature promotes effective coordination and communication among team members, enhancing the overall incident resolution process. The details interactive item 1612, as illustrated in FIG. 16C, grants vendors access to comprehensive incident information. By selecting this item, vendors can delve deeper into the specifics of the incident, such as its origin, impact, and relevant contextual details. This detailed overview assists vendors in gaining a thorough understanding of the incident, enabling them to provide more targeted and efficient support.

Additionally, FIG. 16D depicts how the vendor can send a contract to the organization involved in the incident. The contract is transmitted through an interface, allowing the organization to carefully consider the terms and conditions. Within this interface, the organization is presented with the option to accept or decline the contract. This interactive feature streamlines the contracting process, enabling swift decision-making and fostering effective collaboration between the vendor and the organization.

Figure 17:
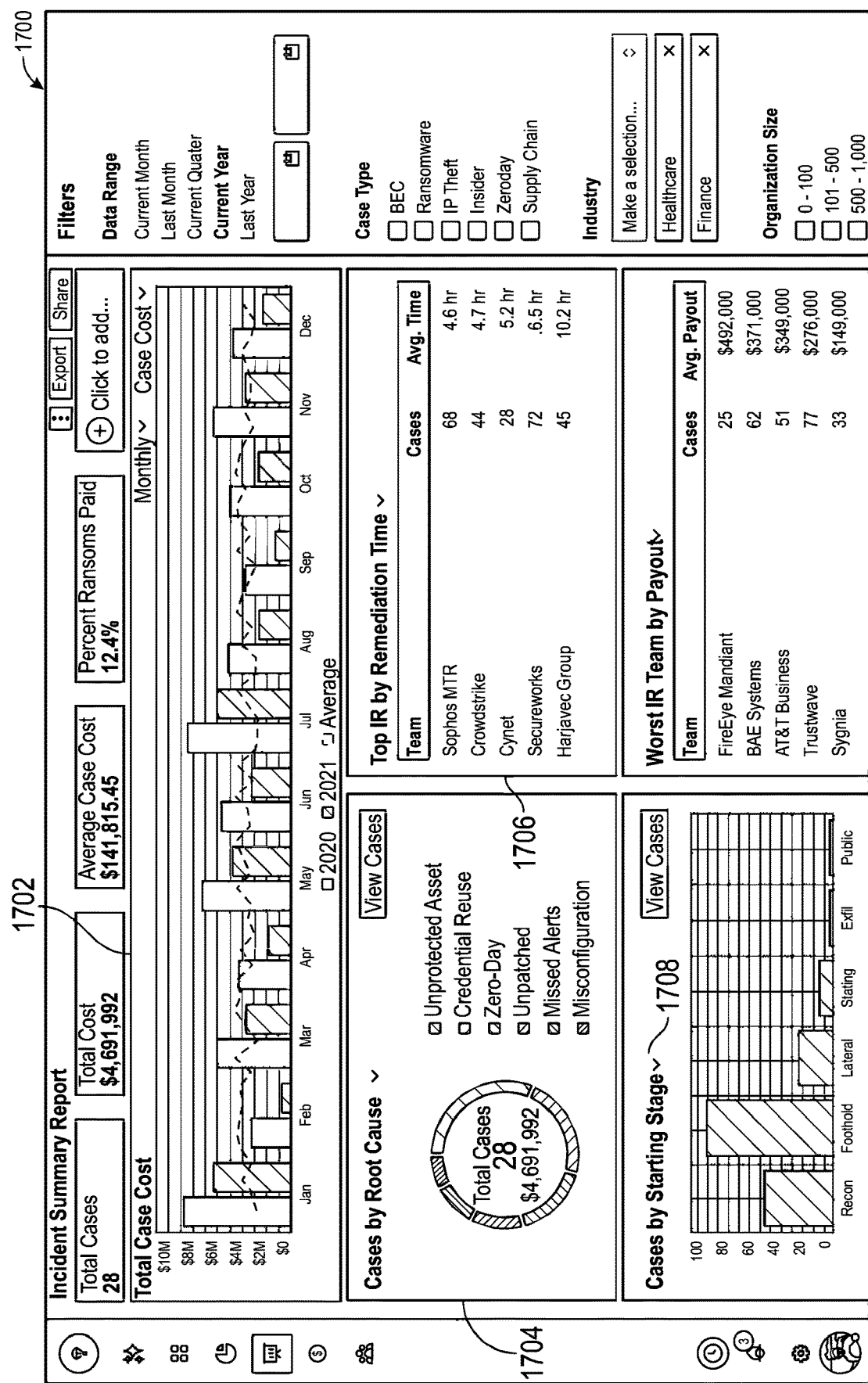
FIG. 17 depicts an example graphical user interface, according to some arrangements.

Referring now to FIG. 17, an incident summary dashboard 1700 that includes an overview of incidents of the entity. The dashboard 1700 includes various graphical representations 1702, illustrating metrics such as the total number of cases handled, the cumulative cost of remediation, and the percentage of incidents involving ransom payments. These metrics provide a high-level overview of the entity's cybersecurity incident history, enabling a quick evaluation of the overall situation. In some arrangements, the incident summary dashboard 1700 further enriches this overview with additional metrics 1704, 1706, and 1708.

These metrics delve deeper into the nature and handling of the incidents. For instance, they may include the average time taken to remediate an incident, which could highlight the efficiency of the incident response process and identify potential areas for improvement. The root causes of incidents are also displayed, providing insights into the types of threats frequently encountered by the entity. The dashboard 1700 can also display the highest payouts made by particular incident response teams.

Figure 18A:
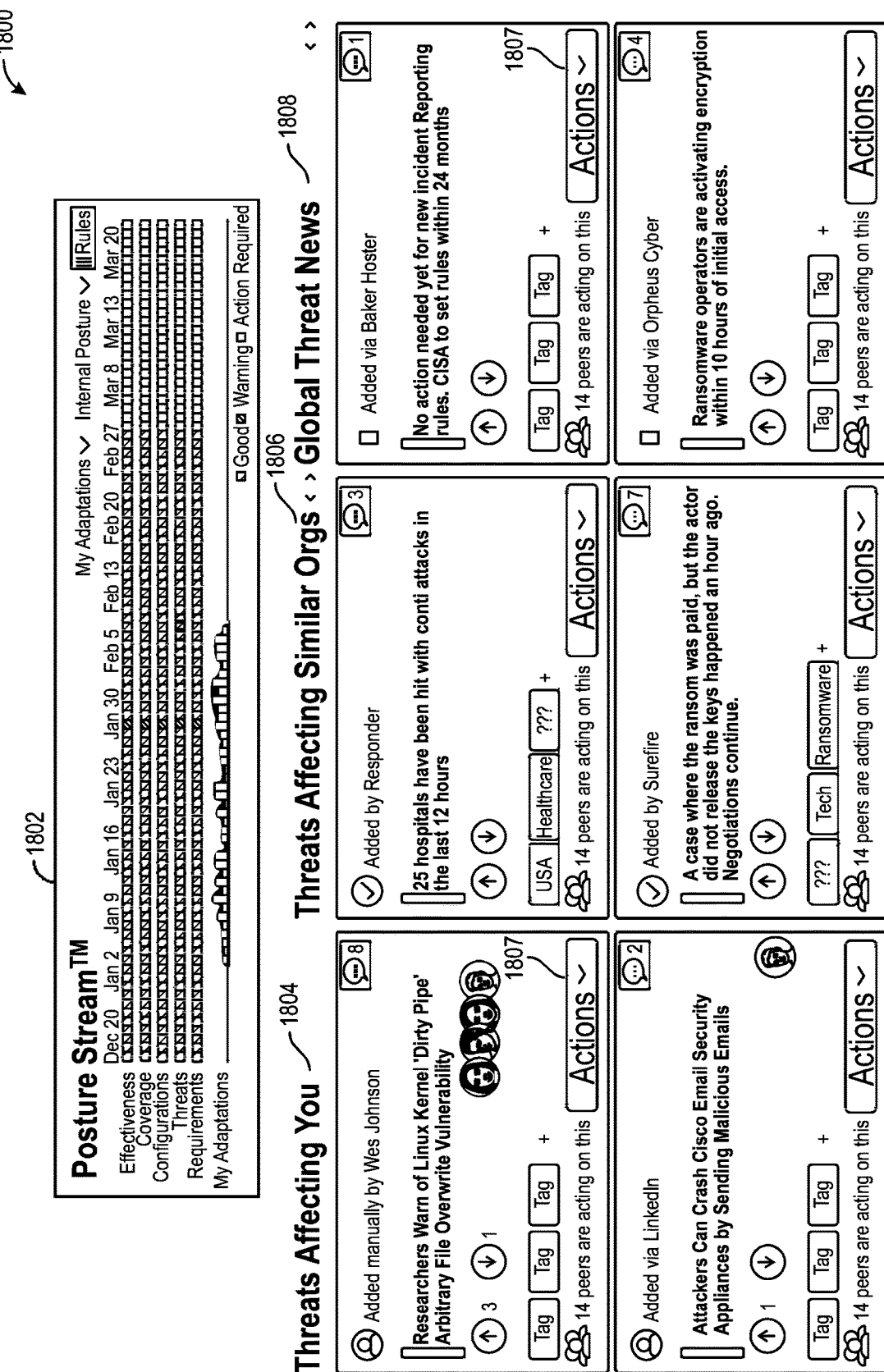

Referring now to FIGS. 18A-18C, a posture dashboard 1800 that includes a posture stream 1802 and real-time (or near real-time) information associated with threats (e.g., threats affecting you 1804, threats affecting similar orgs 1806, and global threat news 1808). The posture dashboard 1800 can also provide three different lenses through which to view the cybersecurity threat landscape. The "threats affecting you" section 1804 offers information about threats directly targeting the entity, providing real-time updates and context. For instance, it may show whether peers within the industry are also addressing the same threat, offering comparative insights and potentially guiding response strategies. For example, in FIG. 18C, the treats affecting you can include real-time information about the particular threat, if the entities peers are acting on it, and action buttons allowing the entity to perform various actions. Action buttons within this section allow the entity to quickly respond to threats. These may include options to investigate further, escalate the threat to a response team, or activate specific protection measures. The "threats affecting similar orgs" section 1806 provides an overview of threats impacting entities with similar profiles. The "global threat news" section 1808 offers a wider perspective, delivering updates on significant cybersecurity incidents and trends worldwide.

Expand on FIG. 18A, the posture dashboard 1800 provides a view of the cybersecurity threat landscape, allowing the entity to stay informed and proactive in addressing potential risks. The posture stream 1802 captures and records the entity's posture and coverage levels over time, taking into account various factors such as the locations of data (e.g., EC2 servers in AWS), the implemented safeguards (e.g., EPP, CSPM), and the specific threats that could target the entity's environment based on real incidents. By continuously monitoring and assessing this combination of factors, the system determines the current state of the entity's security posture, representing it as a dynamic and immutable record. This enables the entity to gauge its security readiness and identify any areas that require attention or improvement. By providing visual indicators such as green, yellow, or red, the posture dashboard 1800 offers an overview of the entity's overall security status at any given point in time. This empowers the entity to make informed decisions, allocate resources effectively, and implement timely measures to mitigate risks and maintain a robust cybersecurity posture.

In FIG. 18B, the posture dashboard 1800 also includes recommended capabilities tailored to the entity's specific needs. These capabilities can be easily added by selecting the interactable buttons 1808 and 1810, streamlining the process of enhancing the entity's cybersecurity posture. Further, the entity can configure automated protection measures through "adaptation rules" like assessment management 1812. These are automated actions designed to protect the entity's assets and environment, such as initiating vulnerability scans or activating intrusion prevention systems when certain conditions are met.

Figure 19:
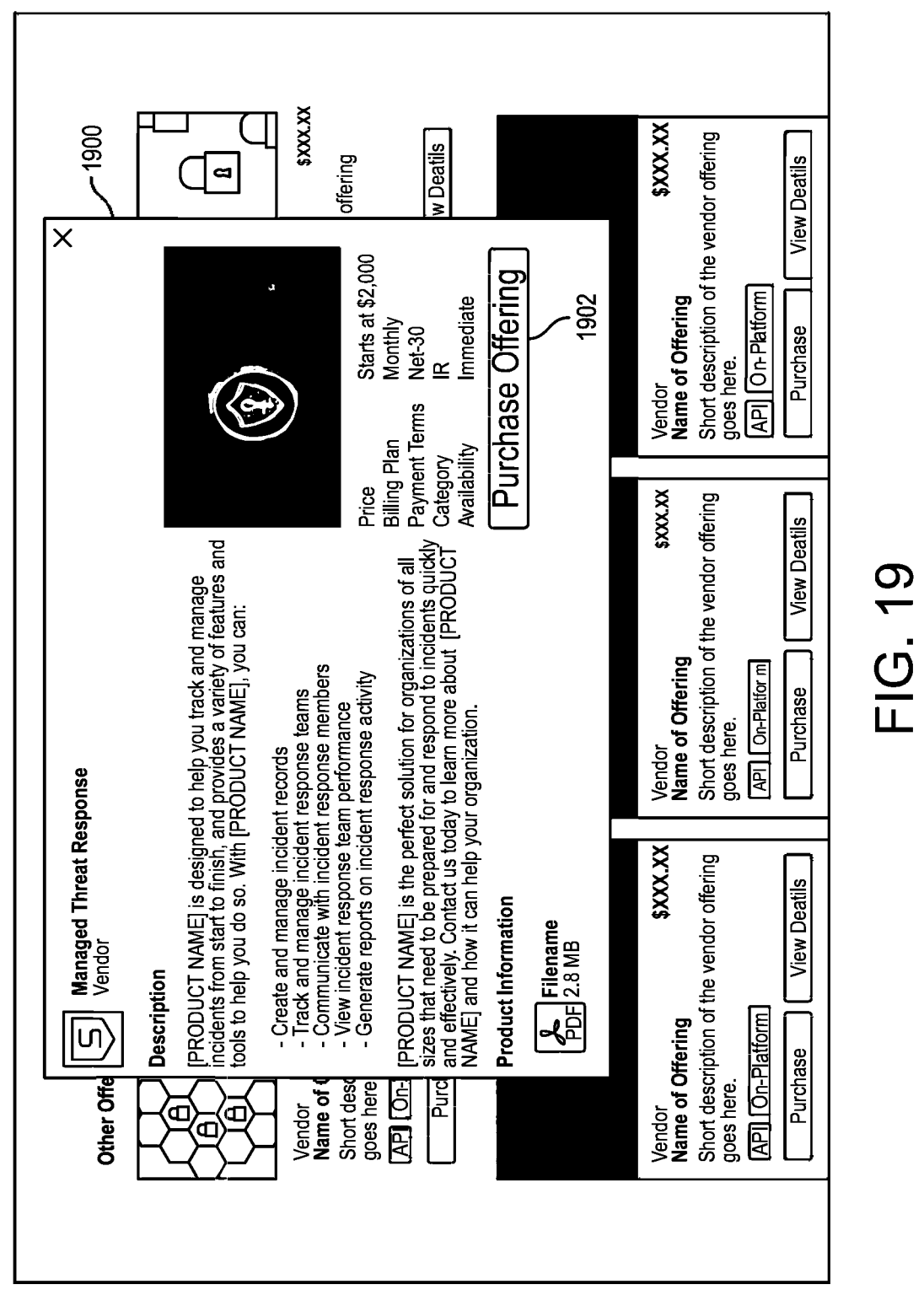

Referring now to FIG. 19, the offering dashboard 1900 serves as a comprehensive interface for entities interested in purchasing a cybersecurity offering. Upon selecting a particular offering, the dashboard provides a detailed breakdown of the product, including essential information about its capabilities and features. The entity can review what specific tasks the offering can perform—for example, the creation and management of incident records. Additionally, the dashboard provides clarity on the financial side, presenting the price and the billing plan associated with the offering. It ensures transparency, allowing the entity to assess the value proposition of the offering fully. To streamline the purchasing process, a selectable button 1902 is included on the dashboard. Upon clicking this, the entity can seamlessly proceed with the purchase, making the acquisition of the offering a user-friendly and straightforward process.

Referring now to FIGS. 20A-20B, the vendor dashboard 2000 provides an entity with a platform to identify and select vendors they wish to engage for various cybersecurity plans. It facilitates the selection of multiple vendors concurrently, allowing the entity to choose vendors offering distinct cybersecurity protections to create a diversified and robust security portfolio. The dashboard presents information about each vendor, including their qualifications and current availability status. Additionally, the entity can also invite vendors (e.g., by selecting selectable button 2010) after reviewing vendor qualifications and information presented in vendor dashboard 2000 and their current state such as available now state, available in 75 minutes (i.e., available pending state), or unavailable state. Invitations can be sent directly from the dashboard by selecting the appropriate button 2010. An example of the dashboard's functionality can be seen with the vendor Sophos MTR, marked as the best fit 2006 and available now 2012. The entity can easily select this vendor by checking the corresponding checkbox 2008. In contrast, another vendor might be shown as available in 30 minutes, as indicated by state element 2014, but also marked as off-panel, implying they do not currently have an account on response system 130.

Figure 21A:
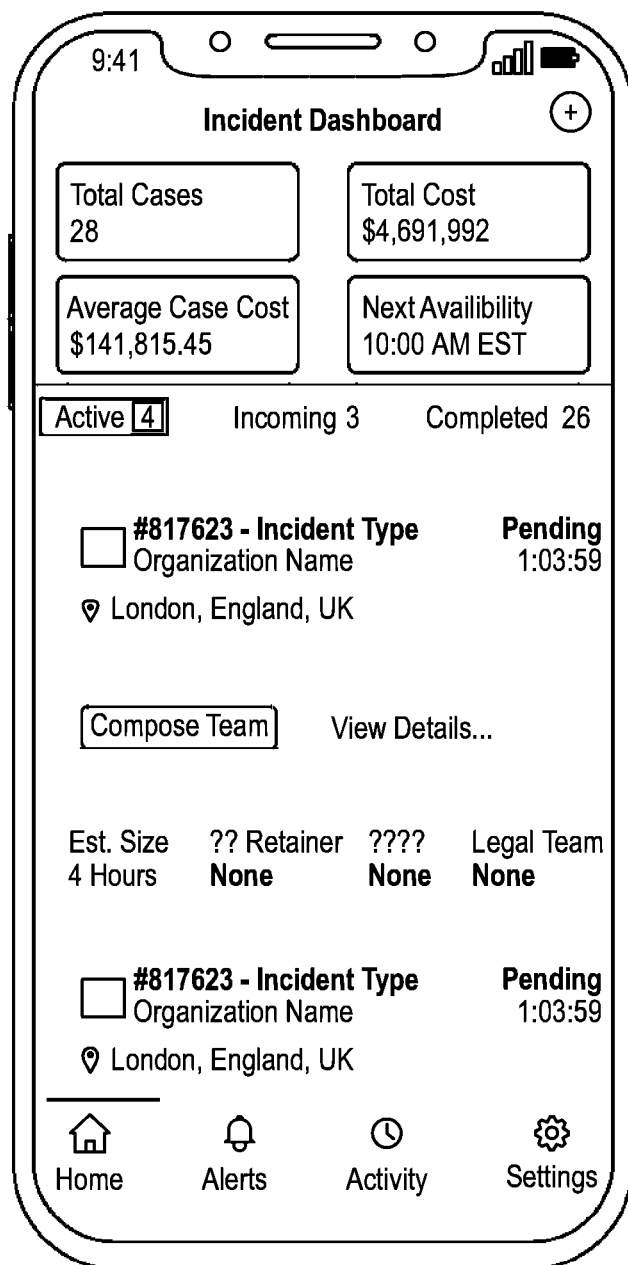
FIGS. 21A-21B depict example graphical user interfaces, according to some arrangements.
Figure 21B:
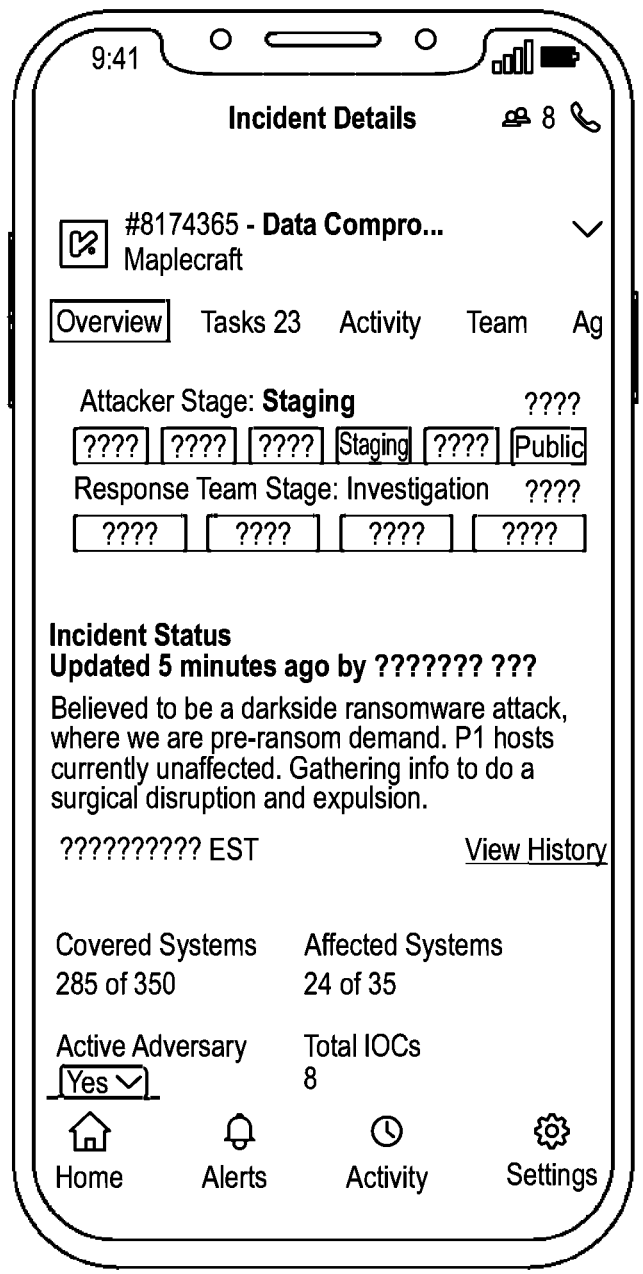

Referring now to FIGS. 21A-21B, a mobile application 2100 can be configured as a pocket companion for Incident Response (IR) vendors, enabling them to engage, monitor, and respond to incidents directly from their mobile devices such as phones, tablets, or VR/AR glasses. With the mobile app, vendors have the convenience and flexibility to handle incidents anytime, even in urgent situations when they are away from their home office. The mobile application 2100 offers a transition of the features and functionality described in the desktop version (FIGS. 10A-10E) to a mobile interface. Vendors can access their incident dashboard, providing an overview of all active incidents. They can efficiently navigate to individual incidents, review detailed information, and track the progress of ongoing tasks. By monitoring activity within the mobile application 2100, vendors stay informed about updates and can quickly respond to any developments.

In some implementations, the mobile application 2100 also facilitates team collaboration by displaying the team members involved in each incident. Vendors can identify their colleagues, fostering efficient communication and coordination. Furthermore, the mobile application 2100 provides visibility into existing agreements, ensuring vendors have immediate access to relevant contractual details. In some implementations, to enhance responsiveness and situational awareness, the mobile application 2100 includes an alerts feature. This feature aggregates alerts from multiple incidents, allowing vendors to monitor critical notifications and stay informed about significant events or changes. The mobile application 2100 delivers a user-friendly interface optimized for mobile devices, enabling vendors to engage with incidents, review details, manage tasks, monitor activity, collaborate with team members, and access important agreements-all while on the go. This mobile experience empowers IR vendors to stay connected and effectively respond to incidents, regardless of their physical location, providing agility and convenience to their incident response efforts.

Figure 22:
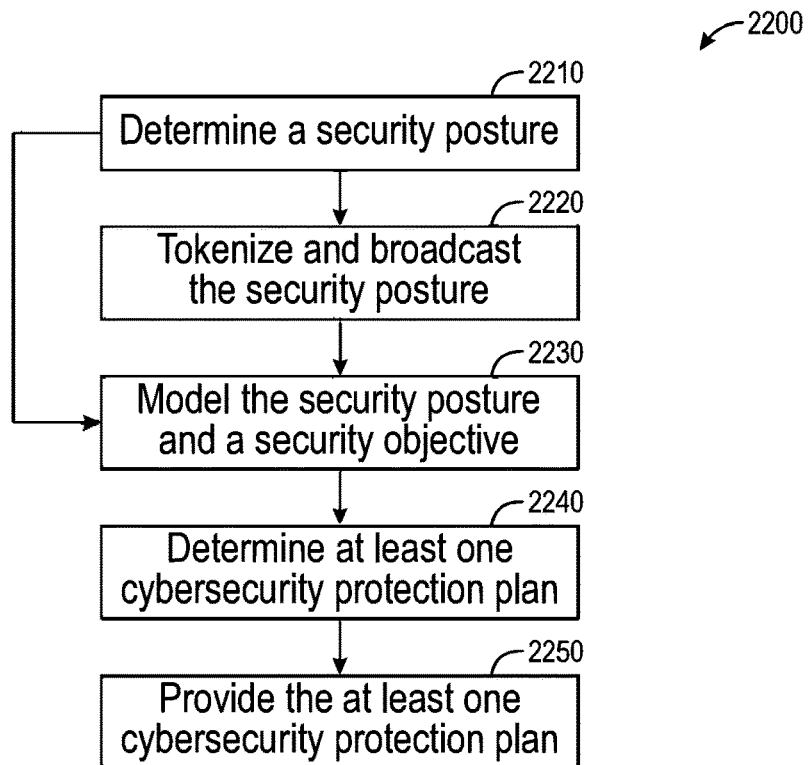
FIG. 22 depicts a flowchart for a method to protect data, according to some arrangements.

Referring now to FIG. 22, a flowchart for a method 2200 to protect data, in accordance with present implementations. At least system 100 can perform method 2200 according to present implementations.

In broad overview of method 2200, at block 2210, the one or more processing circuits (e.g., response system 130 of FIG. 1A) can determine a security posture. At block 2220, the one or more processing circuits can tokenize and broadcast the security posture. At block 2230, the one or more processing circuits can model the security posture and a security objective. At block 2240, the one or more processing circuits can determine at least one cybersecurity protection plan. At block 2250, the one or more processing circuits can provide the at least one cybersecurity protection plan. Additional, fewer, or different operations may be performed depending on the particular arrangement. In some embodiments, some, or all operations of method 2200 may be performed by one or more processors executing on one or more computing devices, systems, or servers. In various embodiments, each operation may be re-ordered, added, removed, or repeated.

At block 2210, the one or more processing circuits can determine the security posture based on the entity data. In some arrangements, this can include analyzing the data storage systems of the entity to determine the various types of data being handled. Additionally, the processing circuits can assess the entity data to identify potential cybersecurity threats that may pose a risk to the organization. In some arrangements, the processing circuits can identify entity assets by accessing the data channels that are communicatively linked to these assets. Accordingly, this allows the processing circuits to understand and evaluate the resources, devices, and networks that include the entity's infrastructure.

In general, the security posture corresponds to an assessment of the entity's overall cybersecurity risk profile. In some arrangements, the security posture encompasses multiple dimensions, including the current entity state and current entity index. For example, the current entity state represents the current cybersecurity conditions of the entity, such as system configurations, security policies, and incident response readiness. In another example, the current entity index can serve as references or pointers to the entity assets, enabling efficient retrieval and access of critical information. Accordingly, the security posture is an aggregate representation of various aspects, such as the entity's firmographics, data types, asset locations, cybersecurity safeguards, coverage, gaps, cyber hygiene practices, third-party attestations, cybersecurity incidents, and cybersecurity claims. By considering these factors, the processing circuits can determine a comprehensive view of the entity's cybersecurity posture, enabling organizations and third-parties to assess their security risks and make informed decisions. Thus, the security posture can refer to the overall cybersecurity stance of an entity, encompassing various factors that contribute to its risk profile and resilience against potential threats.

For example, to determine a security posture of an eCommerce business with a significant online presence that processes large amounts of consumer data daily, including sensitive information such as credit card details and personal identities can include analyzing the entity data of the eCommerce business. In some arrangements, the processing circuits can evaluate the entity data, involving an analysis of the types of data stored in the company's databases. These databases might include customer records, transaction logs, and financial records. Additionally, in this example the processing circuits can identify the assets of the company. This can include accessing various data channels linked to these assets, which could include servers, computers, software applications, and network infrastructure. In the above example, after the entity data is analyzed, the processing circuits can begin to assess the current cybersecurity conditions of the company. This current entity state includes the company's system configurations, security policies, and the readiness of their incident response team. The processing circuits can also identify the current entity index, which provides as references or pointers to the entity's assets. Considering these elements, the processing circuits can now determine the company's security posture. In particular, the security posture provides a holistic assessment that includes the company's firmographics, data types, asset locations, cybersecurity safeguards, coverage, gaps in security, cyber hygiene practices, third-party attestations, past cybersecurity incidents, and cybersecurity claims. By considering all these factors, the processing circuits can provide a comprehensive view of the entity's cybersecurity posture.

At block 2220, the one or more processing circuits can tokenize and broadcast the security posture to a distributed ledger. In general, tokenization is the process of converting rights to an asset into a digital token on a blockchain. In this case, the asset is the security posture of the company. The processing circuits convert the security posture into a digital token that can be stored, transmitted, and processed. In some arrangements, the digital token is a representation of the security posture that is unique, tamper-resistant, and encrypted. Broadcasting refers to the process of sending this digital token to all nodes in the distributed ledger or blockchain network. The distributed ledger is a decentralized database that is maintained by multiple nodes or participants in the network. Broadcasting the token to the distributed ledger ensures that the token, representing the security posture, is stored in a decentralized, immutable, and transparent manner. In some arrangements, any changes to the security posture will require a new token to be generated and broadcasted, ensuring that there is a historical record of all changes.

Over time, the circumstances, assets, and the data that the entity handles can change. For instance, the company may adopt new technologies, handle new types of data, or face new threats. As a result, it can be important to keep the security posture updated. In some arrangements, the processing circuits continuously monitor the entity's data and systems for any changes. When new data is accessed, the processing circuits analyze it to determine how it impacts the current security posture. For example, this can include reassessing the types of data the entity handles, the technologies it uses, its cybersecurity policies, and its overall threat landscape. Accordingly, the updated security posture provides a current and accurate representation of the entity's cybersecurity status, reflecting the most recent changes and developments.

In some arrangements, once the updated security posture is determined, the next step can include tokenizing this updated posture. As mentioned earlier, tokenization involves converting the updated security posture into a digital token. After tokenizing the updated security posture, the processing circuits broadcast this new token to the distributed ledger. In some arrangements, the processing circuits provide a public address of the tokenized updated security posture on the distributed ledger. The public address is a unique identifier that allows third parties to locate and access the token on the blockchain. Providing the public address to a plurality of third parties allows these parties to verify the updated security posture.

In some arrangements, the public address provided by the processing circuits acts as a unique identifier on the distributed ledger, or blockchain, for the tokenized security posture. By providing this address to third parties, they can locate and access the specific token, which represents the company's current security posture. That is, the ability for third-parties to access the tokenized security posture allows third parties to independently verify its contents. This is because the tokenization process ensures that the data representing the security posture is both tamper-proof and transparent, lending credibility to its contents. Furthermore, the decentralized nature of a distributed ledger ensures that the tokenized data has not been altered without consensus, adding an extra layer of verification. This means that third parties, be it auditors, partners, or cybersecurity firms, can trust the authenticity of the information encapsulated in the token, thus enabling them to accurately evaluate the organization's cybersecurity posture.

At block 2230, the one or more processing circuits can model the security posture and a plurality of security objectives to generate a set of cybersecurity attributes of the entity. In some arrangements, modeling the security posture includes constructing a representation of the entity's current cybersecurity state. This includes the data collected and analyzed in previous blocks, such as the types of data the entity handles, the assets it possesses, its system configurations, its security policies, its cybersecurity incidents, and other relevant factors. In some arrangements, the processing circuits can also model a plurality of security objectives. As user herein, "security objectives" refer to the goals or targets that the entity aims to achieve in terms of its cybersecurity. For example, the entity might aim to reduce its vulnerability to specific types of cyberattacks, improve its incident response time, or achieve compliance with certain cybersecurity standards or regulations. These objectives provide a framework for evaluating the entity's security posture and identifying areas for improvement. In some arrangements, block 2220 can be skipped or performed at a later point in time.

In some arrangements, based on the modeled security posture and the security objectives, the processing circuits generate a set of cybersecurity attributes of the entity. Each cybersecurity attribute represents a specific aspect of the entity's cybersecurity. For example, one attribute might be the entity's vulnerability to phishing attacks, while another might be its adherence to data encryption standards. Accordingly, the attributes provide a more detailed and granular view of the entity's cybersecurity posture. In some arrangements, each cybersecurity attribute is associated with at least one of a required cybersecurity attribute, an additional cybersecurity attribute, or an existing cybersecurity attribute. A required attribute can be a cybersecurity attribute that the entity must possess to meet its security objectives. An additional attribute can be a cybersecurity attribute that the entity could benefit from but is not mandatory. An existing attribute is a cybersecurity attribute that the entity already possesses. By categorizing the attributes in this way, the processing circuits can identify the entity's strengths, weaknesses, and areas for improvement in its cybersecurity.

In some arrangements, generating the set of cybersecurity attributes also involves creating a security roadmap. This is a strategic plan that outlines how the entity can improve its cybersecurity over time. The roadmap consists of multiple phases, each associated with a subset of the cybersecurity attributes. Each attribute is assigned to a phase based on its importance, urgency, and the entity's ability to implement it. For example, the first phase might involve implementing the required attributes, while later phases might involve adding the additional attributes. In some arrangements, modeling the security posture and security objectives together is a strategic approach that provides a comprehensive understanding of an entity's cybersecurity landscape. This process provides an interplay between the entity's current state of security (security posture) and its desired state of security (security objectives).

In this context, the security posture represents the entity's current cybersecurity status. It includes all relevant factors such as the types of data the entity handles, the system configurations, the cybersecurity policies in place, the incident response readiness, and the history of cybersecurity incidents, among others. On the other hand, the security objectives represent the entity's goals or targets in terms of cybersecurity. These might include reducing vulnerability to specific types of cyberattacks, improving incident response time, achieving compliance with certain cybersecurity standards, or enhancing the security of specific assets. In some arrangements, when modeling the security posture and security objectives together, the processing circuits can map out the path from the current state to the desired state. For example, the map can identify the gaps between the security posture and the security objectives, and outline the steps that need to be taken to bridge these gaps.

In various arrangements, the modeling process also involves generating a set of cybersecurity attributes of the entity, each reflecting a specific aspect of the entity's cybersecurity. By considering the security posture and the security objectives together, the processing circuits can develop a nuanced understanding of the entity's cybersecurity landscape. They can identify the strengths and weaknesses in the current security posture, align these with the security objectives, and define a clear path towards achieving these objectives. This holistic approach ensures that the entity's cybersecurity strategy is both grounded in its current reality and focused on its future goals.

It should be understood that modeling the security posture and security objectives can involve executing computational algorithms and machine learning techniques. The processing circuits would analyze various data points, including system configurations, network structures, user behaviors, security incident history, and more, to create a multi-dimensional model of the entity's current security posture. This model could be represented in various forms, such as a statistical model, a graphical model, or a neural network, depending on the complexity of the data and the specific needs of the analysis. Concurrently, the security objectives would be defined and encoded in a format that can be integrated into the model. This could involve setting target values for certain metrics, specifying desired states for different aspects of the cybersecurity, or defining specific conditions that should be met. The processing circuits could then map the security posture onto the security objectives, identifying the gaps and generating the set of cybersecurity attributes that represent specific areas for improvement. This mapping process could involve various computational techniques, such as optimization algorithms, decision tree analysis, or reinforcement learning, depending on the complexity of the security posture and objectives. In some arrangements, the output would be a model that represents the entity's current security posture, its security objectives, and the path to bridge the gap between them.

At block 2240, the one or more processing circuits can determine utilizing one or more protection parameters, at least one cybersecurity protection plan corresponding to a new cybersecurity attribute to protect the entity. In some arrangements, the new cybersecurity attribute is an attribute from the generated set of cybersecurity attributes of the entity after modeling the security posture and a plurality of security objectives. Protection parameters refer to specific criteria or guidelines that are used to design the cybersecurity protection plan. For example, these could include, but are not limited to, the entity's resources, the severity of the threats it faces, the criticality of its assets, its regulatory requirements, and its risk tolerance. In particular, the protection parameters provide a framework for tailoring the cybersecurity protection plan to the entity's specific needs and circumstances.

In some arrangements, each cybersecurity protection plan corresponds to a new cybersecurity attribute. As discussed herein, the cybersecurity attributes represent specific aspects of the entity's cybersecurity that were identified in the modeling process. A new cybersecurity attribute might represent an area for improvement, a gap in the current security posture, or a step towards achieving a security objective. The process of determining a cybersecurity protection plan can include defining the actions, measures, or strategies that will improve the entity develop or strengthen the new cybersecurity attribute. For instance, if the new attribute relates to improving incident response readiness, the protection plan might involve training staff, establishing an incident response team, or implementing an incident management system. In some arrangements, the cybersecurity protection plan is also designed to be adaptable. This means it can be updated or modified based on changes in the entity's security posture, security objectives, or the cybersecurity landscape. This adaptability ensures that the protection plan remains effective and relevant over time. Furthermore, while a cybersecurity protection plan is designed for a specific attribute, it can also have broader effects on the entity's overall cybersecurity. For instance, a plan designed to improve incident response readiness might also enhance the entity's resilience to cyberattacks, reduce downtime in the event of an incident, and improve its reputation for cybersecurity.

In various arrangements, once the processing circuits have determined a cybersecurity protection plan based on the entity's security posture and objectives, the processing circuits can consider the practical implementation of the plan. It's important to note that there could be multiple cybersecurity protection plans that offer the same essential protection but come from different vendors and have different price points, features, support levels, and other variables. Each of these elements can significantly influence the choice of protection plan. For example, suppose the determined cybersecurity protection plan involves the deployment of a specific type of firewall to enhance network security. There could be several vendors in the market that offer firewall solutions. While each solution essentially serves the same purpose-protecting the network from unauthorized access—there could be significant differences in their features, performance, ease of use, compatibility with the existing IT infrastructure, and more. Some firewalls might offer advanced features such as deep packet inspection, intrusion prevention systems, or integrated virtual private network (VPN) support, while others might focus on providing a user-friendly interface or extensive customization options.

Furthermore, price can be another factor in choosing a protection plan. Different vendors may offer their solutions at different price points, depending on factors such as the sophistication of the technology, the reputation of the vendor, the level of customer support provided, and the licensing model (for example, one-time purchase versus subscription-based). The entity can be presented with one or more plans corresponding to a new cybersecurity attribute to protect the entity with different price points so that the entity can consider its budget and the potential return on investment of each solution. Additionally, other factors such as the vendor's reputation, the quality of customer support, the vendor's understanding of the entity's industry, and the vendor's commitment to future updates and enhancements can also influence the choice of a cybersecurity protection plan. Therefore, the processing circuits can consider all these factors and potentially integrate additional data (e.g., vendor information, product reviews, and budget constraints) to select or offer the most suitable cybersecurity protection plan for the entity. This ensures that the chosen plan not only meets the entity's cybersecurity needs but also aligns with its financial, operational, and strategic requirements.

In general, the processing circuits can connect the organizations with the relevant cybersecurity vendors. They can do this by integrating with a database or network of vendors, or by utilizing a platform that facilitates such connections. By acting as a bridge between the organization and the vendors, the processing circuits can streamline the process of finding and implementing cybersecurity solutions. They can automatically match the organization's needs, as defined by the cybersecurity protection plans, with the offerings of various vendors, taking into account factors such as features, price, vendor reputation, and support levels. This not only improves accessibility for both the organization and vendors by improving the selection process, but it also leads to improved technology and security for the organization. The automation and data-driven approach of the processing circuits ensure that the organization is connected with the most suitable vendors, allowing it to benefit from the latest cybersecurity technologies that align with its security posture and objectives. This ultimately contributes to a stronger and more effective cybersecurity infrastructure for the organization.

In some arrangements, at block 2240, the processing circuits can determine at least one cybersecurity protection plan based on an assortment of qualifying and additional cybersecurity protection plans. These plans may come from a diverse set of third-party vendors and are presented to the entity computing system via a cybersecurity marketplace. For example, a qualifying cybersecurity protection plan refers to a plan that meets the minimum requirements established by the entity's security objectives and the identified cybersecurity attributes. This could include factors such as the type of protection needed, compliance with certain standards, compatibility with the existing IT infrastructure, and others. The qualifying plan provides the basic level of security that the entity needs to address its identified cybersecurity attributes. In another example, an additional cybersecurity protection plan refers to a plan that goes beyond the minimum requirements to provide extra features, higher performance, or other benefits. This could include advanced threat detection capabilities, integrated incident response tools, superior customer support, and more. The additional plan can offer a higher level of protection and can provide more value to the entity, although it might also come at a higher cost. In some arrangements, the security objectives used to guide this determination process can be entity-specific. That is, they can be tailored to the unique needs, risks, and goals of the entity, which ensures that the determined protection plans are highly relevant and targeted.

At block 2250, the one or more processing circuits can provide the at least one cybersecurity protection plan to an entity computing system of the entity. In some arrangements, the cybersecurity protection plan is provided to the entity's computing system through a cybersecurity marketplace. For example, this can be a digital platform that connects entities with a wide range of third-party cybersecurity vendors. The marketplace enables the entity to easily browse, compare, and select from various cybersecurity protection plans. It also allows vendors to showcase their offerings to potential customers. Within the cybersecurity marketplace, the processing circuits identify the cybersecurity protection plans associated with a plurality of third parties. This includes a first cybersecurity protection plan offered by a first third-party and a second cybersecurity protection plan offered by a second third-party. Each of these plans is associated with the new cybersecurity attribute identified during the modeling process, meaning they are designed to address this specific aspect of the entity's cybersecurity. In some arrangements, each cybersecurity protection plan is associated with one of a plurality of availability states. These states indicate whether the plan is currently available for the entity to implement (an "available now" state), whether it will become available in the future (an "available pending" state), or whether it is not available at all (an "unavailable" state).

In addition to identifying and providing the cybersecurity protection plans, the processing circuits can also facilitate the implementation of these plans. This could involve, for instance, integrating the chosen protection plan with the entity's existing IT systems, configuring the plan's settings according to the entity's needs and preferences, or monitoring the plan's deployment to ensure its functioning as expected. The processing circuits can also provide ongoing support for the protection plan, such as troubleshooting issues, providing updates, or adapting the plan based on changes in the entity's security posture or the cybersecurity landscape. Moreover, the processing circuits can manage the entity's interactions with third-party vendors. The processing circuits can handle communications between the entity and the vendors, negotiate contracts or service agreements, manage payment transactions, and ensure that the vendors fulfill their obligations. By acting as an intermediary, the processing circuits can help streamline the vendor management process, reduce the entity's administrative burden, and ensure a smooth and successful collaboration.

In some arrangements, the processing circuits can also provide valuable analytics and reporting capabilities. For example, the processing circuits can track the performance of the cybersecurity protection plans, measure their impact on the entity's security posture, and generate reports that provide insights into the entity's cybersecurity progress. This can help the entity understand the effectiveness of its cybersecurity efforts, identify areas for improvement, and make informed decisions about its future cybersecurity strategy. These analytics and reporting capabilities can be particularly valuable in demonstrating the entity's compliance with regulatory requirements or industry standards, as well as in building trust with stakeholders such as customers, partners, or investors.

In some arrangements, the processing circuits can scan the plurality of data channels to access third-party data from a range of third-parties. For example, this can include data about third-party vendors, partners, customers, or other entities that interact with the organization. Such third-party data can provide insights into the external aspects of the entity's cybersecurity, such as the security practices of its partners or the threats posed by its digital ecosystem. In this context, modeling involves integrating this third-party data into the determination of the set of cybersecurity attributes of the entity. This ensures that the model captures a holistic view of the entity's cybersecurity, encompassing both internal and external factors. In some arrangements, the processing circuits can determine a set of existing security attributes of the entity based on both the entity data and the third-party data. These existing security attributes represent the current state of the entity's cybersecurity, including its existing defenses, vulnerabilities, and threat exposures. By comparing these existing attributes with the desired attributes identified in the modeling process, the processing circuits can pinpoint the gaps that need to be addressed and guide the development of the cybersecurity protection plan.

In some arrangements, the processing circuits can determine an incident readiness based on the set of cybersecurity attributes of the entity. In particular, the incident readiness corresponds to a calculated level that indicates how prepared the entity is to respond to a cybersecurity incident. For example, this could involve factors such as the robustness of the entity's incident response plan, the skills and resources of its incident response team, the effectiveness of its communication channels, and its capacity for detecting, analyzing, and containing incidents. Similarly, the processing circuits can determine an insurance readiness based on the set of cybersecurity attributes. The insurance readiness refers to a calculated level that indicates how prepared the entity is to obtain cybersecurity insurance. For example, this could consider factors such as the entity's risk profile, its compliance with insurance requirements, the adequacy of its security controls, and its history of cybersecurity incidents. In some arrangements, the set of cybersecurity attributes of the entity is associated with at least the incident readiness or the insurance readiness. That is, these readiness levels can be parts of the entity's overall cybersecurity profile, reflecting its ability to respond to incidents and its readiness to obtain insurance. By considering these readiness levels in its analysis, the processing circuits can provide a more nuanced and comprehensive assessment of the entity's cybersecurity posture.

In various arrangements, the incident readiness and insurance readiness could be calculated through a weighted scoring system that combines various cybersecurity attributes. For example, the incident readiness score might take into account the robustness of the entity's incident response plan (weighted at 30%), the skills and resources of its incident response team (30%), the effectiveness of its communication channels (20%), and its capacity for detecting, analyzing, and containing incidents (20%). Each attribute could be scored on a scale from 1 to 10, with the scores then multiplied by their respective weights and summed to produce the overall incident readiness score. Similarly, the insurance readiness score might consider the entity's risk profile (weighted at 40%), its compliance with insurance requirements (30%), the adequacy of its security controls (20%), and its history of cybersecurity incidents (10%). Again, each attribute could be scored on a scale from 1 to 10, with the scores multiplied by their weights and summed to produce the insurance readiness score. Accordingly, the scores provide a quantitative measure of the entity's readiness levels, allowing for comparison and tracking over time.

In some arrangements, the one or more processing circuits can (1) receive a portion of the entity data from a user device via an application programming interface (API), (2) tokenize and extract content of the portion of the entity data into a plurality of tokens, (3) generate a unique identifier for each of the plurality of tokens, (4) store a mapping between the unique identifier and each of the plurality of tokens, (5) populate, from each of the plurality of tokens, a plurality of fields of a data object associated with the security posture based on the extracted content of the portion of entity data stored in each of the plurality of tokens, and (6) verify accuracy of the populated plurality of fields. In general, the processing circuits can enhance the entity's security posture assessment by actively engaging with user devices via an application programming interface (API). Through this interface, they can receive a portion of the entity data, tokenize and extract content, generate unique identifiers for each token, and store a mapping between these identifiers and tokens. This process enables a granular analysis of the entity data, allowing the processing circuits to identify specific security attributes and nuances that may be concealed in the aggregated data.

In some arrangements, the processing circuits can populate a data object associated with the security posture using the extracted content from the tokens. Each field of the data object corresponds to a specific aspect of the security posture, such as incident readiness, insurance readiness, risk profile, or compliance status. By populating these fields with precise data extracted from the tokens, the processing circuits can ensure that the data object accurately represents the entity's security posture. Furthermore, the processing circuits can verify the accuracy of the populated fields. For example, this could involve cross-checking the data with other sources, applying data validation rules, or using machine learning algorithms to detect anomalies or inconsistencies.

In some arrangements, the processing circuits can receive a request to set up a cybersecurity protection account. This request could come from an entity that wants to enhance its cybersecurity posture or from a third-party such as a cybersecurity vendor or consultant. Setting up a cybersecurity protection account is the first step towards building a robust cybersecurity strategy, as it provides a centralized platform for managing all cybersecurity-related activities. Upon receiving the request, the processing circuits can generate a first graphical user interface (GUI) including interactable elements. The GUI serves as the main interface for users to interact with the cybersecurity protection account. The interactable elements could include menus, buttons, forms, or other components that allow users to input data, navigate the platform, or perform specific actions. When a user interacts with one of these elements, the processing circuits can receive, via the first GUI, a portion of the entity data. This data could correspond to various aspects of the entity's operations, such as team information, asset information, current third-party providers, and current cybersecurity protection plans.

Next, the processing circuits can model the current cybersecurity protection plans. This involves analyzing the plans to understand their features, benefits, limitations, and effectiveness. It also includes implementing the plan, which could involve coordinating with the vendor, integrating the plan with the entity's systems, and ensuring its proper operation. By modeling the current plans, the processing circuits can identify potential improvements or gaps that need to be addressed in the new cybersecurity strategy. In some arrangements, the processing circuits can generate a second GUI including additional interactable elements. These elements are associated with the security posture, a plurality of incidents, and the plurality of security objectives. This second GUI provides users with a more detailed view of their cybersecurity situation, including their current posture, past incidents, and future objectives.

In some arrangements, the processing circuits can implement, test, and manage (sometimes referred to collectively as "modeling") the cybersecurity protection plans. After a plan is selected, the processing circuits can facilitate the integration (or modeling) process between the vendor's solution and the entity's systems. For example, this might involve configuring the entity's networks, devices, and applications to work with the vendor's cybersecurity tools, testing the integrated solution to ensure that it functions correctly, and addressing any issues or conflicts that arise during this process. Moreover, the processing circuits can continuously monitor the entity's systems to assess the effectiveness of the protection plan. This can include analyzing system logs, network traffic, user behavior, and other relevant data to detect any signs of cybersecurity incidents. It also includes coordinating with the vendor to receive updates about new threats, patches, or improvements to the protection plan. These updates can then be incorporated into the entity's systems to ensure that the protection plan remains up-to-date and effective against evolving cybersecurity threats. In the event of a potential incident, the processing circuits can alert the entity and the vendor, providing detailed information about the incident's nature, scope, and potential impact. This allows the entity and the vendor to respond quickly and effectively, minimizing the damage and downtime caused by the incident. Furthermore, the processing circuits can analyze the incident to understand its causes, impacts, and lessons, and use this information to further improve the protection plan and the entity's overall cybersecurity posture.

In some arrangements, the processing circuits can model the selected cybersecurity protection plan by testing it within the entity's infrastructure. This can include simulating various scenarios to evaluate the plan's effectiveness and resilience against potential threats. Through this testing process, the processing circuits can identify any gaps, vulnerabilities, or implementation issues, ensuring that the plan is not only compatible with the entity's systems but also robust enough to provide the necessary level of protection. In some arrangements, a vendor plan can be tested by enabling stepping through the incident response plan as documented, including taking iterative steps to check if the plan would indeed work for a particular modeled threat scenario. By virtually executing the plan and monitoring its response to simulated threats, the processing circuits can assess its practicality and effectiveness, making any necessary adjustments or improvements to ensure optimal incident response readiness. This testing approach enhances the confidence in the selected cybersecurity protection plan, enabling the entity to deploy a proactive and reliable security strategy.

In some arrangements, the one or more processing circuits can generate a security posture stream including a timeline of incidents, changes in the security posture, and corresponding cybersecurity threat levels. This timeline provides a historical record of the entity's security posture over time. By reviewing the posture stream, the entity can gain insights into the effectiveness of their cybersecurity measures, identify recurring vulnerabilities or patterns, and make data-driven decisions for future enhancements. The processing circuits can also apply advanced analytics and machine learning algorithms to the posture stream, enabling predictive capabilities to anticipate potential threats and proactively strengthen the entity's security posture.

In addition to the aforementioned capabilities, some arrangements may leverage generative artificial intelligence (AI) algorithms to enhance the security posture analysis. Generative AI algorithms can analyze large volumes of data from various sources, such as threat intelligence feeds, incident reports, and security best practices, to identify patterns, trends, and potential vulnerabilities that human analysts may not have detected. By utilizing generative AI, the processing circuits can uncover hidden insights, predict emerging threats, and recommend proactive security measures to fortify the entity's defenses. In various arrangements, the use of generative AI further augments the capabilities of the processing circuits, enhancing the accuracy, efficiency, and scalability of the security posture analysis, and ultimately contributing to the overall resilience and robustness of the entity's cybersecurity framework.

Figure 23:
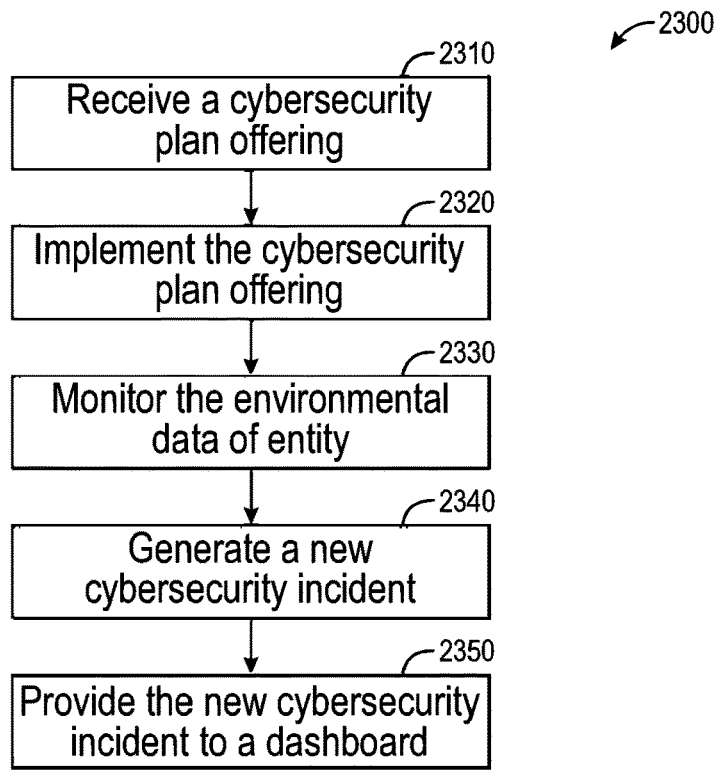
FIG. 23 depicts a flowchart for a method to protect data, according to some arrangements.

Referring now to FIG. 23, a flowchart for a method 2300 to protect data, in accordance with present implementations. At least system 100 can perform method 2300 according to present implementations.

In broad overview of method 2300, at block 2310, the one or more processing circuits (e.g., response system 130 of FIG. 1A) can receive a cybersecurity plan offering. At block 2320, the one or more processing circuits can implement the cybersecurity plan offering. At block 2330, the one or more processing circuits can monitor the environmental data of an entity. At block 2340, the one or more processing circuits can generate a new cybersecurity incident. At block 2350, the one or more processing circuits can provide the new cybersecurity incident to a dashboard. Additional, fewer, or different operations may be performed depending on the particular arrangement. In some embodiments, some, or all operations of method 2300 may be performed by one or more processors executing on one or more computing devices, systems, or servers. In various embodiments, each operation may be re-ordered, added, removed, or repeated.

At block 2310, the processing circuits can receive one or more cybersecurity plan offerings associated with a third-party. These offerings represent a variety of cybersecurity solutions that the third-party has developed to address different types of threats and vulnerabilities. The offerings may include active plans, which are ready to be implemented immediately, as well as plans that are to be offered on the marketplace for entities to activate. In general, the marketplace is a digital platform where entities can be provided, explore, compare, and select the cybersecurity plans that best meet their needs. It provides a wide range of options, catering to entities with different risk profiles, business models, and budget constraints. Upon receiving the cybersecurity plan offerings, the processing circuits then provide these offerings to the marketplace. The plans can be made available for activation by a plurality of entities, broadening the third-party vendor's reach and giving them access to a wider customer base. The processing circuits facilitate this process, ensuring that the offerings are presented accurately and attractively in the marketplace.

In some arrangements, the processing circuits can receive an activation of a cybersecurity plan offering from an entity's computing system. This signals that the entity has selected a plan from the marketplace and is ready to implement it. The activation triggers a series of processes, including setting up the necessary connections between the entity and the third-party (described in block 2320), configuring the plan according to the entity's specific requirements, and monitoring the implementation to ensure that it is successful. In some arrangements, the processing circuits can provide the cybersecurity plan offerings to entities for purchase before the modeling process at block 2320 takes place. This is based on one or more third-party customer parameters, which could include factors such as the entity's size, industry, risk profile, or specific cybersecurity needs.

In some arrangements, the cybersecurity offerings may be tailored and made available only to certain entities based on both or either of the entity and vendor preferences. On one hand, an entity may have specific preferences or needs for cybersecurity protection plans based on their industry, size, geographical location, or regulatory requirements. On the other hand, the vendor may also have preferences for the types of entities they cater to, depending on factors such as the entity's risk profile, the vendor's area of expertise, or strategic business decisions. This customization of offerings ensures that each entity is presented with cybersecurity plans that are most relevant and suitable for their specific needs, while vendors can focus on providing services to entities that align with their capabilities and business strategy. This bespoke approach to cybersecurity planning enhances the efficiency and effectiveness of the cybersecurity marketplace.

At block 2320, the one or more processing circuits can model the one or more cybersecurity plan offerings, setting the stage for the application of the plans within the entity's infrastructure. For example, this process can being with the generation and activation of a cybersecurity protection obligation between the entity and the third-party vendor. These attributes encapsulate the specifics of the cybersecurity plan, detailing parameters such as the scope of coverage, the service level agreements, the roles and responsibilities of each party, and the cost and payment terms, among others. In some arrangements, the processing circuits can provide the entity's security posture, entity data, and the details of the cybersecurity protection obligation to a third-party computing system of the third-party. This sharing of information can be important to the successful implementation of the cybersecurity plan. The entity's security posture and data allow the third-party to understand the unique cybersecurity landscape of the entity and tailor their offerings accordingly. In some arrangements, the processing circuits can provide a public address to the tokenized security posture of the entity. The security posture can provide insights into the entity's existing security framework, potential vulnerabilities, and overall security objectives, thereby equipping the third-party with the context necessary to deliver effective protection.

In some arrangements, the processing circuits, in response to the activation of the cybersecurity protection obligation, model the activated cybersecurity plan offering. This modeling phase translates the theoretical aspects of the plan into practical measures that are incorporated into the entity's existing infrastructure. It could involve the configuration and deployment of specific cybersecurity tools, the establishment of monitoring protocols, and the setup of incident response mechanisms, among other actions. The completion of this modeling phase signifies the full integration of the cybersecurity plan into the entity's infrastructure, positioning the entity to benefit from enhanced cybersecurity protection. For example, when a state is inconsistent or identified the processing circuits automatically analyze the current configurations of security tools employed by the vendor and the operating systems of the organization. Based on this analysis, appropriate modifications are made to the configurations or the agreement between the vendor and organization, ensuring that the security measures are aligned with the specific needs and risks of the entity.

In some arrangements, prior to generating and activating the cybersecurity protection obligations, the one or more processing circuits can underwrite the cybersecurity plan by leveraging the data collected from the insured's security tools and configurations. This data, which provides a detailed and accurate representation of the insured's security posture, is assessed against the underwriting criteria established by the insurer. The processing circuits analyze various factors, including the effectiveness of the security measures implemented, the coverage level provided by the cybersecurity plan, and the compliance history of the insured.

For example, a Fortune 500 company is seeking cybersecurity insurance. The processing circuits can collect data from the company's security tools and configurations, including information about their network infrastructure, access controls, incident response protocols, and data protection measures. By analyzing this data, the processing circuits can assess the company's overall security posture and identify any potential vulnerabilities or gaps in their defenses. The processing circuits can also evaluate the company's compliance history, including past incidents or breaches, and their adherence to industry best practices and regulatory requirements. Based on this analysis, the processing circuits can determine the level of threat associated with insuring the company and provide an accurate underwriting assessment.

In another example, a small business owner who is applying for cybersecurity insurance. The processing circuits can collect data from the business owner's security tools, such as firewalls, antivirus software, and intrusion detection systems, as well as information about their data encryption practices and employee training programs. The processing circuits can also assess the business owner's compliance with relevant cybersecurity regulations and their incident response capabilities. By analyzing this data, the processing circuits can evaluate the effectiveness of the security measures in place and determine the level of threat associated with insuring the business. The processing circuits can identify any areas where additional safeguards or improvements may be needed and provide recommendations to mitigate potential risks. Based on this underwriting assessment, the processing circuits can generate a tailored cybersecurity plan that aligns with the business owner's specific needs and offers appropriate coverage for their computing environment.

In some arrangements, the processing circuits takes a proactive approach to modeling the cybersecurity plan offerings by engaging in deployment and configuration activities. This involves deploying and configuring third-party tools and various systems within the computing infrastructure of the entity, in accordance with the specific requirements outlined in the cybersecurity plan offerings. Furthermore, in the modeling of the cybersecurity plan offerings, the processing circuits can establish connections and integrate the third-party tools within the existing computing infrastructure of the entity. By establishing these connections and integrating the tools, the processing circuits ensures that the cybersecurity measures are incorporated into the entity's computing environment, creating a holistic and robust defense against potential threats.

At block 2330, the one or more processing circuits initiate a monitoring process, leveraging the plurality of data channels to keep a watch on the environmental data of the entities that are being modeled using the one or more cybersecurity plan offerings. This monitoring process provides real-time threat detection and response mechanisms. By maintaining a consistent surveillance over the environmental data, the processing circuits are able to detect any anomalies or deviations that might signify a potential cybersecurity threat or breach. Environmental data in this context refers to an extensive array of information that encapsulates the operational environment of the entities. This data includes network traffic details, system logs, user activity, application activity, and other relevant metrics. Importantly, environmental data also includes information about the external threat landscape, such as updates about new types of cyber threats, threat intelligence feeds, and other relevant details. By monitoring this data, the processing circuits can maintain an updated understanding of the entity's cybersecurity status.

In some arrangements, the monitoring process is carried out using a variety of data channels. These channels could include direct network connections, API feeds, and other communication interfaces that allow the processing circuits to tap into the entity's systems. The choice of data channels can depend on the specific architecture and requirements of the entity's information systems. Once the monitoring process is set in motion, the processing circuits are not just passively observing the data flow. They are actively scanning, analyzing, and interpreting the environmental data to pick up on any signs of cyber threats. For example, algorithms and artificial intelligence mechanisms can be deployed to sift through the vast volumes of data, identifying patterns and correlations that might escape human scrutiny. Any detected anomalies are promptly flagged, triggering appropriate response mechanisms as detailed in the cybersecurity plan offerings. This continuous, vigilant monitoring is instrumental in ensuring the entity's cybersecurity is always one step ahead of potential threats.

At block 2340, the one or more processing circuits are configured to generate a new cybersecurity incident, this operation is triggered upon detecting an anomaly or potential threat within the environmental data associated with any entity from the plurality of entities. The generation of a new cybersecurity incident is a step in the cybersecurity workflow. It signifies the identification of a potential threat, vulnerability, or breach within the entity's systems, based on the analysis of the environmental data. It should be understood that may times the detection of a new cybersecurity incident is not a simple binary process; it can include a multi-faceted analysis of the environmental data. For example, machine learning algorithms, statistical models, neural networks, or heuristic rules could be employed to analyze the data for signs of malicious activity. For instance, sudden spikes in network traffic, unusual login attempts, or patterns that match known attack signatures could all trigger the generation of a new cybersecurity incident. This incident is then logged and tracked, with all relevant information captured for further analysis and response.

In some arrangements, the processing circuits can identify and engage with one or more partners of the third-party vendor. For example, the partners could be other cybersecurity service providers, third-party software vendors, or even internal teams within the entity's organization. Through job routing for cases and conditions, as shown in FIG. 15F, the processing circuits categorize the identified gaps and match them to suitable solutions or vendors capable of remedying those gaps. This matching process can be facilitated through an insurer marketplace portal, leveraging the capabilities provided by response system 130. By collaborating with partners, the processing circuits ensure that the entity gains access to the expertise, technologies, and resources necessary to address specific security gaps effectively.

In some arrangements, the processing circuits facilitate the linking of preferred products or solutions to pre-existing relationships between vendors, customers, and insurers. By leveraging the data and insights gathered from the ecosystem partner APIs, the processing circuits can identify vendors that have established relationships with the entity's preferred customers or insurers. This linkage enables a streamlined procurement process, where the entity can benefit from pre-negotiated contracts, favorable pricing, or tailored solutions. The processing circuits can evaluate the compatibility of preferred products with the entity's security objectives and seamlessly integrate them into the existing cybersecurity infrastructure.

In some arrangements, once partners are identified, the processing circuits can configure one or more routing rules that dictate the flow of information and action items in response to the detected cybersecurity incident. These rules could be based on various factors such as the nature of the incident, the specific systems or data affected, the capabilities of the partner, or even pre-defined response plans. For instance, if a certain type of cybersecurity incident requires the expertise of a specific partner, the routing rules would ensure that all relevant action items are automatically sent to that partner. In particular, the routing rules facilitate improved and efficient response to cybersecurity incidents, ensuring that the right people are alerted at the right time with the right information. This coordinated, automated response mechanism significantly enhances the overall efficacy of the cybersecurity protection plan, reinforcing the entity's defenses against cyber threats.

At block 2350, the one or more processing circuits can be configured to deliver the newly identified cybersecurity incident to a dashboard managed by the one or more processing circuits In some arrangements, the dashboard includes a set of categories under which incidents are organized. These categories include inbound incidents, active incidents, and past incidents, each of which provides a different perspective on the entity's cybersecurity status. Inbound incidents refer to newly detected threats or vulnerabilities that have not yet been addressed. They include the security posture information associated with the entity, which gives context about the entity's overall cybersecurity health and potentially vulnerable areas. The information might encompass details about the entity's network architecture, the nature of its data, its existing cybersecurity measures, and its previous history of incidents.

In some arrangements, active incidents, pertain to ongoing issues that are currently being handled. These incidents come with real-time status updates and states, providing the third-party with a dynamic view of the incident's progression. The real-time statuses can include information on the current stage of incident response, such as investigation, containment, eradication, or recovery. The states may describe the condition of the incident, like open, pending, escalated, or closed, which helps in understanding the immediate attention that an incident requires.

In some arrangements, past incidents consist of resolved threats or breaches and serve as a historical record of the entity's cybersecurity events. Moreover, the dashboard can include an Incident Room for each of the active incidents. An Incident Room can serve as a dedicated space for collaborative incident response, where all relevant parties can communicate, share updates, and coordinate their actions. It consolidates all information related to a particular incident, such as logs, alerts, action plans, timelines, and other relevant data, thereby facilitating a streamlined and efficient response process. In some arrangements, the Incident Room also enables the tracking of response efforts, ensuring accountability and promoting continuous improvement in the entity's cybersecurity practices.

In some arrangements, the one or more processing circuits can automatically renew at least one of the one or more cybersecurity plan offerings with at least one of the plurality of entities. The automation process is designed to ensure continuity of protection by eliminating the risk of lapses due to manual renewal processes. This can be achieved by tracking the expiry dates of the cybersecurity plans and triggering the renewal process in advance. The renewal terms could be based on the existing contract between the entity and the third-party, or they could be subject to negotiation. The process also includes updating the entity's profile and security posture, and recalibrating the cybersecurity plan's specifications to align with any changes that may have occurred in the entity's environment or needs. Notifications about the renewal process, including any changes in terms or pricing, can be sent to the entity and vendor.

In some arrangements, the automatic renewal process for cybersecurity plan offerings is built on procedures to ensure a seamless and efficient experience for both the entities and vendors. The processing circuits keep track of the expiration dates of the cybersecurity plans and initiates the renewal process in advance, eliminating the need for manual intervention and mitigating the risk of coverage lapses. The renewal terms and conditions can be based on the existing contract between the entity and the third-party vendor, ensuring consistency and alignment with the agreed-upon terms. In addition to the contractual aspects, the processing circuits can also takes into account any changes in the entity's profile, security posture, or specific needs, allowing for the recalibration of the cybersecurity plan's specifications to provide tailored protection. Throughout the renewal process, notifications are sent to the entity and the vendor, providing updates on any changes in terms, pricing, or other relevant information, facilitating transparency and effective communication between all parties involved.

In some arrangements, in response to receiving an indication of the completion of the new cybersecurity incident, the processing circuits can automatically generate and provide an invoice of the new cybersecurity incident to the entity. The invoice could include details such as the type of incident, the duration of the response, resources utilized, and the cost associated with each line item. The processing circuits could also include detailed explanations of each charge, enabling the entity to understand the cost drivers. Furthermore, upon completion of the new cybersecurity incident, the processing circuits can generate an incident summary. The summary can include a report that provides an overview of the incident from origination to resolution. It includes performance metrics such as the time to detect the incident, time to respond, time to contain, and time to recover. These metrics can provide insights into the effectiveness and efficiency of the entity's incident response process. Origination details can provide information about the source of the incident, its nature, and how it infiltrated the entity's defenses, which can be crucial for future prevention strategies. The incident timeline can be a chronological representation of the incident's progression and the response activities, providing a clear picture of the incident's lifecycle. The incident summary can be provided to the entity and relevant stakeholders, serving as a valuable resource for post-incident reviews, improvement of security strategies, and compliance reporting.

In some arrangements, the processing circuits can collect cybersecurity data from the third-party tool interface and analyze and identify the data that aligns with the underwriting requirements. This analysis involves matching the collected cybersecurity data with the specific underwriting criteria, ensuring that the plan meets the necessary standards and guidelines. Once the data has been identified and categorized, the processing circuits package the information and seamlessly provide it to an application programming interface (API). This API serves as a conduit for transmitting the wrapped cybersecurity data, along with the underwriting requirements, to the underwriting system.

Figure 24:
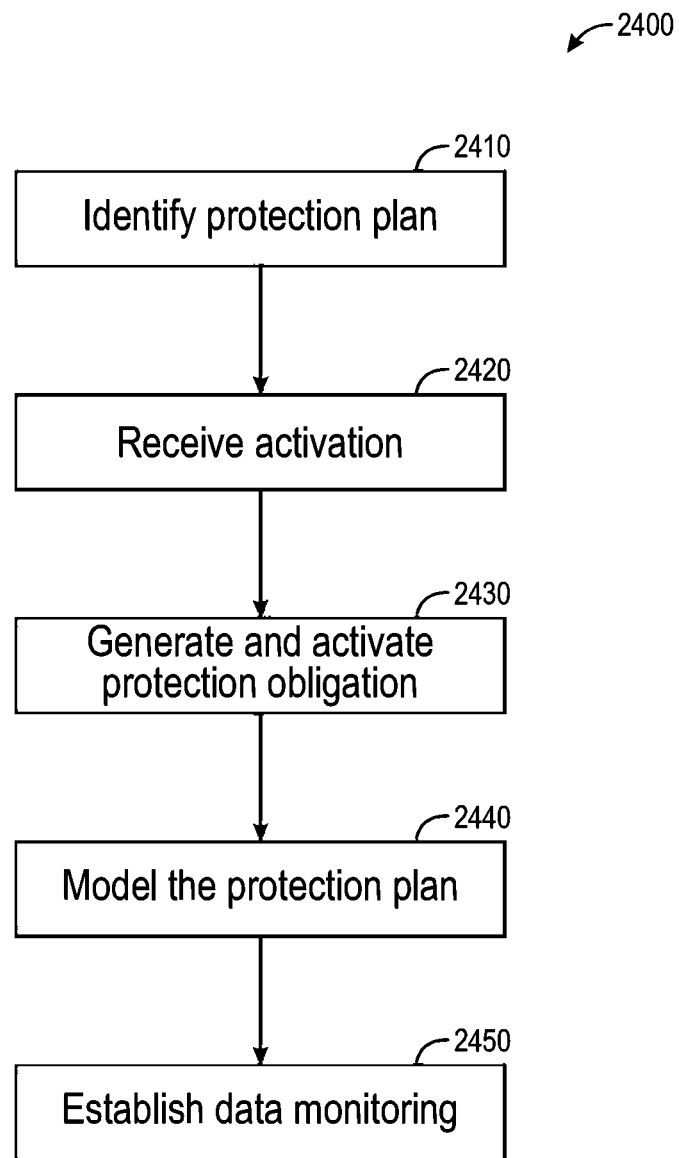
FIG. 24 depicts a flowchart for a method to protect data, according to some arrangements.

Referring now to FIG. 24, a flowchart for a method 2400 to protect data, in accordance with present implementations. At least system 100 can perform method 2400 according to present implementations.

In broad overview of method 2400, at block 2410, the one or more processing circuits (e.g., response system 130 of FIG. 1A) can identify a protection plan. At block 2420, the one or more processing circuits can receive activation. At block 2430, the one or more processing circuits can generate and activate protection obligation. At block 2440, the one or more processing circuits can model the protection plan. At block 2450, the one or more processing circuits can establish data monitoring. Additional, fewer, or different operations may be performed depending on the particular arrangement. In some embodiments, some, or all operations of method 2400 may be performed by one or more processors executing on one or more computing devices, systems, or servers. In various embodiments, each operation may be re-ordered, added, removed, or repeated.

At block 2410, the processing circuits identify at least one cybersecurity protection plan associated with a plurality of third-parties. This identification process is guided by the previously modelled cybersecurity attributes, ensuring that the identified protection plan is relevant to the entity's cybersecurity needs. For example, the protection plan may be offered by a first third-party and a second third-party. Each of these plans is associated with the new cybersecurity attribute, demonstrating their capacity to address the specific cybersecurity needs identified during the modeling process. To provide more choice and flexibility for the entity, each cybersecurity protection plan is associated with one of several availability states.

At block 2420, the processing circuits are configured to receive an activation request from the entity's computing system for a selected cybersecurity protection plan. This activation signifies the entity's commitment to implementing the chosen protection plan. It might be, for example, that the entity has decided to proceed with the cybersecurity protection plan associated with the first third-party. The activation request signals the entity's decision to the processing circuits and triggers the next step in the process. Still at block 2420, the processing circuits generate and activate a cybersecurity protection obligation between the entity and the first third-party. This protection obligation represents a formal agreement between the entity and the third-party provider, stipulating the provision of cybersecurity services as per the selected protection plan. In some arrangements, the protection obligation includes a plurality of protection attributes, which could include the specific services to be provided, the duration of the agreement, the obligations of each party, and the terms for monitoring, reporting, and responding to cybersecurity incidents. The activation of this obligation effectively sets the selected cybersecurity protection plan into motion, transitioning the entity into a phase of enhanced cybersecurity protection.

The process of generating and activating a cybersecurity protection obligation involves several steps, for example, the creation of a formal contractual agreement between the entity and the third-party vendor. This contract outlines the scope and specifics of the cybersecurity services to be provided, in line with the selected protection plan. The document can detail the responsibilities and obligations of both parties, including the specific cybersecurity tasks to be undertaken by the vendor, and the cooperation and access required from the entity. The contract can be reviewed by both parties, and sometimes the processing circuits can automatically begin executing to fulfil contract terms based on previous relationship or authorizations by the vendor and/or entity. In some arrangements, the processing circuits may generate an invoice for the entity, reflecting the cost of the cybersecurity services as per the agreed-upon protection plan. This invoice might include details such as the price of individual services, any discounts or package deals, taxes, and payment terms. Payment processing can also be facilitated through the processing circuits, providing a seamless and convenient transaction experience for the entity.

At block 2430, the processing circuits provide the security posture, the entity data, and the cybersecurity protection obligation to the third-party computing system of the chosen vendor. This information transfer enables the vendor to understand the current cybersecurity state of the entity, their specific needs, and the obligations outlined in the protection plan. In particular, following financial settlement or prior to financial settlement based on the agreement, the processing circuits can provide the vendor the necessary access to the entity's infrastructure. In some arrangements, this can be achieved through a secure Application Programming Interface (API), which allows the vendor's systems to interact directly with the entity's systems. The API may provide the vendor with access to various aspects of the entity's infrastructure, depending on the services outlined in the protection plan. For instance, it could allow the vendor to monitor network traffic, manage security protocols, or deploy software patches. In some arrangements, there can be two separate APIs where the entity communicates with the processing circuits via a first API and the vendor communicates with the processing circuits via a second API. Thus, the activation of the cybersecurity protection obligation signifies the commencement of the cybersecurity services. It represents the implementation phase of the protection plan, where the vendor starts executing the agreed-upon services, guided by the contract terms and enabled by the access provided through the API. This activation indicates a transition from the planning stage to the action stage, setting the entity on a path towards improved cybersecurity.

At block 2440, the processing circuits model the cybersecurity protection plan. This involves configuring the vendor's tools and systems to work within the entity's infrastructure, based on the agreed-upon rules of engagement. This configuration process can be automated, with the processing circuits sending specific instructions to the vendor's systems via an API. These instructions could include access permissions, monitoring parameters, alert settings, and various other operational details that will guide the execution of the protection plan. The successful modeling of the protection plan at this stage provides that the vendor's systems are well-integrated into the entity's infrastructure and are ready to provide the required cybersecurity services.

In order to implement (or deploy/configure) (i.e., model) the protection plan and integrate the vendor's tools into the entity's infrastructure, several steps can be taken. In some arrangements, the organization can establish the necessary credentials and permissions for the vendor to access the relevant systems or platforms. For example, if the entity utilizes AWS for its cloud infrastructure, the organization can provide the vendor with the required AWS credentials to facilitate the deployment of their tools on the entity's EC2 instances. In various arrangements, the organization can leverage automation capabilities to streamline the deployment process. This automation can be set up to automatically deploy the vendor's tools to the appropriate systems within the entity's infrastructure. By defining clear rules and configurations, the automation system can ensure that the deployment is consistent, efficient, and aligned with the organization's security requirements. During the deployment process, the processing circuits can monitor the progress and provide real-time feedback on the integration of the vendor's tools. They can validate that the tools are properly installed, configured, and connected to the relevant components within the entity's infrastructure.

For example, suppose an organization operates a cloud-based infrastructure using platforms like Amazon Web Services (AWS). To integrate the vendor's tools into this environment, the organization can leverage automation tools. They can create infrastructure-as-code templates that define the desired state of the infrastructure and include the necessary configurations for deploying the vendor's tools. Using these templates, the organization can automatically provision the required infrastructure components, such as EC2 instances, security groups, and networking resources. The templates can be configured to install and configure the vendor's tools on the provisioned instances, ensuring that they are integrated into the organization's cloud environment.

In another example, in the case of endpoint security solutions, the organization may have a diverse range of devices and operating systems across its network. To integrate the vendor's endpoint security tools into these devices, the organization can utilize a unified endpoint management (UEM) platform (e.g., executed and deployed by the response system 130 and stored in database 140). The UEM platform can provide a centralized management console and agent-based deployment capabilities. The organization can configure the UEM platform to push the vendor's endpoint security agent to all managed devices within the network. The agent can be configured to communicate with the vendor's cloud-based security platform or an on-premises management server. Through the UEM platform, the organization can enforce security policies, monitor endpoint activities, and receive alerts and notifications from the vendor's tools.

In some arrangements, the configuration of vendor tools is carried out by customizing the settings and parameters to align with the organization's specific security requirements. This includes defining rules, policies, and thresholds within the tools to effectively monitor, detect, and respond to security incidents. For instance, configuring firewalls to enforce access control policies, fine-tuning intrusion detection systems to detect specific attack patterns, or setting up encryption protocols for secure data transmission. In some arrangements, establishing connections between the vendor's tools and the organization's infrastructure allows for data flow and security monitoring. This involves integrating the tools with existing systems, such as log management platforms, identity and access management solutions, or security information and event management (SIEM) systems. Through these integrations, the organization can consolidate and correlate security events, streamline incident response workflows, and gain a comprehensive view of the overall security posture. In some arrangements, the deployment and implementation of vendor tools encompass the installation, activation, and configuration of the tools within the organization's environment. This can involve deploying software agents on endpoints, installing network appliances or sensors, or provisioning virtual instances in cloud environments. The deployment process ensures that the vendor tools are properly installed, connected, and ready to perform their intended functions. In some arrangements, testing and validation procedures are conducted after the deployment phase to ensure the effectiveness and reliability of the vendor tools and connections. This includes testing the tools' functionality, performance, and interoperability with other systems. Security assessments, vulnerability scans, and penetration testing may also be conducted to verify the tools' capability to detect and respond to various threats and attacks.

In some arrangements, modeling, as part of the implementation process, refers to the systematic and strategic approach of configuring, integrating, and deploying vendor tools and connections within an organization's infrastructure. This involves a series of steps to ensure that the tools are appropriately tailored to meet the organization's specific security needs and seamlessly integrated with existing systems and processes. During the modeling phase, organizations collaborate closely with the vendor to define and customize the configuration settings of the tools. This includes determining the appropriate thresholds, policies, and rules that align with the organization's security objectives. For example, the modeling process may involve fine-tuning intrusion detection systems to detect specific attack patterns or configuring security information and event management (SIEM) systems to correlate and analyze security events effectively. Once the configuration settings are defined, the modeling process moves to the deployment stage. This can include the installation, activation, and integration of the vendor tools within the organization's infrastructure. The tools are deployed across various components, such as endpoints, network devices, servers, and cloud environments, to provide comprehensive security coverage. To ensure the successful integration and functionality of the vendor tools, thorough testing and validation are conducted during the modeling phase. Accordingly, the modeling process encompasses the implementation and deployment of vendor tools and connections. It involves configuring the tools to match the organization's security requirements, integrating them within the existing infrastructure, and conducting thorough testing to ensure their effectiveness.

At block 2450, the processing circuits establish a continuous data monitoring channel between the entity and the vendor. This involves the creation of two secure communication connections using APIs. The first connection is established between the entity's computing system or assets and the processing circuits, allowing the circuits to monitor the entity's systems in real-time. The second connection is established between the vendor's computing system and the processing circuits, enabling the vendor to receive real-time updates and alerts about the entity's security status. This continuous data monitoring channel can be a component of the protection plan, as it allows for immediate (or periodic) detection and response to any cybersecurity incidents. It ensures that the vendor is up-to-date with the entity's security status and can provide the necessary support promptly and efficiently.

In some arrangements, the processing circuits can respond to changes in the security objectives or the security posture of the entity. When the processing circuits receive an updated security objective from the plurality of security objectives or detect a new security objective, or when they detect a change in the security posture, the processing circuits can determine an updated cybersecurity attribute of the set of cybersecurity attributes of the entity. This can be a dynamic process, reflecting the fact that cybersecurity is not a static data structure. As threats evolve and the entity's business environment changes, its security objectives and posture may need to be adjusted. The processing circuits are designed to handle such changes, updating the entity's cybersecurity attributes as needed to ensure that the protection plan remains effective.

Once the updated cybersecurity attribute has been determined, the processing circuits then reconfigure the security objective via the second API. This reconfiguration could involve adjusting the parameters of the security objective, changing its priorities, or even replacing it entirely with a new objective. In some arrangements, this process can be done in consultation with the vendor and the entity, ensuring that any changes to the security objective align with the entity's current needs and risk tolerance. The reconfiguration via the second API allows these changes to be implemented promptly and seamlessly, minimizing any potential disruption to the entity's operations. In some arrangements, when an objective of the entity is updated, the processing circuits analyze the corresponding state data, which includes information about the entity's safeguards, coverage, threats, insurance, and other relevant factors. If the analysis reveals an imbalance or a gap in the combination of these factors, the processing circuits notify the entity (e.g., through a gap manager). For example, this notification prompts the entity to take automated actions to address the gap, such as modifying insurance policies, adjusting technology configurations, or implementing additional security measures.

For example, assume a Fortune 500 company has experienced a significant increase in targeted cyber threats aimed at their customer data. Through the analysis of the state data, the processing circuits identify a gap in the entity's existing security objective related to data protection. The gap manager alerts the entity about this imbalance and triggers an automated response. The processing circuits, in consultation with the entity and the vendor, reconfigure the security objective to prioritize enhanced data encryption, real-time monitoring, and incident response measures. In the above example, the second API could be utilized to promptly implement these changes across the organization's infrastructure, ensuring that the security objective is aligned with the heightened threat landscape.

Systems and Methods for Posture-Based Modeling

Figure 25:
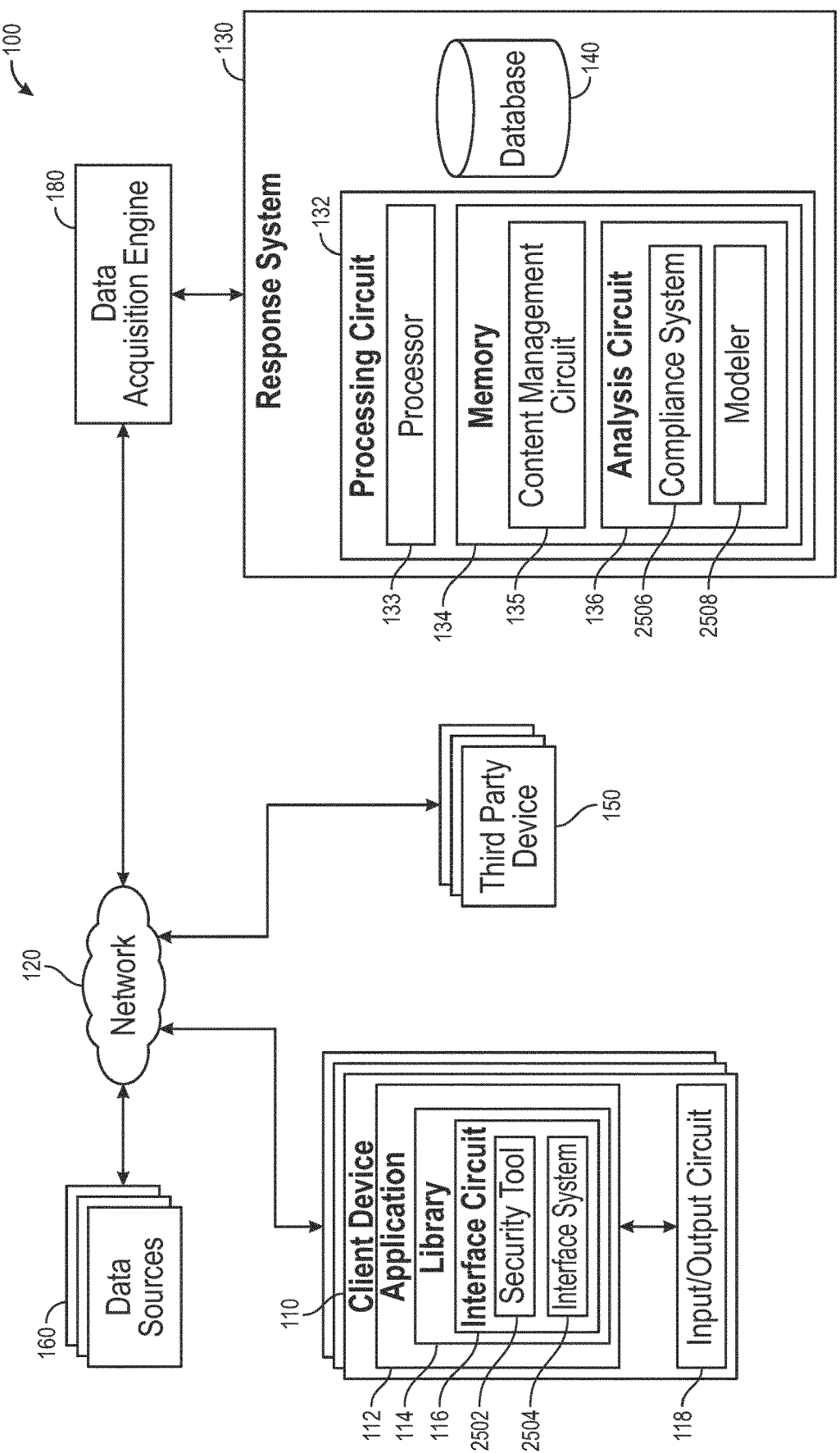
FIG. 25 depicts a block diagram of an implementation of a security architecture for posture-based modeling, according to some arrangements.

Referring to FIG. 25, a block diagram of an implementation of a security architecture for posture-based modeling is shown. The implementation shown in FIG. 25 includes a client device 110, response system 130, third-party device 150, data sources 160, and data acquisition engine 180 for protecting data (e.g., entity data, cybersecurity posture data, etc.). These components can be interconnected through a network 120 that supports secure communications profiles (e.g., TLS, SSL, HTTPS, etc.). In some arrangements, the elements shown in FIG. 25 can incorporate similar features and functionality as described regarding the elements shown FIG. 1A. For example, the response system 130, as shown in FIG. 25, incorporates similar functionality as described regarding the response system 130 of FIG. 1A; the database 140, as shown in FIG. 25, may incorporate the same or similar functionality as described regarding the database 140 of FIG. 1A; etc. Specifically, like callout references of FIG. 1A are now further described, however the features and functionalities of components like the response system 130 in FIG. 25 still correspond to those referred to with the same callout reference in FIG. 1A. For example, response system 130 is described in FIG. 25 to include additional functionality and features related to the security architecture for posture-based modeling.

In some arrangements, the client device 110 can include an application 112 and an input/output circuit 118. The application 112 can include a library 114, and the library 114 can include an interface circuit 116. The interface circuit 116 can further include a security tool 2502 and an interface system 2504. In some arrangements, the response system 130 can include a processing circuit 132 and a database 140. The processing circuit 132 can include a processor 133 and memory 134. The memory 134 can further include a content management circuit 135 and an analysis circuit 136, and the analysis circuit 136 can include a compliance system 2506 and a modeler 2508, as further described herein.

In some arrangements, one or more elements (computing systems, devices) of FIG. 25 can be communicably coupled (connected) to a distributed ledger (e.g., blockchain 170 of FIG. 1B) or other authoritative data source to ensure data integrity and security. For example, as described above regarding FIG. 1A, the database 140 can be a private ledger and data source 160 can be a public ledger, and data transactions (e.g., updates to proof/posture state data, cybersecurity parameters, entity data, etc.) recorded on the database 140 can be validated against entries recorded on the data source 160 to ensure that updates to entries are accurately reflected and can be audited against an immutable record (e.g., ensuring that results can be traceable and linkable). In some arrangements, the application 112 can be designed to integrate with technology and databases (e.g., database 140, response system 130, etc.) to access information used for posture-based modeling. The user can access the application 112 through a variety of devices, including client device 110.

In some arrangements, the response system 130 can be operably connected to data acquisition engine 180 and includes analysis circuit 136 to democratize posture threats, incidents, and claim data (e.g., cyber security data, protection data, protection control schemas, historical protection data, etc.) for posture-based modeling. The analysis circuit 136 can use the democratized data in underwriting, claims, the resilience process, etc. Using the data acquisition engine 180, the response system 130 can collect and process data (e.g., unstructured data, entity data) from various sources, such as client device 110, third-party devices 150 and data sources 160 for posture-based modeling.

In some arrangements, the response system 130 can receive, via a vendor security tool (sometimes referred to herein as a "security tool") application, a cybersecurity protection request from an entity. For example, the response system 130 can receive a request for cybersecurity protection (e.g., inquiry regarding cybersecurity protection plan, etc.) from the client device 110 (e.g., via the entity or other user interacting with the interface system 2504), and the request can be transmitted via the network 120. In some arrangements, the cybersecurity protection request can include entity data of the entity. For example, the cybersecurity protection request received by the response system 130 via the interface system 2504 can include legal data (e.g., regulatory impact, privacy impact, etc.), firmographic data (e.g., industry, revenue, etc.), and/or cybersecurity data (e.g., safeguards, root cause, etc.) of the entity. In some arrangements, the security tool 2502 is a security tool application (e.g., vendor security tool application of a vendor) configured to receive cybersecurity protection requests from entities or users and provider the cybersecurity protection requests, as described regarding the response system 130. Furthermore, as used herein, a vendor can be a party or protection entity offering a product (e.g., cybersecurity tool), and the cybersecurity tool can allow a prospective entity (e.g., party seeking protection) to purchase cybersecurity protection using the cybersecurity tool.

As used herein, a "protection plan" and "cybersecurity protection plan" refers to any array of measures and strategies primarily focused on bolstering cybersecurity defenses, including cybersecurity monitoring and response services, digital infrastructure hardening programs, employee cyber awareness training, data protection and encryption techniques, insurance plans, all aimed at securing or covering an entity's computing and networking infrastructure against cyber threats, vulnerabilities, and incidents, while ensuring compliance with relevant standards and regulations.

In some arrangements, the response system 130 can determine a cybersecurity posture with proof based on the entity data. For example, the compliance system 2508 can receive, process, and model data received via the vendor security tool application (e.g., entity data related to firmographics, security measures, etc.) and output a cybersecurity posture with proof. In some arrangements, the proof includes one or more digital signatures and/or authenticated data (e.g., of an entity, related to a security posture, etc.). In some arrangements, a cybersecurity posture can be a data package encapsulating an entity's cybersecurity disposition. This includes a mapping of compliances (e.g., regulatory and privacy impacts) and firmographic insights (e.g., industry classification and revenue metrics). Furthermore, the cybersecurity posture can include data related to protective measures (e.g., encryption standards, MDR, etc.) implemented by the entity and rationales for implementation. For example, the encoded posture state may integrate data reflecting the entity's encryption protocols, thereby offering a "snapshot" of its technical safeguards. This data can be used by a vendor, provider, or protection entity to assess the entity's alignment with cybersecurity benchmarks and standards, such as ISO 27001 certification. In some arrangements, the cybersecurity posture can include a verifiable account of the entity's cybersecurity measures, such as the implementation of advanced threat detection systems like MDR and endpoint detection and response solutions.

In some arrangements, the response system 130 can determine, utilizing one or more protection parameters, at least one cybersecurity protection plan corresponding to a cybersecurity attribute to protect the entity based on the cybersecurity posture with the proof. For example, the compliance system 2506 and/or modeler 2508 can identify and/or generate a cybersecurity protection plan (e.g., ransomware protection plan, data breach compensation plan, etc.), and the cybersecurity protection plan can correspond to a cybersecurity attribute (e.g., confidentiality, integrity, authentication, etc.) of the entity. In some arrangements, the cybersecurity protection plan determined by the response system 130 can be based on the cybersecurity posture of the entity and/or based on the proof (e.g., digital signatures, authenticated cybersecurity data, etc.). For example, the compliance system 2506 and/or modeler 2508 can identify and/or generate a cybersecurity protection plan by comparing and mapping compliances (e.g., regulatory and privacy impacts) of the entity, firmographic insights (e.g., industry classification and revenue metrics) of the entity, data related to protective measures (e.g., encryption standards, MDR, etc.) implemented by the entity, etc. to requirements (e.g., protection eligibility) of the cybersecurity protection plan (e.g., encryption standards, managed detection and response (MDR) system requirements, entity size/revenue requirements, etc.). This can include a comparison of rates tied to the effectiveness of current entity-implemented cybersecurity measures, such as encryption strength, endpoint security coverage, and MDR system efficiency.

In some arrangements, the response system 130 can provide, via the vendor security tool application of the entity computing system of the entity, the at least one cybersecurity plan (e.g., to the entity). For example, the cybersecurity protection plan determined by the response system 130 can be transmitted to the client device 110 and displayed via the security tool 2502 (e.g., using a graphical user interface (GUI)) of the application 112. In some arrangements, the cybersecurity protection plan provided via the vendor security tool application can include at least one selectable element (e.g., digital button, drag-n-drop, etc.). For example, a user (e.g., the entity) can interact with the selectable element (e.g., via pressing, clicking, etc.) to select one or more options related to the cybersecurity protection plan (e.g., "Yes"/"No", "I agree," "Please modify," "Please add," etc.). For example, the entity can accept (e.g., digitally sign/approve) the cybersecurity protection plan using the selectable element.

In some arrangements, the response system 130 can receive, from the vendor security tool application, an acceptance of the at least one cybersecurity protection plan. For example, the compliance system 2506 and modeler 2508 can receive an acceptance of the cybersecurity protection plan via the user (e.g., entity) interacting with the application 112 of the client device 110 (e.g., via the interface system 2504, using a GUI, etc.). For example, the entity can accept the at least one cybersecurity protection plan by selecting an "Accept" button within the application 112 (e.g., via the interface system 2504), by providing a digital signature, etc., and the entity's acceptance can be received by the response system 130 via the network 120.

In some arrangements, the response system 130 can record the acceptance with the proof embedded in a compliance dataset. That is, the proof can be embedded into the acceptance that is then recorded. For example, the response system 130 can store data related to the acceptance of the cybersecurity protection plan of the entity in a data store (e.g., database 140) for compliance verification, and the response system 130 can embed the proof (e.g., digital signatures, compliance certifications, etc.) within the stored data. Furthermore, the acceptance stored in the compliance dataset can be stored on a distributed ledger (e.g., using database 140 as a private ledger and data store 160 as a public ledger, as described above), or on an external data store (e.g., data sources 160, third party device 150). In some arrangements, the acceptance recorded by the response system 130 can include the cybersecurity attribute and the accepted cybersecurity protection plan. For example, the data recorded in the compliance data set can include data related to the cybersecurity attribute (e.g., confidentiality, integrity, authentication, etc.) and the accepted cybersecurity protection plan (e.g., artifact/identifier of signed/accepted breach protection plan, etc.). Furthermore, the compliance dataset can be a dataset/data structure configured to be monitored to ensure ongoing compliance with the accepted cybersecurity protection plan's cybersecurity requirements (e.g., encryption protocol compliance, security patching cadence, and access control integrity, such as SSL/TLS standards for data in transit, frequency of security updates, implementation of least privilege principles, etc.). As such, the various computing elements of FIG. 25 can perform underwriting for any cybersecurity protection policy/plan matching predefined proof criteria.

It should be understood that while the response system 130 processes cybersecurity protection requests, its functions can also be applied to other areas. These include conducting risk assessments, identifying supply chain vulnerabilities, and ensuring compliance with regulatory standards. The system can analyze entity data to recommend technology upgrades or process optimizations, based on firmographic data, legal requirements, and cybersecurity posture. Additionally, it can offer monitoring and reporting services to track the effectiveness of implemented measures. Furthermore, the response system 130 can be utilized for disaster recovery planning, facilitating the development of strategies to ensure business continuity in the event of cyber-attacks, natural disasters, or other unforeseen incidents. The response system 130 can create incident response plans, model the assessment of potential impacts on business operations, and perform and prioritize recovery actions.

In some arrangements, the response system 130 and/or client device 110 can further receive or collect environmental data from computing and networking structures of the entity for posture-based modeling. For example, the user (e.g., entity) can input environmental data via the interface system 2504 of the application 112, and the interface system 2504 (or other components of the client device 110, such as input/output circuit 118) can transmit the environmental data via the network 120, and the response system 130 (e.g., compliance system 2506, modeler 2508, etc.) can receive the environmental data. Furthermore, the environmental data can include information related to the entity's computing and networking infrastructure such as hardware and software setups, security mechanisms, and network layouts (e.g., firewall rules, server specifications, network connections, etc.).

In some arrangements, the response system 130 and/or client device 110 can further record the environmental data received/collected from the computing and networking structures of the entity in the compliance dataset. For example, the response system 130 (e.g., content management circuit 135, compliance system 2506, modeler 2508, etc.) can store/catalog environmental data (e.g., data related to network architecture, device configurations, security policies, etc.) in a data set (e.g., stored on database 140). Furthermore, the compliance dataset can be a structured dataset stored in a data store (e.g., database 140, data sources 160, etc.) and can be used (e.g., in compliance automation) by the computing elements of FIG. 25 (e.g., response system 130, compliance system 2506, etc.) to determine the entity's compliance with various requirements (e.g., protection parameters) of the cybersecurity plan (e.g., GDPR compliance, minimum data encryption standards, etc.).

In some arrangements, determining the at least one cybersecurity protection plan can include executing a zero-knowledge proof (ZKP) model to determine the entity's cybersecurity posture (e.g., readiness, resilience) against the one or more protection parameters. As described herein, zero-knowledge proofs (ZKPs) are a cryptographic method enabling one party (the prover) to prove to another party (the verifier) that a certain statement is true without revealing any information about the statement itself beyond its veracity. ZKP techniques can implement mathematical functions, such as elliptic curve cryptography or hash functions (e.g., SHA-256), to create a proof of knowledge (e.g., proving the possession of a secret key, such as a key proving the implementation of a specific cybersecurity requirement of a cybersecurity protection plan) without disclosing confidential and/or sensitive entity data. ZKPs can be implemented through interactive protocols (e.g., SHA-256, the Schnorr protocol, etc.), where the prover and verifier execute a sequence of exchanges (e.g., challenge-response cycles) to prove knowledge without revealing the underlying data. ZKPs can also be implemented via non-interactive schemes (e.g., e.g., zk-SNARKs (Zero-Knowledge Succinct Non-Interactive Arguments of Knowledge)) using a common reference string (e.g., a publicly agreed-upon set of values used in the cryptographic computation, other identifier, etc.).

In some arrangements, the ZKP model used by the response system 130 to determine the entity's cybersecurity posture can maintain anonymity of all or a portion of data used in determining the at least one cybersecurity protection plan. For example, the response system 130 (e.g., compliance system 2506, modeler 2508) can execute ZKPs to match entity posture to protectability (e.g., eligibility, regulatorability, insurability), allowing the entity to prove compliance with protection parameters (e.g., encryption standards, endpoint security) without revealing underlying data (e.g., sensitive user data, classified cybersecurity data, etc.) of the entity and/or data related to the security tool (e.g., proprietary source code used in cybersecurity product, etc.). Furthermore, the ZKP model can verify the entity's adherence to required security measures (e.g., SHA-256 encryption for data at rest, TLS 1.3 for data in transit, etc.) without exposing actual encryption keys of data being encrypted. For example, the ZKP model can be used (e.g., by the response system 130, compliance system 2506, modeler 2508, some combination of various FIG. 25 elements, etc.) to confirm the deployment of next-generation firewalls (NGFWs) required by protection parameters of the cybersecurity protection plan. Further, in some arrangements, the anonymity of the entity is maintained until acceptance. For example, the ZKP model used by the response system 130 to determine the entity's cybersecurity posture can prevent a protection entity from learning the identity of a prospective entity prior to acceptance of the protection plan (e.g., before the prospective entity/the prospective entity's representative accepts the provided security plan).

In some arrangements, the modeler 2508 can (1) determine at least one cybersecurity protection plan, (2) provide, to a graphical user interface (GUI), the at least one cybersecurity protection plan, (3) receive the acceptance, and (4) embed and record the acceptance can correspond to quoting, binding, and issue (QBI) of the cybersecurity protection plan. For example, the response system 130 can further analyze qualitative business impact (QBI) and resilience against cybersecurity threats of the entity's computing infrastructure in performing the various steps described above. For example, the compliance system 2506 and/or modeler 2508 can unify and analyze data related to the QBI to assess the potential financial loss, reputation damage, and operational downtime associated with cybersecurity incidents (e.g., data breaches, ransomware attacks, DDoS attacks, etc.). In some arrangements, determining the at least one cybersecurity protection plan further includes quoting the cybersecurity protection plan based on matching the cybersecurity posture of the entity to the cybersecurity attribute. For example, the response system 130 can compare the cybersecurity posture of the entity to cybersecurity attributes of one or more protection plans (e.g., by filtering based on protection parameters, by using GAI/ML techniques, etc.) to determine whether the entity meets various criteria (e.g., protection parameters) of the one or more protection plans and determine a protection quote (e.g., premiums, payments schedule, reimbursement, etc.) based on the identified protection plans and the entity's cybersecurity posture. Further, in this example, the response system 130 can examine the robustness of security measures (e.g., deployment of redundant systems), determine the effectiveness of incident response plans (e.g., using historical/predictive datasets and/or models), and/or analyze other entity datasets and/or security tools and further generate a protection quote based on the above analysis. For example, the response system 130 can use an artificial intelligence (AI) or machine learning (ML) model (e.g., generative AI (GAI), large-language model, supervised learning model, etc.) to predict the impact of specific vulnerabilities within the entity's network (e.g., unpatched software, outdated hardware), simulate model potential attack paths (e.g., using cyber penetration testing tools), and determine potential business impacts based on the QBI. In some arrangements, providing the at least one cybersecurity protection plan, receiving the acceptance, and recording the acceptance corresponds to binding and issuing the at least one cybersecurity protection plan based on (1) transmitting a first API call to create an protection binder and (2) transmitting a second API call to issue the at least one cybersecurity protection plan. For example, the response system 130 can bind (e.g., signify the third-party's commitment to the protection agreement before the actual protection policy is issued) and issue (e.g., finalize the protection coverage by preparing and sending the formal policy documents to the entity) the protection plan by executing API calls (e.g., for submitting an protection application, quoting an protection application, creating an protection binder, issuing a corresponding cyber plan, etc.), and the API calls executed by the response system 130 can include data payloads for various uses in aligning security posture to protection requirements. In some arrangements, the first API call can include a first data payload including an entity identification, cybersecurity protection plan information, and a temporary protection agreement identifier. In some arrangements, the second API call can include a finalized protection policy document, a permanent policy identifier, and confirmation of policy activation covering the entity under the at least one cybersecurity protection plan.

In some arrangements, the response system 130 can further renew (e.g., automatically) the cybersecurity protection plan of the entity based on the modeled cybersecurity posture and resilience. For example, the compliance system 2506 and modeler 2508 can evaluate and/or update the cybersecurity protection plan parameters (e.g., encryption requirements, regulatory standards, coverage levels, deductible amounts) by analyzing the modeled cybersecurity posture and resilience to extend or renew the term (e.g., period of effect) of the cybersecurity protection plan. For example, the response system 130 (e.g., using compliance system 2506, modeler 2508, etc.) can process the renewal of the cybersecurity protection plan by assessing adherence to encryption standards (e.g., AES-256 for data at rest, TLS 1.3 for data in transit), compliance with regulatory standards (e.g., GDPR for data protection, SOC 2 for service organizations), and more. For example, the response system 130 can map data associated with the entity's adherence to cybersecurity standards (e.g., based on the entity's cybersecurity posture) to various protection parameters of a cybersecurity protection plan, and further update the cybersecurity protection plan (e.g., by changing/recalibrating the cybersecurity parameters of the plan, by generating a new plan, etc.) based on the entity's adherence with the plan requirements, thereby unifying protectability tools for autorenewal.

In some arrangements, the response system 130 can further dynamically update the at least one cybersecurity protection plan based at least on an update in a cybersecurity landscape or a change in one or more entities' protection preferences. For example, the response system 130 can adjust the cybersecurity protection plan (e.g., by adjusting cybersecurity plan parameters) in response to emerging threats (e.g., zero-day exploits, advanced persistent threats), new compliance requirements (e.g., updates to international data protection laws), or other changes in the cybersecurity landscape identified by the compliance system 2506. Furthermore, the response system 130 (e.g., using modeler 2508) can update or refine the cybersecurity protection plan based on changes in the entity's protection preferences. For example, an entity can change its protection preferences when implementing more enhanced data privacy measures in light of increasing regulatory scrutiny (e.g., changing protection preferences to a higher value associated with a higher degree of cybersecurity protection, etc.). Based on analyzing the update and/or changes, the response system 130 can adjust or update the cybersecurity protection plan to match the entity's current risk profile and cybersecurity needs (e.g., extending coverage to new digital assets, recalibrating premiums based on risk assessment outcomes, renewing a plan, generating a new plan, etc.). For example, the response system 130 can update one or more protection parameters to ensure the related protection plan is dynamically aligned with the entity's evolving security requirements and the external cybersecurity environment.

In some arrangements, the various computing elements of FIG. 25 (e.g., response system 130) can further perform bulk trading of entity policies matching proof criteria for posture-based modeling, as described in detail below. In some arrangements, the response system 130 can receive, from a broker (e.g., provider) computing system, a bundle request from an protection broker. For example, the response system 130 can receive, from a broker computing system (e.g., client device 110, third party device 130, etc.), a bundle request for multiple protection policies that meet certain cybersecurity posture requirements (e.g., MDR system criteria). Furthermore, the bundle request can specify criteria (e.g., proof criteria) such as the presence of continuous monitoring tools, adherence to specific cybersecurity frameworks (e.g., ISO/IEC 27001, NIST), or a minimum score on cybersecurity posture assessments, and the response system 130 (e.g., utilizing modeler 2508) can execute functions/algorithms to assess which policies in the market comply with these proof criteria. For example, the bundle request can be generated (e.g., by the response system 130) based on parsing through policy attributes, analyzing historical claims data for risk assessment, and evaluating compliance certifications that entities possess. Once a match between cybersecurity protection plans and a group of entities is identified, the response system 130 can facilitate the bulk trading of the matched policies to a cybersecurity protection broker.

In some arrangements, the bundle request can include a set of cybersecurity parameters (e.g., cybersecurity protection plan criteria, such as incident response (IR) plan requirements). In some arrangements, the response system 130 can determine a plurality of prospective entities satisfying the set of cybersecurity parameters. For example, the bundle request can include a set of cybersecurity parameters such as required intrusion detection system capabilities (e.g., signature-based, anomaly-based), data encryption levels (e.g., AES 256-bit encryption), and endpoint protection standards (e.g., real-time malware scanning, automated patch management). The response system 130 (e.g., using compliance system 2506 and/or modeler 2508) can process data from a database of entities (e.g., protected entities, insured entities, compliant entities) to identify the entities whose cybersecurity measures align with the set of cybersecurity parameters. For example, determining the entities satisfying the criteria can include the response system 130 querying a compliance database (e.g., stored on database 140, data source 150, etc.) for certifications held (e.g., SOC 2 Type II, PCI DSS compliance), checking configuration management databases for installed security software versions, and cross-referencing against security incident and event management logs to determine the efficacy of the entities' cybersecurity implementations (e.g., cost-avoidance based determination, etc.). Once the matching entities are identified, the response system 130 (or modeler 2508) can group or bundle the identified entities that meet the protection provider's bundle request criteria for cybersecurity protection.

In some arrangements, the response system 130 can bundle the plurality of prospective entities and corresponding cybersecurity postures into a data package. For example, the response system 130 can bundle the identified prospective entities and corresponding postures into a data package by compiling (e.g., grouping, mapping, etc.) data of the selected entities with data of the entities' security postures in a unified format (e.g., JSON, XML, etc.). Furthermore, the response system 130 can use data serialization techniques (e.g., converting data structures into JSON format for ease of transmission) and/or encrypt the package using advanced encryption standards (AES) to ensure data confidentiality and integrity. For example, the bundled package can be timestamped and digitally signed (e.g., by the modeler 2508) using employing cryptographic hashing (e.g., SHA-256) to protect the data included in the package and to prepare the data package for secure transmission to the protection provider via encrypted communication channels.

In some arrangements, the response system 130 can transmit, to a plurality of protection entity computing systems (e.g., one or more third party device 150), the data package including information of the plurality of prospective entities and corresponding security postures. For example, the response system 130 can transmit the bundled data package to a broker computing system, such as a third-party device 150, by establishing a secure connection utilizing various protocols (e.g., TLS (Transport Layer Security) for data in transit, VPN (Virtual Private Network) tunnel or a dedicated leased line for added security, etc.). Upon establishing the connection, the response system 130 can initiate and execute a secure file transfer protocol (e.g., SFTP or SCP) to send the encrypted and signed data package including information of the plurality of protection plans (e.g., coverage type, reimbursements, other data related to the cybersecurity protection plans and/or cybersecurity parameters, etc.). Furthermore, the broker computing system (e.g., third-party device 160) can use decryption keys and digital signature verification tools (as per the shared security protocol with the response system 130) to decrypt, authenticate, and process the received data package, ensuring the integrity and confidentiality of the plurality of protection plans information during transit and upon receipt. In some arrangements, the data package can include a customized arrangement corresponding to an endorsement or a pricing coverage. For example, the data package can include specific terms (e.g., cyber protection terms) that offer enhanced cybersecurity protection coverage at preferential rates for prospective entities demonstrating strong cybersecurity postures (e.g., robust systems, organizational focus on cyber threats, implementation of specific cybersecurity tools, etc.). Alternatively, the data package can include terms demanding increased premiums or deductibles for entities identified as high-risk (e.g., based on cybersecurity posture, firmographic data of the prospective entity, weak cybersecurity measures implemented, etc.).

In some arrangements, the various components of FIG. 25 (e.g., response system 130) can perform bulk trading of entity policies matching proof criteria according to the process outlined above, but by determining, bundling, or transmitting a plurality of protection plans instead of a plurality of prospective entities/corresponding cybersecurity postures. For example, the response system 130 can receive, from a broker computing system (e.g., third party device 150), the bundle request including a set of cybersecurity parameters and determine a plurality of entities (e.g., entities with cyber protection) satisfying the parameters. Further, the response system 130 can identify a plurality of protection plans of the plurality of entities. For example, the response system 130 can identify a plurality of protection plans by querying the compliance system 2506 and/or modeler 2508 to retrieve and analyze policy attributes from a secured database (e.g., database 140). For example, the response system 130 can execute database search operations (e.g., SQL JOIN queries across policyholder tables and protection plan tables) to cross-reference the protection parameters (e.g., using protection database logs, data on current cybersecurity certifications, risk assessments, etc.) to identify a plurality of protection plans implemented by the entities. The response system 130 can further transmit, to a plurality of protection entity computing systems, the data package including information of the plurality of protection plans (e.g., plan type, coverage amount, term, entity cyber requirements/prerequisites, etc.), receive one or more bid requests for the bundled data package, and exchange the bundled data package for an amount. For example, the exchange can include the response system 130 assigning the plurality of protection plans of the bundled data package to a protection entity.

For example, the processes outlined above can allow a broker, after digitization of cybersecurity safeguards and/or configurations of an entity, to present (e.g., independently or by partnering with a security vendor) a set of qualified prospective entities to a protection entity. For example, the set of qualified prospective entities can include a list of entities (e.g., entities seeking cybersecurity protection) and corresponding cybersecurity posture data (e.g., entity firmographic data, data related to cyber implementations, etc.) to be used by a protection entity in determining whether to bid on a portion (e.g., a bulk amount) of the prospective entities. Furthermore, after receiving the entity and cybersecurity data, the protection entities can make special arrangements (e.g., endorsements, pricing, coverage, etc.) to encourage the broker to provide the prospective entities included in the list of entities to the protection entity. For example, the protection entity can offer reduced pricing terms (e.g., lower premiums) or additional coverage options (e.g., DDoS coverage) after receiving the list of prospective entities and determining the corresponding cybersecurity postures of the entity are robust (e.g., implementation of multiple cybersecurity tools, compliance with latest industry standards, compliance with regulatory standards, etc.). Furthermore, the bid amount offered by the protection entity or the special arrangements made to encourage the broker to send the plurality of entities to the protection entity can be based on a bulk pricing model designed to factor both the number of entities included in the bid (or the entities for which special arrangements are offered) and corresponding cybersecurity postures of the entities.

In some arrangements, the response system 130 can receive, from one or more broker computing systems (e.g., third-party device 150), one or more bid requests for the bundled data package. For example, the response system 130 can receive bid requests that include specific parameters such as the desired level of cybersecurity coverage (e.g., coverage against data breaches, ransomware attacks, etc.), preferred premium ranges and/or payment criteria (e.g., payment periods, late fees, etc.), and criteria for cybersecurity compliance standards (e.g., compliance with ISO/IEC 27001, NIST Cybersecurity Framework, etc.). Furthermore, each bid request received by the response system 130 via the one or more broker computing systems can specify the broker's requirements for policy customization options (e.g., inclusion of cyber incident response services, coverage extensions for cloud-based assets, etc.) to match/align the protection plans with the market demand, cybersecurity landscape changes, and/or specific entity cybersecurity protection needs.

In some arrangements, the response system 130 can exchange the bundled data package for an amount based on one of the one or more bid requests. For example, the response system 130 can evaluate and accept a bid request (e.g., offer of monetary sum) that offers improved terms for the exchange by evaluating various factors related to the one or more bid requests, including the proposed amount and the bidder's compliance with required cybersecurity practices (e.g., data encryption standards, regulatory compliance, etc.). In some arrangements, the exchange (e.g., process of exchanging bundled data package for amount) includes assigning the plurality of protection plans of the bundled data package to a broker. For example, the broker to whom the protection plans are assigned can be a specialized entity with a robust technological infrastructure capable of handling complex data transactions securely (e.g., intermediator). Furthermore, in assigning the protection plans to the broker, the response system 130 can update a transaction ledger (e.g., stored within database 140) to reflect the transfer of ownership (e.g., the exchange of the bundled data package for amount).

In some arrangements, the set of cybersecurity parameters can include proof criteria, and the proof criteria can include cybersecurity measures and technologies (SMT) of the plurality of entities. For example, the response system 130 (e.g., using the modeler 2508) can evaluate the bundled data package against the bid requests by applying proof criteria that encompass specific cybersecurity measures and technologies (SMT) of the entities. For example, these proof criteria can include verifying the implementation of entity-implemented Multi-Factor Authentication (MFA) to bolster access control, assessing the effectiveness of Endpoint Detection and Response (EDR) systems in identifying and mitigating cyber threats, evaluating the coverage provided by Managed Detection and Response (MDR) services for comprehensive threat management, etc. In some arrangements, determining the at least one cybersecurity protection plan corresponding to the cybersecurity attribute can further includes using the proof to ensure compliance with required cybersecurity measures and technologies. Furthermore, the proof used to ensure compliance can include documentation (e.g., security policy documents, incident response plans, employee training completion certificates), compliance proof (e.g., ISO/IEC 27001 certification, GDPR compliance reports), network security proof (e.g., firewall and IDS/IPS configuration snapshots, VPN usage logs), access control proof (e.g., MFA deployment records, access control lists), data protection proof (e.g., encryption protocol details, data backup and recovery audit trails), threat detection and response proof (e.g., EDR alerts history, malware removal reports), and/or vendor risk management proof (e.g., third-party security assessment reports, vendor SLAs). For example, the response system 130 can incorporate digital certificates or blockchain-based records as proof (e.g., stored via database 140/data source 160 acting as private and public ledgers, respectively, of a distributed ledger). For example, these proofs can validate that an entity's cybersecurity implementations, such as MFA, EDR, and MDR, meet specific standards set by the cyber protection plan. For example, a digital certificate could be issued to an entity upon successful implementation of MFA, and the response system 130 can use this proof of implementation in determining potential cybersecurity plans for which the entity is qualified. In some arrangements, determining the at least one cybersecurity protection plan corresponding to the cybersecurity attribute further can include using one or more tokens to align the entity with the cybersecurity attributes. For example, one or more tokens can serve as digital representations of an entity's compliance with required cybersecurity measures and technologies, and holding a token can indicate that an entity has implemented certain cybersecurity measures (e.g., those that have been validated and are in active use). For example, a token could represent the active and effective use of EDR systems within the entity's network and be issued following an audit or assessment by a trusted third party or through automated systems capable of independently verifying the presence and effectiveness of EDR systems. In some arrangements, the tokens correspond to a verified and authenticated state of the entities' security posture and resilience. For example, the verified/authenticated state can indicate that the entity's security implementations have been thoroughly checked for effectiveness and compliance (e.g., verification that a cybersecurity measure is implemented by the entity, that the implemented cybersecurity measure is correctly configured and fully operational (e.g., active), etc.).

In some arrangements, the cybersecurity protection plan provided is based on the determined security posture of the entity, and the cybersecurity protection plan corresponds to one or more coverage options aligning with the entity's protection preference. For example, the response system 130 (e.g., using the compliance system 2506 and/or modeler 2508) can analyze the entity's digital infrastructure vulnerabilities (e.g., utilizing data collected from security tools 2502, such as data regarding recent cyber incidents, current defense mechanisms, etc.), the entity's cybersecurity needs (e.g., coverage type, amount of coverage, etc.), and other entity data (e.g., firmographic data such as entity size, revenue, etc.) to determine a cybersecurity protection plan aligning with the entity's cybersecurity needs (e.g., type of protection, integrations, etc.), preferences, technical implementations, etc. For example, the response system 130 can process entity data to generate an entity risk profile that includes potential attack vectors (e.g., susceptibility to phishing, ransomware attack history), existing safeguards (e.g., deployment of firewalls, use of secure sockets layer (SSL) encryption for data transmission), and areas of compliance (e.g., adherence to the General Data Protection Regulation (GDPR) or the Health Insurance Portability and Accountability Act (HIPAA)). Based on entity risk profiles and the entity's stated cybersecurity needs, the response system 130 can dynamically configure protection coverage options by providing different cybersecurity protection plans in response to different entity protection preferences/needs/ implementations (e.g., necessity of Endpoint Detection and Response (EDR) systems, desire for phishing protection, entity size/revenue, etc.).

In some arrangements, the security tool 2502 of the client device 110 can be configured to collect and transmit data to the response system 130 for various actions (e.g., submitting cybersecurity protection requests). The response system 130 can collect and submit entity data, including environmental data about the entity's computing and networking infrastructure. This data can be used by the response system 130 in posture-based modeling. Users can input relevant environmental information through the application's interface, which can then be securely transmitted to the response system for analysis. Furthermore, the security tool 2502 can be a conduit for receiving updates from the response system 130 regarding cybersecurity protection plans, modifications based on ongoing risk assessments, and feedback on the entity's cybersecurity posture.

In some arrangements, the security tool 2502 can a software application embedded within the client device 110, designed to facilitate secure communication and data exchange with the response system 130 for cybersecurity management tasks. The security tool 2502 can include functionalities for initiating cybersecurity protection requests, submitting entity-specific data (e.g., including cybersecurity posture data and environmental data pertaining to the entity's IT infrastructure), and receiving updates or feedback on cybersecurity protection plans. The security tool 2502 can be integrated with the device's application layer, utilizing secure communication protocols (e.g., TLS/SSL) for data transmission over networks. For example, the security tool 2502 can provide a user interface (e.g., graphical user interface (GUI)) for entities to interact with the system, input data, and make selections regarding protection options. Additionally, the tool may incorporate features for real-time monitoring and alerts.

In some arrangements, the compliance system 2506 can prepare and report cyber incidents according to various governmental regulations. In some arrangements, the compliance system 2506 can determine when a cyber incident is substantial based on a government regulation, which could range from significant losses in the confidentiality, integrity, or availability of information systems, to serious impacts on operational safety, disruptions in business activities, or unauthorized access stemming from third-party compromises. Upon identifying such incidents, the compliance system 2506 can gather a set of data necessary for reporting. This data collection can encompass all correspondence with threat actors, indicators of compromise, relevant log entries, forensic artifacts, network data, and information on how the threat actor compromised the system, among others. Additionally, the compliance system 2506 can track and document all details related to any ransom payments, including the amount, the decision process, and the aftermath of the payment.

For example, a substantial cyber incident can lead to one or more of the following: a substantial loss of confidentiality, integrity or availability of a covered entity's information system or network, a serious impact on the safety and resiliency of a covered entity's operational systems and processes, a disruption of a covered entity's ability to engage in business or industrial operations, or deliver goods or services, unauthorized access to a covered entity's information system or network, or any nonpublic information contained therein, that is facilitated through or caused by a: compromise of a cloud service provider, managed service provider, or other third-party data hosting provider; or supply chain compromise.

Furthermore, in some arrangements, the compliance system 2506 can also be configured to manage and submit follow-up reports as required. This can include generating supplemental reports when new or different information about a cyber incident becomes available or if additional ransom payments are made. Thus, the compliance system 2506 can provide all relevant data such that it is accurately preserved and maintained for a minimum period (e.g., set at two years), following the submission of the most recent report. This data preservation can include the initial detection of a compromise to the full resolution and analysis of the incident, including any payments made and the identification of exploited vulnerabilities.

In some arrangements, the operational framework of the compliance system 2506 aligns with the need for timely and detailed incident reporting and data preservation to assist organizations in maintaining compliance with regulatory requirements. By automating the process of collecting, preserving, and reporting detailed information about cyber incidents and ransom payments, the compliance system 2506 reduces the manual effort required and enhances the accuracy of the information reported. This approach can be used to fulfil legal and regulatory obligations and strengthen the overall cybersecurity posture of organizations by ensuring a structured response to incidents and facilitating continuous improvement through detailed incident analysis and feedback.

In some arrangements, the preservation requirement of the compliance system 2506 can include all correspondence with the threat actor, regardless of the forum or method; indicators of compromise; relevant log entries; relevant forensic artifacts; network data; data and information that may help identify how a threat actor compromised or potentially compromised an information system; system information that may help identify exploited vulnerabilities; information about exfiltrated data; all data or records related to the disbursement or payment of any ransom payment; and any forensic or other reports concerning the incident, whether internal or prepared for the covered entity by a cybersecurity company or other third-party vendor.

Figure 26A:
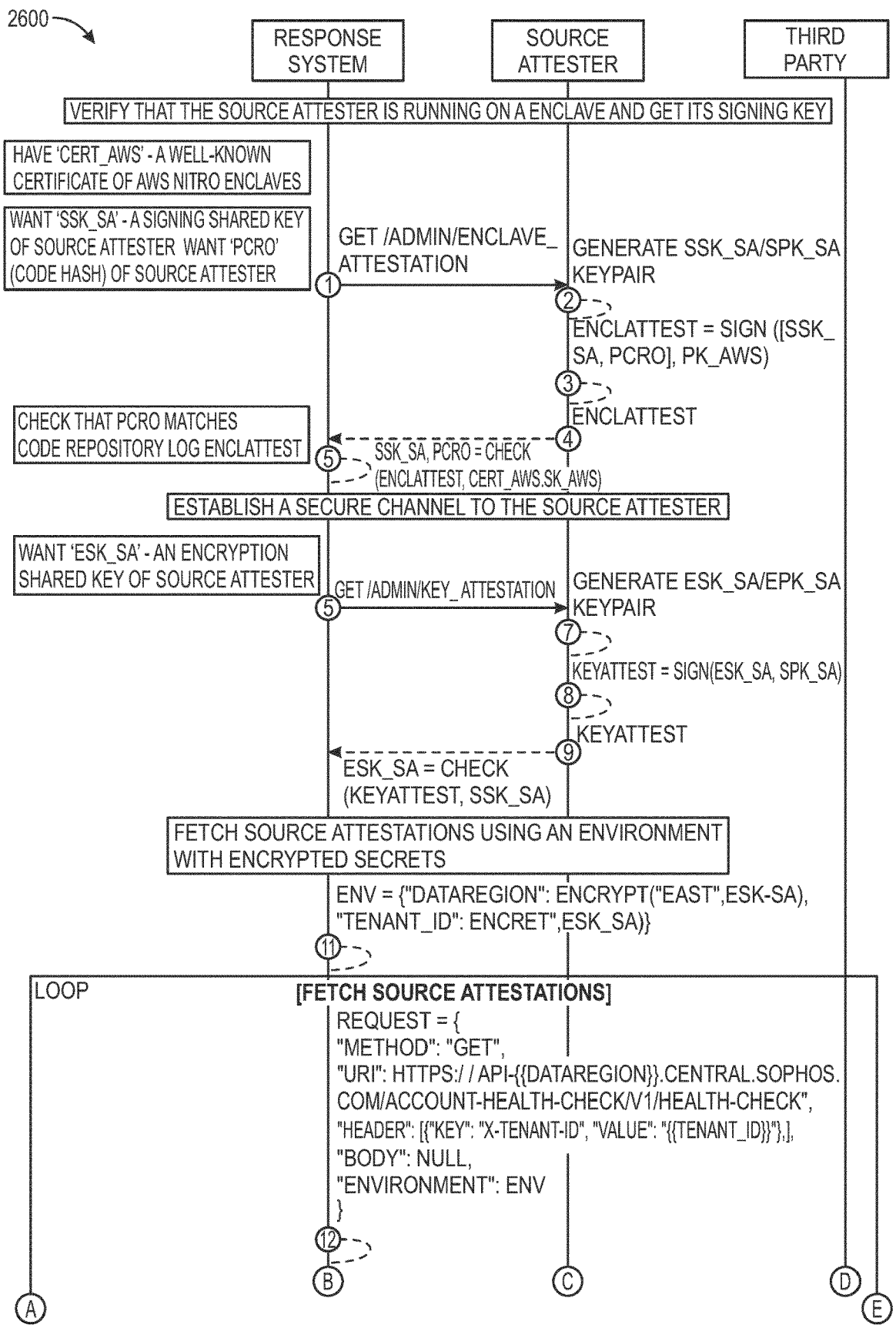
FIGS. 26A-26B depicts a block diagram of a zero-knowledge proof (ZKP) model, according to some arrangements.

Referring generally to FIG. 26, block diagrams of implementations of a system 2600 for posture-based modeling (e.g., attestation/verification within a secure computing environment) are shown. Referring to FIG. 26A in more detail, the system 2600 can verify that a source attester is running on an enclave and fetch a signing key of the source attester, establish a secure channel to the source attester, and fetch source attestations using an environment with encrypted secrets. For example, the system 2600 can verify that a source attester is running on an enclave and fetch a signing key of the source attester by initiating a certificate check process (e.g., utilizing AWS Nitro Enclaves certificates) to authenticate the enclave's integrity and identity. A compliance system (e.g., compliance system 2506 of FIG. 25) can then request and validate an attestation, confirming that the enclave's state and the code executed by the enclave are as expected (e.g., matching a known good configuration). Furthermore, the system 2600 can establish a secure channel to the source attester by executing a cryptographic protocol (e.g., Transport Layer Security (TLS) handshake) that ensures the confidentiality and integrity of communications. This can involve the exchange of session keys generated by a modeler (e.g., modeler 2508 of FIG. 25) and the enclave (e.g., with session keys derived using an ephemeral Diffie-Hellman key exchange to facilitate a secure channel setup). Further, the system 2600 can fetch source attestations using an environment with encrypted secrets by employing secure cryptographic envelopes (e.g., using symmetric key encryption like AES-256) to encapsulate the attestation data. For example, a modeler (e.g., modeler 2508) can encrypt an attestation request payload with a shared secret key, ensuring that only a source attester, which possesses the corresponding decryption key, can access and process an attestation request.

Figure 26B:
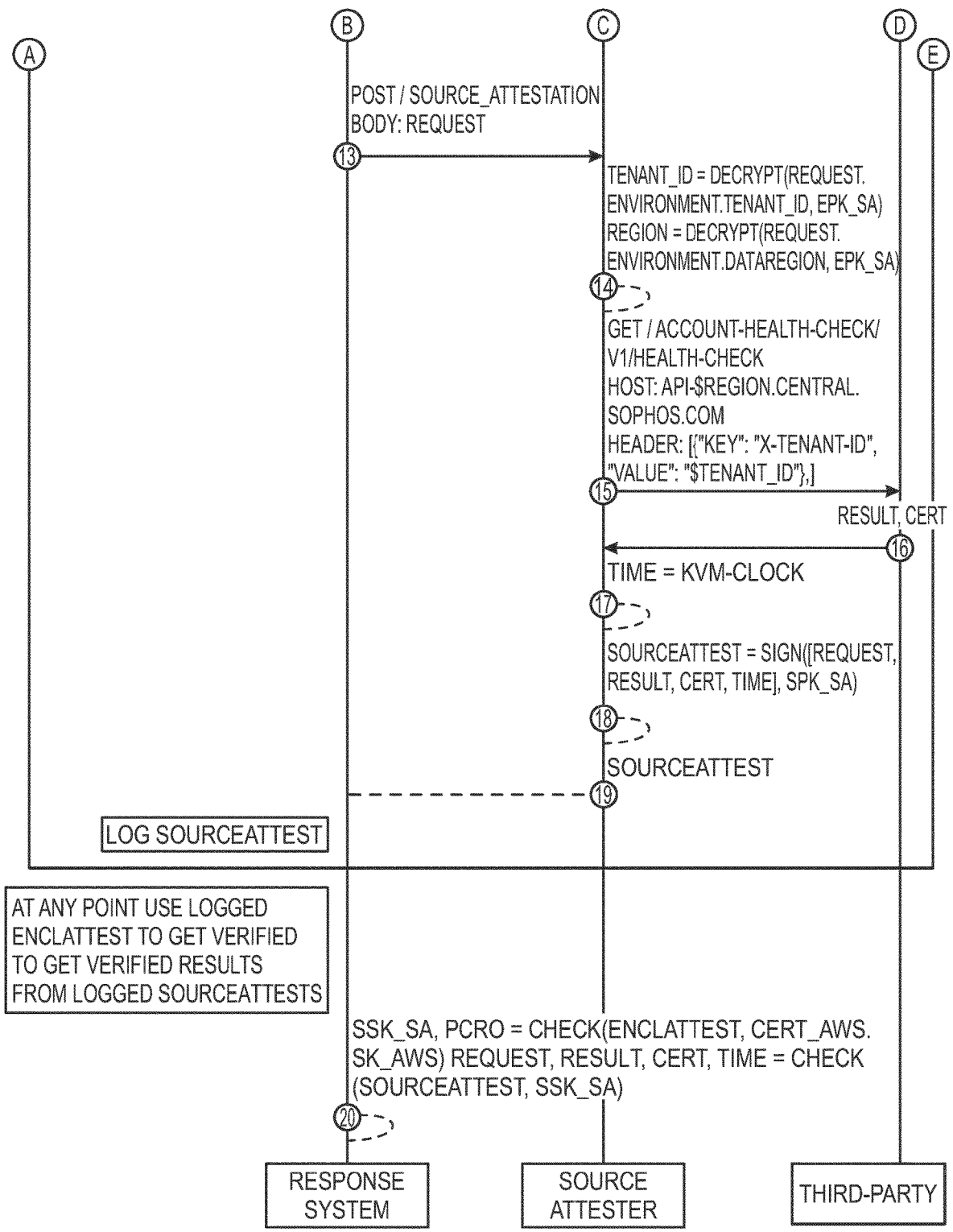

Referring to FIG. 26B in more detail, the system 2600 can capture and securely log a POST action of a source attestation body (e.g., encapsulating requests for attestation validation). For example, the response system 130 of FIG. 25 (e.g., using the modeler 2508) can decode the encrypted environment variables/fields (e.g., TENANT_ID, REGION, TIME, SOURCE ATTEST, etc.) and utilize the ESK for decryption). The system 2600 can transmit GET requests to verify the health and status of an account (e.g., via an API endpoint as specified in the health check URL) and ensure that the received information is current by timestamping with a trusted source (e.g., KVM-CLOCK). Further, the system 2600 can verify that the source attester's signature is applied to the transaction (e.g., signing with the enclave's SPK), further verified by the compliance system 2506 against the enclave's attestation and the known certificate authority (e.g., using AWS certificates, using fields such as SSK_SA, PCRO, REQUEST, RESULT, CERT, TIME, etc.), thereby providing an immutable log for subsequent audits and verifications.

Figure 27:
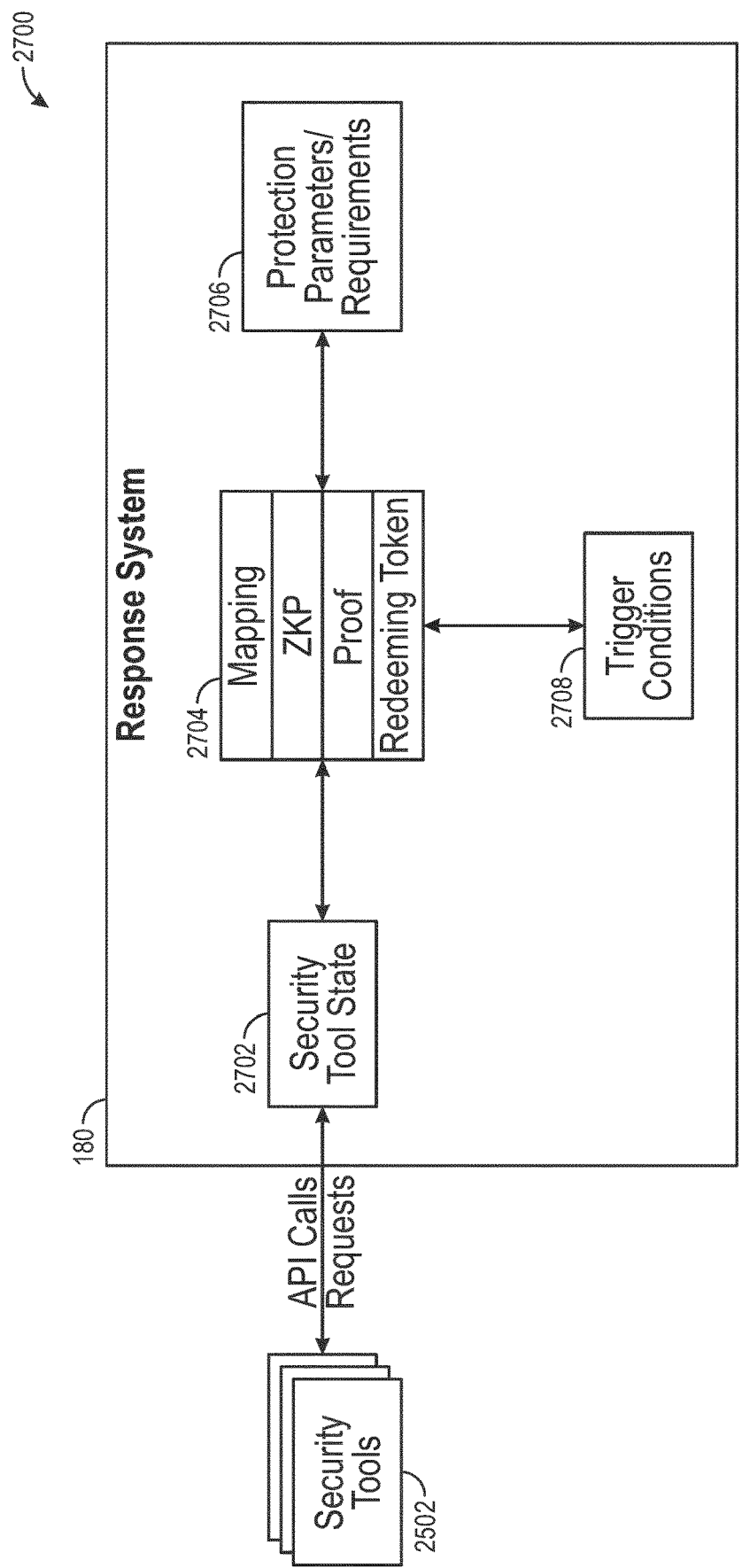
FIG. 27 depicts a block diagram of a more detailed architecture of certain systems or devices of FIG. 25, according to some arrangements.

Referring now to FIG. 27, a block diagram of an implementation of a system 2700 including a response system 130 for posture-based modeling is shown. In some arrangements, the system 2700 can include the response system 130 and security tools 2502, which can be used at block 2702, block 2704, block 2706, and block 2708 for various purposes related to cybersecurity protection, protecting data, and/or posture-based modeling, as further described herein. In some arrangements, at block 2702, the response system 130 can determine a security tool state corresponding to one or more security tools 2502. For example, the response system 130 can utilize API calls/requests (e.g., utilizing RESTful API) to interrogate the security tools 2502, retrieving their operational states, configurations, and recent activity logs (e.g., to assess the current state, effectiveness, etc. of the security tools 2502). At block 2704, the response system 130 can receive data and engage in data processing tasks such as mapping the received data to known security incidents or potential threats using techniques like Zero-Knowledge Proofs (ZKPs) to verify data integrity without exposing the underlying data. For example, the system can use ZKP to validate the redemption of tokens provided by security tools as proof of a secure state or incident resolution without revealing sensitive details related to an entity.

At block 2706, the response system 130 can determine and/or apply protection parameters or requirements by comparing the current security tool states against predefined security benchmarks or profiles (e.g., encryption standards, regulatory compliance requirements, etc.). For example, at block 2706, the response system 130 can process and analyze data such as the efficacy of current encryption protocols in use (e.g., comparing deployed AES-256 encryption against organizational policy requirements) and the level of adherence to various cybersecurity frameworks (e.g., NIST Cybersecurity Framework, ISO/IEC 27001 standards). At block 2708, the response system 130 can trigger conditions based on the analyzed data and security tool states. For example, in response to detecting a discrepancy or anomaly, the response system 130 can execute predefined cybersecurity response protocols (e.g., isolation of affected systems, activation of additional monitoring tools, notification to incident response teams, etc.) based on protection parameters/requirements corresponding to an entity and/or to a protection plan of the entity, as described above regarding FIG. 25.

Figure 28:
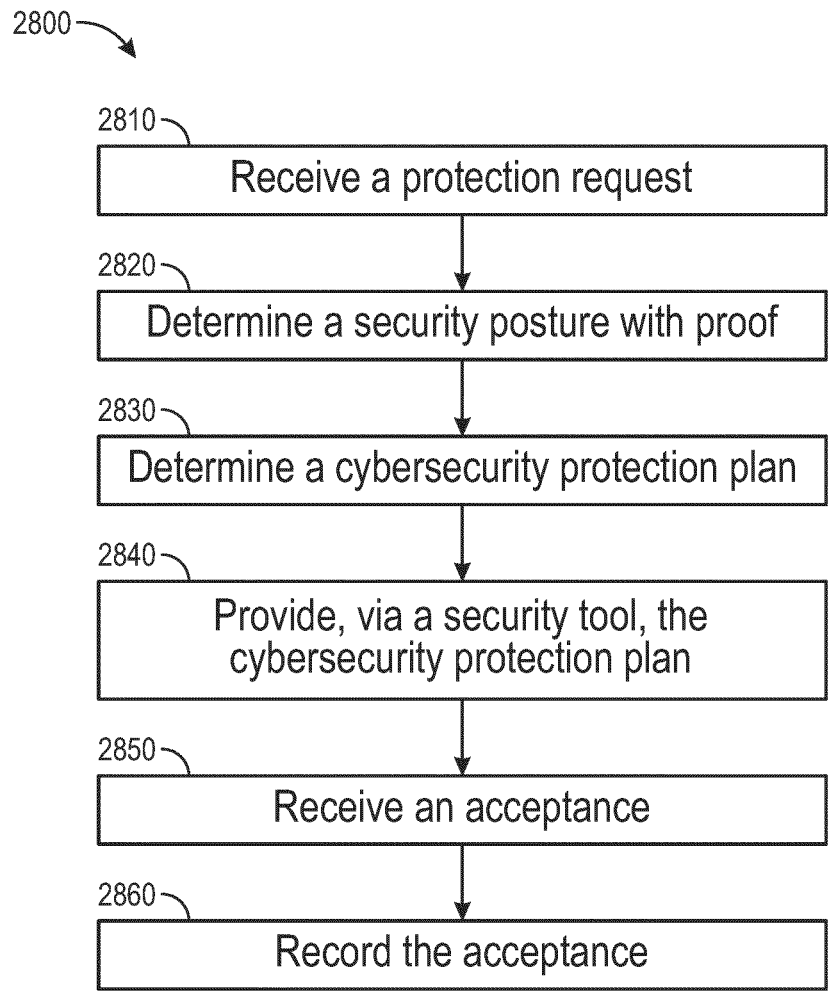
FIG. 28 depicts a flowchart for protecting data, according to some arrangements.

Referring now to FIG. 28, a flowchart for a method 2800 for protecting data (e.g., for posture-based modeling) is shown, in accordance with present implementations. At least the computing/security architecture shown and described regarding FIG. 25 can perform method 2800 according to present implementations.

In general, method 2800 relates to shifting the point of purchase of cyber protection or a cyber product to cybersecurity tools with compliance automation. For example, in response to a protection entity or vendor of a security tool entering rules (e.g., protection parameters or requirements of an protection plan, such as encryption standards, implementation of MDR systems, entity firmographic data, etc.), the method 2800 can be used (e.g., by various computing devices, as shown on FIG. 25) to link the protection plan requirements to real-world cyber implementations of the entity. For example, using an existing link between a security vendor tool and the entity (e.g., prospective entity), the method 2800 can be used to verify whether the protection parameters of the cyber protection plan or product are satisfied by the entity and/or the entity's cybersecurity implementations. For example, rather than requiring a human to perform underwriting or verification that the entity and/or the entity's cybersecurity implementations meet (or comply) with the various criteria of the protection plan (e.g., the protection parameters), the method 2800 can be used to dynamically map cybersecurity parameters to cyber implementations of the entity, using proof (e.g., digital documentation, evidence, or assessments that demonstrate the security measures and protocols a company or entity has implemented to protect against cyber threats and vulnerabilities) to ensure the entity complies with the requirements/parameters of the protection plan, thus bypassing the need for human involvement in underwriting. Furthermore, the point of purchase of cyber protection can be "shifted" to the security vendor (e.g., cybersecurity company offering a security tool) by embedding, within a security vendor dashboard (e.g., GUI), data related to the mapped cybersecurity parameters, proof, and entity (e.g., information related to the entity's qualification or preapproval for protection). For example, a ZKP model can be used can maintain anonymity of the prospective entity prior to the prospective entity agreeing to (or enrolling in) the cyber protection plan. For example, the ZKP model used in method 2800 can prevent sharing the identity of the client prior to the client purchasing, agreeing to, and/or signing the protection plan, thereby avoiding breaking legal agreements (e.g., non-disclosure agreements) associated with the cybersecurity plan, protection entity, and/or prospective entity.

As a broad example of method 2800, a prospective entity can interact with a security vendor application (e.g., dashboard) when considering purchasing and/or implementing a cybersecurity tool offered by the vendor (e.g., firewalls, antivirus software, intrusion detection/prevention systems (IDS/IPS), endpoint protection platforms (EPP), multi-factor authentication (MFA) tools, encryption tools, employee training programs, etc.). Furthermore, as the entity reviews these tools via the dashboard/application, a real-time evaluation of the entity's cybersecurity stance can be initiated and executed. For example, a ZKP model can be used to analyze the entity's security measures against the protection provider's requirements without disclosing the entity's identity, thereby safeguarding confidential information and adhering to any non-disclosure agreements in place. Furthermore, if the entity's cybersecurity practices align with the specified criteria, a notification of pre-qualification or pre-approval for cyber protection can be provided to the entity (e.g., via the vendor dashboard/application). As such, the method 2800 can be used to connect an entity's prospective adoption of specific security tools directly with protection eligibility, streamlining the path to obtaining cyber protection based on the entity's security readiness (e.g., resilience, posture, etc.).

In some arrangements, the one or more processing circuits can be configured to shift the point of purchase of cyber protection to cyber security tools with compliance automation. For example, the one or more processing circuits can provide a prospective entity seeking to purchase or implement a cybersecurity tool with compliance data related to protection plans that the prospective entity is qualified for based on potentially implementing the cybersecurity tool (e.g., whether the entity would comply with protection parameters of a cybersecurity plan if the entity implemented the security tool). This data can be provided via a security tool dashboard of the vendor and can allow the entity to purchase an protection plan via the dashboard, thereby shifting the point of purchase to the security tool application. In some arrangements, the one or more processing circuits can be configured to use a ZKP method of matching posture to protectability. For example, the one or more processing circuits can be configured to use a Zero-Knowledge Proof model to determine whether a prospective entity is qualified and provide this information to a protection entity without exposing the underlying identity of the prospective entity. In some arrangements, the one or more processing circuits can be configured to unify tools for assessing protectability based on cybersecurity posture, identifying cybersecurity/protection gaps, and suggesting solutions, and further to quantify business impact (QBI), enhance resilience, and automate policy renewal processes. For example, the one or more processing circuits can be configured to integrate with cybersecurity assessment platforms to automatically evaluate an entity's security measures, pinpoint specific vulnerabilities, recommend corrective actions, quantify the potential business impact of identified vulnerabilities, and continuously monitor the cybersecurity posture of an entity for further updates. In some arrangements, the one or more processing circuits can be configured to allow a protection entity to perform bulk trading of entity policies matching proof criteria. For example, the one or more processing circuits can be configured to aggregate compliance data and cybersecurity evaluations (e.g., in bulk) and to allow protection entities to efficiently identify and transact policies in bulk for entities that meet or exceed the requisite cybersecurity protection parameters corresponding to one or more cybersecurity protection plans, thereby streamlining the underwriting process.

In a broad overview of method 2800, at block 2810, the one or more processing circuits (e.g., response system 130 of FIG. 25) can receive a protection request. At block 2820, the one or more processing circuits can determine a security posture. At block 2830, the one or more processing circuits can determine a cybersecurity protection plan. At block 2840, the one or more processing circuits can provide, via a security tool, the cybersecurity protection plan. At block 2850, the one or more processing circuits can receive an acceptance. At block 2860, the one or more processing circuits can embed the proof into the acceptance and record the acceptance.

At block 2810, the one or more processing circuits (e.g., response system 130 of FIG. 25) can receive a protection request. In some arrangements, at block 2810, the one or more processing circuits can receive, via a vendor security tool application, a cybersecurity protection request from an entity. For example, the one or more processing circuits can receive a request for cybersecurity protection (e.g., inquiry regarding cybersecurity protection plan, etc.) from a client device by the entity or other user interacting with an interface system, such as a graphical user interface (GUI). In some arrangements, the cybersecurity protection request received at block 2810 can include entity data of the entity. For example, the cybersecurity protection request received by the one or more processing circuits can include legal/regulatory data (e.g., regulatory impact, privacy impact, etc.), firmographic data (e.g., industry, revenue, etc.), and/or cybersecurity data (e.g., safeguards, root cause, etc.) of the entity.

At block 2820, the one or more processing circuits can determine a security posture. In some arrangements, at block 2810, the one or more processing circuits can determine a cybersecurity posture with proof based on the entity data. For example, the one or more processing circuits can process data received via the vendor security tool application (e.g., entity data related to firmographics, security measures, etc.) and output a cybersecurity posture with proof. In some arrangements, the proof includes one or more digital signatures and/or authenticated data (e.g., of an entity, related to a security posture, etc.). In some arrangements, a cybersecurity posture determined at block 2810 can be a data package encapsulating/encoding an entity's cybersecurity disposition (e.g., a mapping of compliances, firmographic insights, protective measures, etc.) For example, the cybersecurity posture may integrate data reflecting the entity's encryption protocols, which can be used by a vendor, provider, or protection entity to assess the entity's alignment with cybersecurity benchmarks and standards (e.g., ISO 27001 certification). In some arrangements, the cybersecurity posture can include a verifiable account of the entity's cybersecurity measures (e.g., implementation of advanced threat detection systems like MDR and endpoint detection and response solutions).

At block 2830, the one or more processing circuits can determine a cybersecurity protection plan. In some arrangements, at block 2830, the one or more processing circuits can determine, utilizing one or more protection parameters (e.g., vendor parameters or rules, insurance parameters or rules, regulatory parameters or rules certification authorities (CAs) parameters or rules, technology partners parameters or rules, audit and compliance firms parameters or rules, cybersecurity framework organizations parameters or rules), at least one cybersecurity protection plan corresponding to a cybersecurity attribute to protect the entity based on the cybersecurity posture with the proof. For example, the one or more processing circuits can identify and/or generate a cybersecurity protection plan (e.g., ransomware protection plan), and the cybersecurity protection plan can correspond to a cybersecurity attribute (e.g., confidentiality, integrity, authentication, etc.) of the entity. In some arrangements, the cybersecurity protection plan determined by the one or more processing circuits at block 2830 can be based on the cybersecurity posture of the entity and/or based on the proof (e.g., digital signatures, authenticated cybersecurity data, etc.). For example, the one or more processing circuits can identify and/or generate a cybersecurity protection plan by comparing and mapping compliances (e.g., regulatory and privacy impacts) of the entity, firmographic insights (e.g., industry classification and revenue metrics) of the entity, data related to protective measures (e.g., encryption standards, MDR, etc.) implemented by the entity, etc. to requirements (e.g., protection eligibility) of the cybersecurity protection plan (e.g., encryption standards, managed detection and response (MDR) system requirements, entity size/revenue requirements, etc.).

Still referring to block 2830, the determining step executed by the processing circuits includes a computational assessment to map the entity's cybersecurity posture against a set of protection parameters. The process can include analyzing various dimensions of the entity's cybersecurity framework, including but not limited to, encryption protocols, the deployment of security measures such as firewalls, intrusion detection systems, and anti-malware tools, the entity's adherence to regulatory standards, and so on. For example, if an entity operates within a highly regulated industry such as finance or healthcare, the processing circuits account for compliance measures like HIPAA or GDPR in shaping the protection plan. This ensures the plan offers coverage for potential cybersecurity incidents and aligns with legal obligations.

Furthermore, the generation of a cybersecurity protection plan includes predicting potential vulnerabilities and simulating threat scenarios based on the entity's current cybersecurity posture. This determining step uses can use data analytics and machine learning algorithms to identify patterns and predict risks, incorporating both historical data on cyber incidents within similar industry sectors and real-time data from the entity's own network. For example, if an entity's data analysis reveals a recurrent pattern of phishing attacks, the proposed protection plan might prioritize coverage for incidents stemming from such breaches, including financial loss and data restoration costs. Additionally, the plan might suggest specific preventative measures, like enhanced employee training on phishing identification and response strategies, integrating both protection and prevention into the entity's cybersecurity framework. In some arrangements, the cybersecurity protection plan is designed to change in response to the dynamic nature of cyber threats and the entity's own changing cybersecurity landscape. As such, the processing circuits can also establish parameters for periodic re-evaluation of the entity's cybersecurity posture and subsequent plan adjustments. For instance, if an entity upgrades its cybersecurity infrastructure by implementing a new Endpoint Detection and Response (EDR) system, this enhancement could be factored into the re-assessment process, potentially leading to adjustments in the protection coverage and cost structure to reflect the reduced risk level.

At block 2840, the one or more processing circuits can provide, via a vendor security tool application, the cybersecurity protection plan. In some arrangements, at block 2840, the one or more processing circuits can provide, to a graphical user interface (GUI) of the vendor security tool application of the entity computing system of the entity, the at least one cybersecurity plan (e.g., to the entity). For example, the cybersecurity protection plan determined by the one or more processing circuits at block 2830 can be transmitted and displayed via the one or more processing circuits (e.g., using a graphical user interface (GUI)) at block 2840. In some arrangements, the cybersecurity protection plan provided via the vendor security tool application at block 2840 can include at least one selectable element (e.g., digital button, drag-n-drop, etc.). For example, the entity can interact with the selectable element (e.g., via pressing, clicking, etc.) to select one or more options related to the cybersecurity protection plan (e.g., "Yes"/"No", "I agree," etc.). For example, the entity can accept (e.g., digitally sign/approve) the cybersecurity protection plan using the selectable element.

At block 2850, the one or more processing circuits can receive an acceptance. In some arrangements, at block 2850, the one or more processing circuits can receive, from the vendor security tool application, an acceptance of the at least one cybersecurity protection plan. For example, the one or more processing circuits can receive an acceptance of the cybersecurity protection plan via the user (e.g., entity) interacting with the one or more processing circuits via an application of a client device (e.g., by using a GUI, etc.) at block 2850. For example, the entity can accept the at least one cybersecurity protection plan by selecting an "Accept" button, by providing a digital signature, etc., and the entity's acceptance can be received by the one or more processing circuits via network, as described regarding FIG. 25.

At block 2860, the one or more processing circuits can record the acceptance. In some arrangements, at block 2860, the one or more processing circuits can record the acceptance with proof embedded in a compliance dataset. For example, the one or more processing circuits can store data related to the acceptance of the cybersecurity protection plan of the entity in a data store for compliance verification, and the one or more processing circuits can embed the proof (e.g., compliance certifications, digital signatures, etc.) within the stored data. Furthermore, the acceptance stored in the compliance dataset can be stored on a distributed ledger, or on an external data store. In some arrangements, at block 2860, the acceptance recorded by the one or more processing circuits can include the cybersecurity attribute and the accepted cybersecurity protection plan. For example, the data recorded in the compliance dataset by the one or more processing circuits at block 2860 scan include data related to the cybersecurity attribute (e.g., confidentiality, integrity, authentication, etc.) and the accepted cybersecurity protection plan (e.g., artifact/identifier of signed/accepted breach protection plan, etc.). Furthermore, the compliance dataset used to embed the proof into the acceptance and record the acceptance at block 2860 can be a dataset/data structure configured to be monitored to ensure ongoing compliance with the accepted cybersecurity protection plan's cybersecurity requirements (e.g., encryption protocol compliance, security patching cadence, and access control integrity, such as SSL/TLS standards for data in transit, frequency of security updates, implementation of least privilege principles, etc.).

In some arrangements, the one or more processing circuits can further receive or collect environmental data from computing and networking structures of the entity for posture-based modeling. For example, the entity can input environmental data using the one or more processing circuits, which can be transmitted via a network and received for further use in posture-based modeling. Furthermore, the environmental data can include information related to the entity's computing and networking infrastructure such as hardware and software setups, security mechanisms, and network layouts (e.g., firewall rules, server specifications, network connections, etc.).

In some arrangements, the one or more processing circuits can further record the environmental data received/collected from the computing and networking structures of the entity in the compliance dataset. For example, the one or more processing circuits can store/catalog environmental data in a data set. Furthermore, the compliance dataset can be a structured dataset stored in a data store and used to determine the entity's compliance with various requirements (e.g., protection parameters) of the cybersecurity plan (e.g., GDPR compliance, minimum data encryption standards, etc.).

In some arrangements, determining the at least one cybersecurity protection plan by the one or more processing circuits can include executing a zero-knowledge proof (ZKP) model to determine the entity's cybersecurity posture (e.g., readiness, resilience) against the one or more protection parameters. As described herein and above, zero-knowledge proofs (ZKPs) are a cryptographic method enabling one party (the prover) to prove to another party (the verifier) that a certain statement is true without revealing any information about the statement itself beyond its veracity. In some arrangements, the ZKP model used by the one or more processing circuits to determine the entity's cybersecurity posture can maintain anonymity of all or a portion of the data used in determining the at least one cybersecurity protection plan. For example, the one or more processing circuits can execute ZKPs to match entity posture to protectability, allowing the entity to prove compliance with protection parameters (e.g., encryption standards, endpoint security) without revealing underlying data (e.g., sensitive user data, classified cybersecurity data, etc.) of the entity and/or data related to the security tool (e.g., proprietary source code used in cybersecurity product, etc.). Furthermore, the one or more processing circuits can verify, using the ZKP model, the entity's adherence to required security measures (e.g., SHA-256 encryption for data at rest, TLS 1.3 for data in transit, etc.) without exposing actual encryption keys of data being encrypted. For example, the ZKP model can be used by the one or more processing circuits to confirm the deployment of next-generation firewalls (NGFWs) required by protection parameters of the cybersecurity protection plan by the entity (e.g., vendor protection, insurance protection, regulatory protection). Further, in some arrangements, the anonymity of the entity is maintained until acceptance. For example, the one or more processing circuits, utilizing the ZKP model, can prevent a protection entity from learning the identity of a prospective entity prior to acceptance of the protection plan (e.g., before the prospective entity/the prospective entity's representative accepts the provided security plan).

In some arrangements, (1) determining at least one cybersecurity protection plan; (2) providing the at least one cybersecurity protection plan, (3) receiving the acceptance, and (4) recording the acceptance can correspond to quoting, binding, and issuing (QBI) of the cybersecurity protection plan. For example, the one or more processing circuits can further analyze qualitative business impact (QBI) and resilience against cybersecurity threats of the entity's computing infrastructure in performing the various steps described above. For example, the one or more processing circuits can unify and analyze data related to the QBI to assess the potential financial loss, reputation damage, and operational downtime associated with cybersecurity incidents (e.g., data breaches, ransomware attacks, DDoS attacks, etc.). In some arrangements, determining the at least one cybersecurity protection plan further includes quoting the cybersecurity protection plan based on matching the cybersecurity posture of the entity to the cybersecurity attribute. For example, the one or more processing circuits can compare the cybersecurity posture of the entity to cybersecurity attributes of one or more protection plans (e.g., by filtering based on protection parameters, by using GAI/ML techniques, etc.) to determine whether the entity meets various criteria (e.g., protection parameters) of the one or more protection plans and determine a protection quote (e.g., premiums, payments schedule, reimbursement, etc.) based on the identified protection plans and the entity's cybersecurity posture. Further, in this example, the one or more processing circuits can examine the robustness of security measures (e.g., deployment of redundant systems), determine the effectiveness of incident response plans (e.g., using historical/predictive datasets and/or models), and/or analyze other entity datasets and/or security tools and further generate a protection quote based on the above analysis.

For example, the one or more processing circuits can use an artificial intelligence (AI) or machine learning (ML) model (e.g., generative AI (GAI), large-language model, supervised learning model, etc.) to predict the impact of specific vulnerabilities within the entity's network (e.g., unpatched software, outdated hardware), simulate model potential attack paths (e.g., using cyber penetration testing tools), and determine potential business impacts based on the QBI. In some arrangements, providing the at least one cybersecurity protection plan, receiving the acceptance, and recording the acceptance corresponds to binding and issuing the at least one cybersecurity protection plan based on (1) transmitting a first API call to create an protection binder and (2) transmitting a second API call to issue the at least one cybersecurity protection plan. For example, the one or more processing circuits can bind (e.g., signify the protection entity's commitment to the protection agreement before the actual protection policy is issued) and issue (e.g., finalize the protection coverage by preparing and sending the formal policy documents to the entity) the protection plan by executing API calls (e.g., for submitting a protection application such as cybersecurity application, protection application, insurance application, third-party application, quoting an protection application, creating a protection binder, issuing a corresponding cyber plan, etc.), and the API calls executed by the one or more processing circuits can include data payloads for various uses in aligning security posture to protection requirements. In some arrangements, the first API call can include a first data payload including an entity identification, cybersecurity protection plan information, and a temporary protection agreement identifier. In some arrangements, the second API call can include a finalized protection policy document, a permanent policy identifier, and confirmation of policy activation covering the entity under the at least one cybersecurity protection plan.

In some arrangements, the one or more processing circuits can further automatically renew the cybersecurity protection plan of the entity based on the modeled cybersecurity posture and resilience. For example, the one or more processing circuits can evaluate and/or update the cybersecurity protection plan parameters (e.g., encryption requirements, regulatory standards, coverage levels, deductible amounts) by analyzing the modeled cybersecurity posture and resilience to extend or renew the term (e.g., period of effect) of the cybersecurity protection plan. For example, the one or more processing circuits can process the renewal of the cybersecurity protection plan by assessing adherence to encryption standards (e.g., AES-256 for data at rest, TLS 1.3 for data in transit), compliance with regulatory standards (e.g., GDPR for data protection, SOC 2 for service organizations), and more. For example, one or more processing circuits can map data associated with the entity's adherence to cybersecurity standards (e.g., based on the entity's cybersecurity posture) to various protection parameters of a cybersecurity protection plan, and further update the cybersecurity protection plan (e.g., by changing/recalibrating the cybersecurity parameters of the plan, by generating a new plan, etc.) based on the entity's adherence with the plan requirements, thereby unifying protectability tools for autorenewal.

In some arrangements, the one or more processing circuits can further dynamically update the at least one cybersecurity protection plan based at least on an update in a cybersecurity landscape or a change in one or more entities' protection preferences. For example, the one or more processing circuits can adjust the cybersecurity protection plan (e.g., by adjusting cybersecurity protection parameters) in response to emerging threats (e.g., zero-day exploits, advanced persistent threats), new compliance requirements (e.g., updates to international data protection laws), or other changes in the cybersecurity landscape identified by the one or more processing circuits. Furthermore, one or more processing circuits can update or refine the cybersecurity protection plan based on changes in the entity's protection preferences. For example, an entity can change its protection preferences when implementing more enhanced data privacy measures in light of increasing regulatory scrutiny (e.g., changing protection preferences to a higher value associated with a higher degree of cybersecurity protection, etc.). Based on evaluating the update and/or changes, the one or more processing circuits can adjust the cybersecurity protection plan to match the entity's current risk profile and cybersecurity needs (e.g., extending coverage to new digital assets, recalibrating premiums based on risk assessment outcomes, renewing a plan, generating a new plan, etc.). For example, one or more processing circuits can update one or more protection parameters to ensure the related protection plan is dynamically aligned with the entity's evolving security requirements and the external cybersecurity environment.

In some arrangements, the one or more processing circuits can further perform bulk trading of entity policies matching proof criteria for posture-based modeling, as described in detail below. In some arrangements, the one or more processing circuits can receive, from a provider computing system, a bundle request from a protection provider (sometimes referred to herein as a third-party, protection entity, e.g., vendor, insurer, certification authorities (CAs), technology partners, audit and compliance firms, cybersecurity framework organizations). For example, the one or more processing circuits can receive, from the provider computing system (e.g., client device) a bundle request for multiple protection policies that meet certain cybersecurity posture requirements (e.g., MDR system criteria). Furthermore, the bundle request can specify criteria (e.g., proof criteria) such as the presence of continuous monitoring tools, adherence to specific cybersecurity frameworks (e.g., ISO/IEC 27001, NIST), or a minimum score on cybersecurity posture assessments, and the one or more processing circuits can execute functions/algorithms to assess which policies in the market comply with these proof criteria. For example, the bundle request can be generated by the one or more processing circuits based on parsing through policy attributes, analyzing historical claims data for risk assessment, and evaluating compliance certifications that entities possess. Once a match between cybersecurity protection plans and a group of entities is identified, the one or more processing circuits can facilitate the bulk trading of the matched policies to a cybersecurity protection provider.

In some arrangements, the bundle request can include a set of cybersecurity parameters (e.g., cybersecurity protection plan criteria, such as incident response (IR) plan requirements). In some arrangements, the one or more processing circuits can determine a plurality of prospective entities satisfying the set of cybersecurity parameters. For example, the bundle request can include a set of cybersecurity parameters such as required intrusion detection system capabilities (e.g., signature-based, anomaly-based), data encryption levels (e.g., AES 256-bit encryption), and endpoint protection standards (e.g., real-time malware scanning, automated patch management). The one or more processing circuits can process data from a database of entities to identify the entities whose cybersecurity measures align with the set of cybersecurity parameters. For example, determining the entities satisfying the criteria can include the one or more processing circuits querying a compliance database for certifications held (e.g., SOC 2 Type II, PCI DSS compliance), checking configuration management databases for installed security software versions, and cross-referencing against security incident and event management logs to determine the efficacy of the entities' cybersecurity implementations (e.g., cost-avoidance based determination, etc.). Once the matching entities are identified, the one or more processing circuits can group or bundle the identified entities that meet the protection provider's bundle request criteria for cybersecurity protection.

In some arrangements, the one or more processing circuits can bundle the plurality of prospective entities and corresponding cybersecurity postures into a data package. For example, the one or more processing circuits can bundle the identified prospective entities and corresponding postures into a data package by compiling (e.g., grouping, mapping, etc.) data of the selected entities with data of the entities' security postures in a unified format (e.g., JSON, XML, etc.). Furthermore, the one or more processing circuits can use data serialization techniques (e.g., converting data structures into JSON format for ease of transmission) and/or encrypt the package using advanced encryption standards (AES) to ensure data confidentiality and integrity. For example, the bundled package can be timestamped and digitally signed using employing cryptographic hashing (e.g., SHA-256) to protect the data included in the package and to prepare the data package for secure transmission to the protection provider via encrypted communication channels.

In some arrangements, the one or more processing circuits can transmit, to a plurality of protection entity computing systems, the data package including information of the plurality of prospective entities and corresponding security postures. For example, the one or more processing circuits can transmit the bundled data package to a broker computing system, such as a third-party device, by establishing a secure connection utilizing various protocols (e.g., TLS (Transport Layer Security) for data in transit, VPN (Virtual Private Network) tunnel or a dedicated leased line for added security, etc.). Upon establishing the connection, the one or more processing circuits can initiate and execute a secure file transfer protocol (e.g., SFTP or SCP) to send the encrypted and signed data package including information of the plurality of protection plans (e.g., coverage type, reimbursements, other data related to the cybersecurity protection plans and/or cybersecurity parameters, etc.). Furthermore, the broker computing system can use decryption keys and digital signature verification tools to decrypt, authenticate, and process the received data package including information of the plurality of protection plans. In some arrangements, the data package includes a customized arrangement corresponding to an endorsement or a pricing coverage. For example, the data package can include specific terms (e.g., cyber protection terms) that offer enhanced cybersecurity protection coverage at preferential rates for prospective entities demonstrating strong cybersecurity postures (e.g., robust systems, organizational focus on cyber threats, implementation of specific cybersecurity tools, etc.). Alternatively, the data package can include terms demanding increased premiums or deductibles for entities identified as high-risk (e.g., based on cybersecurity posture, firmographic data of the prospective entity, weak cybersecurity measures implemented, etc.).

In some arrangements, the one or more processing circuits can perform bulk trading of entity policies or product policies matching proof criteria according to the process outlined above, but by determining, bundling, or transmitting a plurality of protection plans instead of a plurality of prospective entities/corresponding cybersecurity postures. For example, the one or more processing circuits can receive, from a broker computing system, the bundle request including a set of cybersecurity parameters and determine a plurality of entities (e.g., entities with cyber protection) satisfying the parameters. Further, the one or more processing circuits can identify a plurality of protection plans of the plurality of entities. For example, the one or more processing circuits can identify a plurality of protection plans by retrieving and analyzing policy attributes from a secured database. For example, the one or more processing circuits can execute database search operations (e.g., SQL JOIN queries across policyholder tables and protection plan tables) to cross-reference the protection parameters (e.g., using protection database logs, data on current cybersecurity certifications, risk assessments, etc.) to identify a plurality of protection plans implemented by the entities. The one or more processing circuits can further transmit, to a plurality of protection entity computing systems, the data package including information of the plurality of protection plans (e.g., plan type, coverage amount, term, entity cyber requirements/prerequisites, etc.), receive one or more bid requests for the bundled data package, and exchange the bundled data package for an amount. For example, the exchange can include the one or more processing circuits assigning the plurality of protection plans of the bundled data package to a protection entity.

For example, the processes outlined above can allow a broker, after digitization of cybersecurity safeguards and/or configurations of an entity, to present (e.g., independently or by partnering with a security vendor) a set of qualified prospective entities to a protection entity. For example, the set of qualified prospective entities can include a list of entities (e.g., entities seeking cybersecurity protection) and corresponding cybersecurity posture data (e.g., entity firmographic data, data related to cyber implementations, etc.) to be used by a protection entity in determining whether to bid on a portion (e.g., a bulk amount) of the prospective entities. Furthermore, after receiving the entity and cybersecurity data, the protection entities can make special arrangements (e.g., endorsements, pricing, coverage, etc.) to encourage the broker to provide the prospective entities included in the list of entities to the protection entity. For example, the protection entity can offer reduced pricing terms (e.g., lower premiums) or additional coverage options (e.g., DDoS coverage) after receiving the list of prospective entities and determining the corresponding cybersecurity postures of the entity are robust (e.g., implementation of multiple cybersecurity tools, compliance with latest industry standards, compliance with regulatory standards, etc.). Furthermore, the bid amount offered by the protection entity or the special arrangements made to encourage the broker to send the plurality of entities to the protection entity can be based on a bulk pricing model designed to factor both the number of entities included in the bid (or the entities for which special arrangements are offered) and corresponding cybersecurity postures of the entities.

In some arrangements, the one or more processing circuits can receive, from one or more broker computing systems, one or more bid requests for the bundled data package. For example, the one or more processing circuits can receive bid requests that include specific parameters such as the desired level of cybersecurity coverage (e.g., coverage against data breaches, ransomware attacks, etc.), preferred premium ranges and/or payment criteria (e.g., payment periods, late fees, etc.), and criteria for cybersecurity compliance standards (e.g., compliance with ISO/IEC 27001, NIST Cybersecurity Framework, etc.). Furthermore, each bid request received by the one or more processing circuits via the one or more broker computing systems can specify the broker's requirements for policy customization options (e.g., inclusion of cyber incident response services, coverage extensions for cloud-based assets, etc.) to match/align the protection plans with the market demand, cybersecurity landscape changes, and/or specific entity cybersecurity protection needs.

In some arrangements, the one or more processing circuits can exchange the bundled data package for an amount based on one of the one or more bid requests. For example, the one or more processing circuits can evaluate and accept a bid request (e.g., offer of monetary sum) that offers optimal terms for the exchange by evaluating various factors related to the one or more bid requests, including the proposed amount and the bidder's compliance with required cybersecurity practices (e.g., data encryption standards, regulatory compliance, etc.). In some arrangements, the exchange (e.g., process of exchanging bundled data package for amount) includes assigning the plurality of protection plans of the bundled data package to a broker. For example, the broker to whom the protection plans are assigned can be a specialized entity with a robust technological infrastructure capable of handling complex data transactions securely (e.g., intermediary). Furthermore, in assigning the protection plans to the broker, the one or more processing circuits can update a transaction ledger to reflect the transfer of ownership (e.g., the exchange of the bundled data package for monetary amount).

In some arrangements, the set of cybersecurity parameters can include proof criteria, and the proof criteria can include cybersecurity measures and technologies (SMT) of the plurality of entities. For example, the one or more processing circuits can evaluate the bundled data package against the bid requests by applying proof criteria that encompass specific cybersecurity measures and technologies (SMT) of the entities. For example, these proof criteria can include verifying the implementation of Multi-Factor Authentication (MFA) to bolster access control, assessing the effectiveness of Endpoint Detection and Response (EDR) systems in identifying and mitigating cyber threats, evaluating the coverage provided by Managed Detection and Response (MDR) services for comprehensive threat management, etc. In some arrangements, determining the at least one cybersecurity protection plan corresponding to the cybersecurity attribute further includes using the proof to ensure compliance with required cybersecurity measures and technologies. Furthermore, the proof used to ensure compliance can include documentation (e.g., security policy documents, incident response plans, employee training completion certificates), compliance proof (e.g., ISO/IEC 27001 certification, GDPR compliance reports), network security proof (e.g., firewall and IDS/IPS configuration snapshots, VPN usage logs), access control proof (e.g., MFA deployment records, access control lists), data protection proof (e.g., encryption protocol details, data backup and recovery audit trails), and/or threat detection and response proof (e.g., EDR alerts history, malware removal reports). Vendor risk management proof (e.g., third-party security assessment reports, vendor SLAs). For example, the one or more processing circuits can incorporate digital certificates or blockchain-based records as proof (e.g., stored in a database, distributed ledger, etc.). For example, these proofs can validate that an entity's cybersecurity implementations, such as MFA, EDR, and MDR, meet specific standards set by the cyber protection plan. For instance, a digital certificate could be issued to an entity upon successful implementation of MFA, and the one or more processing circuits can use this proof of implementation in determining potential cybersecurity plans for which the entity is qualified. In some arrangements, determining the at least one cybersecurity protection plan corresponding to the cybersecurity attribute further includes using one or more tokens to align the entity with the cybersecurity attributes. For example, one or more tokens can serve as digital representations of an entity's compliance with required cybersecurity measures and technologies, and holding a token can indicate that an entity has implemented certain cybersecurity measures (e.g., those that have been validated and are in active use). For example, a token could represent the active and effective use of EDR systems within the entity's network and be issued following an audit or assessment by a trusted third party or through automated systems capable of independently verifying the presence and effectiveness of EDR systems. In some arrangements, the tokens correspond to a verified and authenticated state of the entities' security posture and resilience. For example, the verified/authenticated state can indicate that the entity's security implementations have been thoroughly checked for effectiveness and compliance (e.g., verification that a cybersecurity measure is implemented by the entity, that the implemented cybersecurity measure is correctly configured and fully operational (e.g., active), etc.).

In some arrangements, the cybersecurity protection plan provided is based on the determined security posture of the entity, and the cybersecurity protection plan corresponds to one or more coverage options aligning with the entity's protection preference. For example, the one or more processing circuits can analyze the entity's digital infrastructure vulnerabilities (e.g., utilizing data collected from or related to security tools, such as data regarding recent cyber incidents, current defense mechanisms, etc.), the entity's cybersecurity needs (e.g., coverage type, amount of coverage, etc.), and other entity data (e.g., firmographic data such as entity size, revenue, etc.) to determine a cybersecurity protection plan aligning with the entity's cybersecurity needs (e.g., type of protection, integrations, etc.), preferences, technical implementations, etc. For example, the one or more processing circuits can process entity data to generate an entity risk profile that includes potential attack vectors (e.g., susceptibility to phishing, ransomware attack history), existing safeguards (e.g., deployment of firewalls, use of secure sockets layer (SSL) encryption for data transmission), and areas of compliance (e.g., adherence to the General Data Protection Regulation (GDPR) or the Health Insurance Portability and Accountability Act (HIPAA)). Based on entity risk profiles and the entity's stated cybersecurity needs, the one or more processing circuits can dynamically configure protection coverage options by providing different cybersecurity protection plans in response to different entity cybersecurity protection preferences, needs, and/or implementations (e.g., necessity of Endpoint Detection and Response (EDR) systems, desire for phishing protection, entity size/revenue, etc.).

Configuration of Exemplary Embodiments

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "including" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A data protection system for protecting data, the data protection system comprising:
   one or more processing circuits comprising memory and at least one processor configured to:
      receive, via a vendor security tool application, a cybersecurity insurance request from an entity, the cybersecurity insurance request comprising entity data of the entity;
      determine a cybersecurity posture with proof based on the entity data, the proof comprising one or more digital signatures and authenticated cybersecurity data;
      determine, utilizing one or more insurance parameters, at least one cybersecurity insurance plan corresponding to a cybersecurity attribute to protect the entity based on the cybersecurity posture with the proof, wherein determining the at least one cybersecurity insurance plan comprises using one or more tokens corresponding to a verified or authenticated state of the cybersecurity posture of the entity, wherein the one or more tokens correspond to at least one digital representation of the cybersecurity posture or compliance of the entity with one or more cybersecurity measures, technologies, or configurations;
      provide, via the vendor security tool application of an entity computing system of the entity, the at least one cybersecurity insurance plan comprising at least one selectable element;
      receive, from the vendor security tool application, an acceptance of the at least one cybersecurity insurance plan; and
      record the acceptance with the proof embedded comprising the cybersecurity attribute and the accepted cybersecurity insurance plan in a compliance dataset.

2. The system of claim 1, the at least one processor further configured to:
   receive or collect environmental data from computing and networking structures of the entity; and
   record the environmental data in the compliance dataset.

3. The system of claim 1, wherein determining the at least one cybersecurity insurance plan comprises executing a Zero-Knowledge Proof (ZKP) model to determine the entity's cybersecurity posture against the one or more insurance parameters, wherein the ZKP model maintains anonymity of all or a portion of data used in determining the at least one cybersecurity insurance plan, and wherein the anonymity of the entity is maintained until acceptance.

4. The system of claim 1, wherein (1) determining at least one cybersecurity insurance plan; (2) providing the at least one cybersecurity insurance plan, (3) receiving the acceptance, and (4) recording the acceptance corresponds to quoting, binding, and issuing (QBI) of the at least one cybersecurity insurance plan;
   wherein determining the at least one cybersecurity insurance plan further comprises quoting the at least one cybersecurity insurance plan based on matching the cybersecurity posture of the entity to the cybersecurity attribute;

wherein providing the at least one cybersecurity insurance plan, receiving the acceptance, and recording the acceptance corresponds to binding and issuing the at least one cybersecurity insurance plan based on (1) transmitting a first API call to create an insurance binder and (2) transmitting a second API call to issue the at least one cybersecurity insurance plan; and wherein the first API call comprises a first data payload comprising an entity identification, cybersecurity insurance plan information, and a temporary insurance agreement identifier, and wherein the second API call comprises a finalized insurance policy document, a permanent policy identifier, and confirmation of policy activation covering the entity under the at least one cybersecurity insurance plan.

5. The system of claim 4, the at least one processor further configured to:

automatically renew the at least one cybersecurity insurance plan of the entity based on the cybersecurity posture and a cybersecurity resilience.

6. The system of claim 1, the at least one processor further configured to:

dynamically update the at least one cybersecurity insurance plan based at least on an update in a cybersecurity landscape or a change in one or more entities' insurance protection preferences.

7. The system of claim 1, the at least one processor further configured to:

receive, from a broker computing system, a bundle request from a broker, the bundle request comprising a set of cybersecurity parameters;

determine a plurality of prospective entities satisfying the set of cybersecurity parameters;

bundle the plurality of prospective entities and corresponding cybersecurity postures into a data package;

transmit, to a plurality of insurer computing systems, the data package comprising information of the plurality of prospective entities and corresponding cybersecurity postures, the data package comprises a customized arrangement corresponding to an endorsement or a pricing coverage;

receive, from one or more broker computing systems, one or more bid requests for the bundled data package; and exchange the bundled data package for an amount based on one of the one or more bid requests, wherein the exchange comprises assigning the plurality of prospective entities of the bundled data package to an insurer.

8. The system of claim 7, wherein the set of cybersecurity parameters comprise proof criteria, the proof criteria comprising cybersecurity measures and technologies (SMT) of a plurality of insured entities, and wherein determining the at least one cybersecurity insurance plan corresponding to the cybersecurity attribute further comprises using the proof to ensure compliance with required cybersecurity measures and technologies, and using the one or more tokens to align the entity with the cybersecurity attribute.

9. The system of claim 1, wherein the at least one cybersecurity insurance plan provided is based on the determined cybersecurity posture of the entity, wherein the cybersecurity insurance plan corresponds to one or more coverage options aligning with the entity's protection preference.

10. A method of protecting data, the method comprising:

receiving, by one or more processing circuits via a vendor security tool application, a cybersecurity insurance request from an entity, the cybersecurity insurance request comprising entity data of the entity;

determining, by the one or more processing circuits a cybersecurity posture with proof based on the entity data, the proof comprising one or more digital signatures and authenticated cybersecurity data;

determining, by the one or more processing circuits utilizing one or more insurance parameters, at least one cybersecurity insurance plan corresponding to a cybersecurity attribute to protect the entity based on the cybersecurity posture with the proof, wherein determining the at least one cybersecurity insurance plan comprises using one or more tokens corresponding to a verified or authenticated state of the cybersecurity posture of the entity, wherein the one or more tokens correspond to at least one digital representation of the cybersecurity posture or compliance of the entity with one or more cybersecurity measures, technologies, or configurations;

providing, by the one or more processing circuits via the vendor security tool application of an entity computing system of the entity, the at least one cybersecurity insurance plan comprising at least one selectable element;

receiving, by the one or more processing circuits from the vendor security tool application, an acceptance of the at least one cybersecurity insurance plan; and recording, by the one or more processing circuits, the acceptance with the proof embedded comprising the cybersecurity attribute and the accepted cybersecurity insurance plan in a compliance dataset.

11. The method of claim 10, further comprising:

receiving or collecting, by the one or more processing circuits, environmental data from computing and networking structures of the entity; and recording, by the one or more processing circuits, the environmental data in the compliance dataset.

12. The method of claim 10, wherein determining the at least one cybersecurity insurance plan comprises executing a Zero-Knowledge Proof (ZKP) model to determine the entity's cybersecurity posture against the one or more insurance parameters, wherein the ZKP model maintains anonymity of all or a portion of data used in determining the at least one cybersecurity insurance plan, and wherein the anonymity of the entity is maintained until acceptance.

13. The method of claim 10, wherein (1) determining at least one cybersecurity insurance plan; (2) providing the at least one cybersecurity insurance plan, (3) receiving the acceptance, and (4) recording the acceptance corresponds to quoting, binding, and issuing (QBI) of the at least one cybersecurity insurance plan;

wherein determining the at least one cybersecurity insurance plan further comprises quoting the at least one cybersecurity insurance plan based on matching the cybersecurity posture of the entity to the cybersecurity attribute;

wherein providing the at least one cybersecurity insurance plan, receiving the acceptance, and recording the acceptance corresponds to binding and issuing the at least one cybersecurity insurance plan based on (1) transmitting a first API call to create an insurance binder and (2) transmitting a second API call to issue the at least one cybersecurity insurance plan;

wherein the first API call comprises a first data payload comprising an entity identification, cybersecurity insurance plan information, and a temporary insurance agreement identifier, and wherein the second API call comprises a finalized insurance policy document, a permanent policy identifier, and confirmation of policy activation covering the entity under the at least one cybersecurity insurance plan.

14. The method of claim 13, further comprising:
automatically renewing, by the one or more processing circuits, the at least one cybersecurity insurance plan of the entity based on the cybersecurity posture and a cybersecurity resilience.

15. The method of claim 10, further comprising:
dynamically updating, by the one or more processing circuits, the at least one cybersecurity insurance plan based at least on an update in a cybersecurity landscape or a change in one or more entities' insurance protection preferences.

16. The method of claim 10, further comprising:
receiving, by the one or more processing circuits from a provider computing system, a bundle request from an insurance provider, the bundle request comprising a set of cybersecurity parameters;
determining, by the one or more processing circuits, a plurality of insured entities protected by the insurance provider satisfying the set of cybersecurity parameters;
identifying, by the one or more processing circuits, a plurality of insurance plans of the plurality of insured entities;
bundling, by the one or more processing circuits, the plurality of insurance plans into a data package;
transmitting, by the one or more processing circuits to a broker computing system, the data package comprising information of the plurality of insurance plans;
receiving, by the one or more processing circuits from one or more broker computing systems, one or more bid requests for the bundled data package; and
exchanging, by the one or more processing circuits, the bundled data package for an amount based on one of the one or more bid requests, wherein the exchange comprises assigning the plurality of insurance plans of the bundled data package to a broker.

17. The method of claim 16, wherein the set of cybersecurity parameters comprise proof criteria, the proof criteria comprising cybersecurity measures and technologies (SMT) of the plurality of insured entities, and wherein determining the at least one cybersecurity insurance plan corresponding to the cybersecurity attribute further comprises using the proof to ensure compliance with required cybersecurity measures and technologies, and using the one or more tokens to align the entity with the cybersecurity attribute.

18. The method of claim 10, wherein the at least one cybersecurity insurance plan provided is based on the determined cybersecurity posture of the entity, wherein the cybersecurity insurance plan corresponds to one or more coverage options aligning with the entity's protection preference.

19. A non-transitory computer readable medium (CRM) comprising one or more instructions stored thereon and executable by one or more processors to:
receive, via a vendor security tool application, a cybersecurity insurance request from an entity, the cybersecurity insurance request comprising entity data of the entity;
determine a cybersecurity posture with proof based on the entity data, the proof comprising one or more digital signatures and authenticated cybersecurity data;
determine, utilizing one or more insurance parameters, at least one cybersecurity insurance plan corresponding to a cybersecurity attribute to protect the entity based on the cybersecurity posture with the proof, wherein determining the at least one cybersecurity insurance plan comprises using one or more tokens corresponding to a verified or authenticated state of the cybersecurity posture of the entity, wherein the one or more tokens correspond to at least one digital representation of the cybersecurity posture or compliance of the entity with one or more cybersecurity measures, technologies, or configurations;
provide, via the vendor security tool application of an entity computing system of the entity, the at least one cybersecurity insurance plan comprising at least one selectable element;
receive, from the vendor security tool application, an acceptance of the at least one cybersecurity insurance plan; and
record the acceptance with the proof embedded comprising the cybersecurity attribute and the accepted cybersecurity insurance plan in a compliance dataset.

20. A non-transitory CRM of claim 19, wherein determining the at least one cybersecurity insurance plan comprises executing a Zero-Knowledge Proof (ZKP) model to determine the entity's cybersecurity posture against the one or more insurance parameters, wherein the ZKP model maintains anonymity of all or a portion of data used in determining the at least one cybersecurity insurance plan, and wherein the anonymity of the entity is maintained until acceptance.

* * * * *